(12) United States Patent
Camp et al.

(10) Patent No.: US 12,275,559 B2
(45) Date of Patent: Apr. 15, 2025

(54) MODULAR STORAGE SYSTEM WITH STORAGE BOX CONNECTIVITY AND INTERNAL STORAGE AND LID FEATURES

(71) Applicant: Makita U.S.A., Inc., La Mirada, CA (US)

(72) Inventors: Andrew Camp, La Mirada, CA (US); Marc Tappeiner, Santa Barbara, CA (US); Jeremy Allan, Santa Barbara, CA (US); Ethan W. Franklin, Santa Barbara, CA (US); Cameron Putnam, Santa Barbara, CA (US); John Grant, Middletown, OH (US); Amin Dahrehsobh, Santa Barbara, CA (US); Kenneth Hefley, La Mirada, CA (US); Keisuke Kato, La Mirada, CA (US); Brent Withey, La Mirada, CA (US); Austin Donoghue, La Mirada, CA (US); Nathan Santos, La Mirada, CA (US); Justin Guthrie, Plano, IL (US); Edward Mark Harris, Plano, IL (US)

(73) Assignee: Makita U.S.A., Inc., La Mirada, CA (US)

( * ) Notice: Subject to any disclaimer, the term of this patent is extended or adjusted under 35 U.S.C. 154(b) by 109 days.

(21) Appl. No.: 17/966,529

(22) Filed: Oct. 14, 2022

(65) Prior Publication Data
US 2023/0415956 A1    Dec. 28, 2023

Related U.S. Application Data

(60) Provisional application No. 63/356,031, filed on Jun. 27, 2022, provisional application No. 63/355,461, (Continued)

(51) Int. Cl.
*B65D 21/02* (2006.01)
*B25H 3/02* (2006.01)
(Continued)

(52) U.S. Cl.
CPC ......... *B65D 21/0213* (2013.01); *B25H 3/021* (2013.01); *B62B 1/12* (2013.01);
(Continued)

(58) Field of Classification Search
CPC ...... B25H 3/02; B25H 3/021; B62B 2206/04; B62B 1/12; B65D 1/0284; B65D 1/0292;
(Continued)

(56) References Cited

U.S. PATENT DOCUMENTS 5,680,932 A * 10/1997 Dickinson ............... B25H 3/023
 220/523
6,176,559 B1   1/2001 Tiramani et al.
(Continued)

FOREIGN PATENT DOCUMENTS

CA    2904042 A1 *  3/2016 ............ B25G 1/102
CN    204195729 U   3/2015
(Continued)

*Primary Examiner* — Anthony D Stashick
*Assistant Examiner* — Marcos Javier Rodriguez Molina
(74) *Attorney, Agent, or Firm* — Dickinson Wright PLLC

(57) ABSTRACT

A modular storage system of connectable, heavy-duty storage boxes, crates, rolling carts and/or dollies, work surfaces, organizers, trays, accessories is provided for internal and external item storage and organization and convenient access for use and transport, that is expandable, customizable and readily adaptable. Storage boxes have different sizes by length, width and/or height and have universal box-to-box connection system for stacking and connection to mounting accessories. Boxes have removable, customizable organization inserts (e.g., dividers, storage trays, bins, alignment trays for bins, and bins of different sizes). Box lid
(Continued)

rib grid with bosses and undercuts expands internal organization, including cooperation with dual purpose dividers and accessories. Boxes have external mounting accessories to expand external organization. Different housing modes are provided including wall mount systems for wall or side of a truck or van, and different transport modes are provided (e.g., base box with wheels, or on a dolly or a cart).

12 Claims, 167 Drawing Sheets

Related U.S. Application Data filed on Jun. 24, 2022, provisional application No. 63/355,498, filed on Jun. 24, 2022, provisional application No. 63/280,896, filed on Nov. 18, 2021, provisional application No. 63/256,490, filed on Oct. 15, 2021.

(51) Int. Cl.
  *B62B 1/12* (2006.01)
  *B65D 25/06* (2006.01)
  *B65D 25/28* (2006.01)
  *B65D 45/16* (2006.01)

(52) U.S. Cl.
  CPC ..... *B65D 21/0201* (2013.01); *B65D 21/0217* (2013.01); *B65D 21/0222* (2013.01); *B65D 21/023* (2013.01); *B65D 25/06* (2013.01); *B65D 25/2882* (2013.01); *B65D 45/16* (2013.01); *B62B 2206/04* (2013.01); *B65D 2525/284* (2013.01); *B65D 2543/00027* (2013.01)

(58) Field of Classification Search
  CPC . B65D 1/24; B65D 1/265; B65D 1/28; B65D 1/38; B65D 1/40; B65D 1/42; B65D 11/06; B65D 11/10; B65D 11/1873; B65D 11/188; B65D 17/401; B65D 17/4011; B65D 19/00; B65D 19/0004; B65D 19/0028; B65D 19/0073; B65D 19/0095; B65D 19/06; B65D 19/08; B65D 19/20; B65D 19/38; B65D 21/02; B65D 21/0201; B65D 21/0212; B65D 21/0213; B65D 21/0217; B65D 21/0222; B65D 21/0223; B65D 21/0235; B65D 21/04; B65D 21/045; B65D 21/086; B65D 2203/00; B65D 2203/02; B65D 2203/12; B65D 2205/00; B65D 2213/02; B65D 2231/001; B65D 2231/022; B65D 2231/025; B65D 2251/0025; B65D 2251/0031; B65D 2251/0093; B65D 2251/023; B65D 2251/1016; B65D 2251/1033; B65D 23/00; B65D 23/003; B65D 2301/10; B65D 2313/00; B65D 2401/25; B65D 2401/55; B65D 25/04; B65D 25/06; B65D 25/105; B65D 25/107; B65D 25/20; B65D 25/205; B65D 25/2805; B65D 25/2808; B65D 25/2888; B65D 25/325; B65D 25/34; B65D 25/56; B65D 2501/0018; B65D 2501/0045; B65D 2501/0081; B65D 2501/0011; B65D 2517/0022; B65D 2517/5027; B65D 2517/5045; B65D 2517/00019; B65D 2519/00024; B65D 2519/00054; B65D 2519/00059; B65D 2519/00069; B65D 2519/00089; B65D 2519/00129; B65D 2519/00134; B65D 2519/00144; B65D 2519/00159; B65D 2519/00184; B65D 2519/00199; B65D 2519/00233; B65D 2519/00243; B65D 2519/00288; B65D 2519/00293; B65D 2519/00318; B65D 2519/00323; B65D 2519/00348; B65D 2519/00358; B65D 2519/00378; B65D 2519/00388; B65D 2519/00412; B65D 2519/00417; B65D 2519/00422; B65D 2519/00427; B65D 2519/00437; B65D 2519/00442; B65D 2519/00452; B65D 2519/00457; B65D 2519/00497; B65D 2519/00502; B65D 2519/00507; B65D 2519/00512; B65D 2519/00522; B65D 2519/00527; B65D 2519/00532; B65D 2519/00557; B65D 2519/00562; B65D 2519/00567; B65D 2519/00572; B65D 2519/00577; B65D 2519/00587; B65D 2519/00597; B65D 2519/00601; B65D 2519/00611; B65D 2519/00621; B65D 2519/00626; B65D 2519/00641; B65D 2519/00651; B65D 2519/00656; B65D 2519/00661; B65D 2519/00666; B65D 2519/00701; B65D 2519/00711; B65D 2519/00726; B65D 2519/00731; B65D 2519/00791; B65D 2519/00796; B65D 2519/008; B65D 2519/00805; B65D 2519/0081; B65D 2519/00815; B65D 2519/00835; B65D 2519/0084; B65D 2519/0086; B65D 2519/00875; B65D 2519/0088; B65D 2519/009; B65D 2519/0091; B65D 2519/00915; B65D 2519/00925; B65D 2519/0093; B65D 2519/0094; B65D 2519/00955; B65D 2519/0096; B65D 2519/00965; B65D 2519/0097; B65D 2519/00975; B65D 2519/0099; B65D 2519/00995; B65D 2525/284; B65D 2543/00; B65D 2543/00009; B65D 2543/00018; B65D 2543/00027; B65D 2543/00037; B65D 2543/00046; B65D 2543/00083; B65D 2543/00092; B65D 2543/00101; B65D 2543/00148; B65D 2543/00175; B65D 2543/00194; B65D 2543/00231; B65D 2543/0024; B65D 2543/00259; B65D 2543/00268; B65D 2543/00277; B65D 2543/00296; B65D 2543/00305; B65D 2543/00314; B65D 2543/0037; B65D 2543/00398; B65D 2543/00407; B65D 2543/00425; B65D 2543/00472; B65D 2543/0049; B65D 2543/00509; B65D 2543/00518; B65D 2543/00527; B65D 2543/00537; B65D 2543/00546; B65D 2543/00555; B65D 2543/00564; B65D 2543/00574; B65D 2543/0062; B65D 2543/00638; B65D 2543/00657; B65D 2543/00685; B65D 2543/00694; B65D 2543/00731; B65D 2543/0074; B65D 2543/00759; B65D 2543/00796; B65D 2543/00805; B65D 2543/00842; B65D 2543/00972; B65D 2571/00037; B65D 2571/00043; B65D 2571/00055; B65D 2571/00117; B65D 2571/00141; B65D 2571/00425; B65D 2571/0045; B65D 2571/00574; B65D 2571/00666; B65D 2571/00796; B65D
2571/00802; B65D 2577/043; B65D
2577/205; B65D 2577/2091; B65D
2581/055; B65D 2581/3441; B65D
2581/3447; B65D 2581/3468; B65D
2581/349; B65D 2581/3493; B65D
2585/545; B65D 2585/56; B65D 2585/68;
B65D 2585/6875; B65D 2585/6882;
B65D 2585/88; B65D 2590/0058; B65D
2590/0066; B65D 3/06; B65D 33/00;
B65D 35/02; B65D 35/28; B65D 35/38;
B65D 35/44; B65D 37/00; B65D 39/04;
B65D 39/08; B65D 39/16; B65D 41/00;
B65D 41/005; B65D 41/0414; B65D
41/0428; B65D 41/16; B65D 41/22;
B65D 41/26; B65D 41/265; B65D 41/32;
B65D 41/34; B65D 41/3409; B65D
41/3414; B65D 41/3428; B65D 41/3438;
B65D 41/3447; B65D 41/48; B65D
41/485; B65D 41/62; B65D 43/02; B65D
43/0202; B65D 43/0204; B65D 43/0212;
B65D 43/0216; B65D 43/0218; B65D
43/0222; B65D 43/0235; B65D 43/14;
B65D 43/16; B65D 43/161; B65D
43/162; B65D 43/163; B65D 43/167;
B65D 43/169; B65D 43/18; B65D 43/22;
B65D 45/02; B65D 45/16; B65D 45/32;
B65D 45/34; B65D 45/345; B65D 47/00;
B65D 47/06; B65D 47/066; B65D
47/0819; B65D 47/103; B65D 47/121;
B65D 47/123; B65D 47/147; B65D
47/18; B65D 47/26; B65D 47/265; B65D
47/268; B65D 47/305; B65D 47/32;
B65D 47/36; B65D 47/42; B65D 5/2033;
B65D 5/2042; B65D 5/2047; B65D
5/243; B65D 5/244; B65D 5/246; B65D
5/3621; B65D 5/3657; B65D 5/42; B65D
5/4212; B65D 5/4295; B65D 5/44; B65D
5/448; B65D 5/48; B65D 5/48008; B65D
5/48016; B65D 5/48032; B65D 5/48038;
B65D 5/50; B65D 5/5019; B65D 5/5028;
B65D 5/5038; B65D 5/5059; B65D
5/5071; B65D 5/5073; B65D 5/5095;
B65D 5/5206; B65D 5/60; B65D 5/62;
B65D 5/64; B65D 5/66; B65D 5/68;
B65D 5/746; B65D 51/002; B65D 51/16;
B65D 51/1616; B65D 51/1644; B65D
51/18; B65D 51/185; B65D 51/20; B65D
51/224; B65D 51/226; B65D 51/228;
B65D 51/24; B65D 51/242; B65D
51/249; B65D 51/28; B65D 51/30; B65D
53/00; B65D 53/02; B65D 53/04; B65D
53/06; B65D 55/02; B65D 55/026; B65D
55/06; B65D 55/0845; B65D 55/16;
B65D 57/00; B65D 61/00; B65D 63/10;
B65D 63/12; B65D 65/40; B65D 65/42;
B65D 65/46; B65D 65/463; B65D
65/466; B65D 7/00; B65D 7/04; B65D
7/10; B65D 7/14; B65D 7/20; B65D
7/24; B65D 7/26; B65D 7/30; B65D
7/42; B65D 71/00; B65D 71/0096; B65D
71/36; B65D 71/508; B65D 71/70; B65D
73/0078; B65D 75/22; B65D 75/24;
B65D 75/26; B65D 75/30; B65D 75/32;
B65D 75/327; B65D 75/34; B65D 75/42;
B65D 75/525; B65D 75/527; B65D
75/5827; B65D 75/5855; B65D 77/02;
B65D 77/04; B65D 77/0413; B65D
77/0453; B65D 77/046; B65D 77/0466;
B65D 77/06; B65D 77/061; B65D
77/062; B65D 77/065; B65D 77/068;
B65D 77/18; B65D 77/20; B65D
77/2004; B65D 77/2012; B65D 77/2024;
B65D 77/2032; B65D 77/2056; B65D
77/206; B65D 77/225; B65D 77/30;
B65D 79/005; B65D 79/0084; B65D
79/0087; B65D 79/02; B65D 81/02;
B65D 81/022; B65D 81/05; B65D
81/052; B65D 81/057; B65D 81/07;
B65D 81/107; B65D 81/1075; B65D
81/113; B65D 81/127; B65D 81/1275;
B65D 81/133; B65D 81/18; B65D
81/2038; B65D 81/2053; B65D 81/22;
B65D 81/24; B65D 81/26; B65D 81/261;
B65D 81/263; B65D 81/264; B65D
81/268; B65D 81/30; B65D 81/32;
B65D 81/34; B65D 81/3453; B65D 81/3484;
B65D 81/36; B65D 81/38; B65D
81/3816; B65D 81/3823; B65D 81/3825;
B65D 81/3865; B65D 81/3893; B65D
81/3897; B65D 83/00; B65D 83/0011;
B65D 83/005; B65D 83/0055; B65D
83/04; B65D 83/06; B65D 83/0805;
B65D 83/0882; B65D 83/20; B65D
83/203; B65D 83/205; B65D 83/285;
B65D 83/30; B65D 83/303; B65D
83/384; B65D 83/40; B65D 83/60; B65D
83/62; B65D 85/00; B65D 85/1045;
B65D 85/18; B65D 85/187; B65D 85/20;
B65D 85/30; B65D 85/32; B65D 85/321;
B65D 85/322; B65D 85/324; B65D
85/34; B65D 85/38; B65D 85/42; B65D
85/48; B65D 85/50; B65D 85/505; B65D
85/52; B65D 85/54; B65D 85/66; B65D
85/672; B65D 85/68; B65D 85/70; B65D
85/72; B65D 85/74; B65D 85/78; B65D
85/8043; B65D 85/8049; B65D 85/8052;
B65D 85/8055; B65D 85/8061; B65D
85/816; Y02W 10/10
USPC ......... 206/100, 11, 210, 217, 228, 232, 264,
206/272, 308.3, 356, 359, 361, 362.2,
206/363, 366, 370, 380, 382, 438, 449,
206/456, 459.5, 460, 484, 503, 525, 534,
206/534.1, 538, 539, 558, 569, 577, 63.3,
206/803, 811, 820, 822, 425, 524.2, 701;
220/1.5, 200, 212, 23.2, 23.8, 23.83,
220/23.87, 23.88, 23.89, 23.91, 252,
220/254.4, 254.8, 260, 268, 277, 284,
220/288, 291, 296, 3.2, 3.3, 3.7, 305,
220/315, 323, 324, 325, 327, 350, 359.4,
220/367.1, 372, 376, 378, 4.01, 4.11,
220/4.16, 4.21, 4.22, 4.24, 477, 480,
220/495.06, 500, 502, 506, 522, 524, 553,
220/560.03, 565, 573.1, 573.4, 575, 578,
220/592.28, 609, 612, 62, 62.14, 62.18,
220/620, 621, 657, 666, 669, 671, 672,
220/675, 682, 683, 684, 689, 714, 797,
220/798, 800, 805, 824, 833, 837, 849, 220/86.1, 86.3, 9.1, DIG. 1, DIG. 28, 220/DIG. 32, DIG. 33
See application file for complete search history.

(56) References Cited

U.S. PATENT DOCUMENTS

| | | | |
|---|---|---|---|
| D437,484 S | 2/2001 | Tiramani et al. | |
| 6,371,320 B2 | 4/2002 | Sagol | |
| 6,601,930 B2 | 8/2003 | Tiramani et al. | |
| 6,761,366 B1 | 7/2004 | Klemmensen et al. | |
| 6,889,838 B2 | 5/2005 | Meier et al. | |
| 6,955,381 B2 | 10/2005 | Parker et al. | |
| 7,121,407 B2 | 10/2006 | Hurt et al. | |
| 7,537,119 B2 | 5/2009 | Becklin | |
| 7,740,138 B2 | 6/2010 | Becklin | |
| 7,854,321 B2 * | 12/2010 | Twig | B25H 3/023 206/483 |
| D630,851 S | 1/2011 | Landau et al. | |
| 7,883,096 B2 | 2/2011 | Katz et al. | |
| D640,869 S | 7/2011 | Katz et al. | |
| 8,132,819 B2 | 3/2012 | Landau et al. | |
| 8,210,387 B2 | 7/2012 | Twig et al. | |
| 8,505,729 B2 | 8/2013 | Sosnovsky et al. | |
| 8,567,796 B2 | 10/2013 | Bar-Erez et al. | |
| 8,590,704 B2 | 11/2013 | Koenig et al. | |
| 8,602,217 B2 | 12/2013 | Sosnovsky et al. | |
| 8,657,307 B2 | 2/2014 | Lifshitz et al. | |
| D701,696 S | 4/2014 | Shitrit et al. | |
| D702,044 S | 4/2014 | Shitrit et al. | |
| 8,851,287 B2 | 10/2014 | Becklin | |
| 8,875,888 B2 | 11/2014 | Koenig et al. | |
| 8,936,258 B2 | 1/2015 | Bar-Erez et al. | |
| 8,979,100 B2 | 3/2015 | Bensman et al. | |
| 9,038,244 B2 | 5/2015 | Tonelli et al. | |
| 9,132,543 B2 | 9/2015 | Bar-Erez et al. | |
| 9,290,299 B2 | 3/2016 | McTavish et al. | |
| 9,393,684 B2 | 7/2016 | Christopher et al. | |
| 9,393,685 B2 | 7/2016 | Chen | |
| 9,511,491 B2 | 12/2016 | Brunner | |
| 9,539,722 B2 | 1/2017 | Martinez et al. | |
| 9,566,990 B2 | 2/2017 | Bar-Erez et al. | |
| 9,616,562 B2 | 4/2017 | Hoppe et al. | |
| 9,643,629 B2 | 5/2017 | Bar-Erez et al. | |
| 9,701,443 B2 | 7/2017 | Wang | |
| 9,725,209 B1 | 8/2017 | Ben-Gigi | |
| 9,802,741 B2 | 10/2017 | Phelan | |
| 10,022,856 B2 | 7/2018 | Bensman et al. | |
| 10,086,508 B2 | 10/2018 | Hoppe et al. | |
| 10,099,815 B2 | 10/2018 | Peña Valcárcel | |
| 10,106,180 B2 | 10/2018 | Bar-Erez et al. | |
| 10,160,471 B2 | 12/2018 | Yahav et al. | |
| 10,179,672 B2 | 1/2019 | Kuhls et al. | |
| 10,213,914 B2 | 2/2019 | Chen | |
| 10,231,524 B2 | 3/2019 | Tonelli et al. | |
| D844,324 S | 4/2019 | Hoppe et al. | |
| 10,293,477 B2 | 5/2019 | Wolle et al. | |
| 10,308,409 B2 | 6/2019 | Stuart et al. | |
| 10,343,702 B2 | 7/2019 | Stuart et al. | |
| 10,350,746 B2 | 7/2019 | Martinez et al. | |
| 10,384,844 B2 | 8/2019 | Phelan | |
| 10,434,638 B1 * | 10/2019 | Tsai | B65D 21/0223 |
| 10,569,412 B1 * | 2/2020 | Reyes | B25H 3/021 |
| 10,575,417 B2 | 2/2020 | Sabbag et al. | |
| 10,583,962 B2 | 3/2020 | Brunner et al. | |
| 10,603,783 B2 | 3/2020 | Brocket et al. | |
| 10,603,784 B2 | 3/2020 | Timm et al. | |
| 10,703,534 B2 | 7/2020 | Brunner et al. | |
| 10,710,770 B2 | 7/2020 | Kögel et al. | |
| 10,722,012 B2 | 7/2020 | Kraus et al. | |
| 10,730,542 B1 | 8/2020 | Guirlinger | |
| 10,750,833 B2 | 8/2020 | Burchia | |
| 10,773,374 B2 | 9/2020 | Hoppe et al. | |
| 10,787,186 B2 | 9/2020 | Bar-Erez et al. | |
| 10,793,172 B2 | 10/2020 | Brunner | |
| 10,829,269 B2 | 11/2020 | Gonitianer et al. | |
| 10,870,513 B2 | 12/2020 | Gonitianer et al. | |
| 10,981,696 B2 | 4/2021 | Brunner et al. | |
| 11,008,136 B2 | 5/2021 | Brunner et al. | |
| 11,027,883 B1 | 6/2021 | Brunner et al. | |
| 11,059,504 B2 | 7/2021 | Stuart et al. | |
| 11,059,631 B1 | 7/2021 | Brunner et al. | |
| 11,155,382 B1 | 10/2021 | Cai | |
| 11,192,689 B2 | 12/2021 | Cai | |
| 11,192,690 B1 | 12/2021 | Brunner et al. | |
| 11,230,410 B2 | 1/2022 | Brunner | |
| 11,235,907 B2 | 2/2022 | Workman | |
| 11,279,518 B2 | 3/2022 | Kögel et al. | |
| 2011/0139777 A1 | 6/2011 | Sosnovsky et al. | |
| 2014/0166516 A1 * | 6/2014 | Martinez | A45F 5/021 206/372 |
| 2016/0023349 A1 * | 1/2016 | Hoppe | A45C 7/0086 280/47.24 |
| 2017/0165829 A1 | 6/2017 | Damberg | |
| 2019/0225371 A1 | 7/2019 | Hoppe et al. | |
| 2019/0232484 A1 | 8/2019 | Ender | |
| 2019/0321963 A1 | 10/2019 | Tsai | |
| 2019/0337143 A1 | 11/2019 | Martinez et al. | |
| 2020/0039056 A1 | 2/2020 | Damberg | |
| 2020/0078929 A1 | 3/2020 | Liu | |
| 2020/0147781 A1 | 5/2020 | Squiers et al. | |
| 2020/0165036 A1 | 5/2020 | Squiers et al. | |
| 2020/0189636 A1 | 6/2020 | Brunner | |
| 2020/0299027 A1 | 9/2020 | Brunner et al. | |
| 2020/0329837 A1 | 10/2020 | Burchia et al. | |
| 2020/0353612 A1 | 11/2020 | McCune et al. | |
| 2020/0406446 A1 | 12/2020 | Hoppe et al. | |
| 2021/0031975 A1 | 2/2021 | Brunner et al. | |
| 2021/0039831 A1 * | 2/2021 | Brunner | B65D 21/0212 |
| 2021/0094600 A1 | 4/2021 | Brunner et al. | |
| 2021/0104909 A1 | 4/2021 | Mantych | |
| 2021/0139197 A1 | 5/2021 | Brunner et al. | |
| 2021/0154824 A1 | 5/2021 | Barton | |
| 2021/0221561 A1 | 7/2021 | Davidian et al. | |
| 2021/0283766 A1 | 9/2021 | Brocket et al. | |
| 2021/0300448 A1 | 9/2021 | Stuart et al. | |
| 2021/0316909 A1 | 10/2021 | Vargo et al. | |
| 2021/0387325 A1 | 12/2021 | Heath et al. | |
| 2022/0033140 A1 | 2/2022 | Barabeisch et al. | |
| 2022/0081162 A1 | 3/2022 | Brunner et al. | |
| 2022/0097926 A1 | 3/2022 | Whitmire et al. | |
| 2022/0153474 A1 | 5/2022 | Workman | |

FOREIGN PATENT DOCUMENTS

| | | | |
|---|---|---|---|
| CN | 204640188 U | 9/2015 | |
| CN | 206998874 U | 2/2018 | |
| CN | 107813274 A | 3/2018 | |
| CN | 207656652 U | 7/2018 | |
| CN | 207696499 U | 8/2018 | |
| CN | 209190734 U | 8/2019 | |
| CN | 110254902 A | 9/2019 | |
| CN | 110733015 A | 1/2020 | |
| CN | 210307728 U | 4/2020 | |
| CN | 211163860 U1 | 8/2020 | |
| CN | 211392067 U | 9/2020 | |
| CN | 211392068 U | 9/2020 | |
| CN | 211761406 U | 10/2020 | |
| CN | 212887558 U | 4/2021 | |
| CN | 213562479 U | 6/2021 | |
| CN | 107249378 B | 9/2021 | |
| CN | 108367427 B | 12/2021 | |
| CN | 113891838 A | 1/2022 | |
| CN | 215972685 U | 3/2022 | |
| DE | 4107267 A1 | 9/1992 | |
| DE | 102013202869 A1 | 9/2013 | |
| DE | 202015005752 U1 | 11/2016 | |
| DE | 202016103775 U1 | 10/2017 | |
| DE | 102016218116 A1 | 3/2018 | |
| DE | 202017104697 U1 | 11/2018 | |
| DE | 102017117185 A1 * | 1/2019 | A45C 13/10 |
| DE | 202017107317 U1 | 3/2019 | |
| DE | 102018121479 A1 | 3/2020 | |
| EM | 007295787-0001 | 11/2019 | |
| EP | 2315701 B1 | 2/2012 | |
| EP | 2965869 A1 * | 1/2016 | A45C 13/02 |

(56) References Cited

FOREIGN PATENT DOCUMENTS

| EP | 3 199 306 A1 | | 8/2017 | |
|---|---|---|---|---|
| EP | 3438385 A1 | | 2/2019 | |
| EP | 3563978 A1 | | 11/2019 | |
| JP | 2018033288 | * | 3/2018 | ............... B25H 3/02 |
| JP | 2019089594 | * | 6/2019 | ............... B65D 6/36 |
| JP | 2020142818 | * | 9/2020 | ............ B65D 43/02 |
| JP | 2021138419 | * | 9/2021 | ............ B65D 21/02 |
| KR | 20170089488 A | * | 8/2017 | ............. A62B 1/18 |
| KR | 20170003172 | * | 9/2017 | ............... B25H 3/02 |
| WO | 11/078763 A1 | | 6/2011 | |
| WO | WO-2011078763 A1 | * | 6/2011 | ............... B25H 3/02 |
| WO | 14102781 A1 | | 7/2014 | |
| WO | WO-2014102781 A1 | * | 7/2014 | ............... B25H 3/02 |
| WO | 16091818 A1 | | 6/2016 | |
| WO | WO-2016091570 A1 | * | 6/2016 | ............ A45C 13/02 |
| WO | 2019147801 A2 | | 8/2019 | |
| WO | 20055726 A1 | | 3/2020 | |
| WO | WO-2020055726 A1 | * | 3/2020 | ............ B25H 3/023 |
| WO | 2020/227630 | | 11/2020 | |
| WO | 21102180 A1 | | 5/2021 | |
| WO | 2021/140500 A1 | | 7/2021 | |
| WO | 2021/240503 A1 | | 12/2021 | |

* cited by examiner

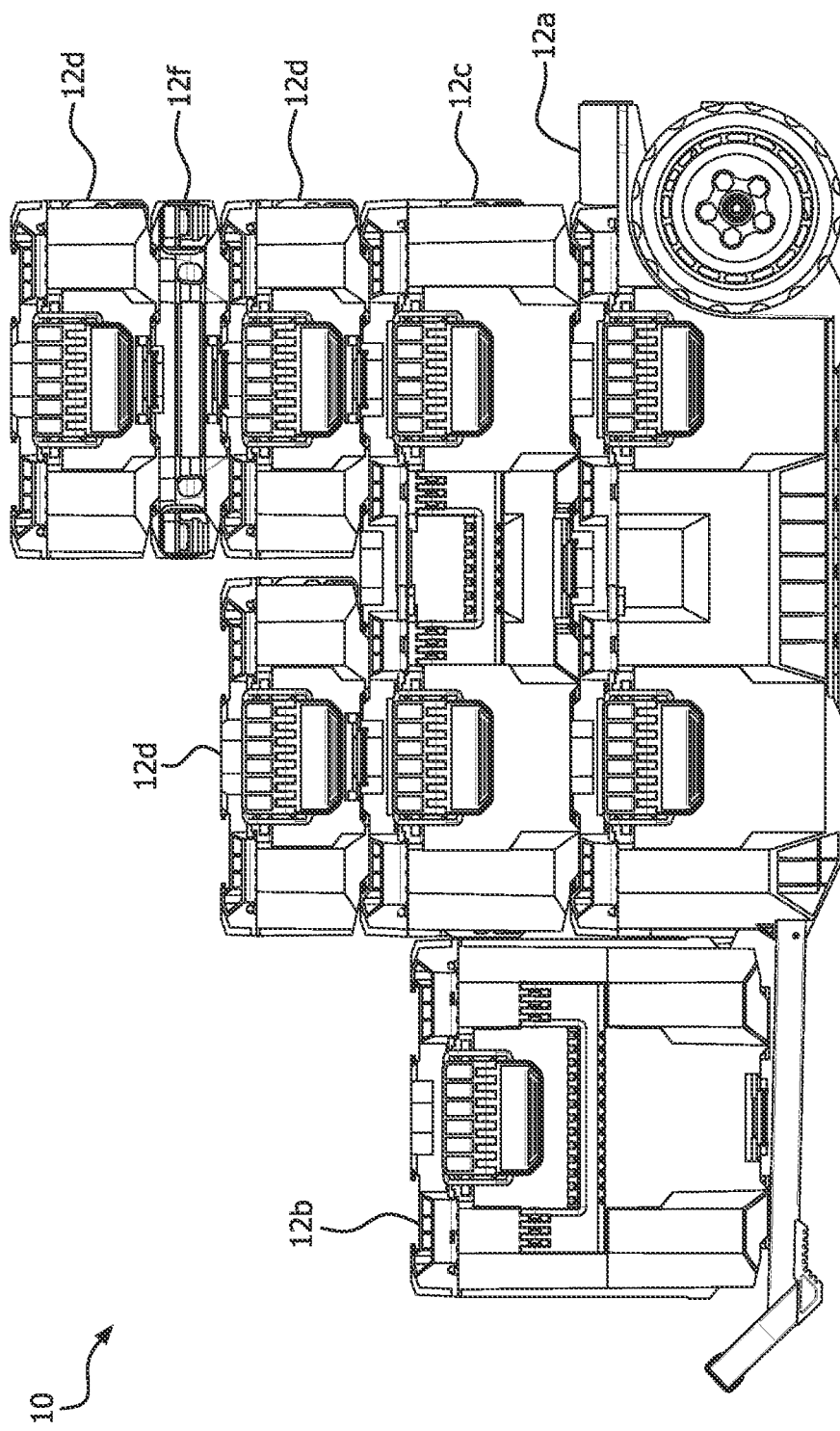

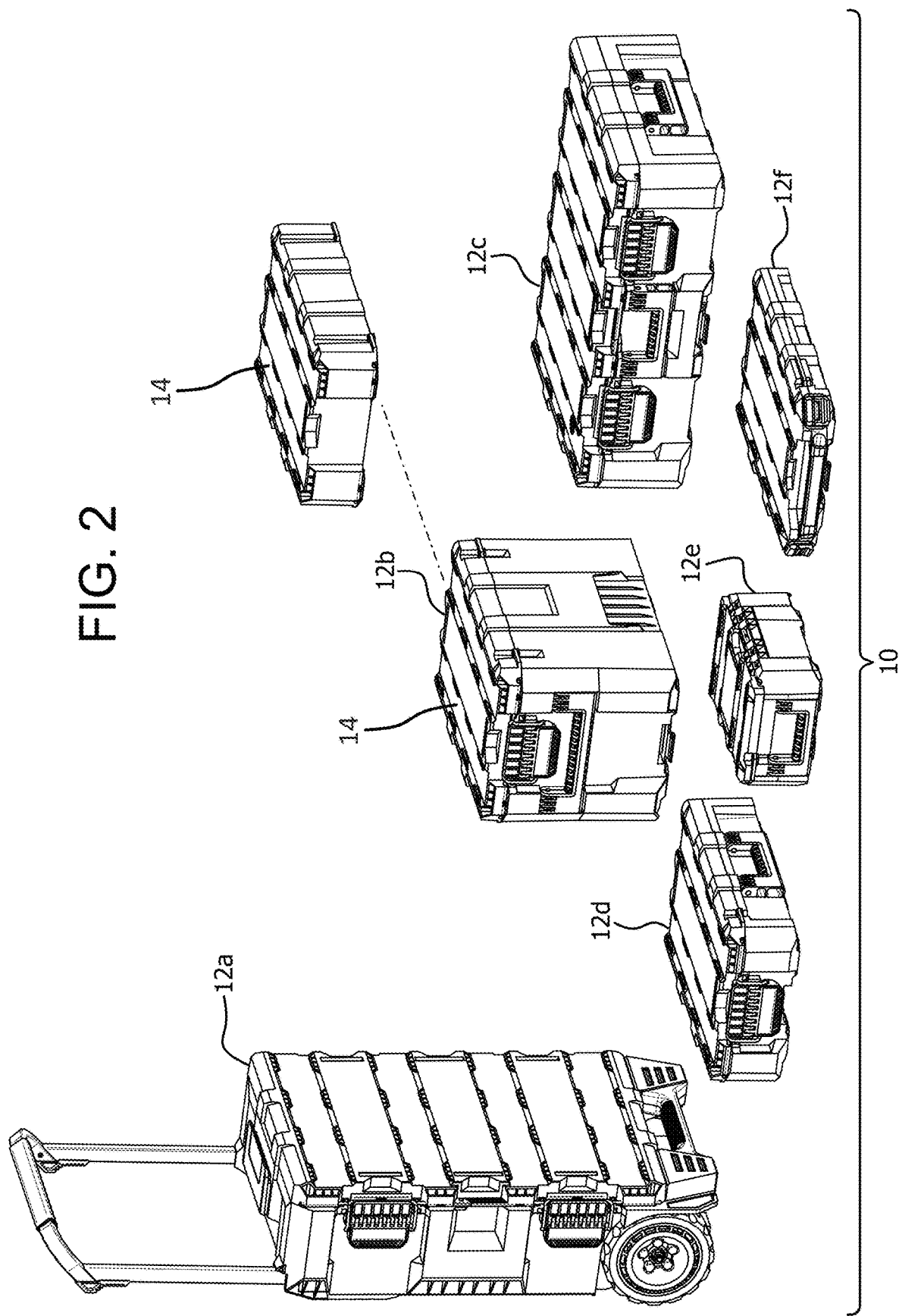

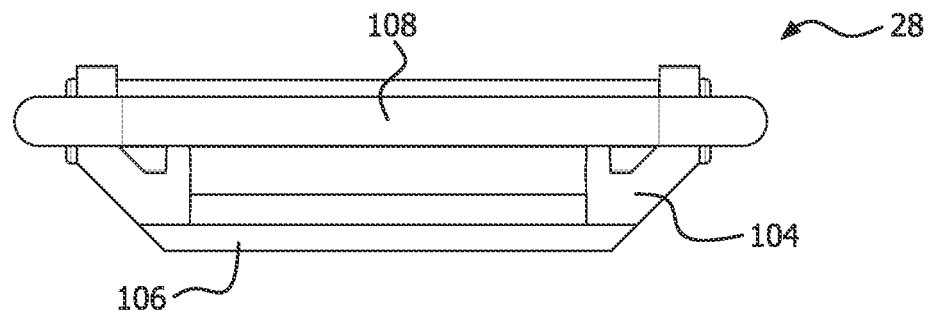
FIG. 22D
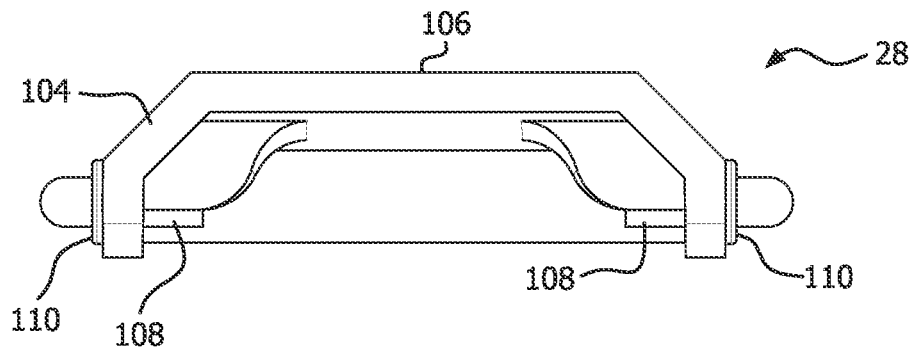
FIG. 22E
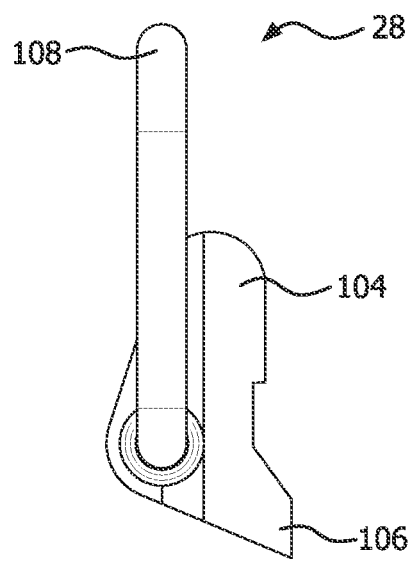 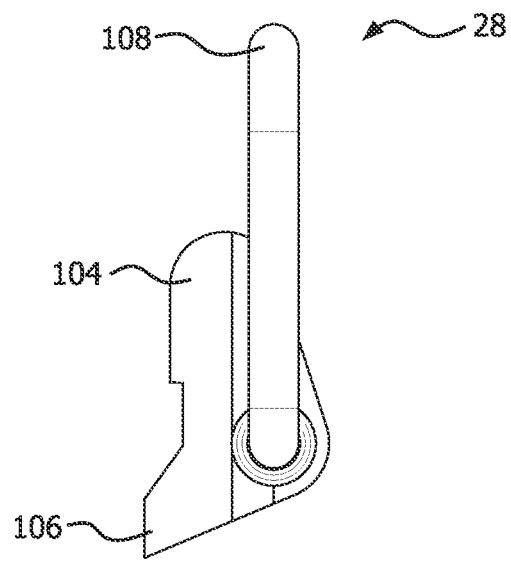
FIG. 22F    FIG. 22G

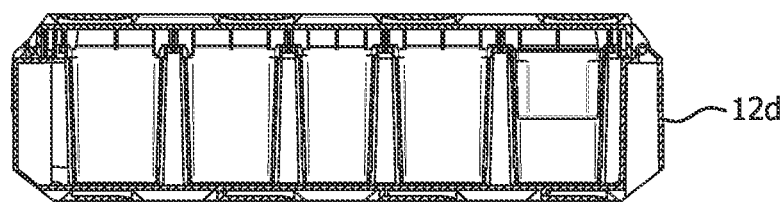
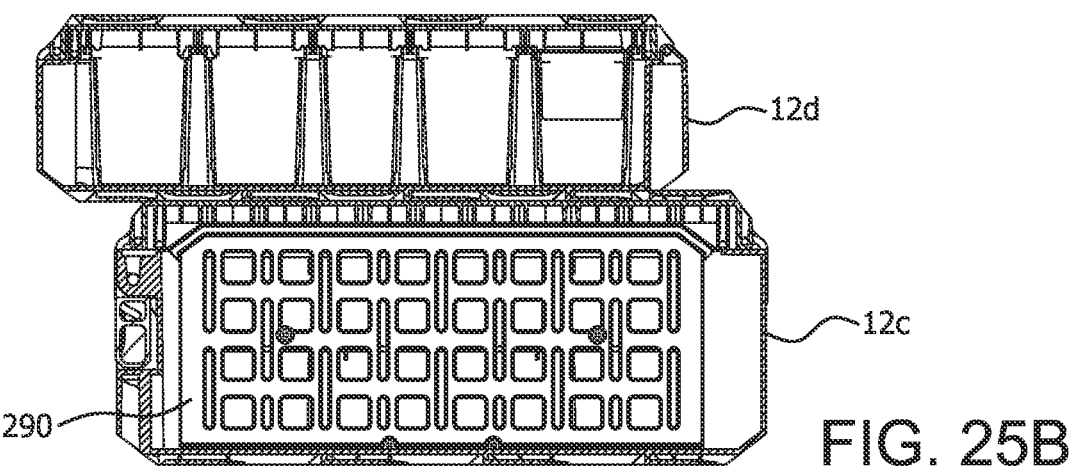
FIG. 25A
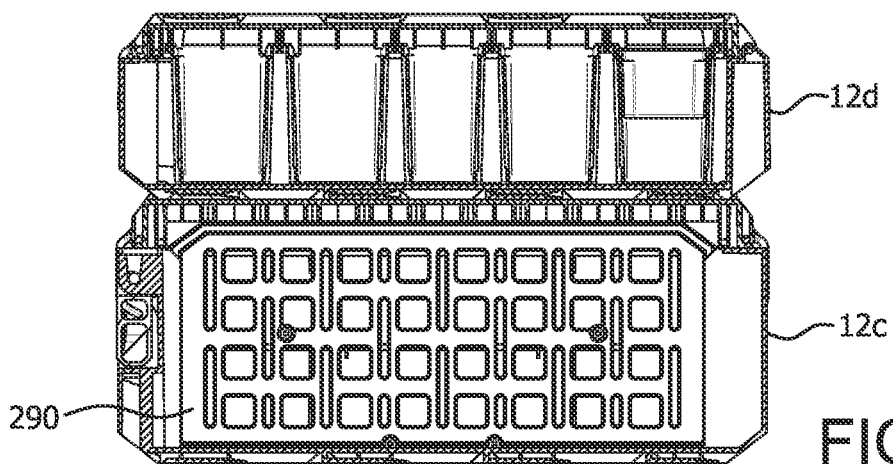
FIG. 25B
FIG. 25C

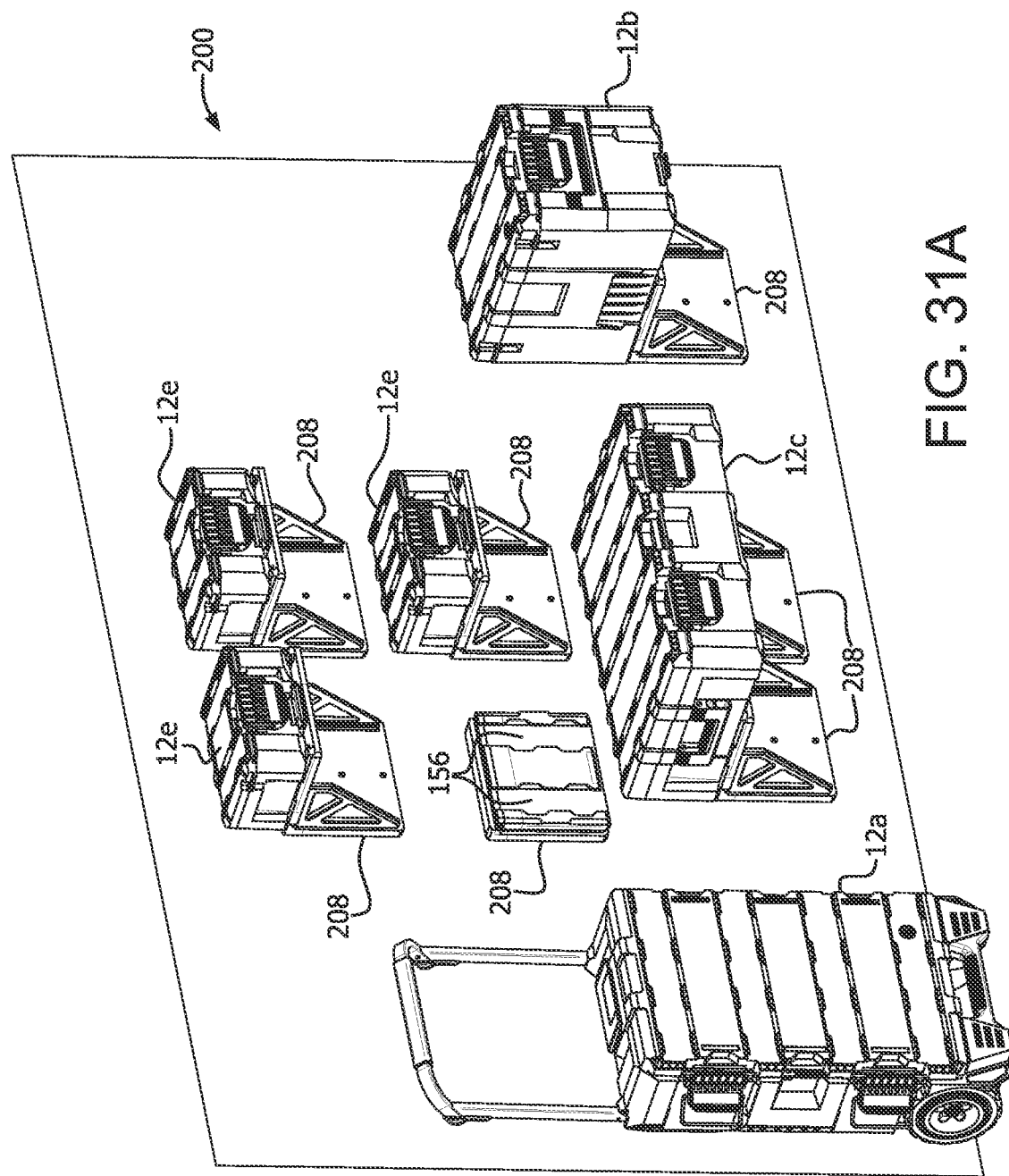

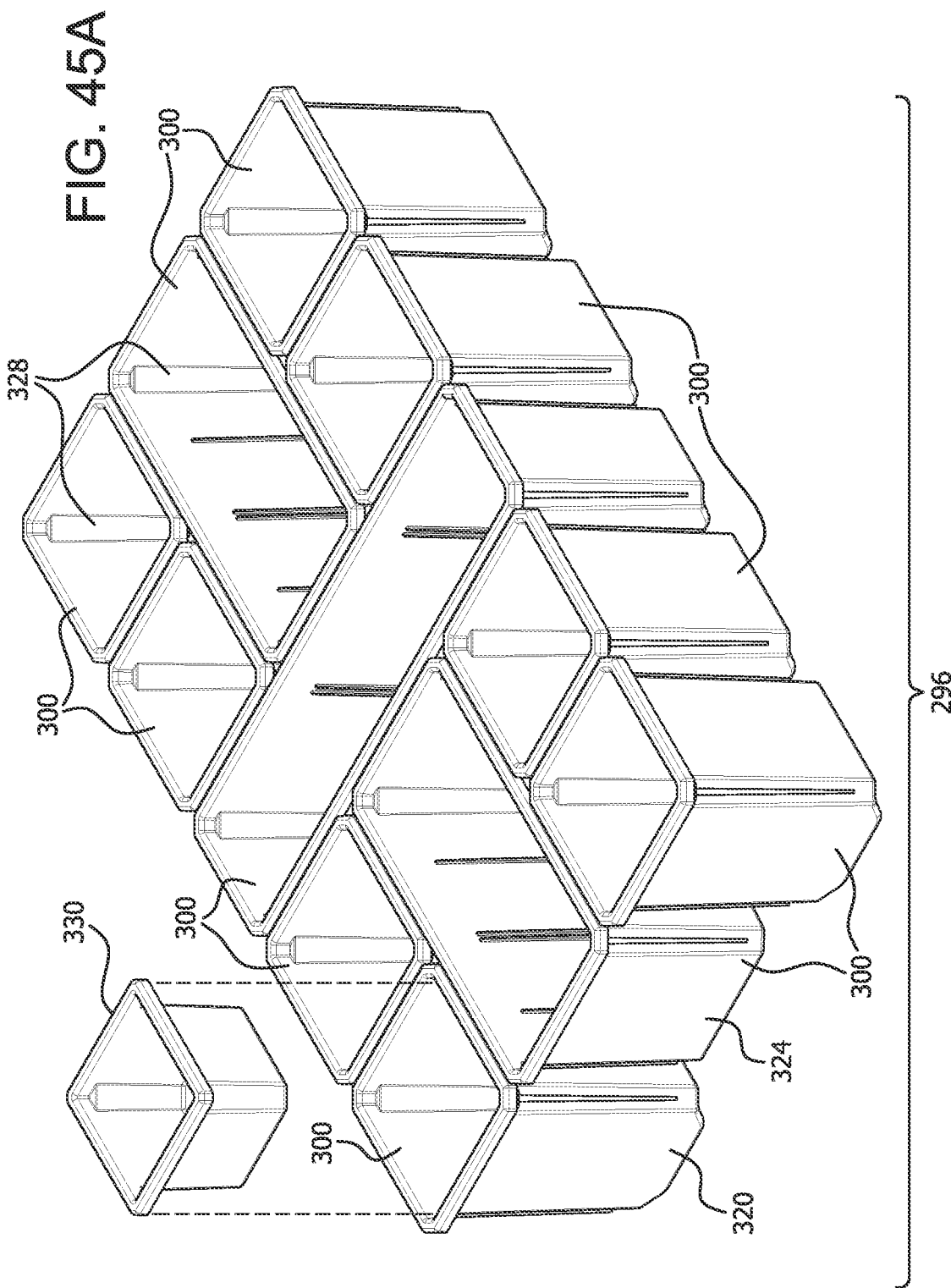

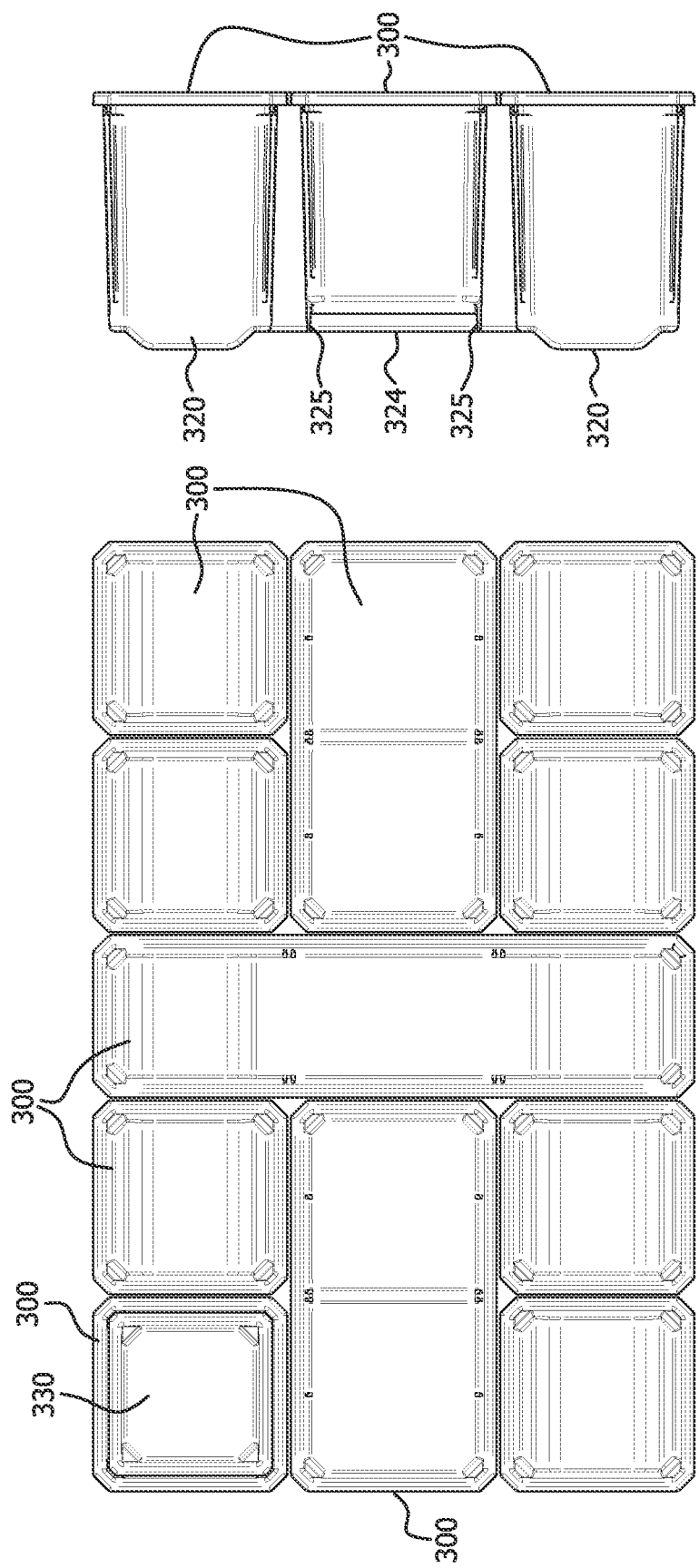

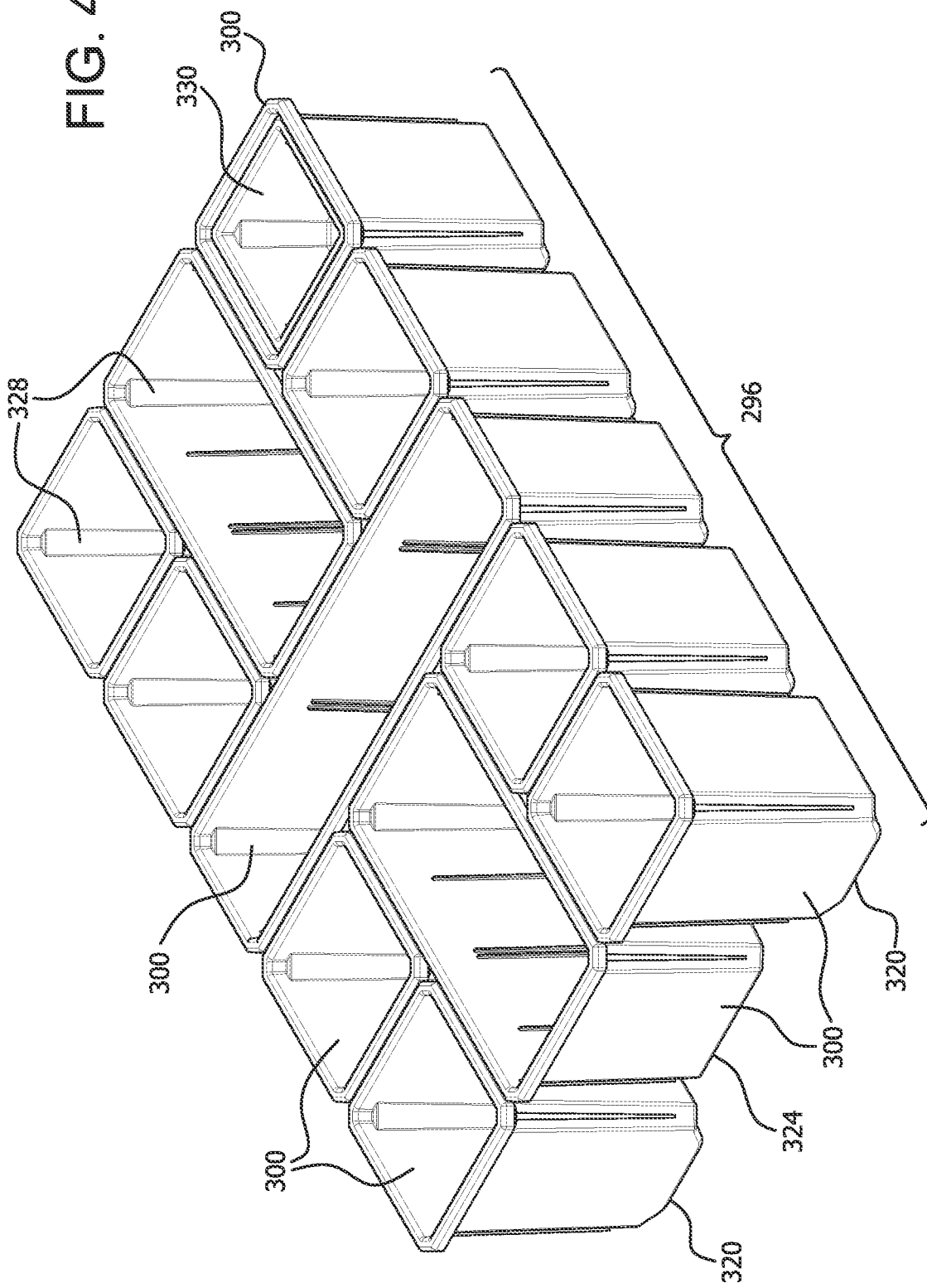

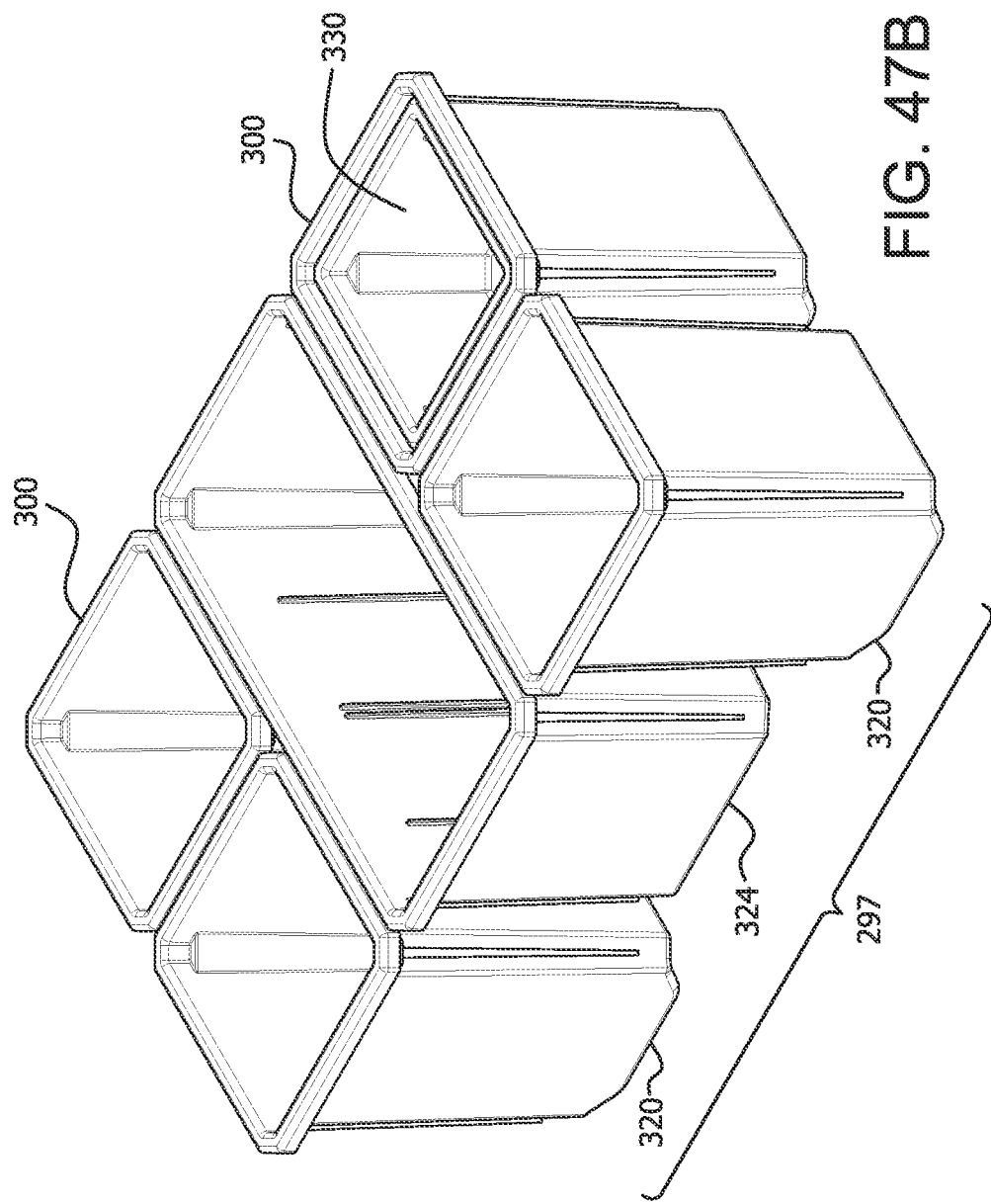

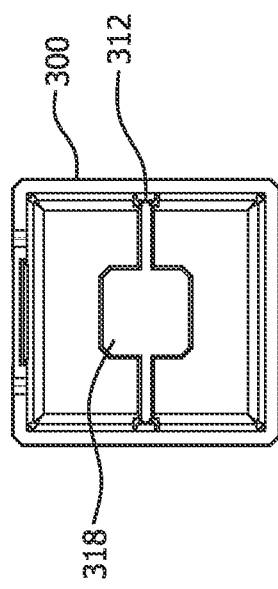
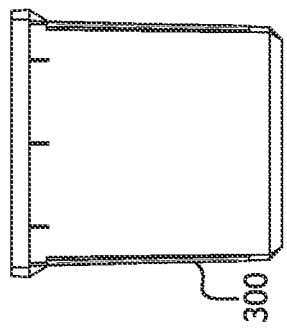
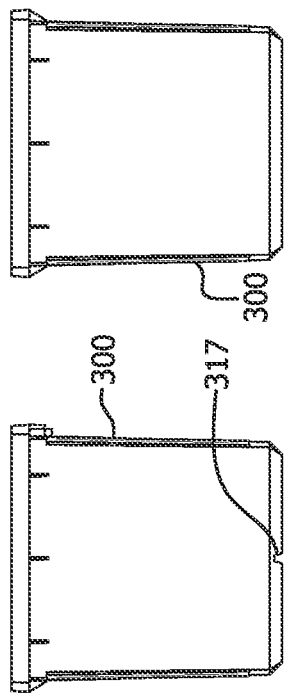
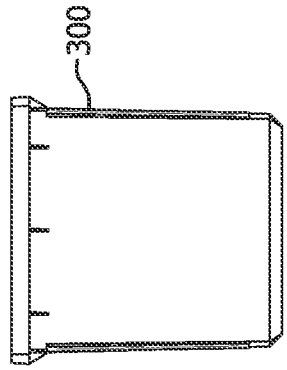
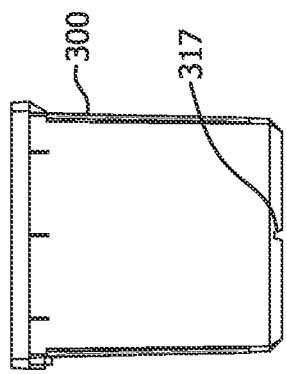
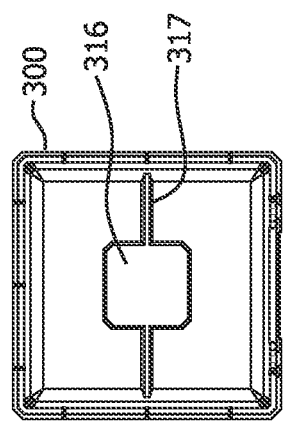

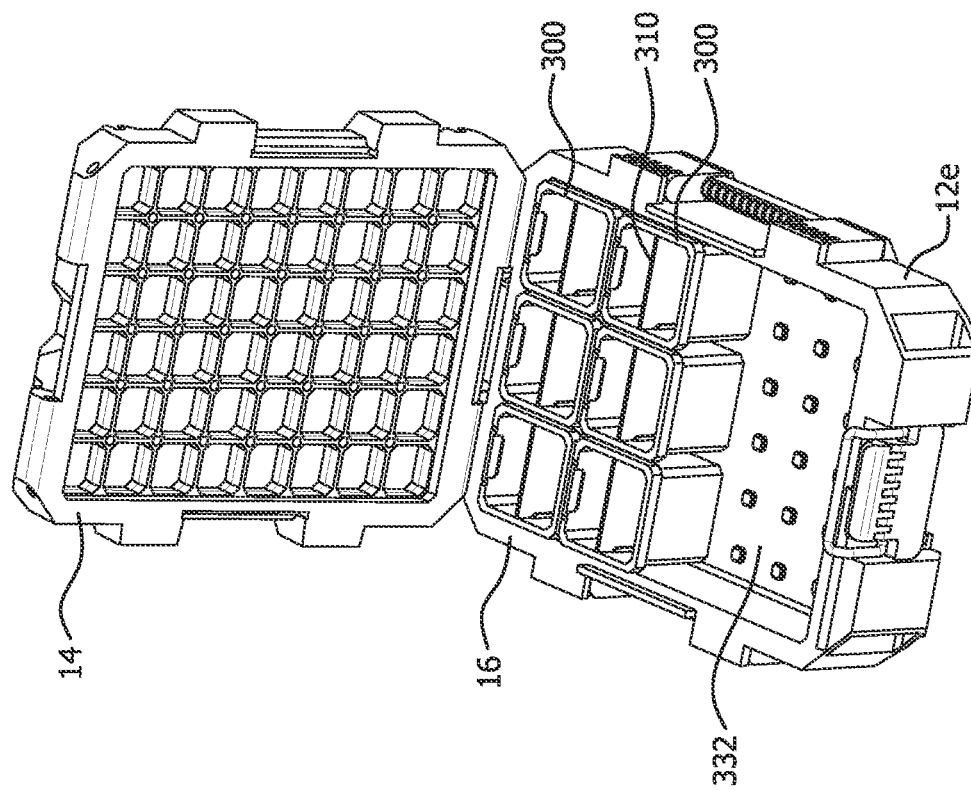
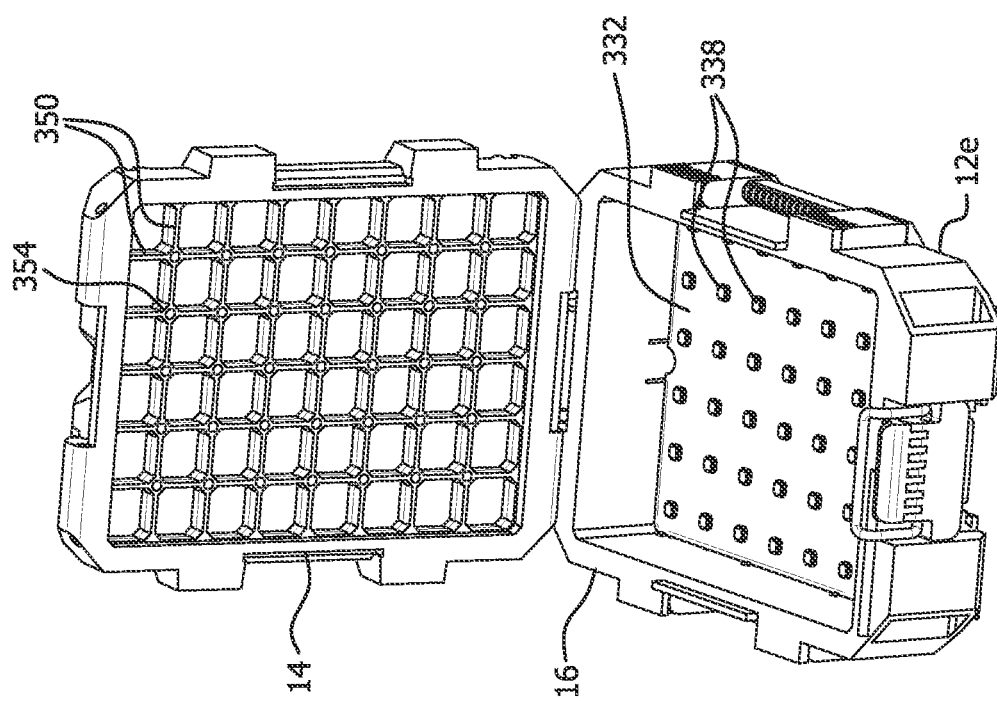

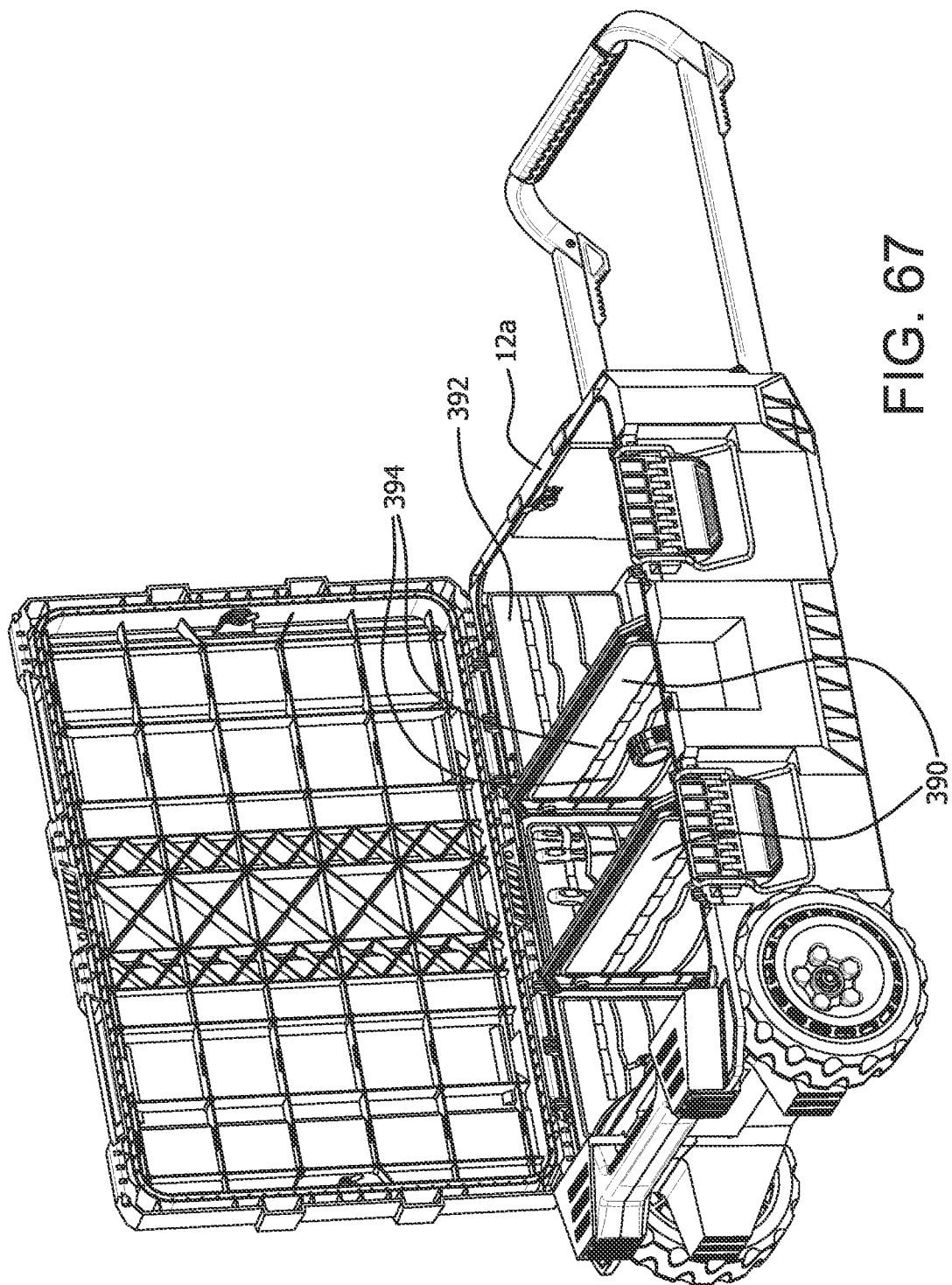

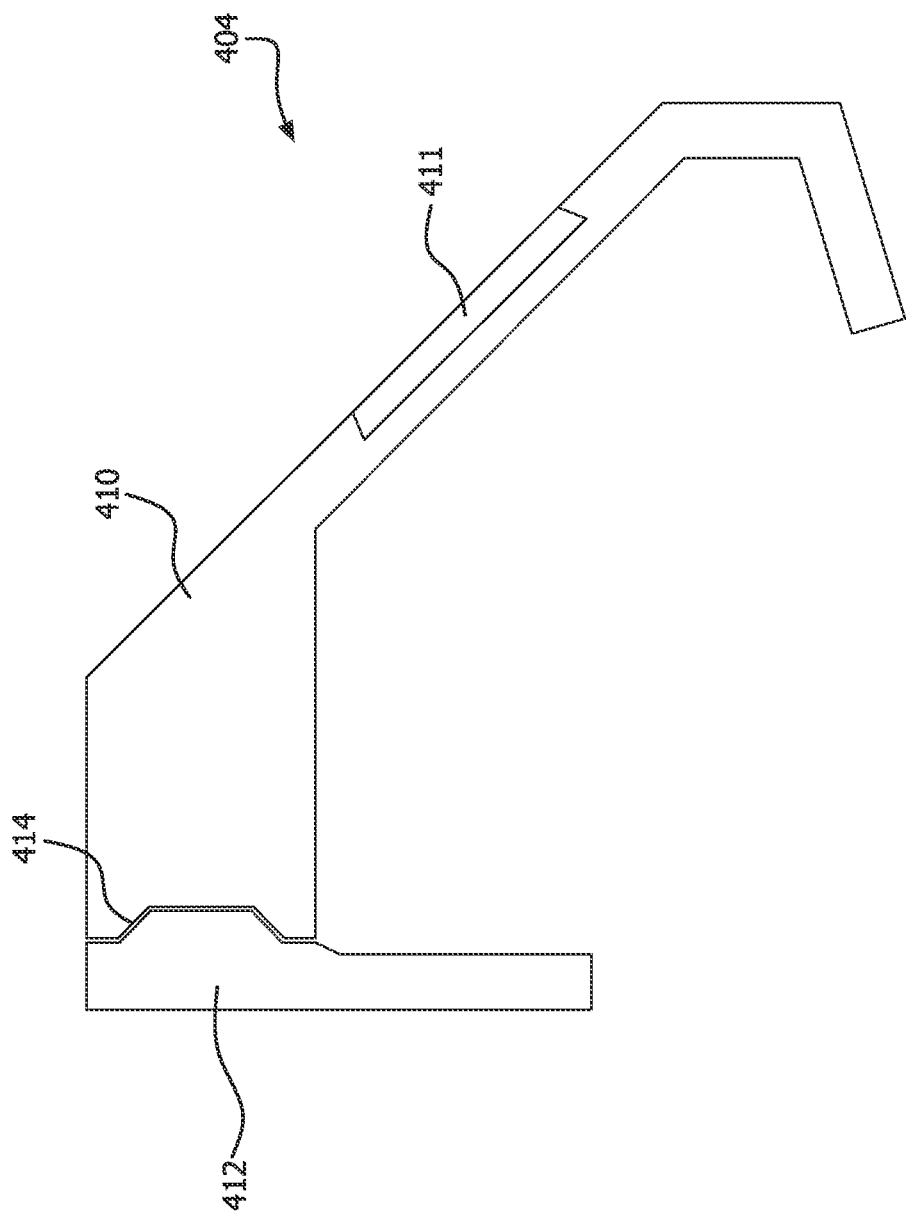

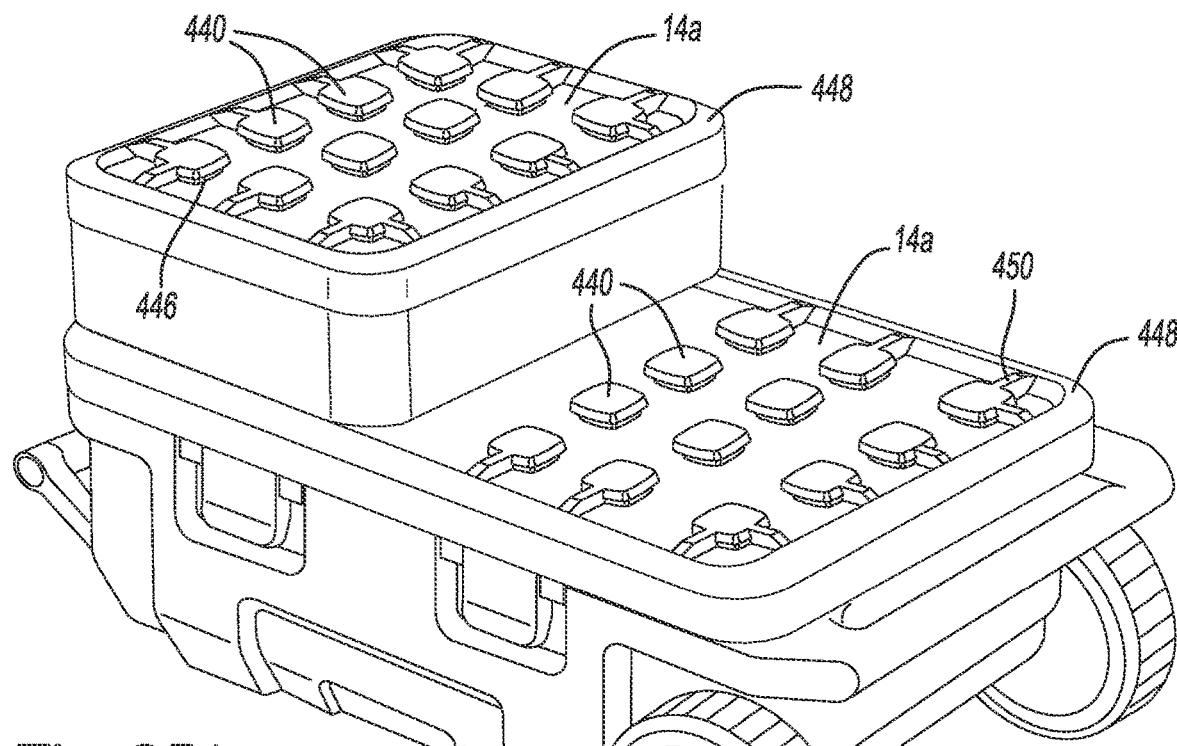
_Fig-83A_
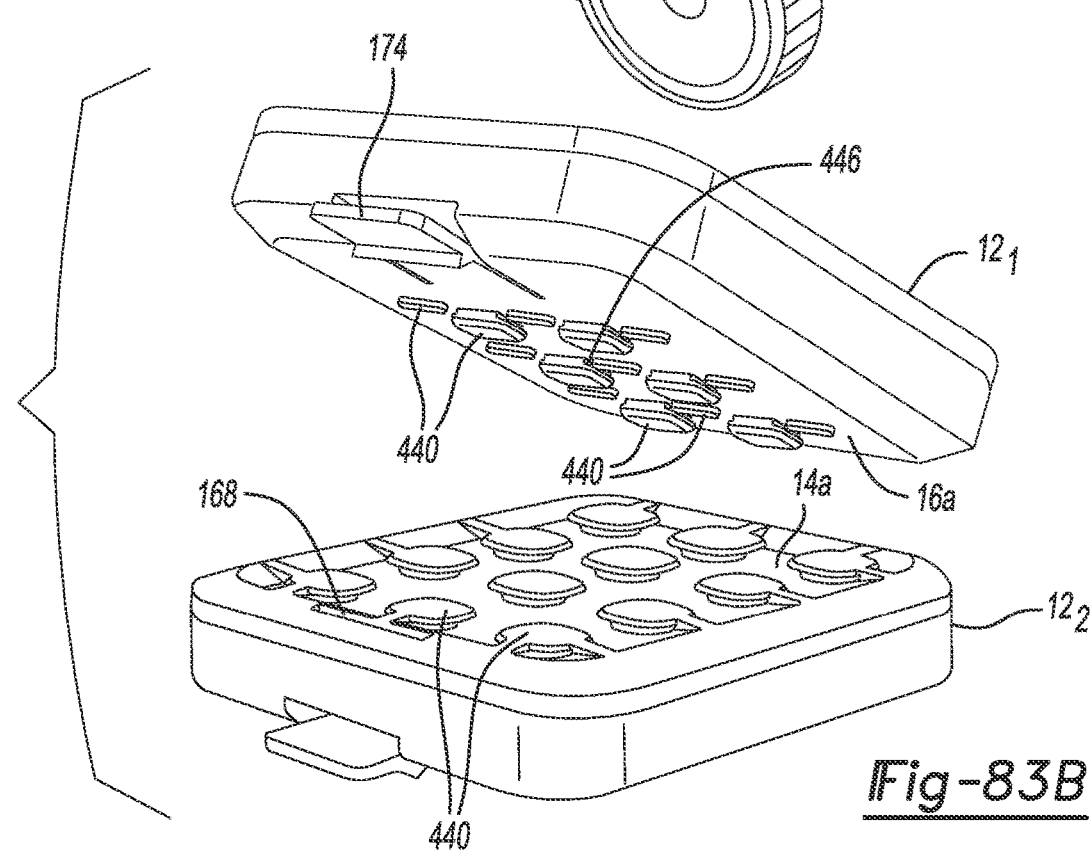
_Fig-83B_

MODULAR STORAGE SYSTEM WITH STORAGE BOX CONNECTIVITY AND INTERNAL STORAGE AND LID FEATURES

This application claims the benefit of U.S. provisional patent application Ser. No. 63/356,031, filed Jun. 27, 2022, and of U.S. provisional patent application Ser. No. 63/355,498, filed Jun. 24, 2022, and of U.S. provisional patent application Ser. No. 63/355,461, filed Jun. 24, 2022, and of U.S. provisional patent application Ser. No. 63/280,896, filed Nov. 18, 2021, and of U.S. provisional patent application Ser. No. 63/256,490, filed Oct. 15, 2021, the entire contents of which are incorporated herein by reference.

FIELD

Example embodiments in the present disclosure are directed to storage boxes for storing and transporting items that can be stacked and which have accessories and internal organization features to enhance storage capacity and transport and access to items stored in the boxes or mounted thereon.

BACKGROUND

Containers or utility boxes can be used in commercial, military and consumer environments to store and transport a wide variety of items such as tools, accessories, parts, materials and supplies for construction, remodeling, repairs, outdoor landscaping, artwork, different hobbies, medical care delivery, sports, among other applications. Some known containers can be stacked to more effectively store and transport items.

SUMMARY

The above and other problems are overcome, and additional advantages are realized, by illustrative embodiments.

It is an aspect of illustrative embodiments to provide a modular storage system having a system for interconnecting two storage boxes comprising: at least one raised guide disposed along a surface of a first box, and at least one channel disposed along a surface of a second box and dimensioned to receive the guide. The guide extends along a dimension of the surface of the first box chosen from a box width and a box length, and the guide has a length that corresponds to the dimension of the surface of the first box chosen from the box width and the box length of the first box.

In accordance with aspects of illustrative embodiments, the channel extends along a dimension of the surface of the second box chosen from a box width and a box length, and the channel has a length that corresponds to the dimension of the surface of the second box chosen from the box width and the box length of the second box.

In accordance with aspects of illustrative embodiments, the channel is open at opposite ends thereof.

In accordance with aspects of illustrative embodiments, the first box is stacked on top of the second box in a stacked configuration, the surface of the first box that comprises the at least one guide is a bottom exterior surface of the first box, the surface of the second box comprising the at least one channel is a top exterior surface of the second box, and the channel is a cavity formed in the top exterior surface of the second box, the cavity comprising a channel bottom and two channel side walls extending inwardly from the top exterior surface of the second box toward the channel bottom.

In accordance with aspects of illustrative embodiments, the guide is a raised member extending from the bottom exterior surface of the first box.

In accordance with aspects of illustrative embodiments, the at least one channel comprises opposite side walls with top edges that extend at least partially over the channel and notches in the top edges of the side walls, the at least one guide comprises tabs that can be aligned with the notches for insertion of the guide into the channel and be misaligned to abut at least one tab against an underside of one of the top edges to provide a surface to prevent the guide from being lifted out of the box channel.

In accordance with aspects of illustrative embodiments, the tabs extend from a top edge of the guide in a direction transverse to the box engagement path.

In accordance with aspects of illustrative embodiments, the first box and the second box can slide relative to each other in both a forward direction and a backward direction along a box engagement path when the guide of the first box contacts the channel in the second box.

In accordance with aspects of illustrative embodiments, an integrative locking system is configured to secure the first box and the second box as two interconnected boxes, the integrative locking system having a cleat disposed on one of the two interconnected boxes, and a receptacle configured to receive the cleat and disposed on the other one of the two interconnected boxes.

In accordance with aspects of illustrative embodiments, the integrative locking system further comprises a cleat member configured as a flat member with the cleat extending from a portion thereof between a first end and a second end, the flat member being securable at the first end thereof to one of the two interconnected boxes, the flat member being movable to remove the cleat from the receptacle when force is applied to the second end to move the second end toward the box and stationary to retain the cleat in the receptacle when no force is applied to the second end to move the second end toward the box.

In accordance with aspects of illustrative embodiments, one of the two interconnected boxes to which the flat member is secured is molded with a depression in the bottom exterior surface thereof that is dimensioned to receive the flat member.

In accordance with aspects of illustrative embodiments, the at least one guide and the at least one channel are configured to prevent relative translational movement between the first box and the second box in a first direction corresponding to one of two-dimensional directions comprising an x-axis and a y-axis perpendicular to the x-axis, and further comprising an integrative locking system for preventing relative translational movement between the first box and the second box in a second direction corresponding to the other one of the two-dimensional directions.

In accordance with aspects of illustrative embodiments, the at least one guide and the at least one channel extend along the first box and the second box, respectively, in the second direction between a first edge and a second edge on each of the first box and second box, and the integrative locking system comprises a cleat disposed at one of the first edge and the second edge of the first box and a cleat retaining member chosen from a receptacle and a wedge disposed at the corresponding one of the first edge and the second edge of the second box that is aligned to receive the cleat when the first box is translated over the second box in the second direction.

It is an aspect of illustrative embodiments to provide a storage system comprising: a first box; a second box; a box-to-box interconnection system to releasable interconnected the first box to the second box; and at least one latch. Each of the first box and the second box comprises a top portion and a bottom portion that define an inner volume for a storage compartment, and the at least one latch is provided on a side wall of each of the first box and the second box to releasably secure the top portion to the bottom portion to enclose the storage compartment thereof, and open and close the top portion relative to the bottom portion independently of the box-to-box interconnection system to allow access to the storage compartment when the first box and the second box are interconnected for a stacked configuration.

In accordance with aspects of illustrative embodiments, at least one of the first box and the second box comprises the at least one latch mounted on each of opposite sides of a box to allow opening the top portion from either of the opposite sides of the box.

In accordance with aspects of illustrative embodiments, when the first box and the second box stacked, the first box and the second box each comprises the at least one latch mounted on the same facing side wall.

In accordance with aspects of illustrative embodiments, the storage system further comprises a dolly with a flat surface, and wheels connected to one side of the flat surface. The first box and the second box are stacked together on an opposite side of the flat surface with the at least one latch mounted on each of the boxes directed from the same facing side wall.

It is an aspect of illustrative embodiments to provide a system for interconnecting two storage boxes comprising: protuberances extending from each of a top surface and a bottom surface of a box, the protuberances extending from the top surface being arranged relative to each other to delineate channels of space in between rows of protuberances along at least one of a width dimension and a length dimension of the top surface. The channels of space between rows of protuberances are open on respective ends thereof.

In accordance with aspects of illustrative embodiments, the protuberances extending from the top surface of the box are formed with an edge to engage the protuberances extending from the bottom surface of a second box, and/or the protuberances extending from the bottom surface of the box are formed with an edge to engage the protuberances extending from the top surface of a second box.

In accordance with aspects of illustrative embodiments, the protuberances are configured as unitary and continuous protuberances extending across a dimension of the top surface of the box to form open and continuous channel cavities with continuous side walls, and as unitary and continuous protuberances extending across a dimension of the bottom surface the box and arranged to form continuous raised guides disposed and dimensioned to be received in the channel cavities of a second box.

In accordance with aspects of illustrative embodiments, the box and the second box slide relative to each other in both a forward direction and a backward direction along a box engagement path when the guide of the box contacts the channel in the second box.

In accordance with aspects of illustrative embodiments, the protuberances that extend from the bottom surface are arranged to engage with one or more of the protuberances extending from the top surface of a second box when the first box is moved in a translational direction that is parallel to the rows of channels.

In accordance with aspects of illustrative embodiments, the protuberances that extend from the bottom surface are arranged to engage with one or more of the protuberances extending from the top surface of a second box when the box is moved in a translational direction that is parallel to the channels of space, and further comprising an integrative locking system to retain the box from translational relative to the second box when stacked.

In accordance with aspects of illustrative embodiments, the protuberances and corresponding channels are arranged along the box and the second box, respectively, in a direction between a first edge and a second edge on each of the box and second box, and the integrative locking system comprises a cleat disposed at one of the first edge and the second edge of the box and a cleat retaining member chosen from a receptacle and a wedge disposed at the corresponding one of the first edge and the second edge of the second box that is aligned to receive the cleat when the box is translated over the second box in the direction of the channels.

It is an aspect of illustrative embodiments to provide a storage box that comprises a lid for covering a bottom portion and defining an inner volume The lid comprises a plurality of ribs are formed on an inner surface of the lid that faces the inner volume of the storage box when the lid is closed against the bottom portion of the storage box, and a plurality of holes formed at one or more intersections of the ribs that are configured to receive a fastener.

In accordance with aspects of illustrative embodiments, the plurality of holes formed at one or more intersections of the ribs are configured as molded bosses.

In accordance with aspects of illustrative embodiments, the storage box further comprises an item to be disposed in the storage box that is connected to the lid by at least one fastener inserted into at least one of the plurality of holes to affix the item to the inner surface of the lid.

In accordance with aspects of illustrative embodiments, at least one of the ribs comprises a slot configured to receive a retention member chosen from a strap and a tab on an item to affix the item to the inner surface of the lid.

In accordance with aspects of illustrative embodiments, the ribs are formed using a grid pattern having greater density in a center portion of the box than at end portions of the box.

In accordance with aspects of illustrative embodiments, the grid pattern comprises two sets of ribs forming double trusses disposed on respective sides of the center portion of the top portion of the box, each set of the double trusses having ribs arranged in a lattice structure between the trusses.

In accordance with aspects of illustrative embodiments, the storage box further comprises a plurality of lids wherein each of the plurality of lids has a length dimension and a width dimension that is the same as the bottom portion of a storage box and different respective height dimensions, the plurality of lids providing a different inner volume depending on which of the plurality of lids is connected to the bottom portion.

In accordance with aspects of illustrative embodiments, the storage box further comprises an internal organizing system configured to organize stored items within the inner volume.

In accordance with aspects of illustrative embodiments, the internal organizing system comprises a receptacle having a bottom surface and side walls for defining an interior storage space therein and an opening at the top of the receptacle, and wherein the ribs are formed using a grid pattern comprising intersecting ribs and some of the intersecting ribs abut the receptacle and close the opening when the lid is closed.

In accordance with aspects of illustrative embodiments, the internal organizing system comprises features for preventing movement of the receptacle within the box and chosen from protrusions arranged at respective locations on a bottom interior surface of the box to coincide with placement of the receptacle in the box and at least partially contact a wall of the receptacle, a tray that can be provided in the bottom portion of the box and that at least one protrusion in a surface thereof that cooperates with a recess formed in the bottom surface of the receptacle, at least one rib on an interior side wall of the bottom portion of the box that contacts a receptacle, and a contoured surface on the bottom of the receptacle that cooperates with an complementary contoured surface on the interior wall of the bottom portion of the box that contacts a receptacle.

In accordance with aspects of illustrative embodiments, the internal organizing system comprises a divider removably provided in the bottom portion to divide the inner volume into plural storage sections. The divider is configured to be removed from the bottom portion and affixed against the inner surface of the lid. The divider has a plurality of through holes, and the plurality of holes formed at one or more intersections of the ribs are configured to receive a fastener inserted through a selected one of the plurality of through holes aligned with a selected one of the plurality of holes to affix the divider against the inner surface of the lid.

In accordance with aspects of illustrative embodiments, the divider has a plurality of slots to which items are connected using a strap inserted into one or more of the slots.

In accordance with aspects of illustrative embodiments, the slots are arranged in the divider to configure the divider as a Modular Lightweight Load-carrying Equipment or MOLLE-board type interface.

In accordance with aspects of illustrative embodiments, the lid can be removably attached to the bottom portion by at least one latch connecting the lid to the bottom portion.

In accordance with aspects of illustrative embodiments, the lid is removably attached to the bottom portion on opposing sides thereof by at least one latch which is configured as a hinge when closed to open the lid from only one of the opposing sides.

Additional and/or other aspects and advantages of illustrative embodiments will be set forth in the description that follows, or will be apparent from the description, or may be learned by practice of the illustrative embodiments. The illustrative embodiments may comprise apparatuses related to a modular storage system and boxes and accessories thereof and method of using same having one or more of the above aspects, and/or one or more of the features and combinations thereof. The illustrative embodiments may comprise one or more of the features and/or combinations of the above aspects as recited, for example, in the attached claims.

BRIEF DESCRIPTION OF DRAWINGS

The above and/or other aspects and advantages of the illustrative embodiments will be more readily appreciated from the following detailed description, taken in conjunction with the accompanying drawings, of which:

FIGS. 1A, 1B and 1C are, respectively, a side elevation view and opposite side perspective views of a modular storage system in accordance with an example embodiment wherein a number of storage boxes are stacked;

FIG. 2 is a perspective view of an modular storage system in accordance with an example embodiment wherein the storage boxes are unstacked or disassembled from each other;

FIGS. 17A, 17B, 17C and 17D show various views of a storage box constructed in accordance with an example embodiment of the present disclosure to have a dual hinge latch function wherein FIGS. 17A and 17B are respective interior and external views of the storage box with its lid pivotably latched to its bottom portion on one side thereof, and FIG. 17C is a view of the storage box with its lid pivotably latched to a side of the box opposite to the side shown in FIG. 17B, and FIG. 17D is a view of the storage box with the lid removed from its bottom portion;

FIGS. 22A, 22B, 22C, 22D, 22E, 22F and 22G depict perspective, front, back, top, bottom, left and right views, respectively, of a latch in accordance with another example embodiment;

FIGS. 25A, 25B and 25C depict respective cross-section views of the top box in FIGS. 24A, 24B and 24C being stacked upon the bottom box in FIGS. 24A, 24B and 24C by a front to back translation of the top box relative to the bottom box in the stack.

FIG. 31A is a perspective view of a wall mount system for storage boxes in accordance with another example embodiment;

FIG. 44C depicts the tray with removable dividers in accordance with an example embodiment;

FIGS. 45A, 45B and 45C are, respectively, perspective, top and side views of an arrangement of bins for use in a medium storage box, in accordance with an example embodiment;

FIG. 46 is another perspective view of the arrangement of bins shown in FIGS. 45A, 45B and 45C and having an inner bin placed in a different bin in accordance with an example embodiment;

FIGS. 47A and 47B are, respectively, perspective views of an arrangement of bins for use in a compact organizer in accordance with an example embodiment and showing an inner bin removed and inserted into a bin;

FIGS. 49A, 49B, 49C, 49D, 49E, 49F and 49G are perspective, top, bottom, left, right, front and back views, respectively, of a bin constructed in accordance with an example embodiment;

FIGS. 54A and 554B are, respectively, front and perspective views of an interior surface of a box lid constructed in accordance with an example embodiment;

FIGS. 66A and 66B are perspective views of a box with a lid portion having a rib pattern that cooperates with an alignment feature in a bottom portion of the box to retain bins in accordance with an example embodiment;

FIG. 67 is a perspective view of dividers and box side panels with pockets that can be provided in a box in accordance with an example embodiment;

FIGS. 74A and 74B are top and perspective views, respectively, of the corner clamp in FIG. 73;

FIGS. 83A and 83B are views of two storage boxes that are stacked and interconnected using a box-to-box connection system, and unstacked, respectively, in accordance with an example embodiment;

FIG. 101 is a perspective view of a modular storage system in accordance with an example embodiment;

FIG. 102 is a perspective view of a modular storage system in accordance with an example embodiment;

FIGS. 103A and 103B are, respectively, a perspective view of a modular storage system with a pivotable work surface, and a partial view of the pivotable work surface in a deployed position, in accordance with an example embodiment;

FIG. 104 depicts a wall mount system for storage boxes in accordance with an example embodiment and deployed on side walls of a truck bed;

FIG. 105 depicts a flexible lid for use on storage boxes in accordance with an example embodiment; and FIG. 106 is a partial view of a storage box interior with integrated air tag holder and air tag in accordance with an example embodiment.

Throughout the drawing figures, like reference numbers will be understood to refer to like elements, features and structures.

DETAILED DESCRIPTION OF ILLUSTRATIVE EMBODIMENTS

Figure 1B:
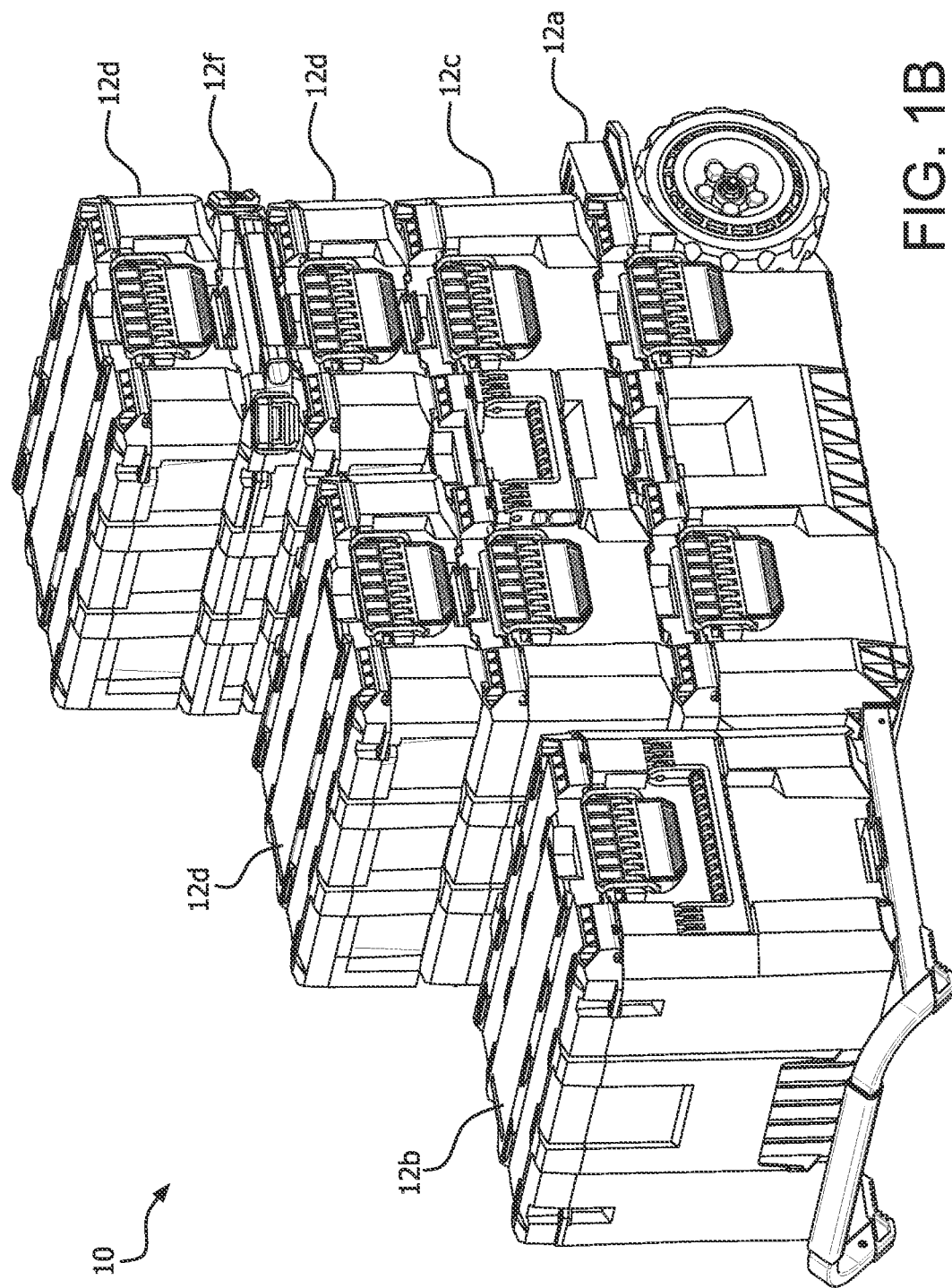

Reference will now be made in detail to illustrative embodiments, which are depicted in the accompanying drawings. The embodiments described herein exemplify, but do not limit, the illustrative embodiments by referring to the drawings.

A robust, heavy-duty, professional-grade, organized modular storage system 10 is provided by example embodiments herein to allow users the ability to securely organize, store, access and transport their tools, accessories, materials, supplies, consumables, and personal items throughout their daily movements between their home, vehicle, office, shop, and worksite. The modular storage system of the present disclosure provides efficient storage, organization, transport of stored items as well as efficient and convenient access to the stored items, which enables users to capture more productive minutes in their day by converting more of their minutes to working minutes and allowing them to be more efficient to complete more jobs for greater earning capacity, and to present themselves and their stored items more professionally.

In accordance with example embodiments a modular storage system 10 of connectable, heavy-duty storage boxes, cases, container modules, crates, organizers, trays, tool boxes, accessories for item storage and convenient access for use, and rolling carts and/or dollies is provided wherein the system 10 is modular, expandable, and readily adaptable to have new connectable items to it in the future. Example embodiments described herein provide storage boxes 12 of different sizes by length, width and/or height. Several of the boxes 12 can be configured with removable, customizable organization inserts (e.g., dividers, storage trays, alignment trays, and bins of different sizes). In accordance with illustrative embodiments, the boxes can have advantageous top portions (e.g., lids), exterior and internal features, and accessories as described below. The modular storage system 10 products and features of the example embodiments are connectable to a variety of different housing and transport modes including on a wall, on a side of a truck or van, on a shelf, on a dolly, and in or on a cart, and configurable to meet the needs and pain points of tradesmen, for example, such as electricians, plumbers, HVAC contractors, finish carpenters, framing carpenters, general contractors and remodelers. Example implementations of the disclosed embodiments are likewise applicable and configurable for non-commercial, consumer usage and for military usage.

Various terms are used to refer to particular system components. Different companies may refer to a component by different names. The present disclosure does not intend to distinguish between components that differ in name but not function. For example, a storage box as described herein can be also considered as a case or container or storage module or storage unit insofar that each can have a bottom wall, side walls and optionally a top wall or lid that define a storage volume, space or compartment therein for storing one of more items such as tools or supplies or other various articles.

It will be understood that the terms "include," "including," "comprise, and/or "comprising," when used in this disclosure, specify the presence of stated features, integers, steps, operations, elements, and/or components, but do not preclude the presence or addition of one or more other features, integers, steps, operations, elements, components, and/or groups thereof. It will be further understood that, although the terms "first," "second," "third," "front," "back," "side," "bottom," "top," etc., may be used herein to describe various elements, components, regions, layers and/ or sections, these elements, components, regions, layers and/or sections may not be limited by these terms. These terms are only used to distinguish one element, component, region, layer or section from another element, component, region, layer or section for clarity in their description in the present disclosure. As used herein, the term "and/or" includes any and all combinations of one or more of the associated listed items. Expressions such as "at least one of," when preceding a list of elements, modify the entire list of elements and do not modify the individual elements of the list. Matters of disclosed example embodiments that are obvious to those of ordinary skill in the technical field to which these example embodiments pertain may not be described here in detail.

Modular Storage System 10

Figure 1C:
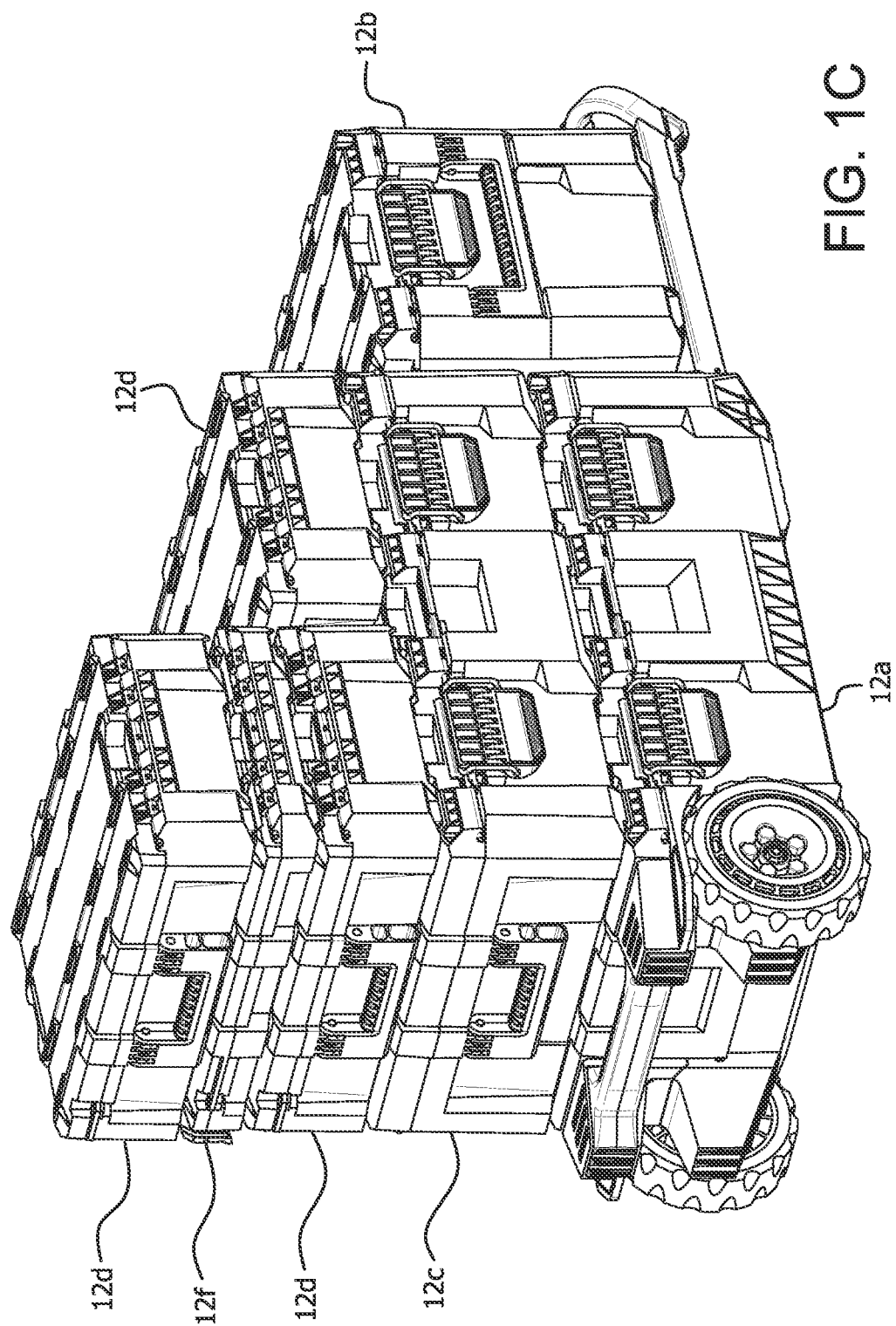

FIGS. 1A, 1B and 1C are, respectively, a side elevation view and opposite side perspective views of a modular storage system 10 in accordance with an example embodiment wherein a number of storage boxes 12 are stacked. FIG. 2 is a perspective view of an example modular storage system 10 wherein the storage boxes are unstacked or disassembled from each other.

With reference to FIGS. 1A through 1C and 2, a mobile and modular design of a storage system 10 constructed in accordance with example embodiments comprises, but is not limited to, the following features and products, and any practical combinations thereof. Different sizes of storage boxes 12 (e.g., boxes 12a through 12g) are provided such as, but not limited to, a rolling base box 12a with a telescoping or retractable handle, a connectable extra-large portable storage box 12b, a large storage box (e.g., a full box) 12c, a medium storage box (e.g., a half box) 12d; a compact organizer (e.g., a quarter box) 12e, and a low profile organizer 12f One or more of the boxes 12 has a see-through top cover and removable, customizable organization inserts. The rolling base box 12a can be dimensioned, for example, for the portable storage box 12b, and a large storage box 12c (or two medium boxes 12d arranged side-by-side) to be releasably connected thereto. Additional boxes 12d, 12e and/or 12f are releasably connected to the large storage box 12c and optionally another adjacent stacked box 12. As described, the sizes of boxes 12, and numbers of boxes 12 constituting a stacked configuration, and the configurations of the stacked boxes 12 can vary from that shown in the FIGS. 1A through 1C and 2 and are also within the scope of the example embodiments of the present disclosure and the claims.

For non-limiting illustrative purposes, example length by width by height dimensions in inches of the respective boxes can be on the order of 36.78"×22.08"×11.62" for the rolling base box 12a (e.g., FIGS. 5A through 5G and 6A through 6E) with its retractable handle in a fully retracted position, and 56.78"×22.08"×11.62" for the rolling base box 12a with its retractable handle in a fully extended position, and 31.58"×22.08"×9.36" for the large storage box 12c (e.g., FIGS. 16A through 16G and 17A through 17D). Thus, when aligned and stacked, the rolling base unit and the large storage box have essentially the same perimeter boundary or footprint. Example length by width by height dimensions of a medium storage box or half box 12d (e.g., FIGS. 18A through 18G) can be on the order of 15.33"×22.08"×6.34" such that, when two of the medium storage boxes 12d are aligned side by side and stacked on a surface of the large storage box, they have essentially the same perimeter boundary or footprint as the large storage box 12c or the rolling base box 12a. Example length by width by height dimensions of a compact organizer or quarter box 12e (e.g., FIGS. 19A through 19G) can be on the order of 15.33"× 11.0"×6.34" such that, when two of the compact organizer or quarter boxes 12e are aligned front to back or side by side and stacked on a surface of the medium storage box 12d, they have essentially the same perimeter boundary or footprint as the medium storage box 12d. Example length by width by height dimensions of a low profile organizer 12f (e.g., FIGS. 20A through 20G) can be on the order of 15.33"×23.5"×3.37" such that when it is aligned and stacked on a medium storage box 12d, both boxes 12f and 12d have a similar perimeter boundary or footprint. The footprint of the low profile organizer 12f can be slightly larger because it has a different handle and latch configuration than other boxes 12 as described below in connection with FIGS. 20A through 20G depicting different views of an example low profile organizer 12f.

Example length by width by height dimensions of portable storage box 12b (e.g., FIGS. 7A through 7G and FIGS. 13A-13B) can be on the order of 15.33"×22.08"×18.38" such that, when the portable storage box 12b is connected to a side of the rolling base box 12a via a box extension connection system 220 described below with reference to FIGS. 9A-9B, 10A-10B, 11 and 12A-12B and rests on its extended retractable handle, the portable storage box 12b and rolling base box 12a have a similar width. The height of the portable storage box 12b can be considerably greater than the heights of the other boxes 12a, 12c, 12d, 12e and 12f to enable storage for larger items such as power tools (e.g., a circular saw).

Figure 3:
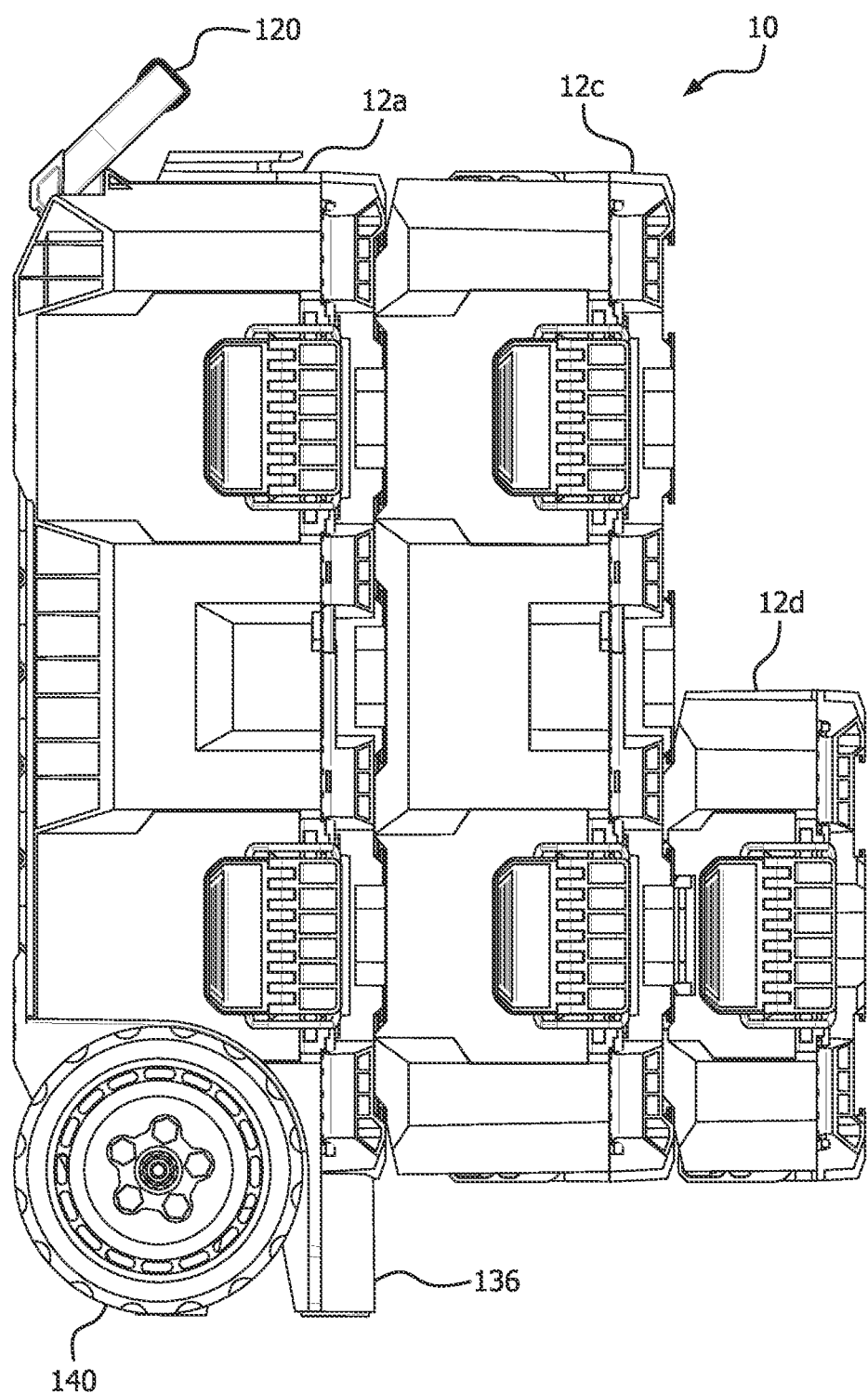
FIG. 3 is a side elevation view of an example modular storage system in accordance with an example embodiment and in an upright position relative to its wheels.

FIG. 3 is a side elevation view of an example modular storage system 10 in an upright position relative to its wheels 140. In accordance with an example embodiment, the wheels 140 and a foot or feet 136 are oriented downwardly and proud of a side of the rolling base box 12a for placement against an essentially planar ground surface when the stacked configuration is in an upright position for rolling via the wheels. The longitudinal axis of a bottom exterior surface of the rolling base box (e.g., the surface opposite the top surface against which a large storage box 12b in the stacked configuration of FIGS. 1A-1C is coupled) and the ground surface is approximately 90 degrees. The upright position of the stacked storage system can be slightly tilted (e.g., with the angle between the bottom exterior surface of the rolling base unit and the ground surface being less than 90 degrees) to facilitate a user tilting the stacked storage system 10 further for transport by holding the handle 120 and rolling via the wheels 140.

Example Storage Box 12

Other features of the example boxes 12a through 12f will now be described with reference to FIGS. 4A and 4B which are perspective views of a medium storage box 12d for illustrative purposes. The reference numerals shown in FIGS. 4A and 4B refer to the same parts or components of a box 12 shown in the drawing figures of the present disclosure but may be omitted in one or more of the drawing figures for clarity. While the modular storage system 10 can comprise different sizes of boxes (e.g., 12a . . . 12n) with each having different features, a box is referenced generally herein as 12. Features that are functionally common among the example boxes 12 shall be referenced herein using the same reference numerals in the accompanying drawings, even if their dimensions may vary. Each box 12 comprises, for example, a top exterior surface 13a, a bottom exterior surface 13b, and side walls 13c, 13d, 13e and 13f that define an inner volume 18 for a storage compartment, at least one latch 28 on a side wall of the box to releasably secure a top portion 14 to a bottom portion 16 of the box 12, at least one handle 38 pivotably secured to a side wall of the box 12 (e.g., except for box 12f having a fixed handle 46), and a box-to-box connection system referenced generally as 150 on the top exterior surface 13a and the bottom exterior surface 13b of the box 12 to allow the box 12 to be releasably secured to another box 12 (e.g., an adjacent box). An example box-to-box connection system 150 is described below in connection with FIGS. 24A through 29C and additional alternate example box-to-box connection systems are shown in FIGS. 78A through 92C.

As described below, the different storage boxes 12 of the modular storage system 10 have features (e.g., a box-to-box connection system 150, placement of latch(es) 28 and hinge members 22,24 on the top and bottom portions 14, 16, and box handle(s) 38, 46 placement) that encourage and facilitate different stacking patterns or configurations of boxes 12 stacked one on top of another, that increase effectiveness, stability and efficiency of the boxes 12 when they are stacked together, and that allow access to contents of boxes 12 while stacked for greater convenience than provided by existing stackable container systems. For example, example embodiments of different storage boxes 12, various external and internal features thereof and accessories described in the present disclosure that encourage the storage boxes 12 to be reconfigurable and multi-functional for customization by users for their particular item storage, organization, transport and access needs.

Figure 4A:
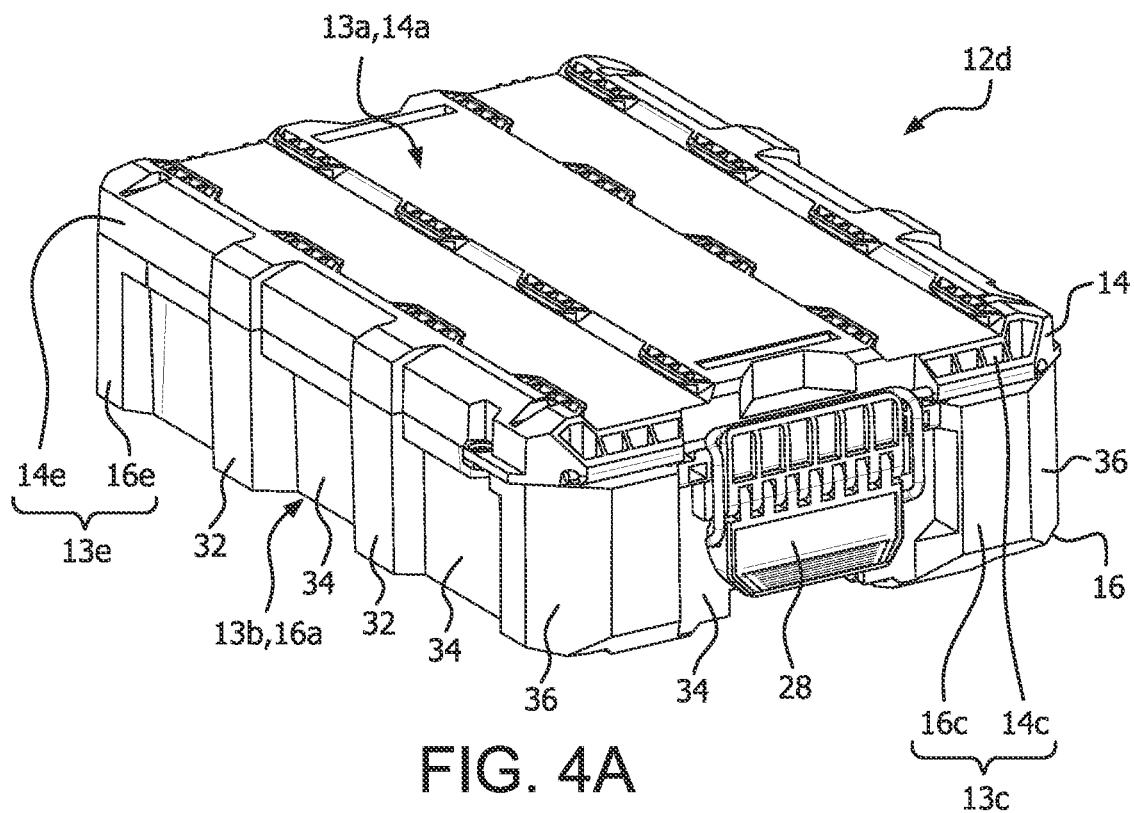
FIGS. 4A and 4B are opposite side perspective views of a storage box in accordance with an example embodiment.
Figure 4B:
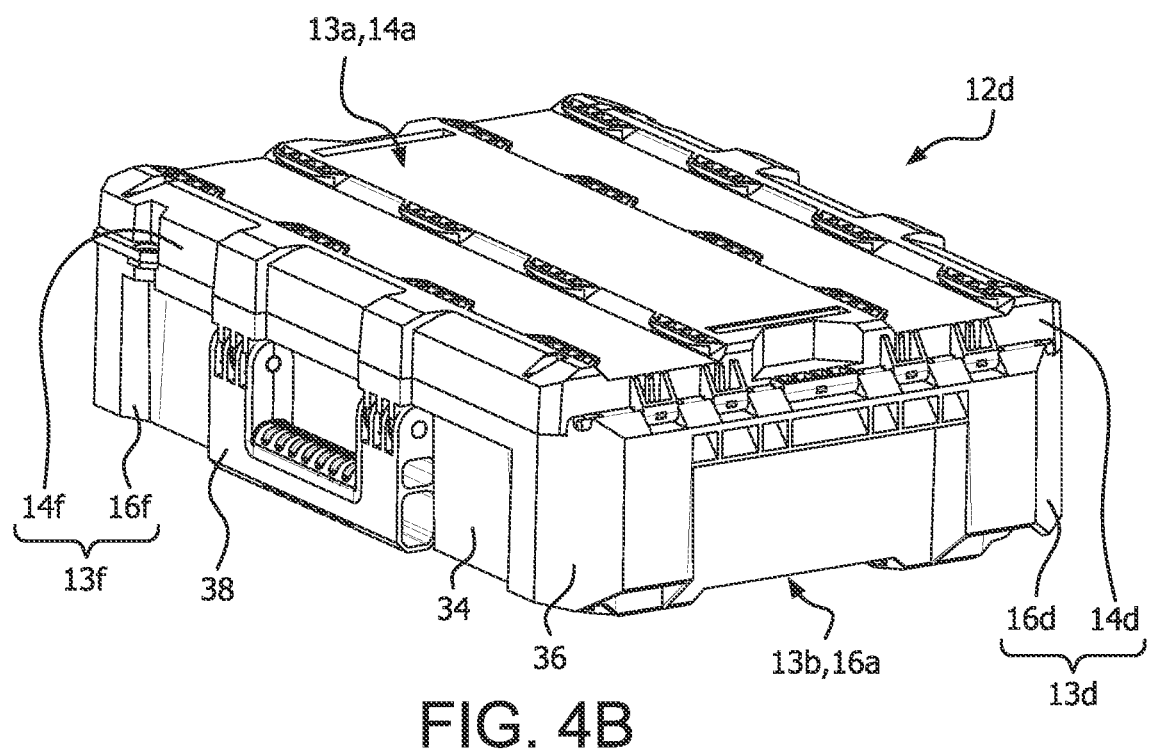

With reference continued to FIGS. 4A and 4B, the boxes 12 of different sizes each includes a top portion 14 and a bottom portion 16 that define an inner volume 18 for storage, wherein the top portion 14 can be open or closed relative to the bottom portion 16, or removed from the bottom portion 16 altogether, and the top and bottom portions 14 and 16 can be secured together via one or more latches 28 and optionally hinge members 22, 24. The top portion 14 of a box 12 comprises, for example, an exterior surface 14a of a top wall, an interior surface 14b of the top wall, and four side walls 14c-f comprising a front wall 14c, a back wall 14d opposite the front wall 14c, and third and fourth end side walls 14e and 14f that are opposite to each other. The bottom portion 16 of a box 12 comprises, for example, as an exterior surface 16a of a bottom wall, an interior surface 16b of the bottom wall, and four side walls 16c-16f comprising a front wall 16c, a back wall 16d opposite the front wall 16c, and third and fourth end side walls 16e and 16f that are opposite to each other. When the top portion 14 and the bottom portion 16 of a box 12 are closed together, the box 12 has exterior surfaces 13 defined, for example, as the box top exterior surface 13a, the box bottom exterior surface 13b, and four surrounding box exterior side walls 13c-f comprising a front wall 13c, a back wall 13d opposite the front wall, and third and fourth end side walls 13e and 13f that are opposite to each other. The box exterior side walls 13c-f correspond to the respective joined side walls 14c-14f and 16c-16f of the top portion 14 and bottom portion 16. The box top exterior surface 13a of the box corresponds to the exterior surface 14a of the top portion 14, and the box bottom exterior surface 13b of a box 12 corresponds to the exterior surface 16a of the bottom portion 16. It is to be understood that the others sizes of boxes 12a-12c and 12e-12f have similar enumerated parts as shown in and described above with reference to FIGS. 4A and 4B, but some of these part numbers may be omitted for clarity.

The bottom portion 16 of a box 12 has a designated depth and opening over which the top portion 14 can be affixed to enclose an inner volume 18 for storage. More details of the top portion 14 are described below with reference to example embodiments for lids shown in FIGS. 54A through 65C. The side walls 14c-14f of the lids 14 can have different heights among the boxes 12a-12f, and even different height options for the same type of box 12, to accommodate different accessories (e.g., lights and power supply or battery) and provide for different volumes of interior space 18 within the box 12.

As stated above, the bottom portion 16 of a box 12 has four surrounding exterior side walls 16c-16f comprising a back wall 16d extending between the two opposite side walls 16e-16f, and a front wall 16c positioned opposite the back wall 16d and extending between the two opposite side walls 16e-16f As described below with reference to the different boxes 12a-12f, different ones of the back wall 16d, front wall 16c and side walls 16e-16f can be provided with one or more of hinge members 22, 24 for connecting to the top portion 14, and a latch(es) 28 or other closure means for securing the top portion 14 to the bottom portion 16. Also, front wall and back wall designations are merely used for differentiating among four side walls of a top portion 14 or a bottom portion 16 of a box 12 and do not necessarily designate a front or a back of a box 12. As described below, several of the boxes 12a through 12c are advantageously designed with a dual hinge latches arrangement (e.g., one or more latches 28 on each of two opposite sides of the box) that allows access to the box storage compartment 18 from either of the two opposite sides of the box. Different ones of the back wall, front wall and side walls of the boxes (e.g., side walls 16c-16f of the bottom portion 16) can be provided with one or more of a pivotable handle 38. An example pivotable handle 38 is described below with reference to FIGS. 23A-23G. The pivotable handles 38 used on the respective boxes 12a through 12e are similar in design and function but may have different dimensions with respect to each other to accommodate the different proportional sixes of the boxes 12a through 12e on which they are mounted. An example hinge (e.g., with hinge members 22, 24) is described below with reference to the medium storage box 12d shown in FIGS. 18A-18E. The hinge members 22, 24 are similar for the compact organizer shown in FIGS. 19A-19E and the low profile organizer 12f shown in FIGS. 20A-20E. An example large latch is described with reference to FIGS. 16A-17D depicting a large storage box 12c and FIGS. 21A-21G showing a large version of a latch 28. The large latch 28 is similar to those used for the rolling base box 12a, the portable storage box 12b, the medium storage box 12d and the compact organizer 12e. A different type of latch 28, that is, a small version of the latch 28, is described with reference to FIGS. 20A-20G showing the low profile organizer 12f and FIGS. 22A-22G showing a small version of the latch 28.

As described below, the boxes 12 have a rugged design which allow their various components to withstand impacts, falls, and long-term use. The boxes 12 are molded or otherwise formed from a durable plastic material. As described below, portions 32, 36 of the side walls 13c-13f of the boxes 12 are formed thicker than other areas on the box for increased structural strength and to create recesses 34 for components such as handles 38 and latches 28 to be arranged flush within a perimeter or exterior boundary of the box 12 to protect handle(s) 38 and latch(es) 28 when side walls 13c-13f of the box(es) 12 are subjected to an applied force or impact. Also, the recesses 34 provide convenient lid lift access for a user's hand, particularly when the lid is closed and the latches 28 are released.

Rolling Base Box 12A

Figure 5A:
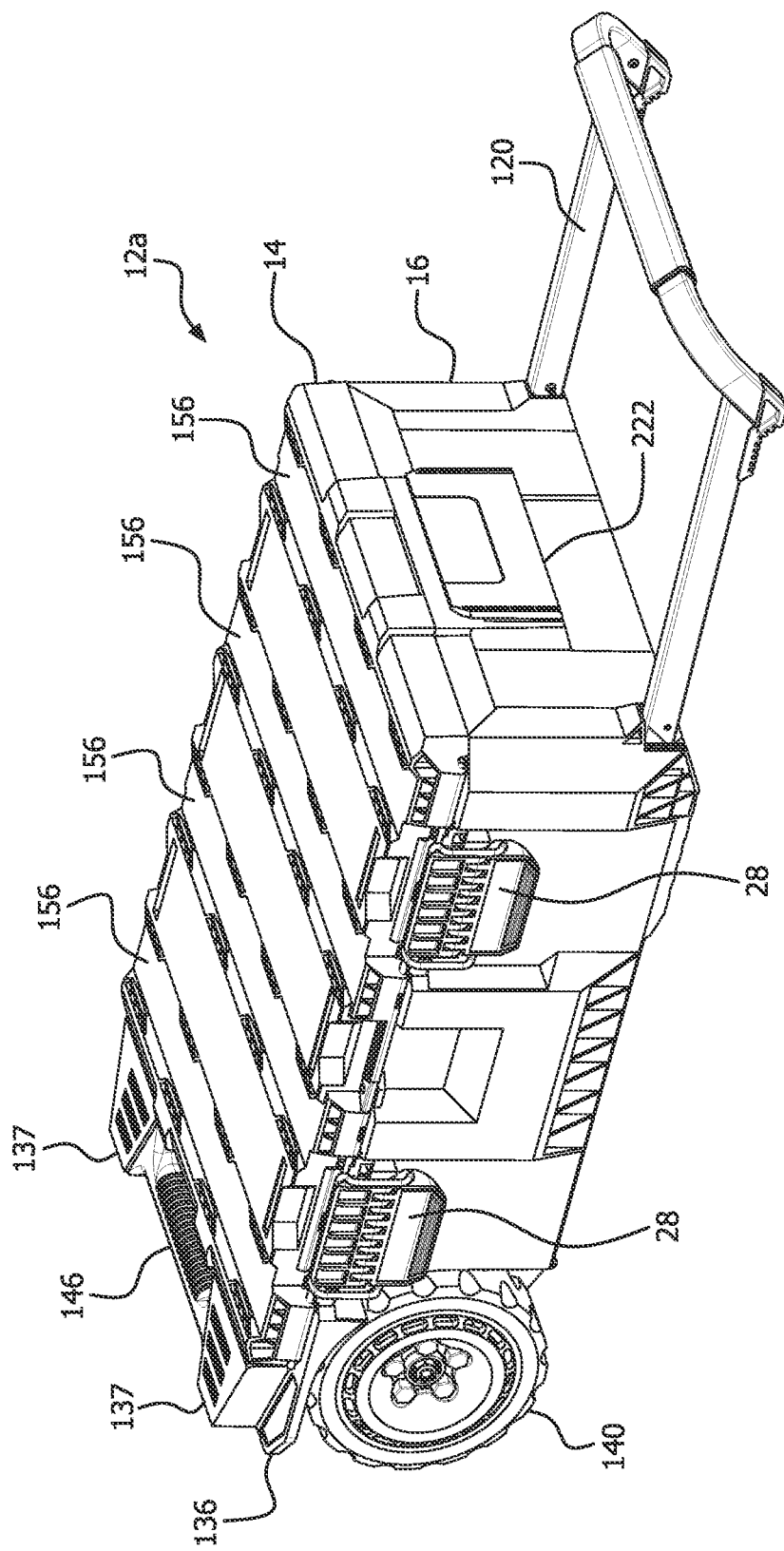
FIGS. 5A, 5B, 5C, 5D, 5E, 5F and 5G depict perspective, top, bottom, left, right, back and front views, respectively, of a rolling base box in accordance with an example embodiment.
Figure 5B:
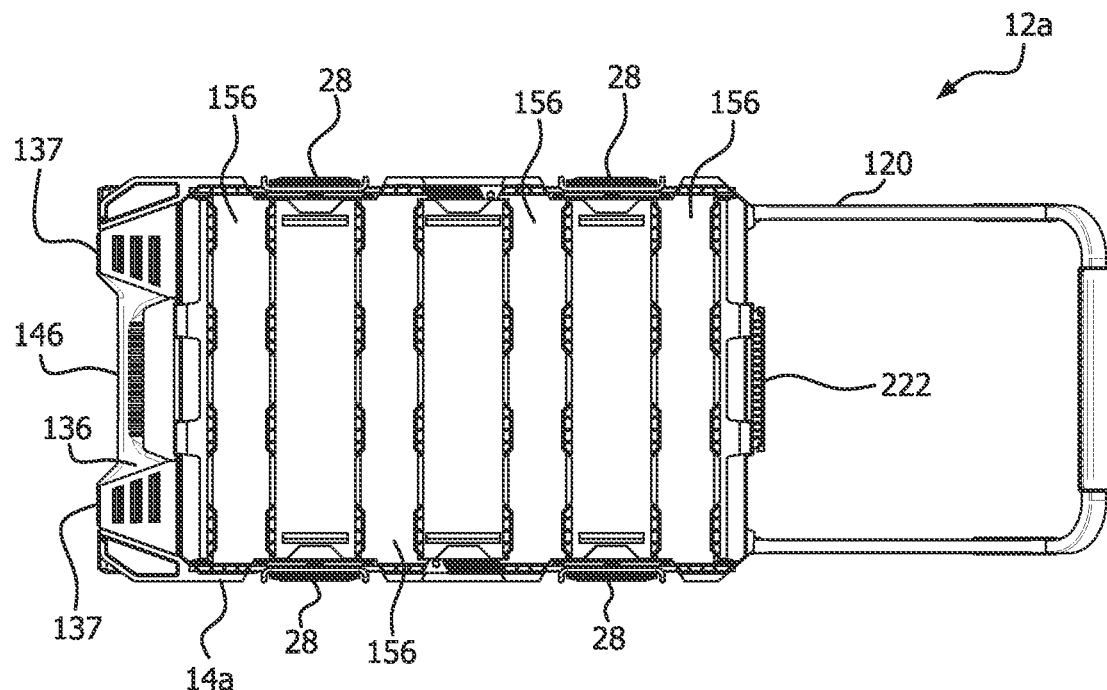
Figure 5C:
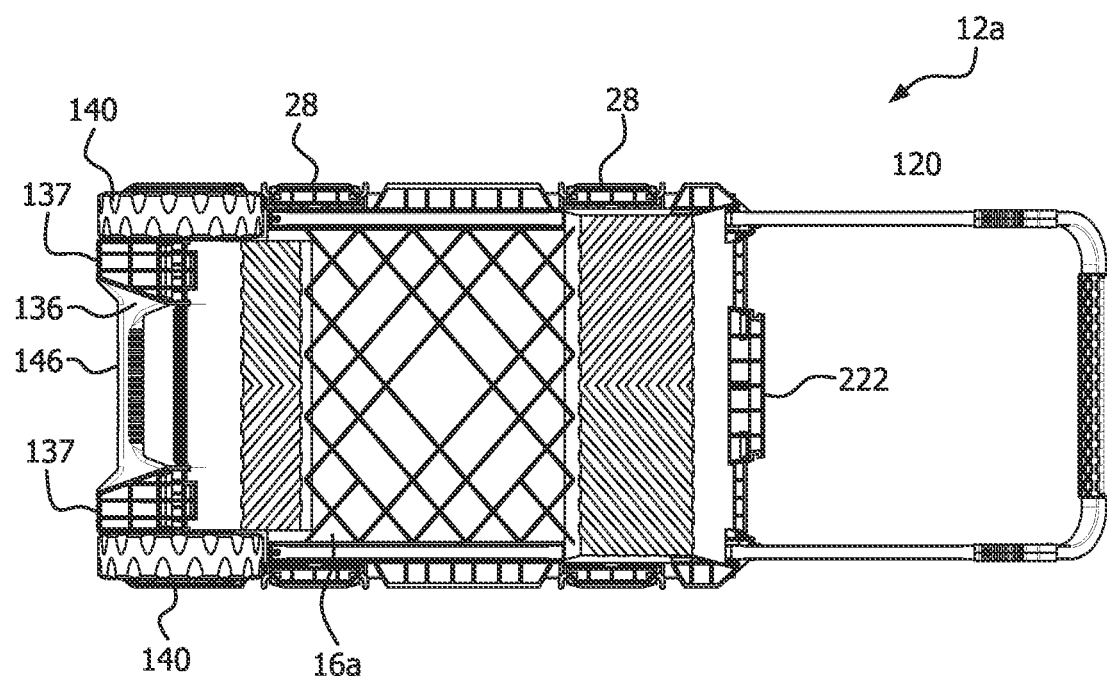
Figure 5D:
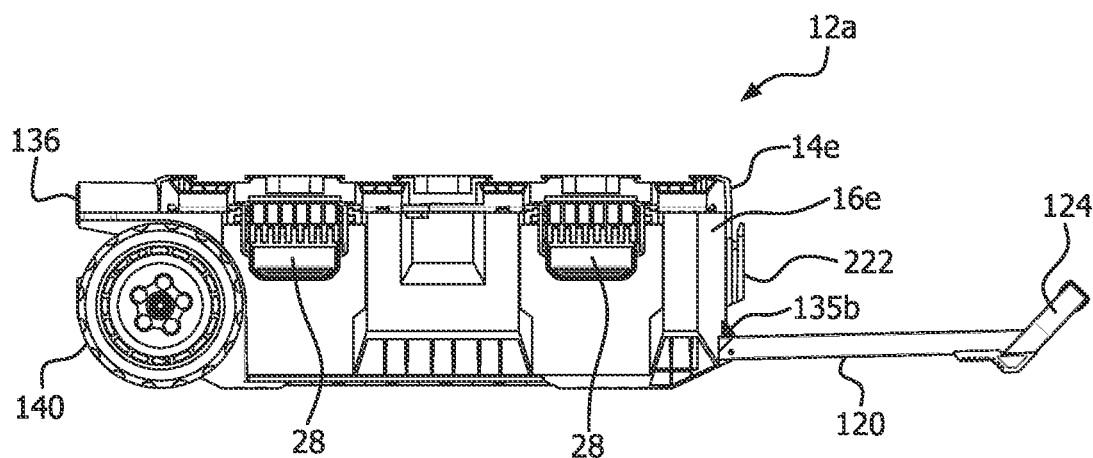
Figure 5E:
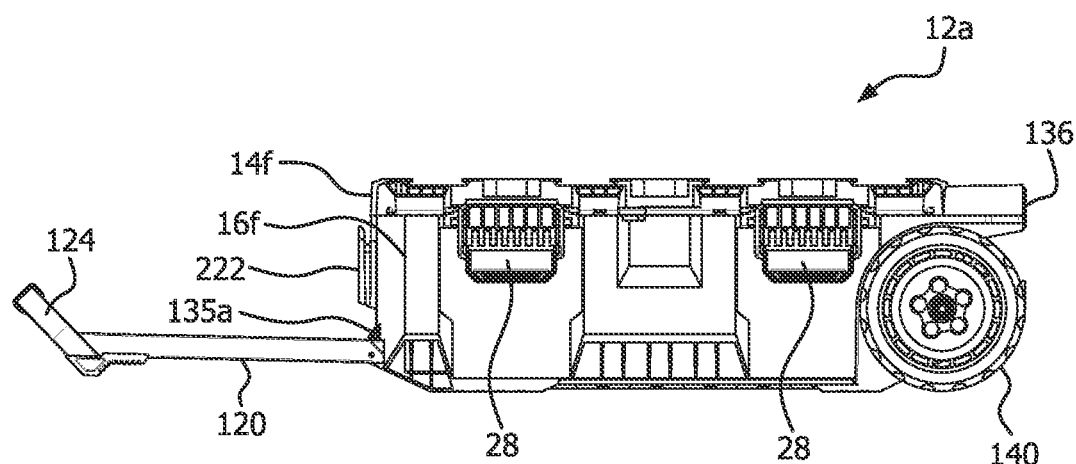
Figure 5F:
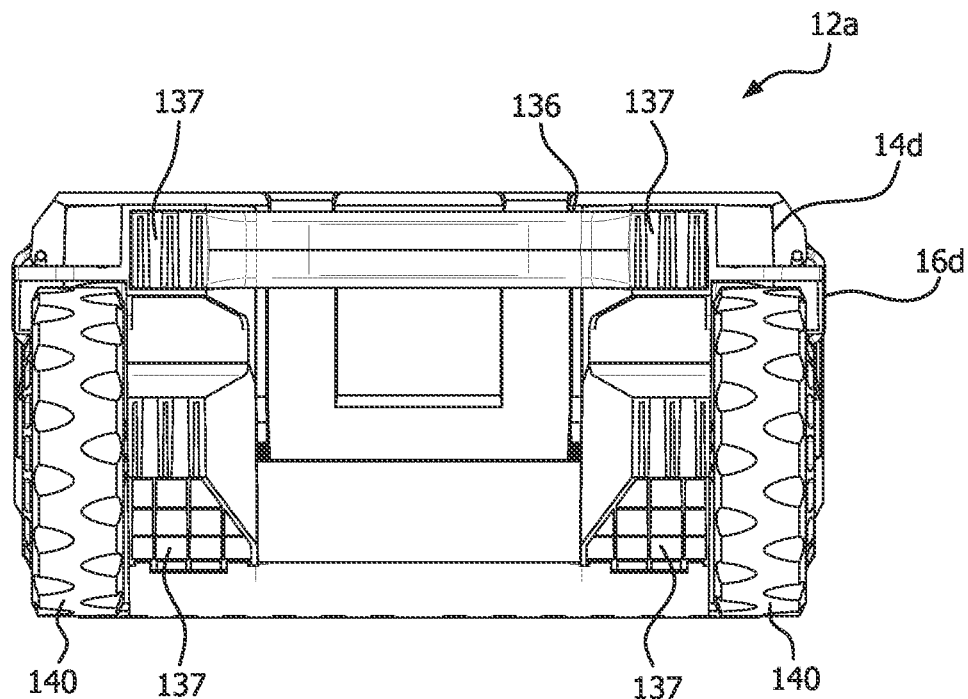
Figure 5G:
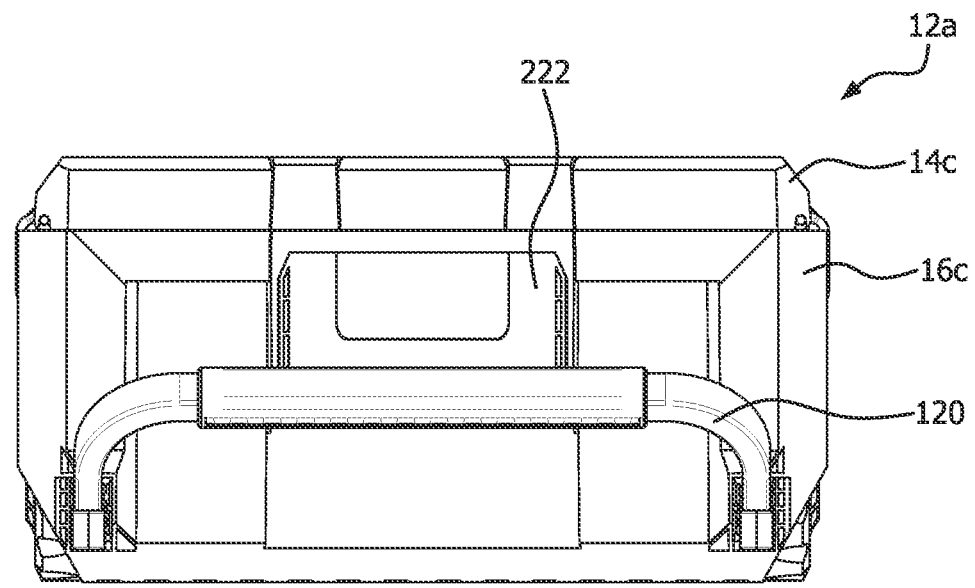

FIGS. 5A through 6E show respective views of a rolling base box 12a constructed in accordance with an example embodiment of the present disclosure. FIGS. 5A though 5G depict perspective, top, bottom, left, right, back and front views, respectively, of an example rolling base box 12a. The rolling base box 12a has a top portion (e.g., a lid) 14 and a bottom portion 16 that define an internal storage compartment 18. The rolling base box 12a can be provided with one or two large latches 28 on both of its left and right side walls 16e, 16f to pivotably open the box lid 14 on one side 13e of the box or the other side 13f, or to remove the lid 14 from the box 12a altogether, for advantageous dual sided latch hinge operation of the top portion 14 on the box 12a. A pivotable handle 38 can also be provided on at least one of the left and right side walls 16e, 16f The top portion 14 has components on its top exterior surface 14a for a box-to-box connection system 150 described below in connection with FIGS. 24A through 29C, and components on two of its left and right side walls 14e,f to engage the latch(es) 28 as described below. For example, the rolling base box 12a has a box-to-box connection system 150 comprising channels 156 on it top exterior surface 14a that interact with guides 160 on the bottom exterior surfaces 16a of other boxes 12 stacked on the top of the box 12a.

Figure 6A:
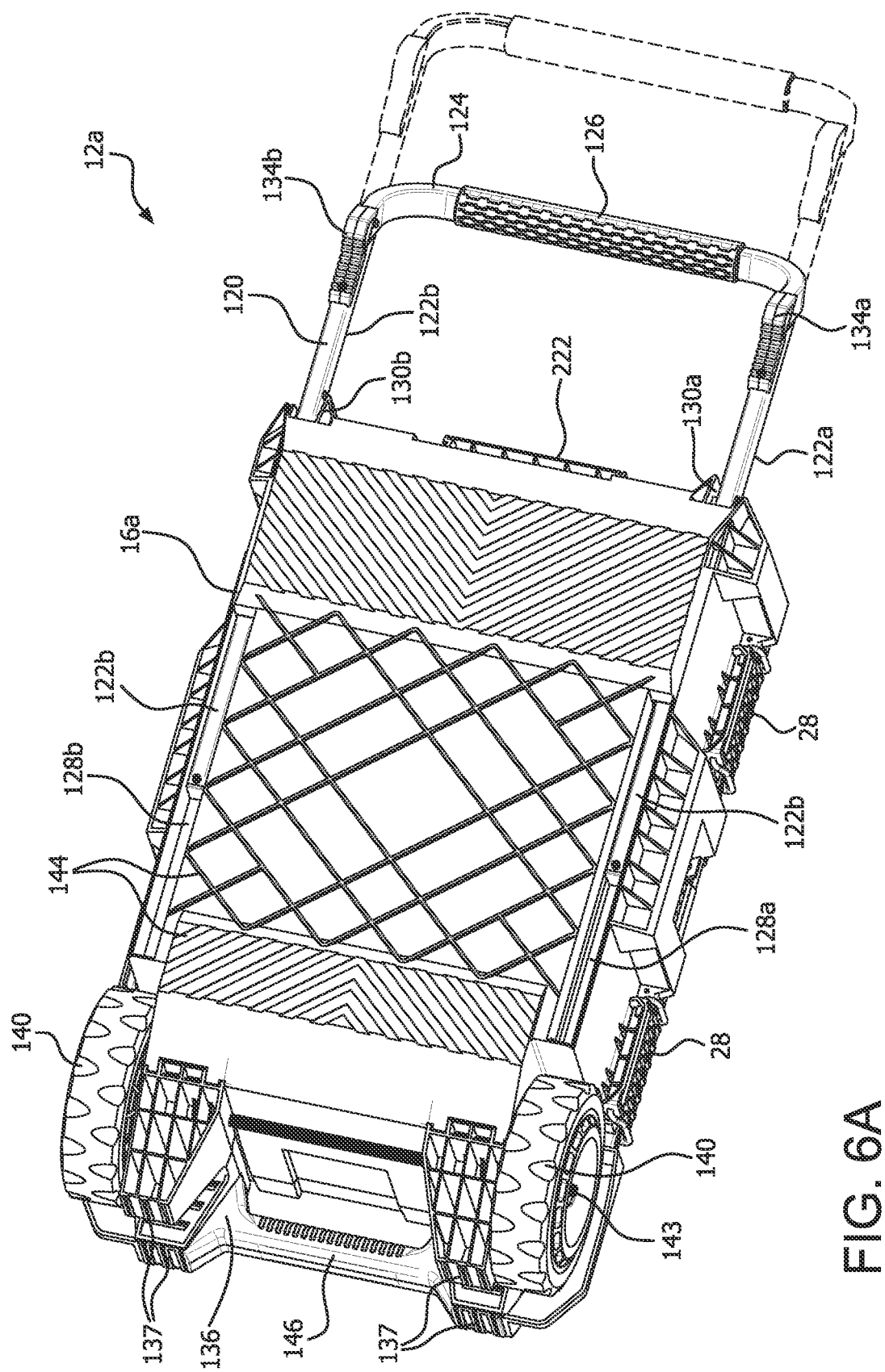
FIGS. 6A, 6B, 6C, 6D and 6E depict different perspective views of a rolling base box in accordance with an example embodiment.
Figure 6B:
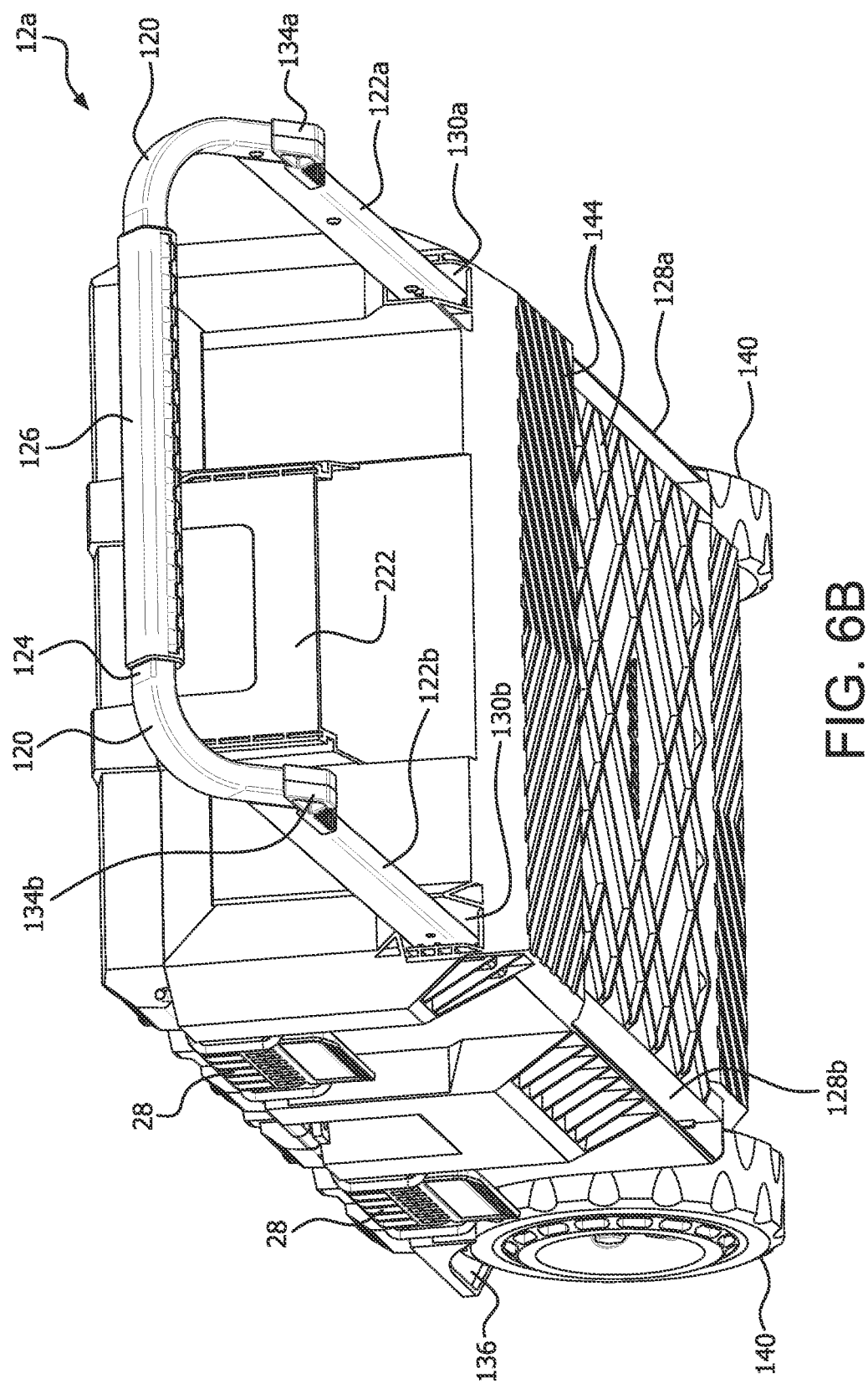
Figure 6C:
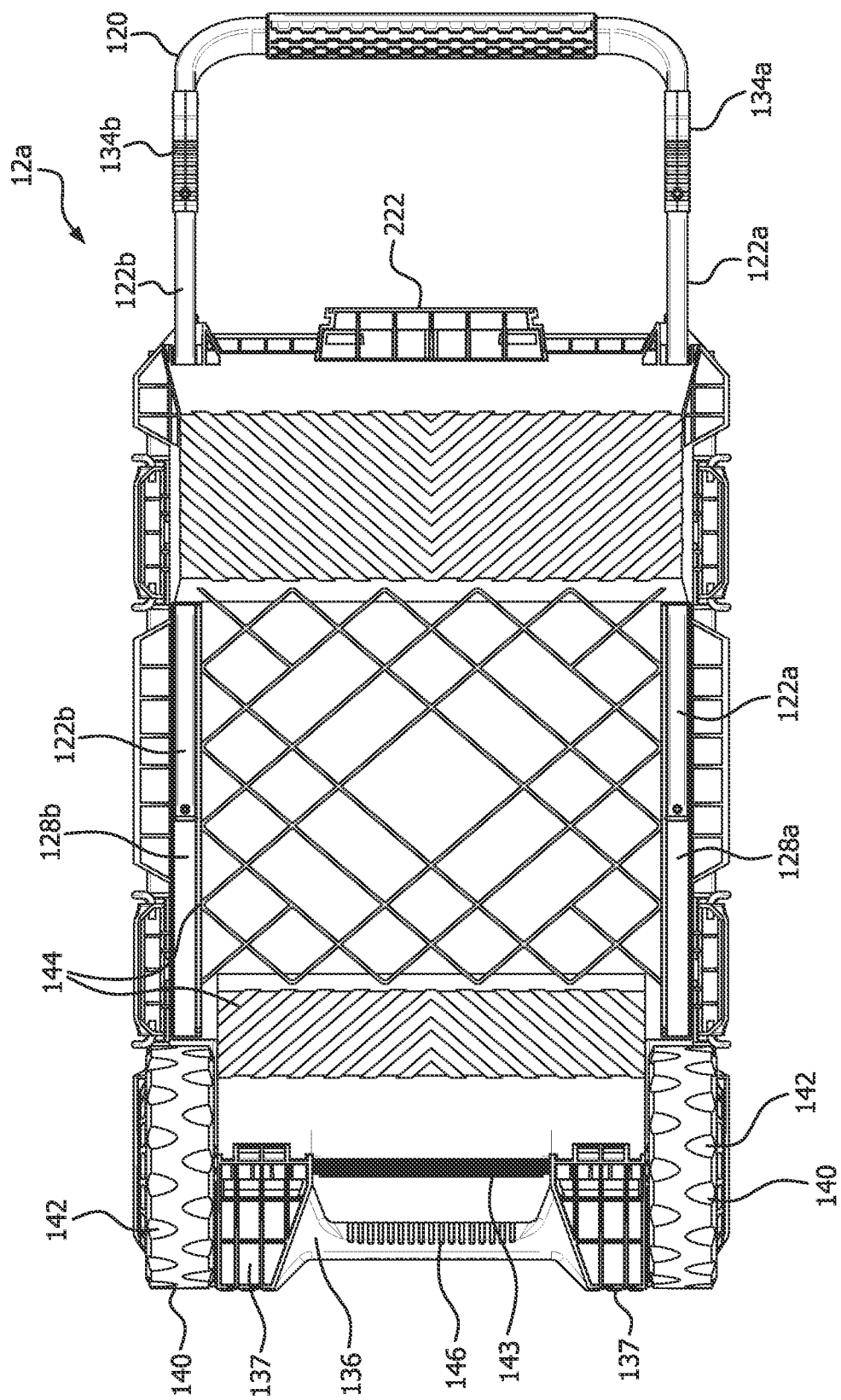
Figure 6D:
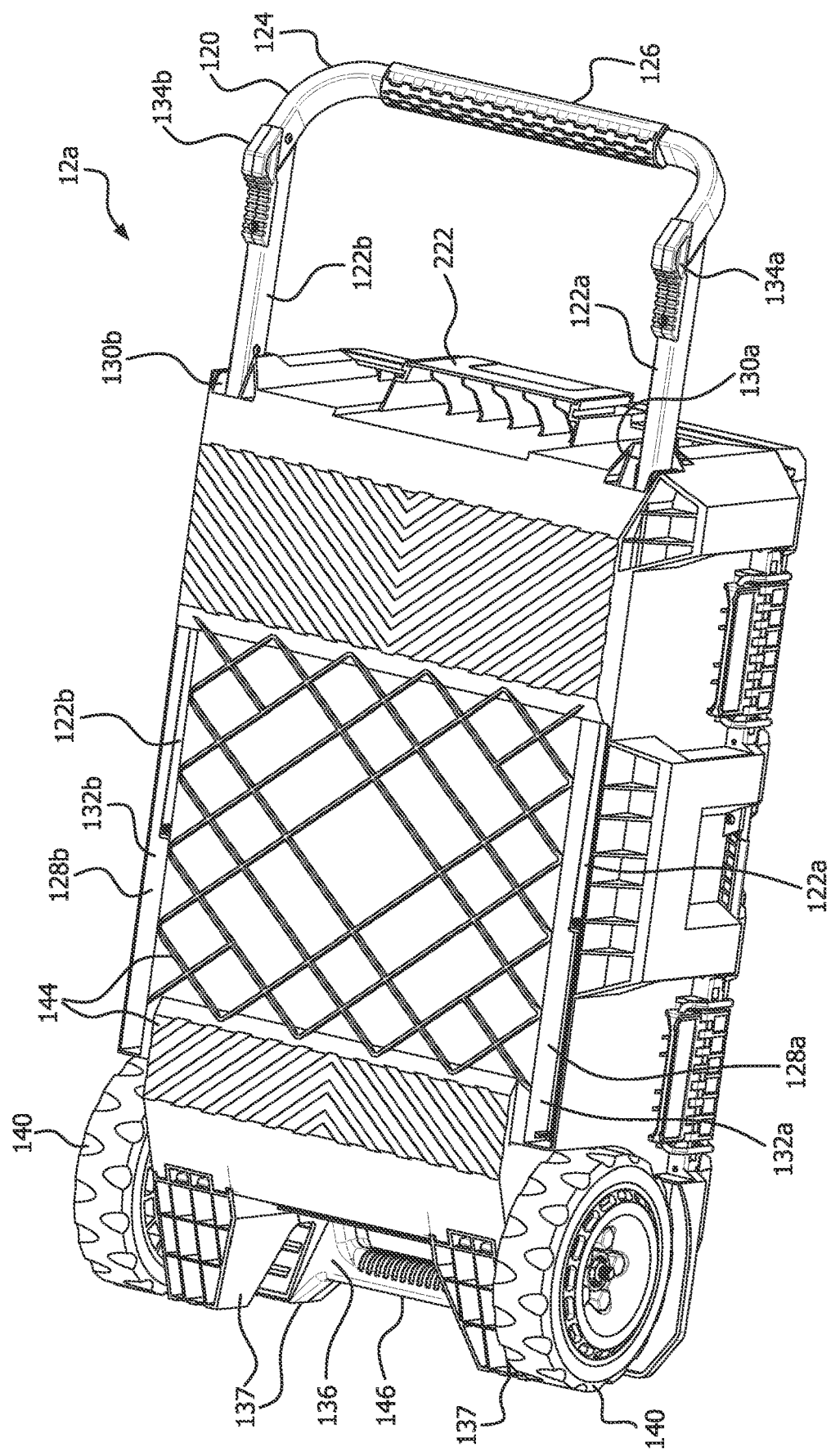
Figure 6E:
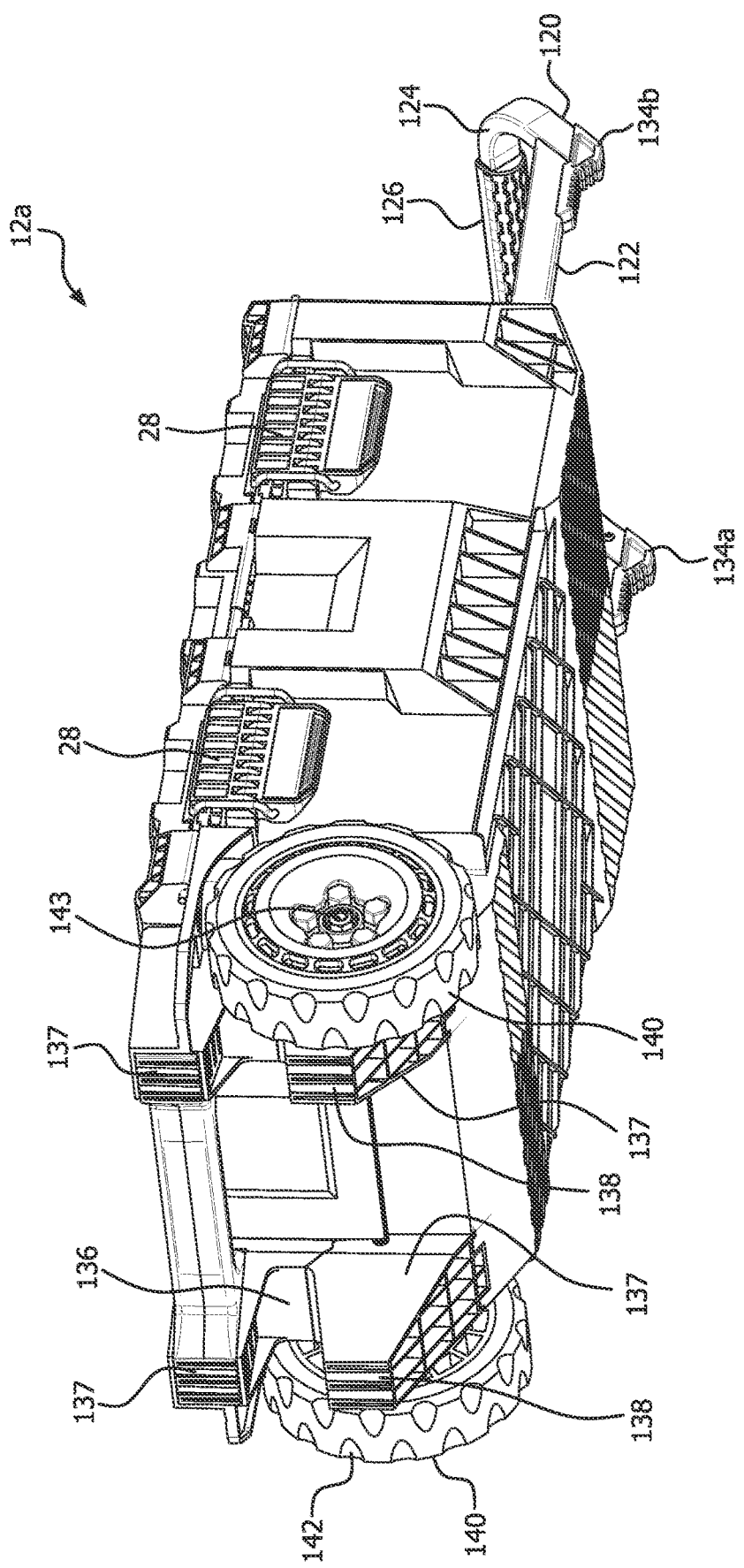
Figure 7A:
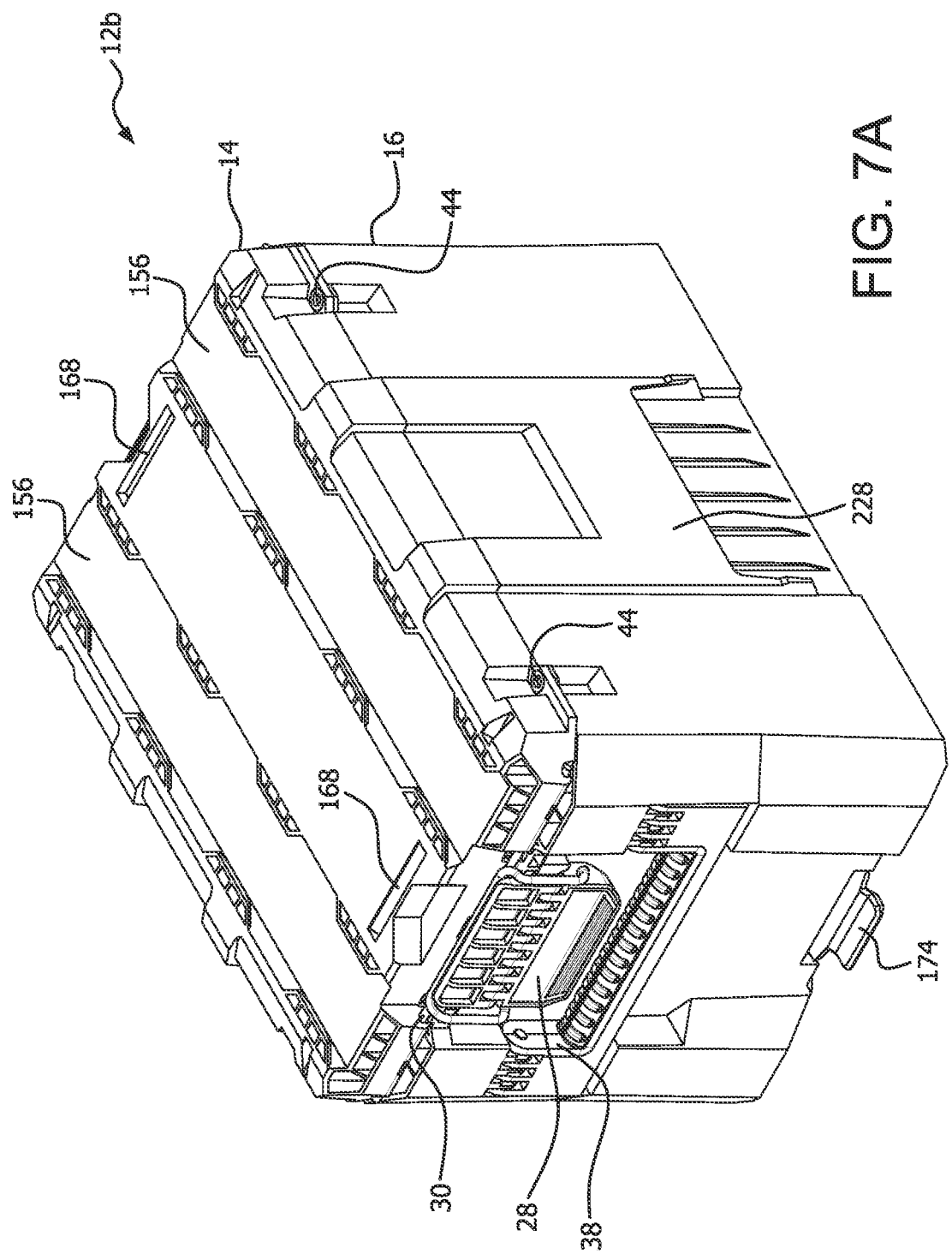
FIGS. 7A, 7B, 7C, 7D, 7E, 7F and 7G are perspective, left, right, top, bottom, front and back views, respectively, of a portable storage box in accordance with an example embodiment.
Figure 7B:
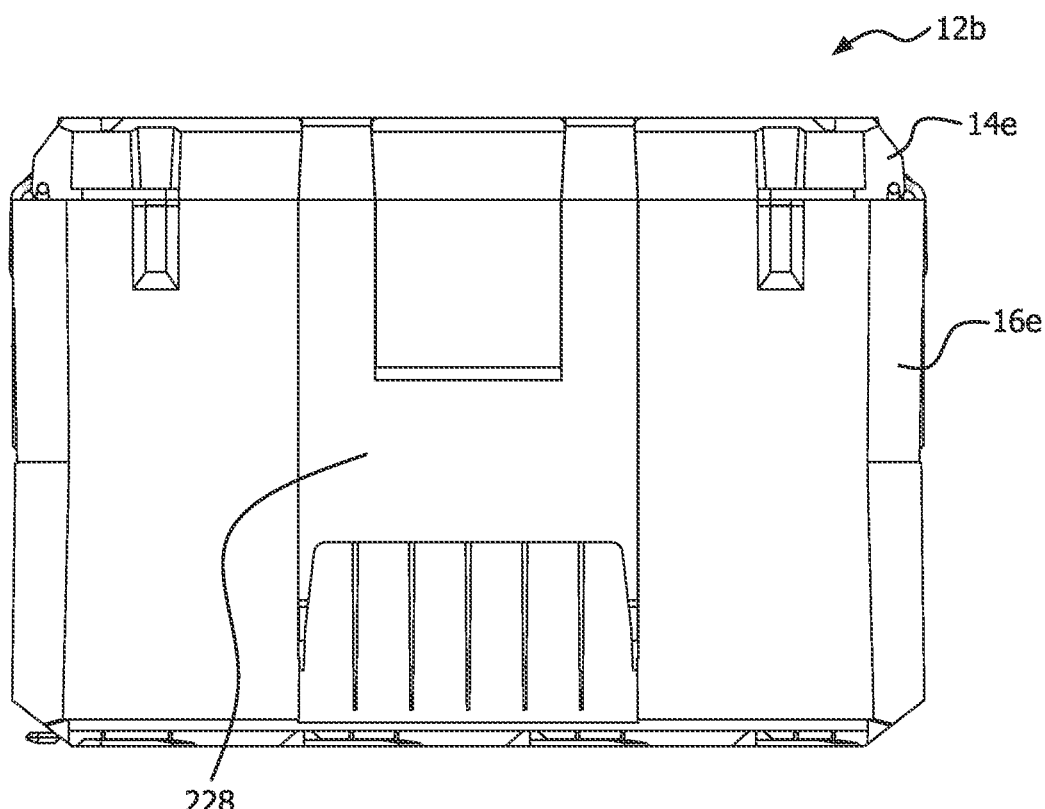
Figure 7C:
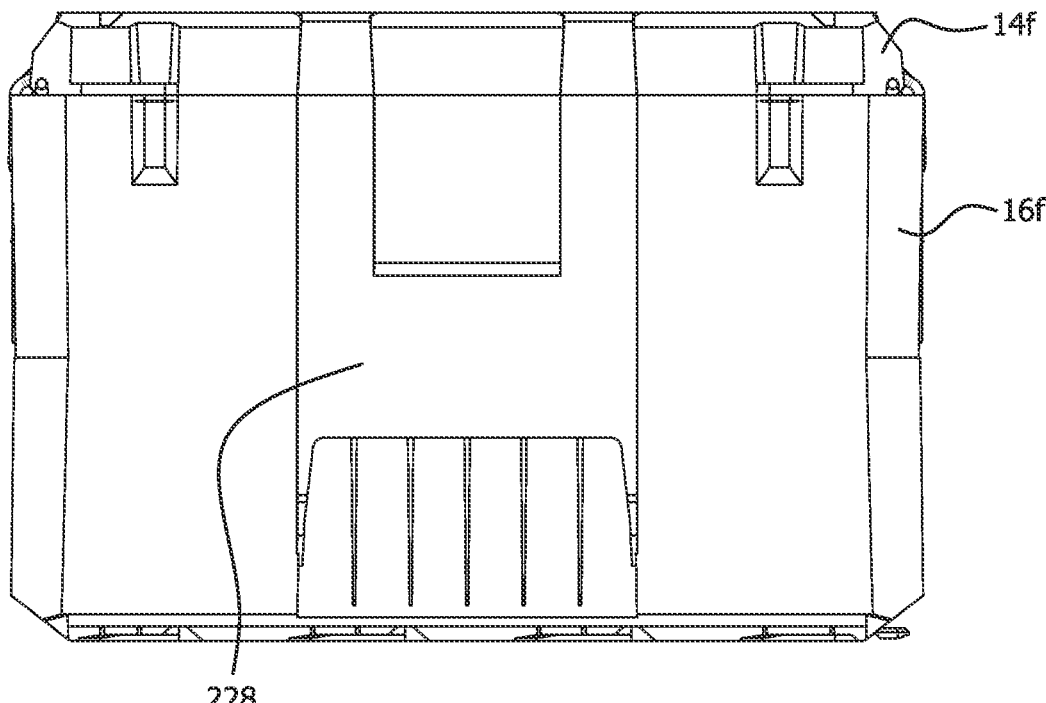
Figure 7D:
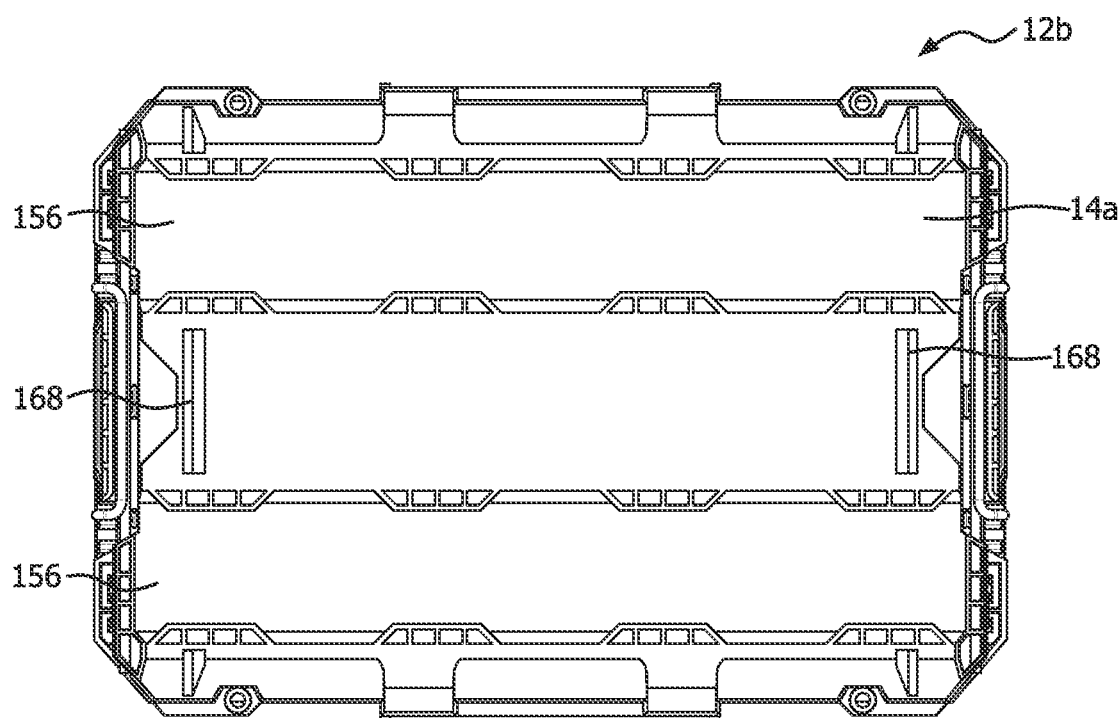
Figure 7E:
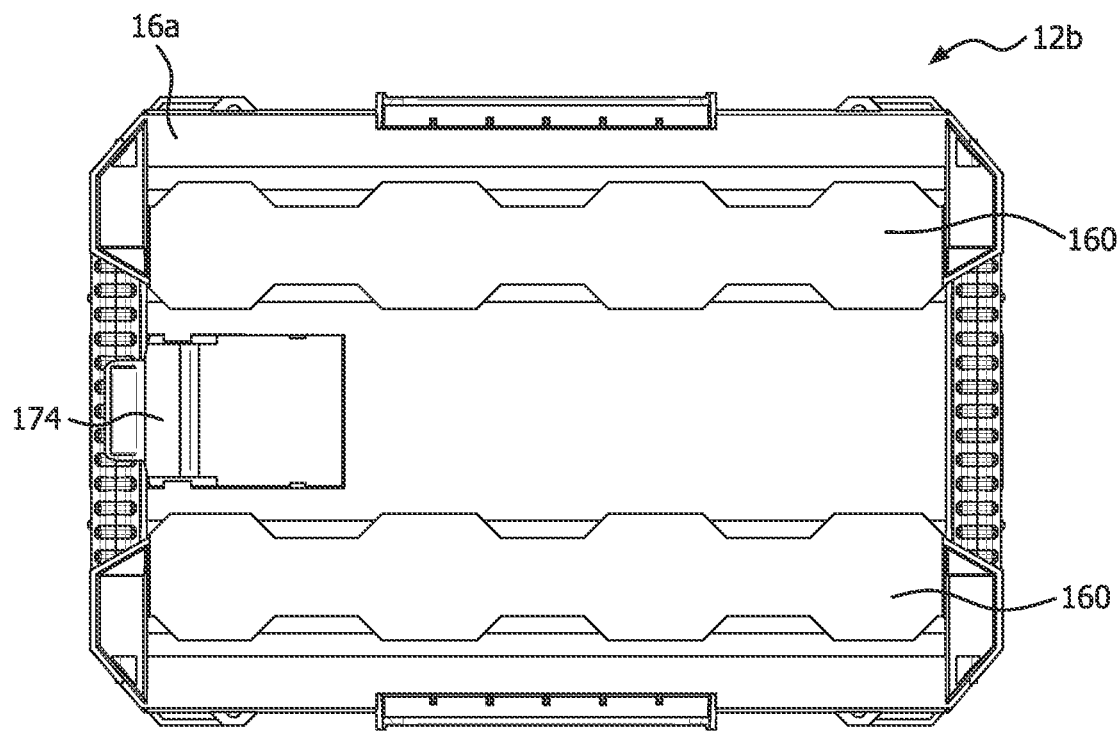
Figure 7F:
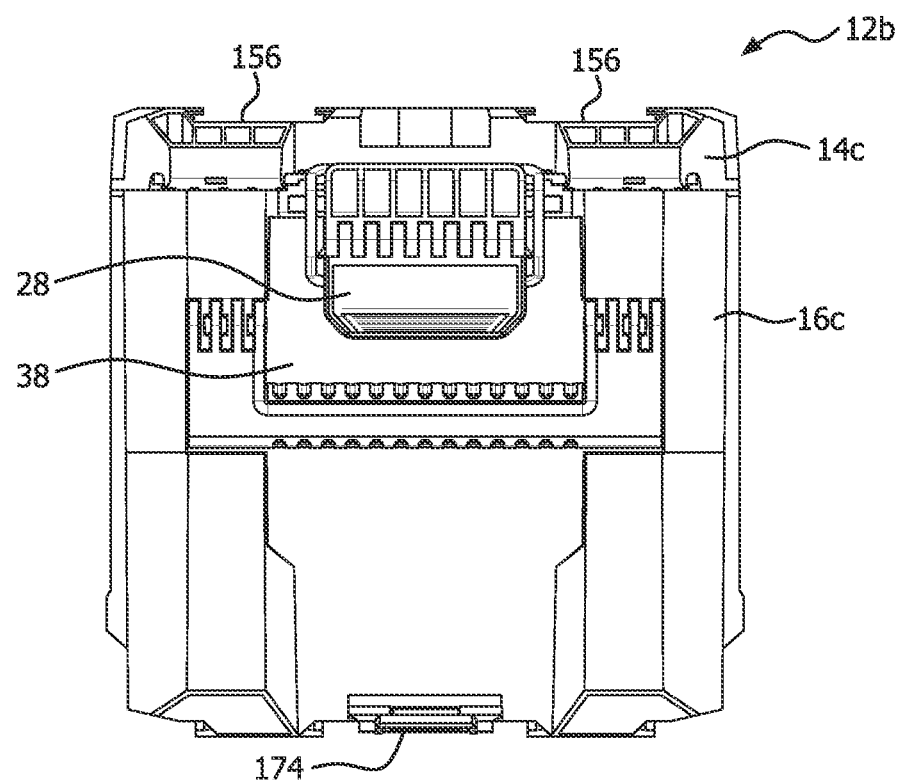
Figure 7G:
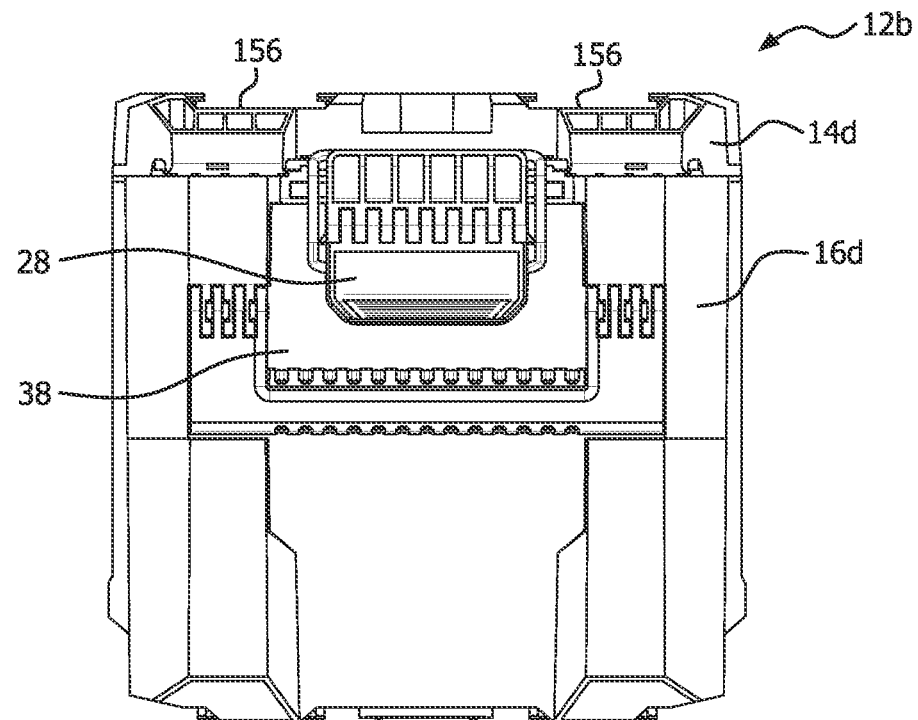
Figure 76A:
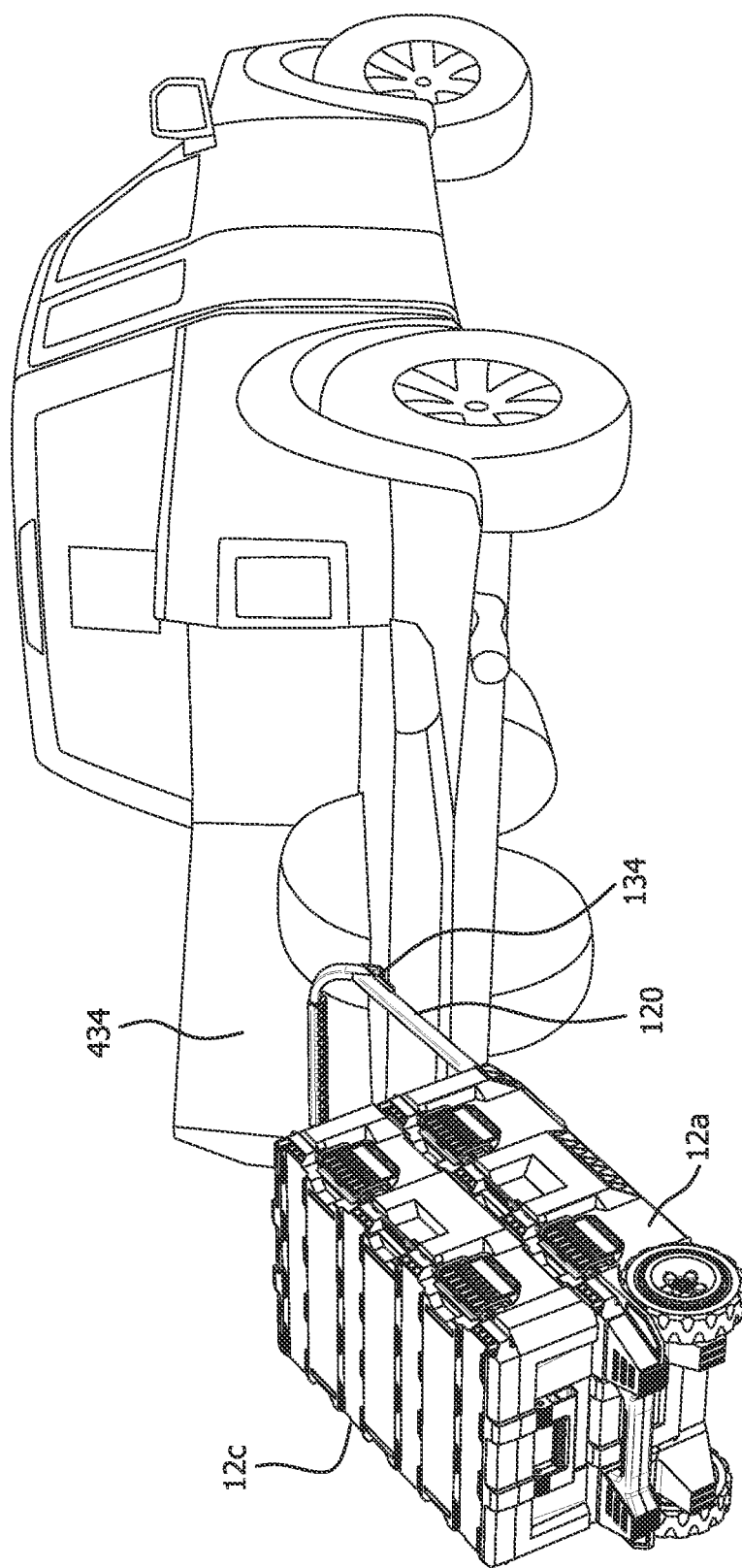
FIG. 76A illustrates a modular storage system having its retractable handle stopper members in use as a truck tailgate grip in accordance with an example embodiment.

Reference is now made to FIGS. 6A through 6E which are different perspective views of a rolling base box 12a in accordance with an example embodiment. In addition to the above illustrative enumerated features of a box 12 described above in connection with FIGS. 5A-5G, the bottom portion 16 of the rolling base box 12a also has wheels 140, a telescopic or retractable handle 120, and a foot member 136 with fixed handle 146 and feet indicated at 137. The fixed handle 146 is particularly helpful to a user as a loading lift handle to assist with leveraging a rolling base box 12a into a truck bed 434 from a tilted orientation as shown in FIG. 76A. The wheels 140 are for example implemented as two wheels (e.g., 9" wheels) connected to respective opposite ends of an axle 143 and arranged along the axle 143 such that the hubs of the wheels do not sit proud of the sides 16e,16f of the box 12a and therefore remain in the perimeter boundary or footprint of the box 12a. The axle 143 can be substantially exposed from the bottom external surface 16a of the box 12a as shown in FIG. 6C, or be mostly encased in an integral axle track integrally formed in side wall 16f of the bottom portion 16. The wheels 140 have a tread pattern indicated generally at 142 that is configured for durability and traction, as well as mud and dirt resistant to discourage clumps of debris from getting stuck among and within the treads 142. The rolling base box 137 further comprises a foot member 136 with feet 137 on the bottom portion 16 that are arranged to be even with or slightly proud of the wheels to facilitate standing the rolling base unit 12a and any boxes 12 stacked thereon in an upright position as depicted in FIG. 3. The feet 137 can also serve as mudflaps to block mud and debris being kicked up by the wheels 140 when in motion.

Figure 105:
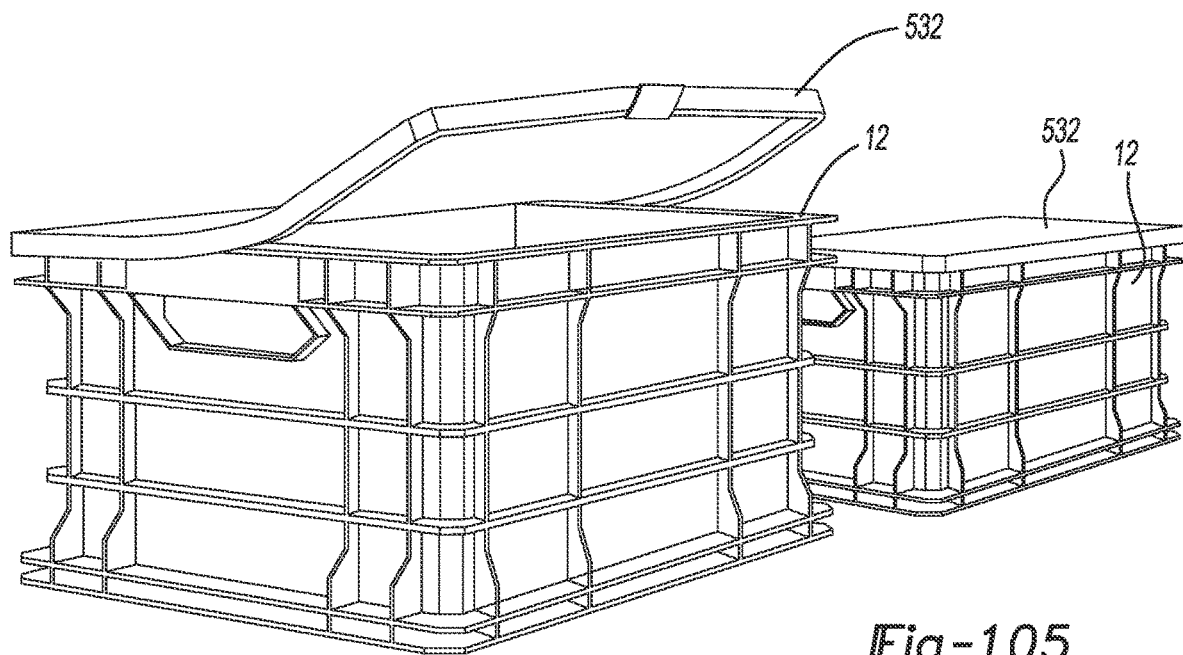

An extension connection component 222 is provided on a front wall 16c of the bottom portion 16 of the rolling base box 12a that is configured to be removably engaged with an extension connection component 228 provided on one or more of the side walls (e.g., 16e,16f) of the portable storage box 12b or other type of box (e.g., a crate 532 as shown in FIG. 105). The cooperation between the extension connection component 222 of a rolling base box 12a and one of the extension connection components 228 on side walls of a portable storage box 12b is described below in connection with FIGS. 9A-15B.

The bottom portion 16 of rolling base box 12a further comprises handle tracks 128a, 128b as illustrated in FIGS. 6A-6D that are configured to receive the retractable handle 120. The handle 120 comprises two legs 122a, 122b and a grip portion 124 extending between two ends of the legs 122a, 122b. The handle 20 is shown in a fully extended position in FIGS. 5A-5G, in partially extended position in FIGS. 6A-6E, and in a fully retracted positon in FIG. 3, for example. The bottom portion 16 of the rolling base unit 12a is formed with the two handle tracks 128a, 128b disposed along a longitudinal axis thereof and proximal to respective opposite sides 16e, 16f and the bottom exterior surface 16a. The handle tracks 128a, 128b are, for example, formed integrally in the bottom portion 16. The handle tracks are dimensioned with a length to receive a portion of the handle legs 122a, 122b in its fully retracted position. Handle insertion openings 130a, 130b to the handle tracks 128a, 128b are formed in a front wall 16c of the bottom portion 16 to receive the respective handle legs 122a, 122b. The handle insertion openings 130a, 130b and a cross-section of the handle tracks 128a, 128b are dimensioned to slidably and stably receive corresponding legs 122a, 122b of the handle 120. In accordance with an advantageous example configuration, the handle tracks 128a, 128b are at least partially open relative to the bottom exterior surface 16a of the rolling base box 12a as shown generally by the handle track openings 132a, 132b (FIG. 6D) to allow debris that may be introduced into the handle tracks (e.g., via the handle insertion openings 130a, 130b and the handle track openings 132a, 132b) to fall out of the handle tracks 128a, 128b to prevent the handle tracks 128a, 128b from be clogged with debris. Further, as the handle legs 122a, 122b slide manually in and out of the handle tracks 128a, 128b, the handle tracks can also be cleared of debris. For durability and less complexity and cost, the handle 120 can be configured without a rocker lock or locking mechanism that can prevent the handle from being extended or retracted, or locked at a selected positon.

The grip portion 124 of the handle 120 comprises a rubberized grip pad 126 secured to at least a portion of the grip portion 124 to add comfort and to improve a user's manual grip pressure on the handle. The grip portion 124 can also be angled relative to the handle legs 122a, 122b to improve ergonomic access to and gripping of the grip portion 124 of the handle 120 by the user when the exterior surface 16a of the bottom portion 16 of the rolling base box 12a is disposed along a ground surface. Each of the legs 122a, 122b comprises a rubberized or nylon stopper member 134a, 134b disposed adjacent to where it adjoins the grip portion 124. The stopper member 134a, 134b each has a catch dimensioned to extend from the handle leg a distance selected to provide a catch against an edge of a tail gate of a truck bed 434 or other surface against which the rolling base box 12a can be leaned as shown in FIG. 76A. The side wall 16e of the rolling base box 12a can be provided with stopper members 135a, 135b (e.g., FIGS. 5D and 5E) near the handle insertion openings 130a, 130b that abut the grip portion 124 of the handle 120 when the handle is in a fully retracted position. Different portions of the bottom surface 16a of the rolling base box 12a can be provided with one or more pattern(s) of raised ribs 144 that can protect the exterior surface 16a from scuffs.

Portable Storage Box 12b

FIGS. 7A through 7E depict perspective, left, right, top, bottom, front and back views, respectively, of an example portable storage 12b. The portable storage box 12b has a top portion 14 (e.g., a lid 14) and a bottom portion 16 that define an internal storage compartment 18. The bottom portion 16 of the portable storage box 12b has a latch 28 and a pivotable handle 38 on each of its front and back walls 16c, 16d. The latches 28 and the handles 38 are described below in connection with FIGS. 21A-21G and FIGS. 23A-23G, respectively. Aligned apertures 44 are provided in the top and bottom portions 14 and 16 to function as a padlock eyelet and receive a shackle of a lock when the top portion or lid 14 on the box 12b is closed to lock the contents of the box 12b. The top portion 14 has components 156 on its top exterior surface 14a to engage components 160 on the bottom exterior surface 16a of another box in accordance with an example box-to-box connection system 150, and features on two of its four side walls (e.g., 14c, 14d) such as a latch bar 30 to engage the latches 28 as described below in connection with FIGS. 21A-21G. The bottom portion 16 has components 160 on its bottom exterior surface 16a for the box-to-box connection system 150 described below in connection with FIGS. 24A through 29C. For example, the portable storage box 12b has a connection system 150 comprising channels 156 on it top exterior surface 14a that can interact with guides 160 on the bottom exterior surfaces 16a of other boxes 12 stacked on the top of the box 12b, and guides 160 on its bottom exterior surface 16a that can interface with channels 156 on the top exterior surfaces 14a of boxes on which the portable storage box 12b is stacked.

The bottom portion 16 also has components such has an extension connection component 228 provided on at least one of its side walls (e.g., 16e, 160 that can cooperate with the extension connection component 222 of the rolling base box 12a. The portable storage box 12b can be provided with an extension connection component 228 on each of its two side walls 16e, 16f that have the same width dimension as the width of rolling base box 12a. The length by width by height dimensions of portable storage box 12b are configured such that, when the portable storage box 12b is connected to a side of the rolling base box 12a via a box extension connection system 220 described below with reference to FIGS. 8 though 15B and the portable storage box 12b can rest on the extended retractable handle 120 of the rolling base box 12a, the portable storage box 12b and rolling base box 12a have a similar width. The height of the portable storage box 12b can be considerably greater than the heights of the other boxes 12a, 12c, 12d, 12e and 12f to enable storage for larger items such as motorized tools.

Box Extension Connection System 220

FIGS. 8 through 15B show respective views of an example box extension connection system 220 between two boxes 12 (e.g., between a rolling base box 12a and a portable storage box 12b) constructed in accordance with an example embodiment of the present disclosure. As stated above, an extension connection component 222 is provided on a side wall 16e of the bottom portion 16 of the rolling base box 12a that is configured to be removably engaged with an extension connection component 228 provided on another box 12 such as on one or more of the side walls (e.g., 16e, 160 of the portable storage box 12b. The cooperation between the extension connection components 222 and 228 of the rolling base box 12a and the portable storage box 12b will now be described with reference to FIGS. 8 through 15B.

Figure 8:
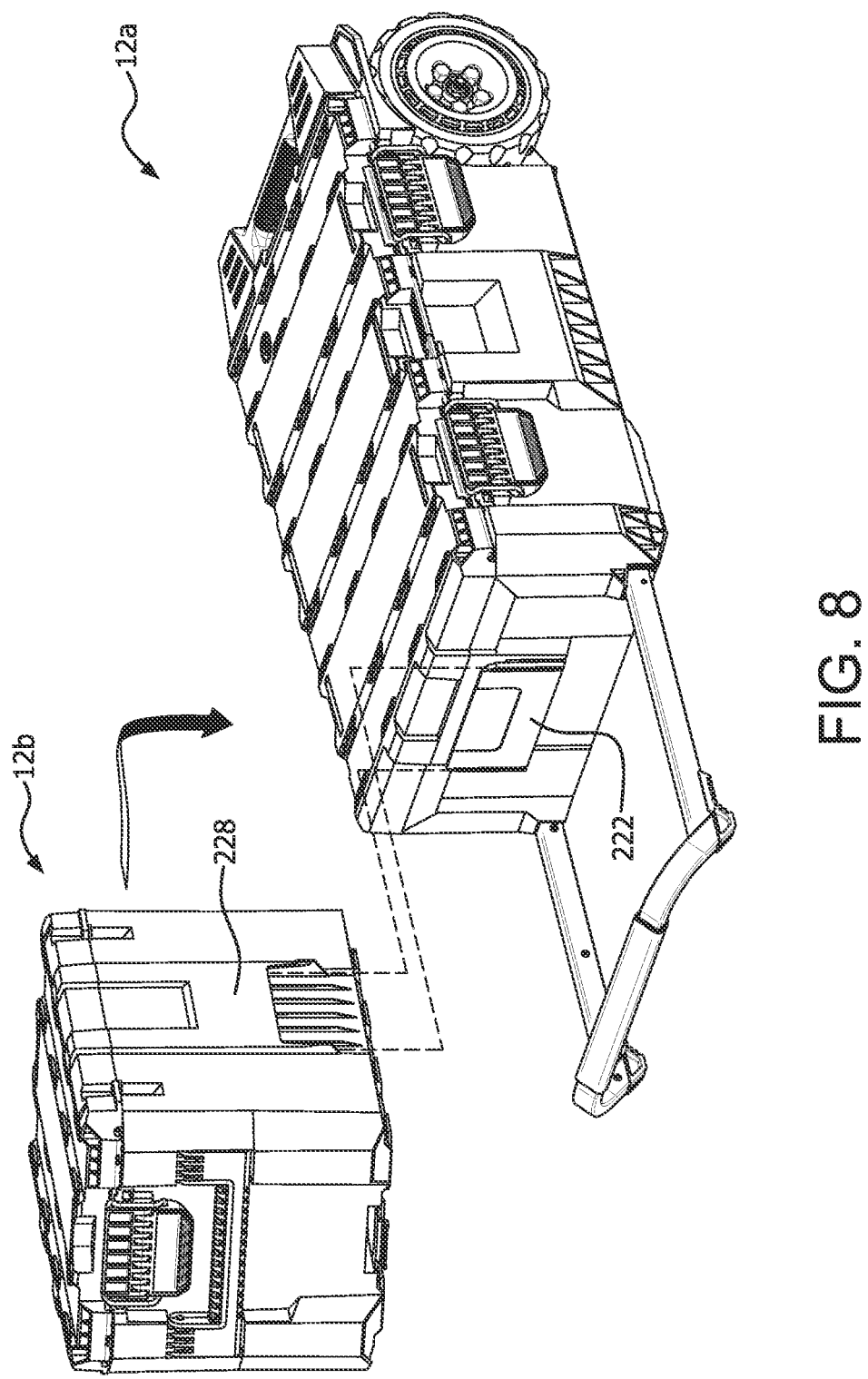
FIG. 8 is a perspective view of a portable storage box aligned to be placed on the extended handle of a rolling base box and connected via an extension connection system in accordance with an example embodiment.

FIG. 8 is a perspective view of two boxes with an example box extension connection system 220 that are in a disconnected state.

Figure 9A:
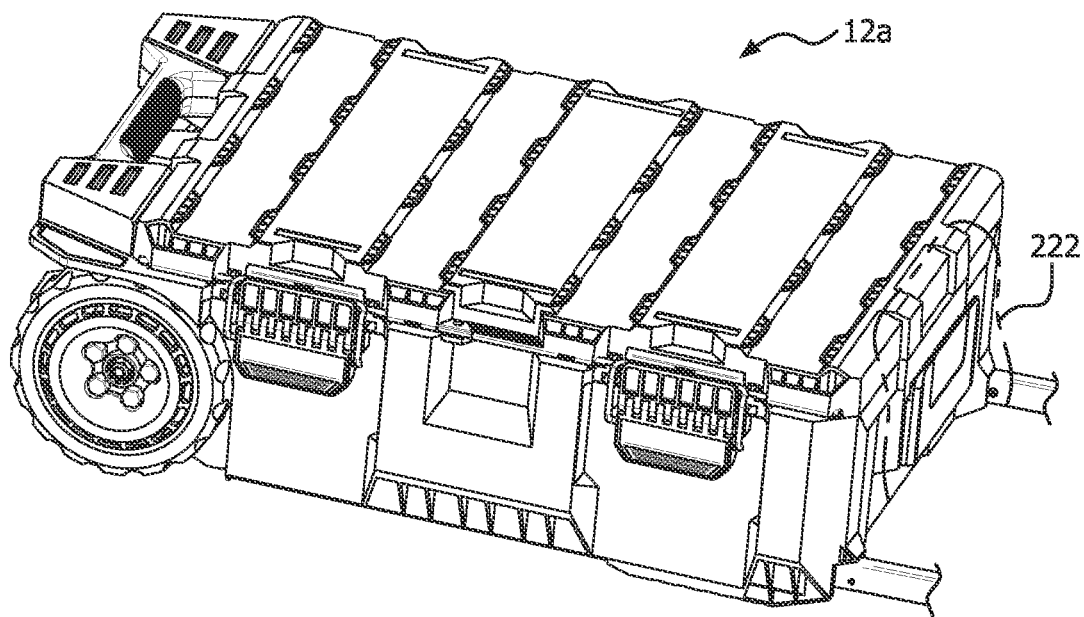
FIGS. 9A and 9B are, respectively, a perspective view of an extension connection component on a rolling base box and a partial, enlarged perspective view of the extension connection component, in accordance with an example embodiment.
Figure 9B:
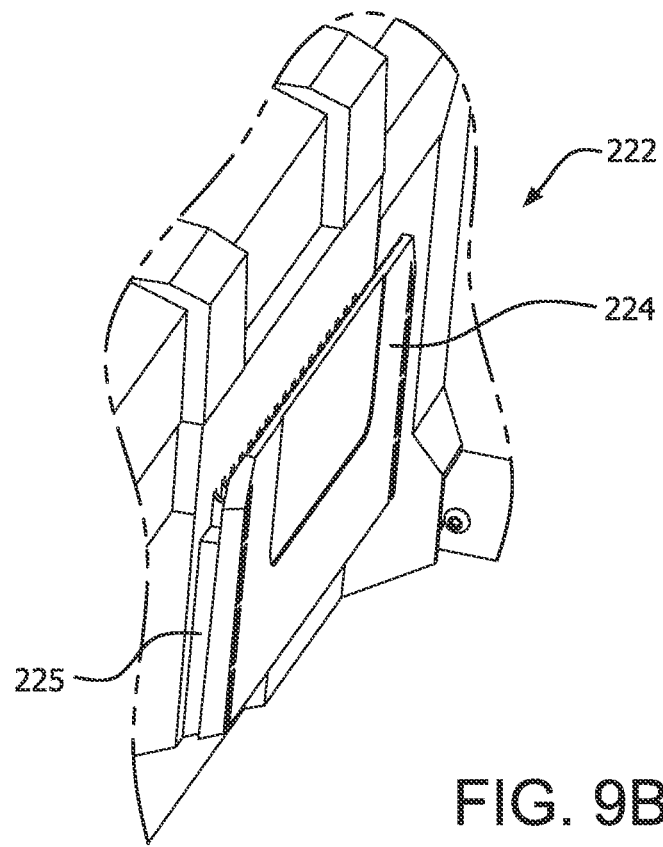
Figure 10A:
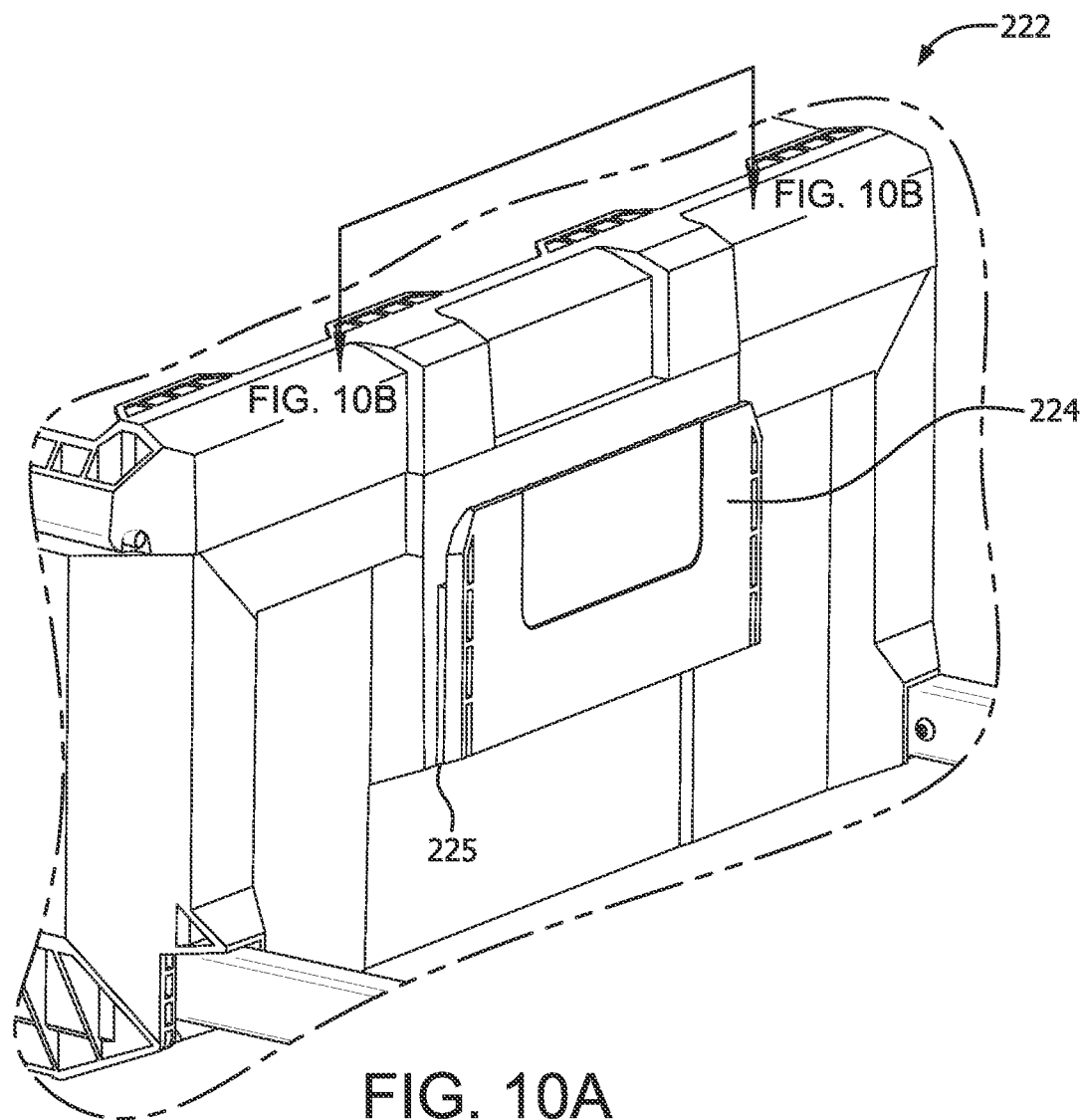
FIGS. 10A and 10B are, respectively, partial, enlarged perspective and top views of an extension connection component of a rolling base box in accordance with an example embodiment.
Figure 10B:
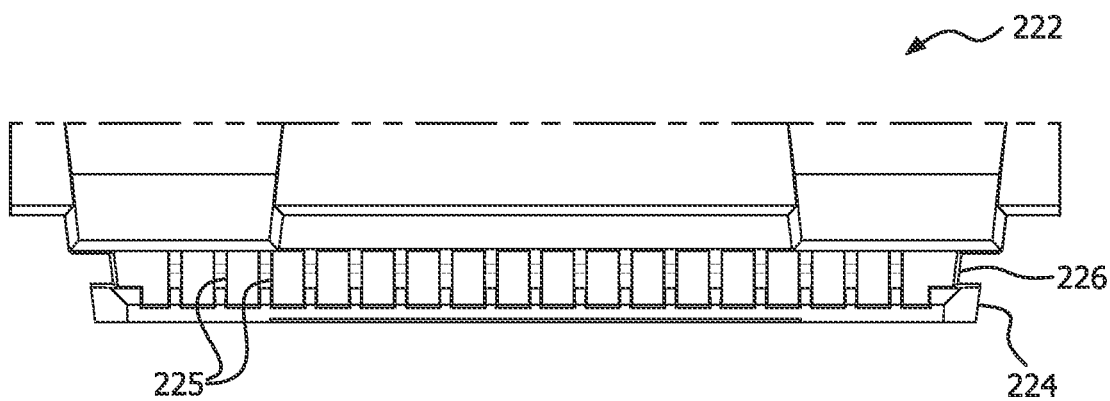
Figure 11:
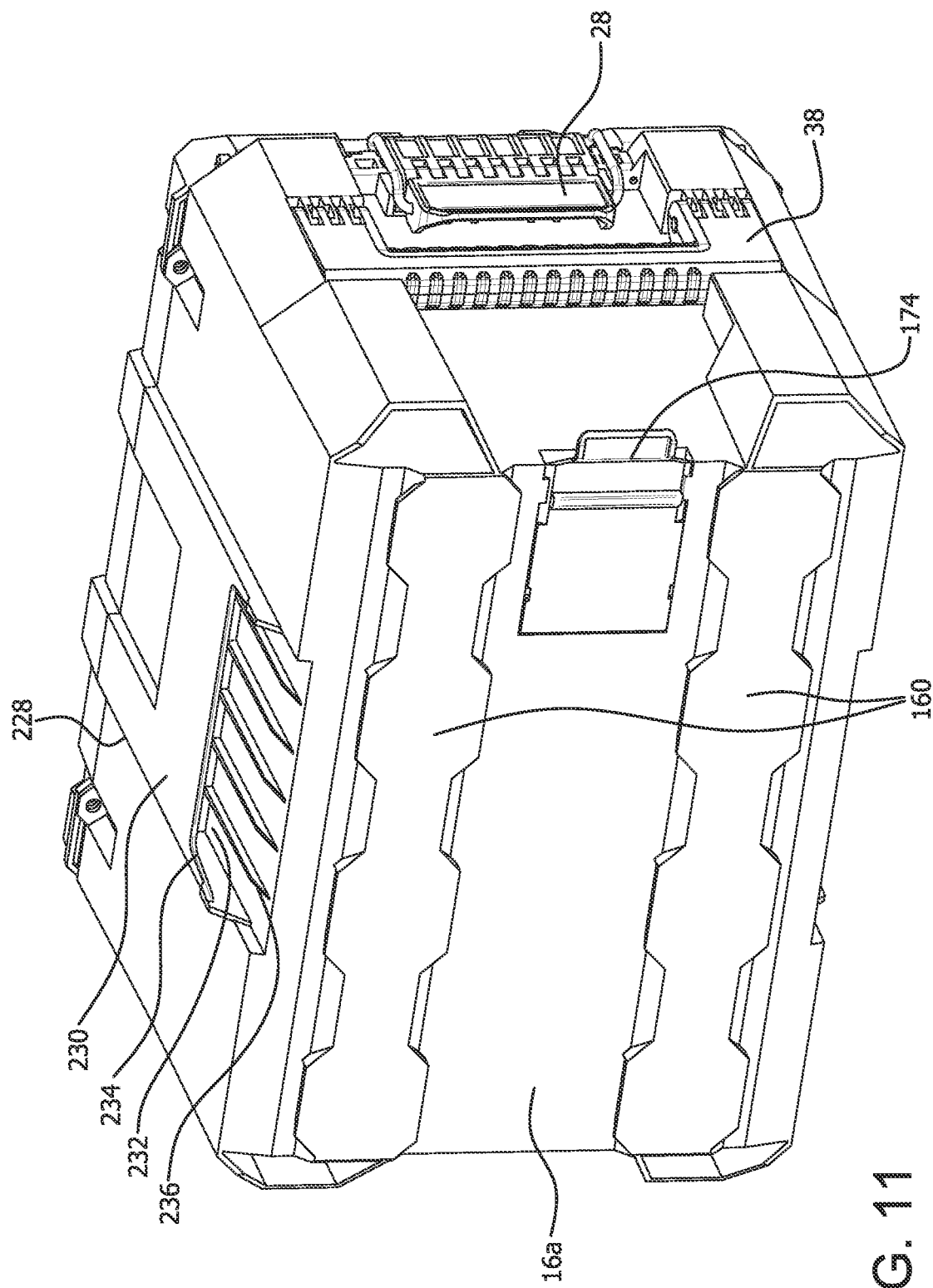
FIG. 11 is a bottom perspective view of an extension connection component on a portable storage box in accordance with an example embodiment.
Figure 12A:
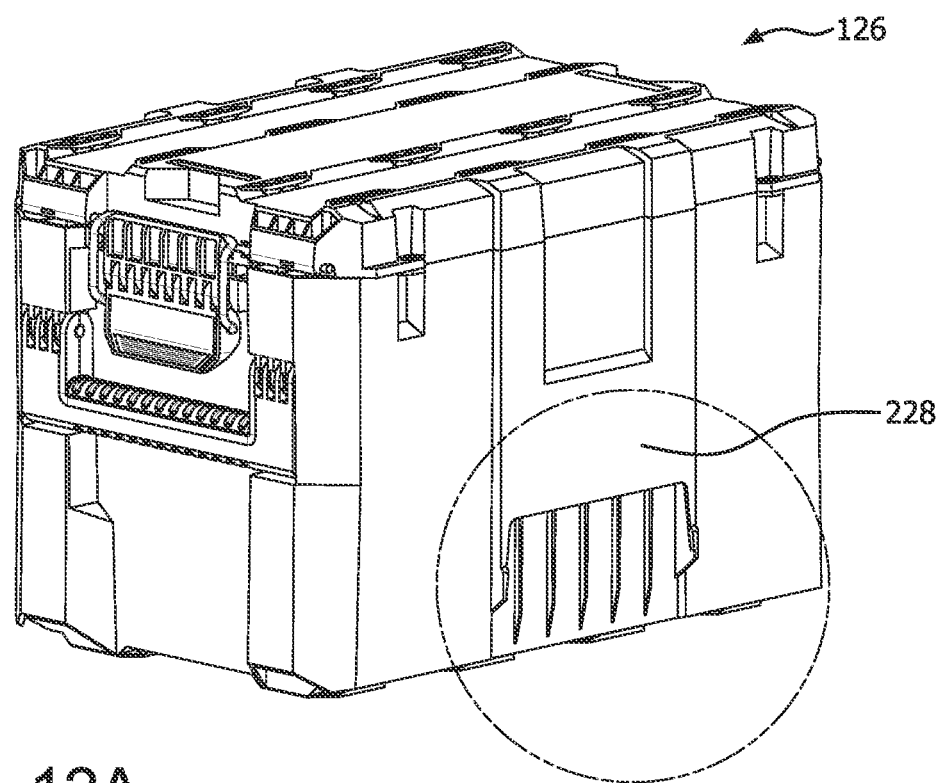
FIGS. 12A and 12B are, respectively, a perspective view of an extension connection component of a portable storage box and a partial, enlarged perspective view of the extension connection component, in accordance with an example embodiment.
Figure 12B:
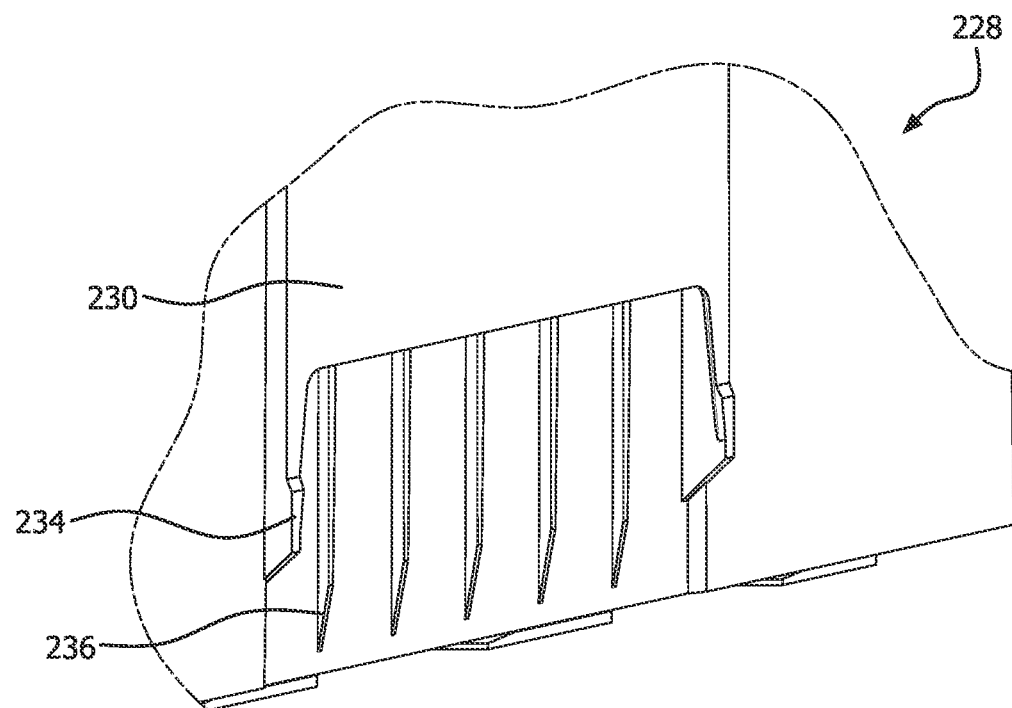
Figure 13A:
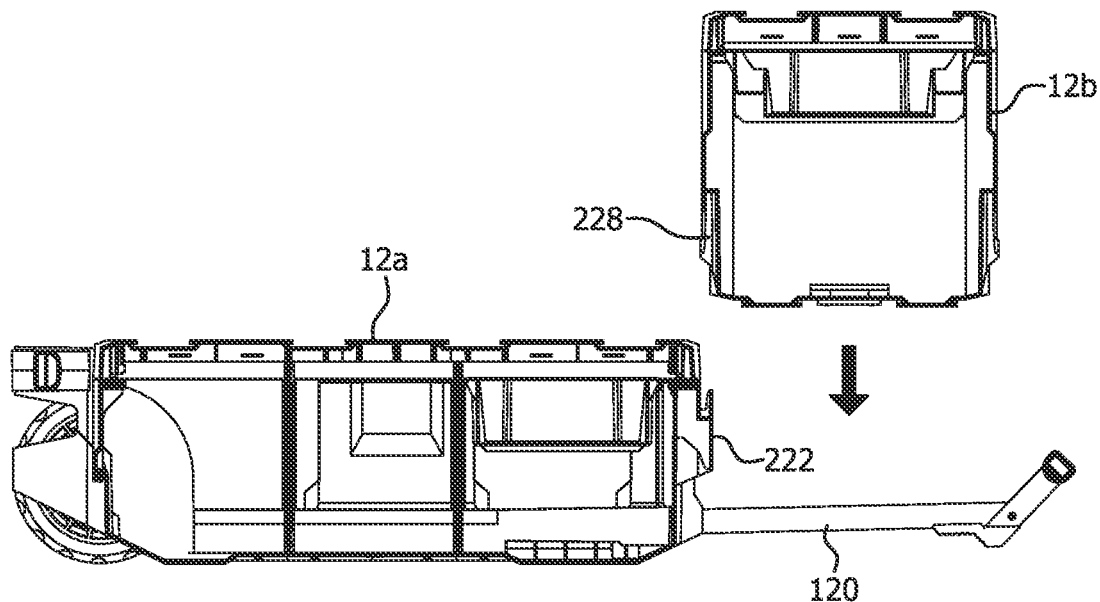
FIGS. 13A and 13B depict respective side views of placement of an extension connection component of a portable storage box onto an extension connection component of a rolling base box in accordance with an example embodiment.
Figure 13B:
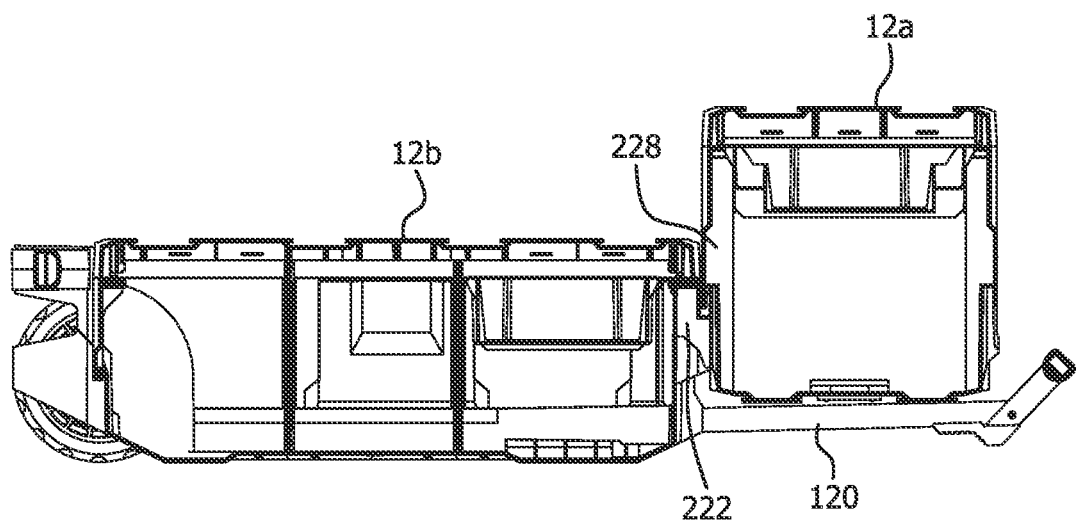
Figure 14A:
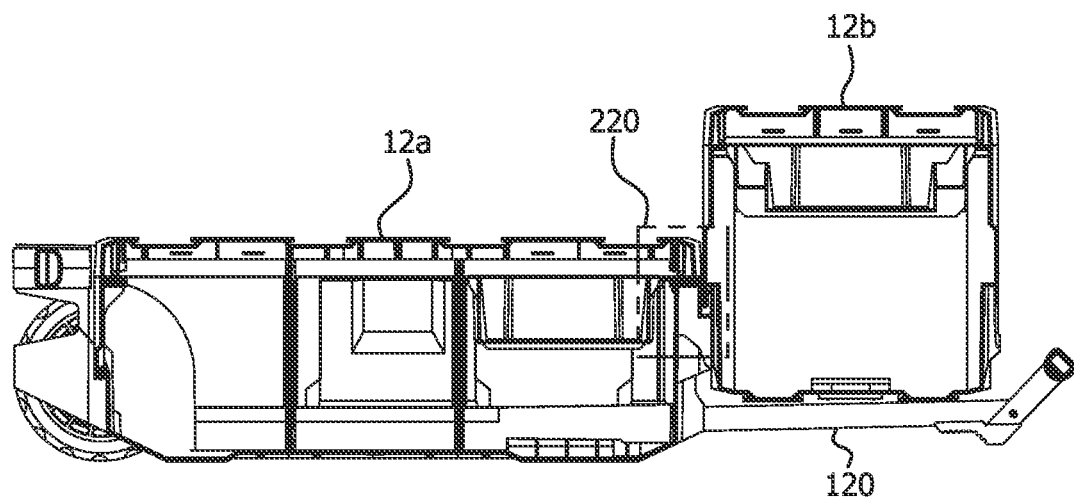
FIGS. 14A and 14B depict, respectively, a side view of the cooperation between respective extension connection components of a rolling base box and a portable storage box, and a partial, enlarged side view of the extension connection components, in accordance with an example embodiment.
Figure 14B:
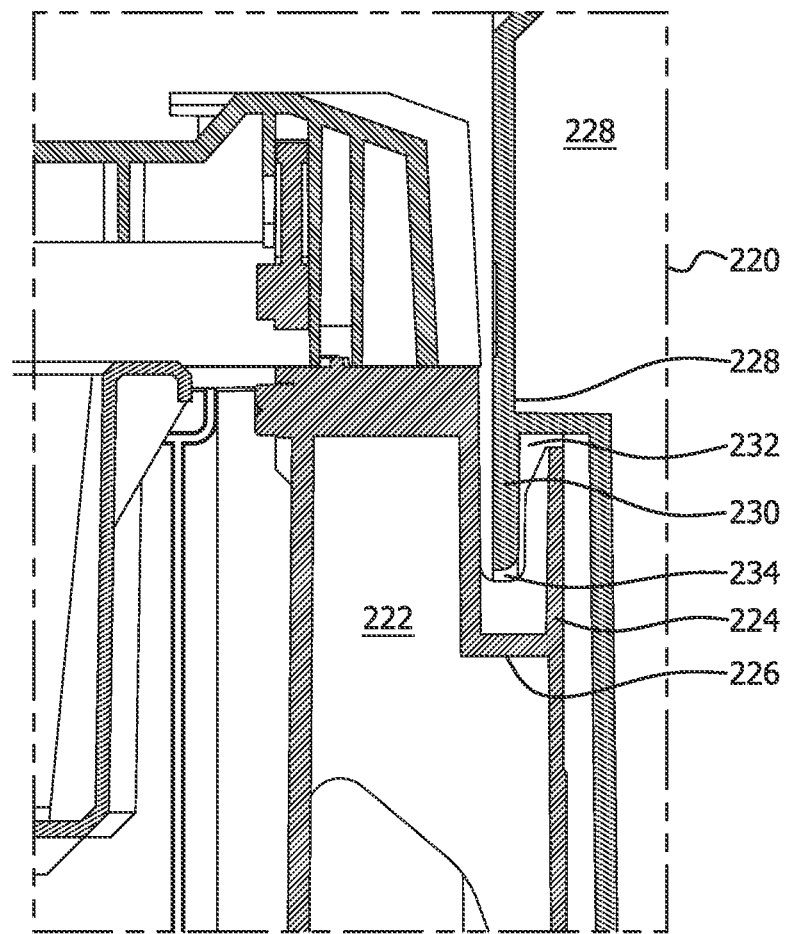
Figure 15A:
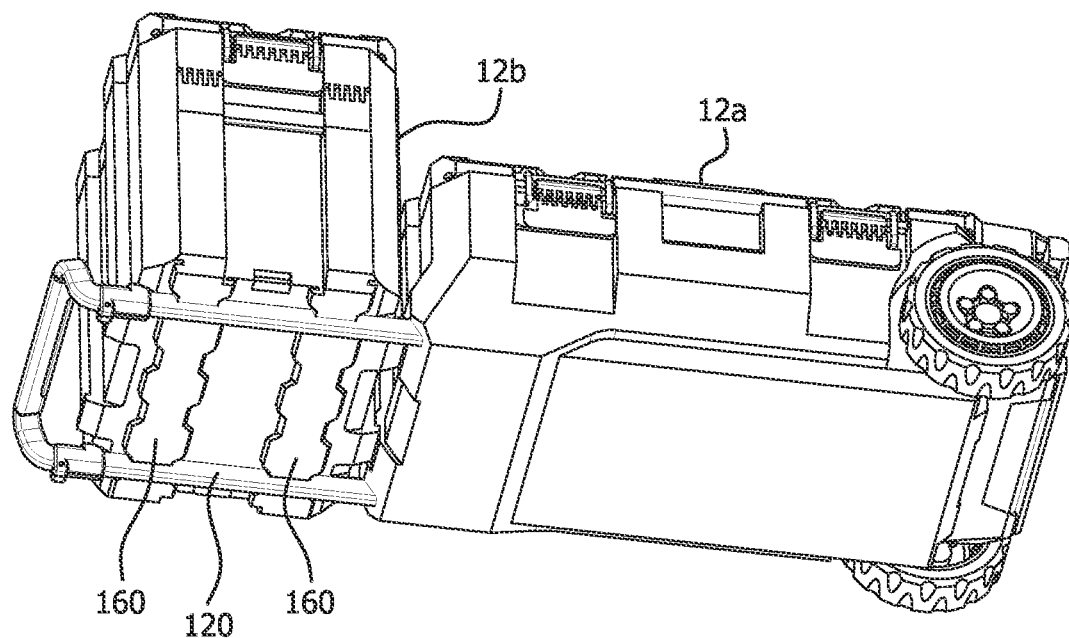
FIGS. 15A and 15B depict, respectively, a bottom perspective view of a portable storage box with cutouts on a rolling base box handle, and a bottom view of the portable storage box, in accordance with an example embodiment.
Figure 15B:
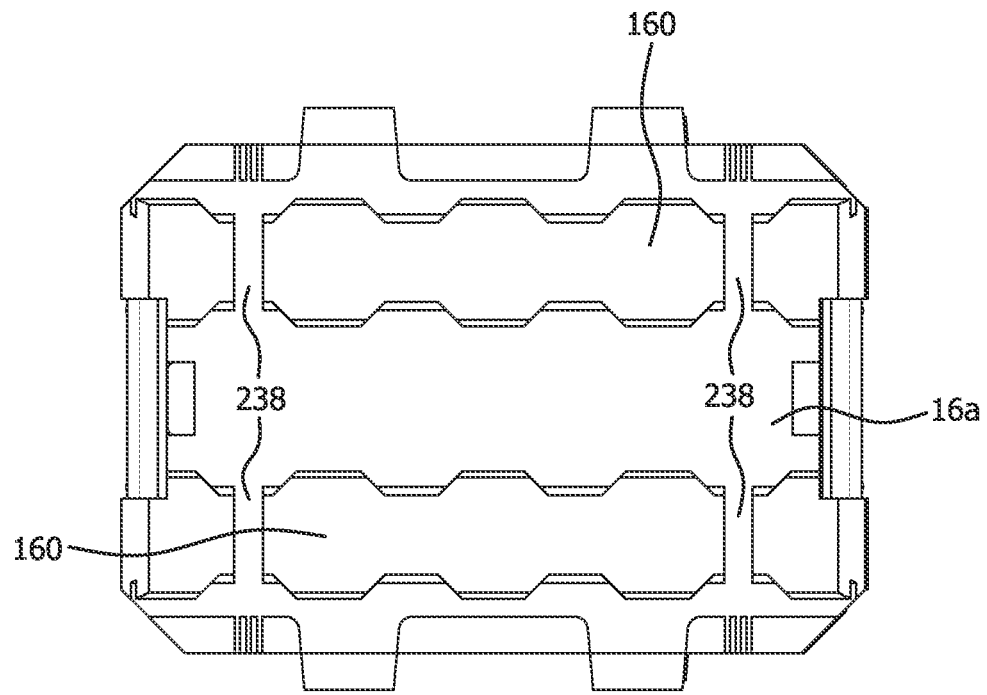
Figure 16A:
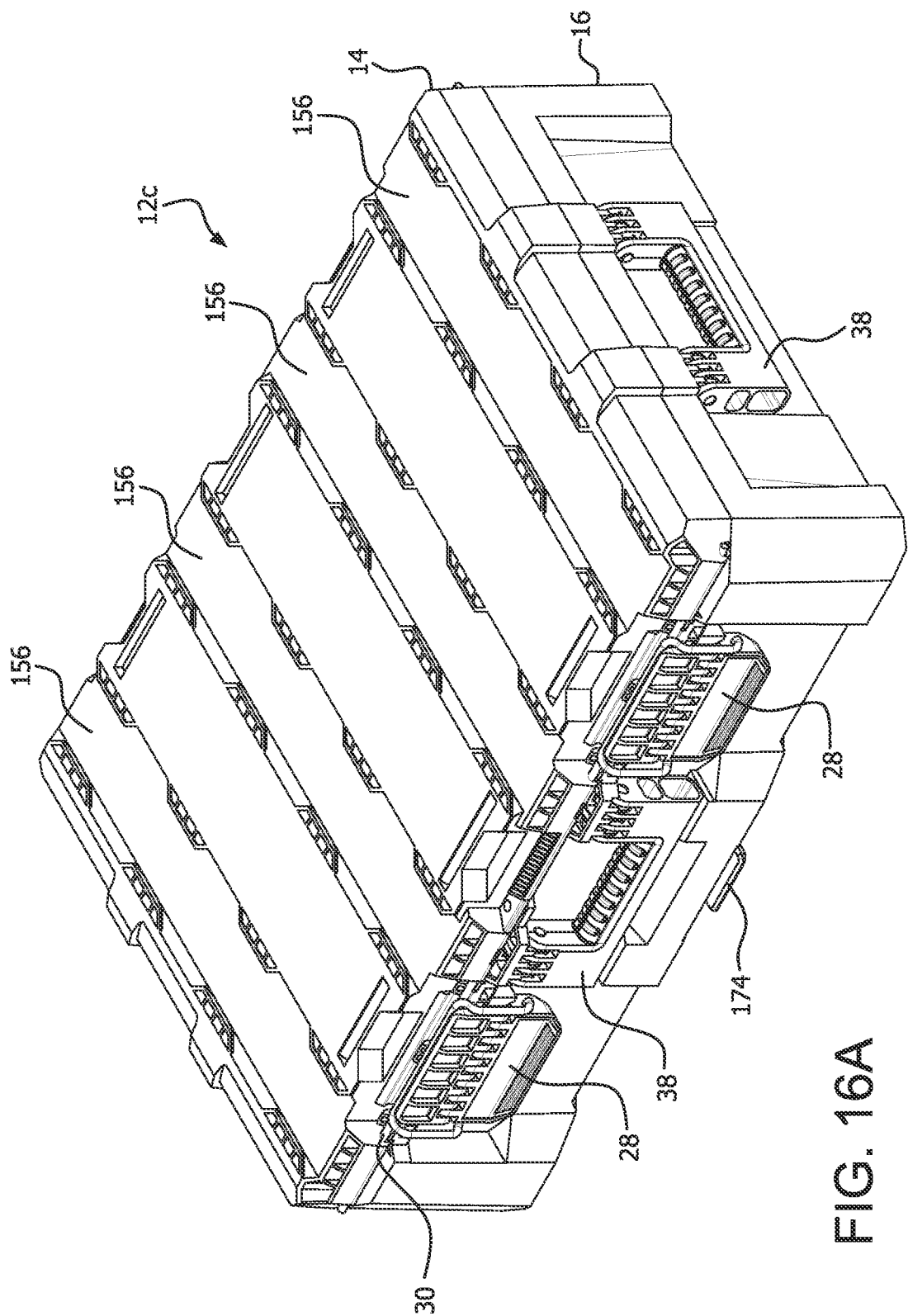
FIGS. 16A, 16B, 16C, 16D, 16E, 16F and 16G depict perspective, top, bottom, front, back, left and right views, respectively, of a large storage box in accordance with an example embodiment.
Figure 16B:
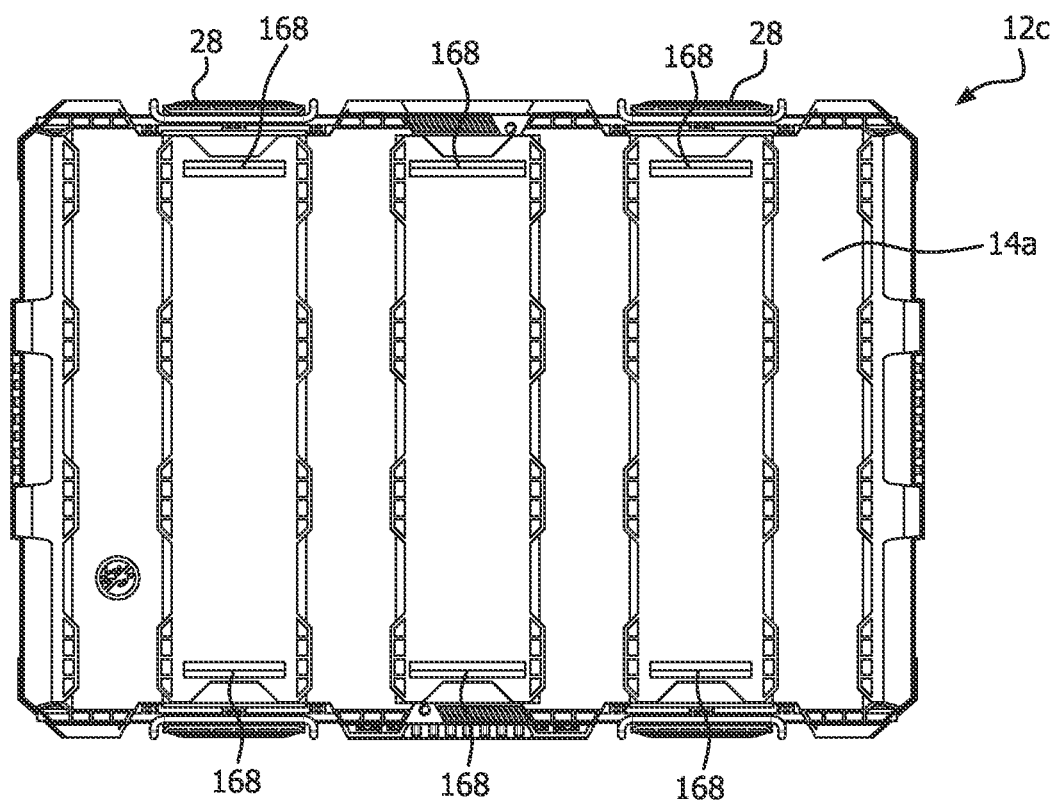
Figure 16C:
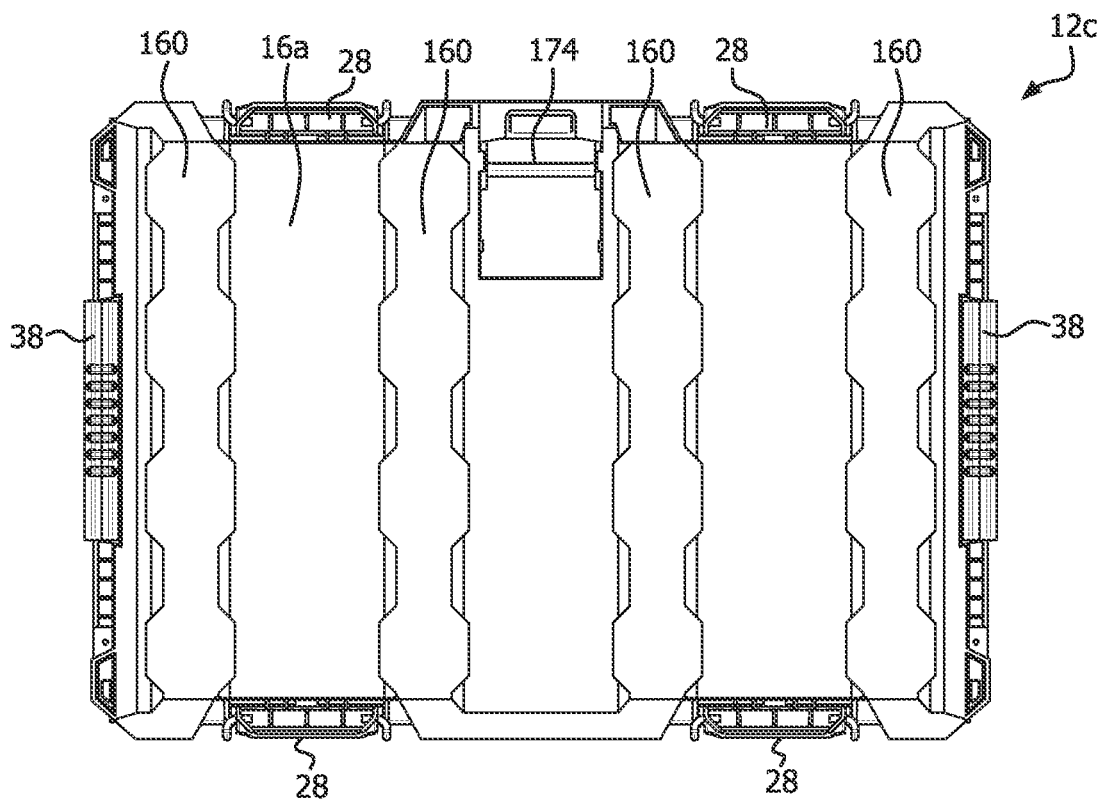
Figure 16D:
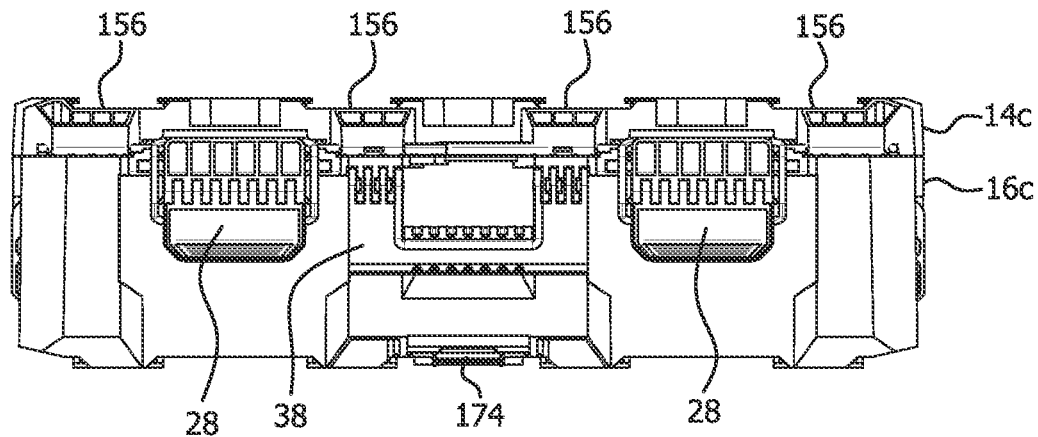
Figure 16E:
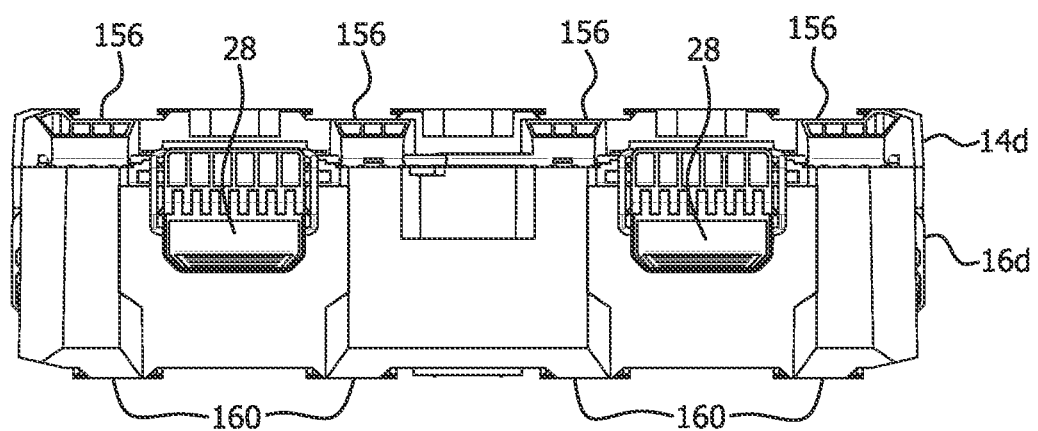
Figure 16F:
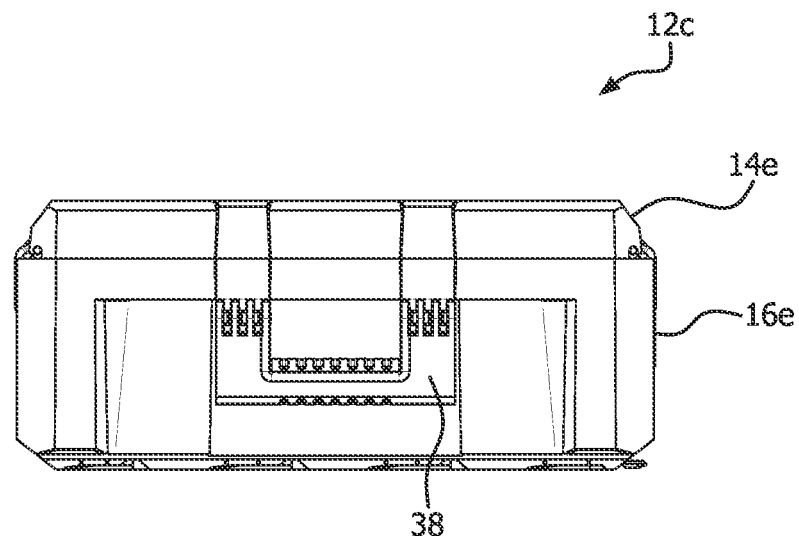
Figure 16G:
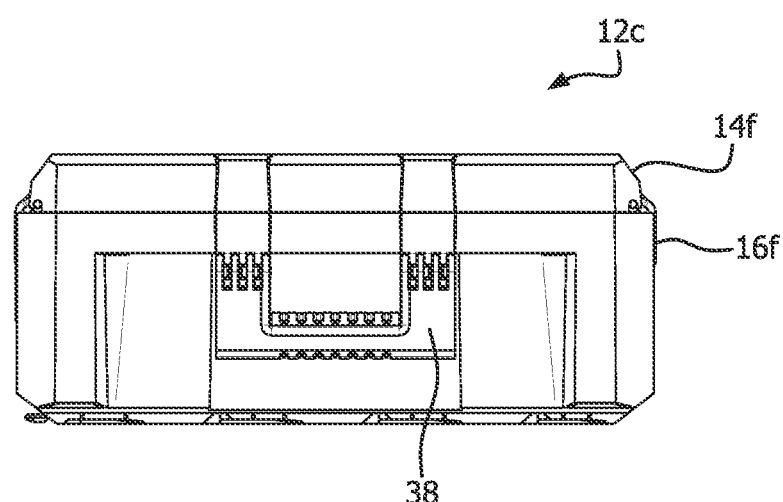

FIGS. 9A and 9B are, respectively, a perspective view of the extension connection component 222 on the rolling base box 12a and a partial, enlarged perspective view of the extension connection component 222 in FIG. 9A. FIGS. 10A and 10B are, respectively, partial, enlarged perspective and top views of the extension connection component 222 of the rolling base box 12a. FIG. 11 is a bottom perspective view of the extension connection component 228 on the portable storage box 12b. FIGS. 12A and 12B are, respectively, a perspective view of the extension connection component 228 on the portable storage box 12b and a partial, enlarged perspective view of the extension connection component 228 in FIG. 12A. FIGS. 13A and 13B depict respective side views of the placement of the extension connection component 228 of the portable storage box 12*b* onto the extension connection component 222 of the rolling base box 12*a*. FIGS. 14A and 14B depict, respectively, a side view of the engagement of the respective extension connection components 222 and 228 of the rolling base box 12*a* and the portable storage box 12*b*, and a partial, enlarged side view of the extension connection components 222 and 228 in FIG. 13A. FIGS. 15A and 15B depict a bottom perspective view of a portable storage box 12*b* engaged with a rolling base box 12*a* via the box extension connection system 10, and a bottom view of the portable storage box 12*b* in accordance with another example embodiment. As shown in FIG. 15B, the guides 160 on the bottom surface 16*a* of a portable storage box 12*b* can be configured with two transverse cutouts 238 that are spaced apart a distance and having a cutout width dimensioned to receive the retractable handle legs 122*a*, 122*b* for additional stability for the portable storage box 12*b* when placed on the extended retractable handle 120.

As an example, the extension connection component 222 provided on the side wall 16*e* of the rolling base box 12*a* can be an insert member, and the extension connection component 228 provided on one or more of the side walls (e.g., 16*e*, 160) of the portable storage box 12*b* can be a sleeve configured to receive the insert member when the portable storage box 12*b* is placed adjacent to the rolling base box 12*a* and on its handle 120 in an extended position. The insert member 222 can comprise a planar portion 224 molded or otherwise formed on a free end of a neck portion 225, and an opposite end of the neck portion can be molded or otherwise formed integrally with the side wall 16*e* of the rolling base unit 12*a*. The sleeve 228 formed on a side wall of the portable storage box 12*b* comprises an outer wall 230 that defines a cavity 232 between the outer wall 230 and a side wall 16*e*,16*f*. The sleeve 222 has an opening 234 to receive a top edge of the planar portion 224 of the insert member 222 into the cavity 232.

With reference to the enlarged, partial, cross-section view of the insert member engaging with the sleeve is provided in FIG. 14B, the depth of the cavity 232 is at least the distance between the outer edge of the planar portion 224 and the neck portion 226. The width of the insert member 222 and the sleeve 228 can vary with respect to the width of the boxes 12*a* and 12*b* but can correspond to a recess between thicker areas of the side walls described below to accommodate a handle and/or latch. The opening of the sleeve 234 and the neck portion 226 of the insert member are provided at respective distances from the bottom surfaces of the boxes 12*a* and 12*b* such that the box 12*b* can rest on the extended retractable handle 120 of box 12*a* when the sleeve 228 is placed on the insert member 222 and the planar portion 224 is received in the cavity 232. The side wall 16*e*, 16*f* can be provided with ribs 236 in the cavity 232 to provide structural reinforcement to the side wall of the box 12*b*.

The extension connection components 222 and 228 of the rolling base box 12*a* and the portable storage box 12*b* can have different shapes than shown in the drawing figures of the present disclosure. For example, an insert member 222 can have a U-shaped planar piece 224 with two legs of the planar piece extending toward the top portion 14 of the box 12*a* and that cooperates with a sleeve 228 having a correspondingly shaped cavity 232 to receive the two legs of the insert member 222. In accordance with other example embodiments, the extension connection component 228 can be provided on the sides of other types of boxes and containers besides the portable storage box 12*b* such as on the side of a crate (e.g., FIG. 105), a bucket, a cord holder, a soft storage bag, and so on to accommodate one of these other types of boxes and containers on rolling base box 12*a* and its extended handle 120.

Large Storage Box 12*c*

FIGS. 16A through 17D show respective views of a large storage box 12*c* constructed in accordance with an example embodiment of the present disclosure. FIGS. 16A through 16G depict perspective, top, bottom, front, back, left and right views, respectively, of an example large storage box 12*c*. FIGS. 17A through 17D show various views of a large storage box 12*c* constructed in accordance with an example embodiment of the present disclosure to have a dual hinge latch function.

The large storage box 12*c* has a top portion 14 (e.g., a lid 14) and a bottom portion 16 that define an internal storage compartment 18. The large storage box 12*c* can be provided with two large latches 28 on both of its front and back walls 16*c*, 16*d* to pivotably open the box lid or top portion 14 on one side 13*c* of the box 12*c* or the other side 13*d*, or to remove the lid 14 from the box 12*c* altogether, for advantageous dual sided latch hinge operation of the top portion 14 on the box 12*a*, as illustrated in FIGS. 17A through 17D. A pivotable handle 38 can also be provided on each of the left and right side walls 16*e*, 16*f* to increase user convenience of picking up and carrying the large storage box. A pivotable handle 38 is also shown provided on the front wall 16*c* and can also be provided on the back wall 16*d*. The latches 28 and the handles 38 are described below in connection with FIGS. 21A-21G and FIGS. 23A-23G, respectively. The top portion 14 has components 156 on its top exterior surface 14*a* for a box-to-box connection system 150 described below in connection with FIGS. 24A through 29C, and components on its front and back walls 14*c*, 14*d* to engage the latch(es) 28 as described below in connection with FIGS. 17A through 17D. The bottom portion 16 also has components 160 on its bottom exterior surface 16*a* for the box-to-box connection system 150. For example, the large storage box 12*c* has a connection system comprising channels 156 on it top exterior surface 14*a* that interact with guides 160 on the bottom exterior surfaces 16*a* of other boxes 12 stacked on the top of the box 12*c*, and guides 160 on its bottom exterior surface 16*a* that can interface with channels 156 on the top exterior surfaces 14*a* of boxes 12 on which the large storage box 12*c* is stacked.

FIGS. 21A through 21G depict perspective, front, back, top, bottom, left and right views, respectively, of a larger version of an example large latch 28 than is shown in FIGS. 23A through 23G. The large latch 28 shown in FIGS. 21A through 21G comprises components to securely mount the large latch 28 to a side wall 16 *c*,*d* of the box 12*c* shown in FIGS. 16A through 17D. It is to be understood that the large latch 28 shown on the box 12*d* depicted in FIGS. 18A through 18G, and on the box 12*e* depicted in FIGS. 19A through 19G, is configured and operates in same manner as that of the latches 28 and the box 12*c* described with reference to FIGS. 17A through 17D and FIGS. 21A through 21G.

Figure 35A:
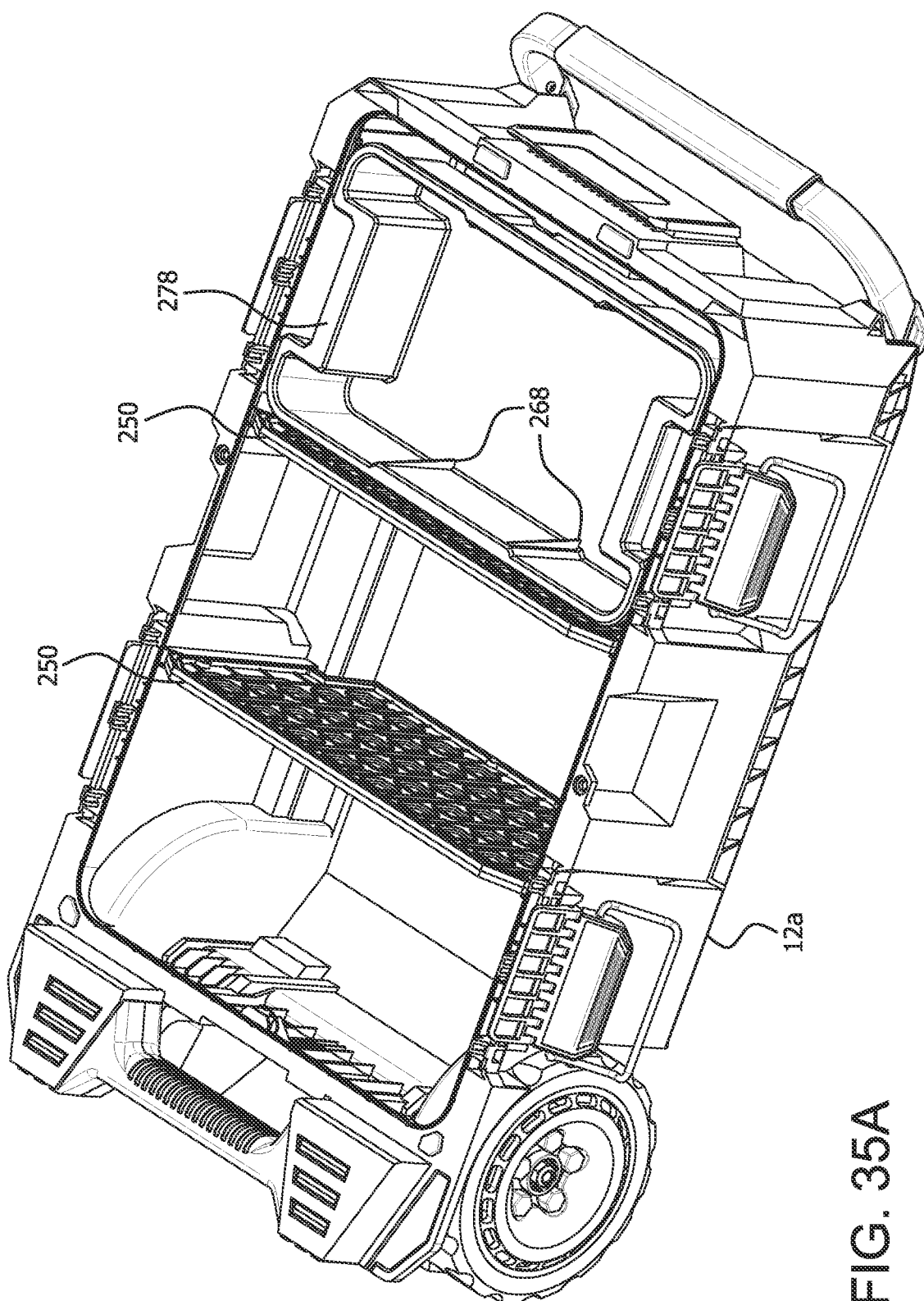
FIGS. 35A and 35B are perspective views of the tray of FIGS. 34A and 34B inserted into and removed from the rolling base box, respectively.
Figure 35B:
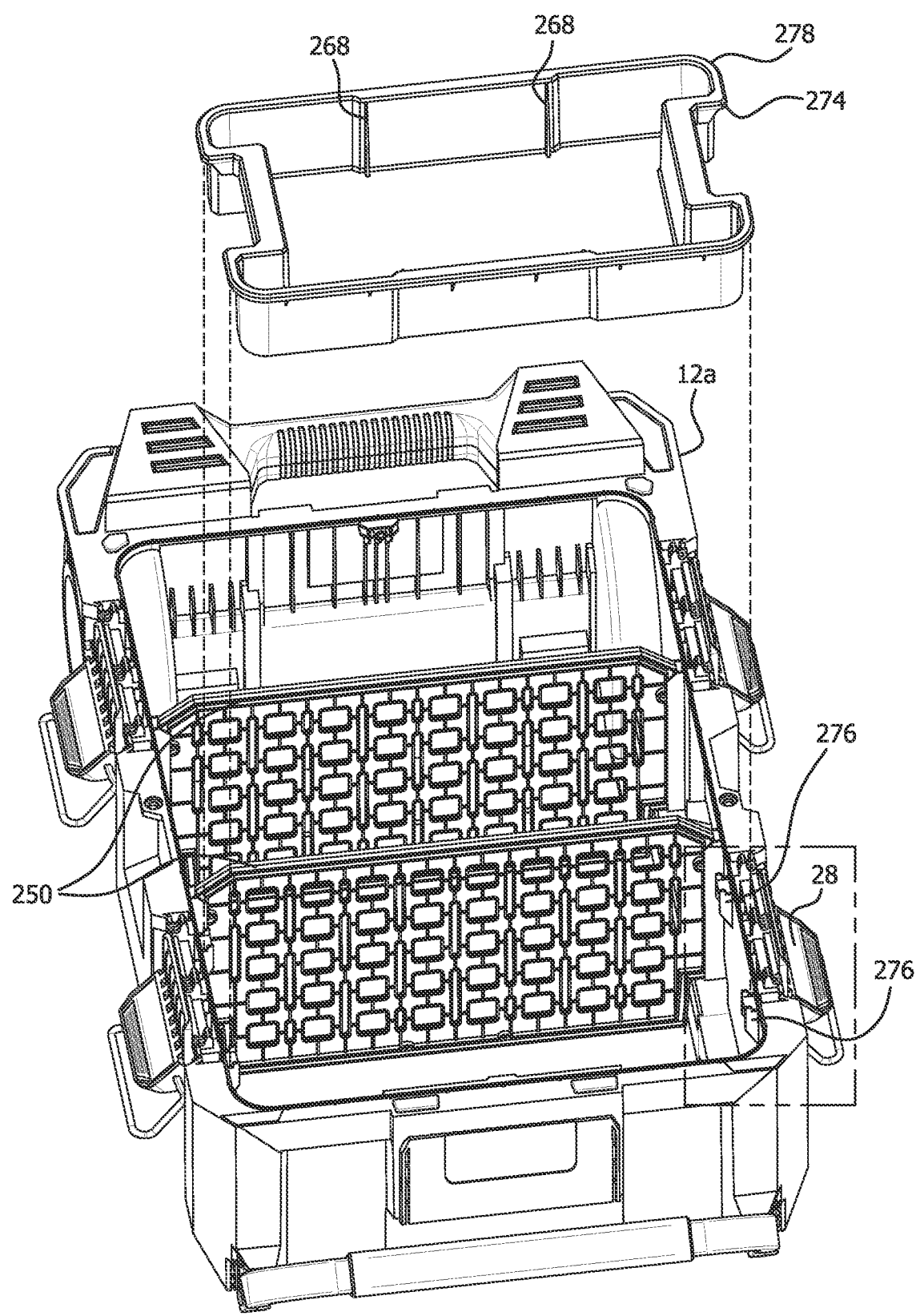
Figure 35C:
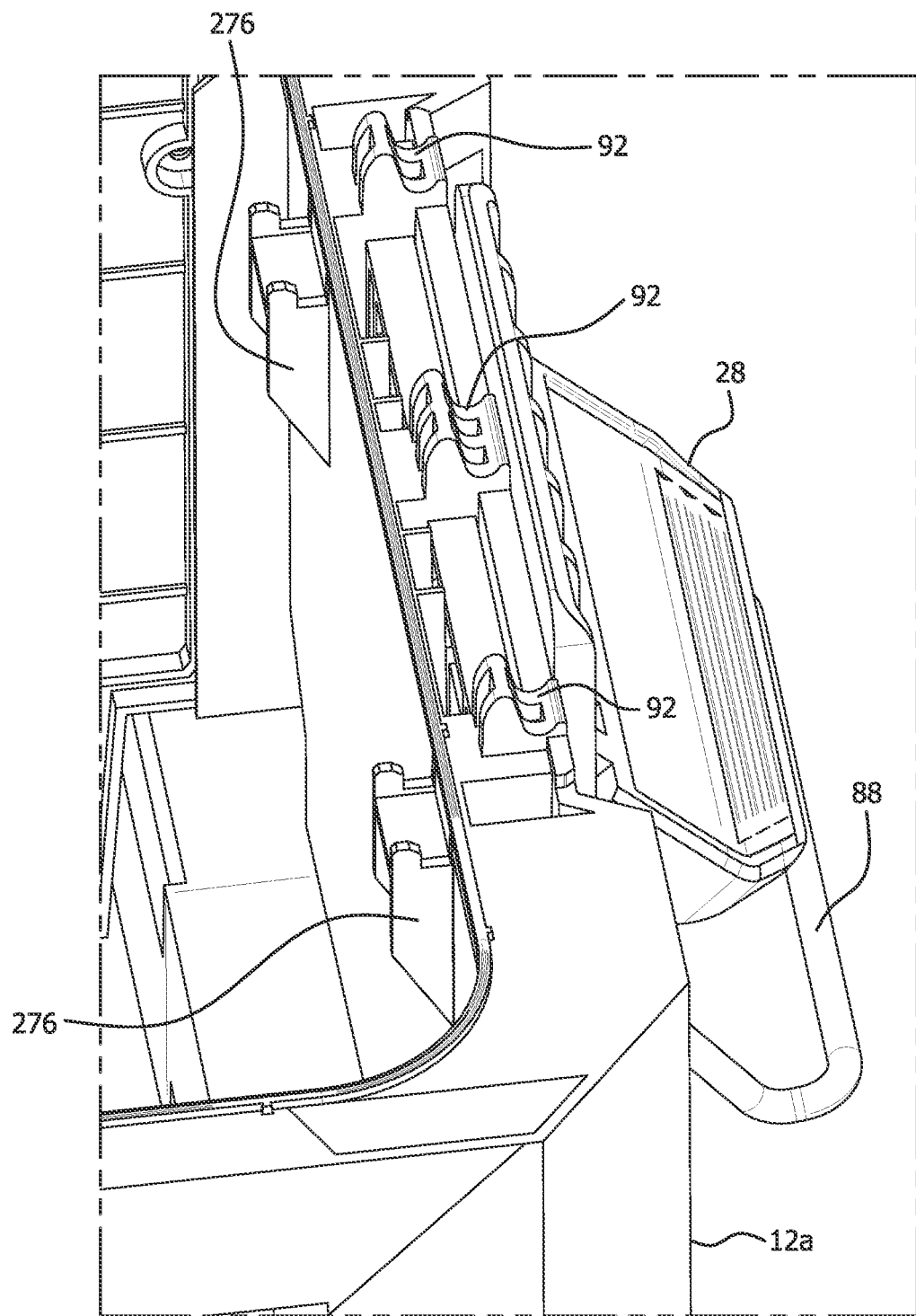
FIG. 35C is a partial enlarged perspective view of interior supports for the tray in the rolling base box, in accordance with an example embodiment.

In accordance with an example embodiment, the latch 28 has a mounting piece that is secured to a side wall of a bottom portion 16 of the box. The mounting piece 70 has a latch lip member 72 that is set apart from mounting piece 70 to create space for a clamp bar 88, and a pivotable clamping piece 80. The latch lip member 72 comprises a bar lip 74 that abuts the clamp bar 88 when the latch is in a locked position, and hinge members (e.g., hinge knuckles) 76 with apertures to receive a pin 80. The pivotable clamping piece 80 is configured to be pivotable relative to box 12 and the mounting piece 70, and is dimensioned to retain the clamp bar 88 behind the bar lip 74 when in a locked position and to allow the clamp bar 88 to clear the bar lip 74 when in an unlocked position and pivoted relative to the latch lip member 72. As shown in FIG. 35C, the rim of the bottom portion 16 of the box 12 can be provided with one or more bar support members 92 to pivotably receive the clamp bar 88 when in a locked position to facilitate the hinge operation of the lid 14 when latch 28 is in the locked position. The pivotable clamping piece 80 comprises hinge members (e.g., hinge knuckles) 82 with apertures that interleave with the hinge members (e.g., hinge knuckles) 72 to receive the pin 78 for the pivotal movement of the clamping piece 80 relative to the mounting piece 70 with latch lip member 72 and the box 12. The pivotable clamping piece 80 further comprises a finger member 84 that is manually moved by a user. The finger member 84 has a lip 85 at the free end thereof that is angled away from the side wall of the box 12 to accommodate one or more of the user's fingers for easy and ergonomic operation of the latch 12 to move the latch in and out of locked and unlocked positons.

As shown, for example, in FIGS. 17A through 17D, the top portion or lid 14 of the box 12c has a latch bar 30 that cooperates with a latch 28 to lock and create a latch hinge operation for the lid 14 relative to the bottom portion 16 of the box. For example, the arrangement of the clamp bar 88 relative to the mounting piece 70 on the side wall of the box can rotatably engage the latch bar 30 when the latch 28 is in a locked position to create a pivot point about the latch bar 30 for the lid 14. In accordance with an alternative example embodiment, the top portion 14 can have a groove that rotatably receives the clamp bar 88 of the latch 28 to create the pivot point for the lid 14 when the latch 28 is in a locked position.

In accordance with an example embodiment, the side walls 16c, 16d, 16e and 16f of the box 12 can be molded or otherwise formed to have thicker portions 32 of the side walls relative to other portions of the side walls to create side wall recesses 34. Where thicker portions 32 of side walls are at an adjoining corner 36, the thickness of the corner 36 and edges formed by a proximal recess 34 creates a pinch grip corner 36 for an advantageous corner clamp accessory described below in connection with FIGS. 69 through 75B. Another advantage of the thicker portions 32 and recesses 34 in the sides walls of a box 16c, 16d, 16e and 16f are that a latch 28 and a handle 38 can be mounted to the bottom portion 16 of a box 12 and within a recess 34 to maintain the latch 28 and a handle 38 within the perimeter boundary or footprint of the box 12 when the latch 28 is in a locked position and the handle 38 is in a resting position against the side wall of the box. Similarly, the latch bar 30 or recess in the top portion 14 that engages the clamp bar 88 can be disposed in a recess of inset area on the top portion 10. Configuring external features of a box 12 to be within the perimeter boundary or footprint of the box 12 is advantageous to facilitate stacking or use or storage of boxes 12 side by side because their external walls 13a through 13f have a more level surface, as well as to provide the boxes 12 and the system 10 with an aesthetically pleasing appearance. Also, placing the handles 38 and latches 28 in recesses 34 of a box side wall can protect them against impacts because the thicker areas 32 can absorb the impact. Arranging box handles 38 to be on side walls 13c-13f of a box 12 (e.g., as opposed on a top surface 13a) is also advantageous for carrying, stacking and unstacking boxes 12.

The example embodiment of the latch 28 described with reference to FIGS. 21A through 21G and FIGS. FIGS. 17A through 17D is also advantageous because the latch 28 secures the top portion 14 to the bottom portion 16 of the box 12 independently of the means for interconnecting two boxes (e.g., the box-to-box connection system 150), and can release the top portion 14 from the bottom portion 16 of a box 12 to allow access to its storage compartment 18 even when another box is interconnected on top of it in a stacked configuration.

Figure 17A:
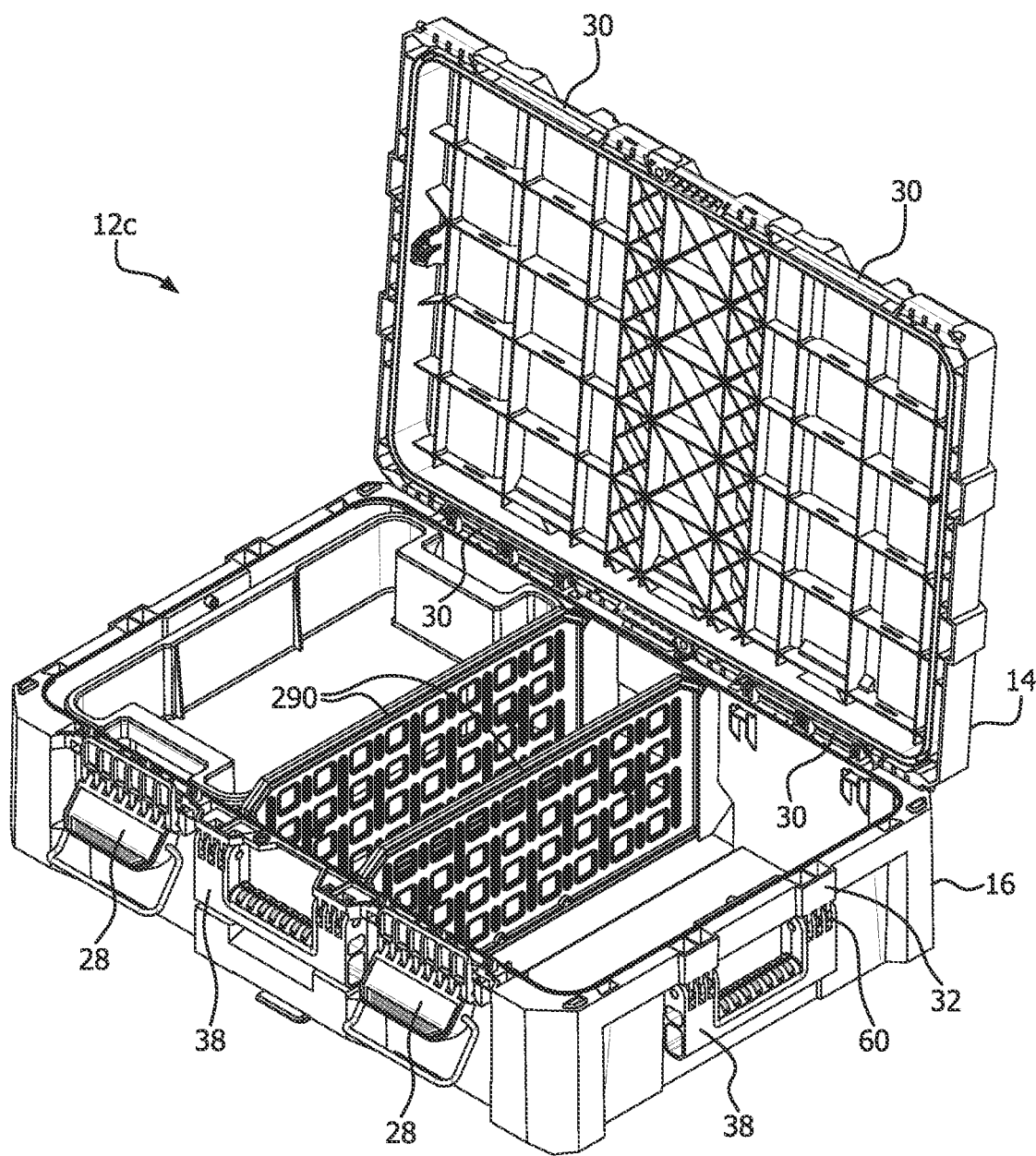
Figure 17B:
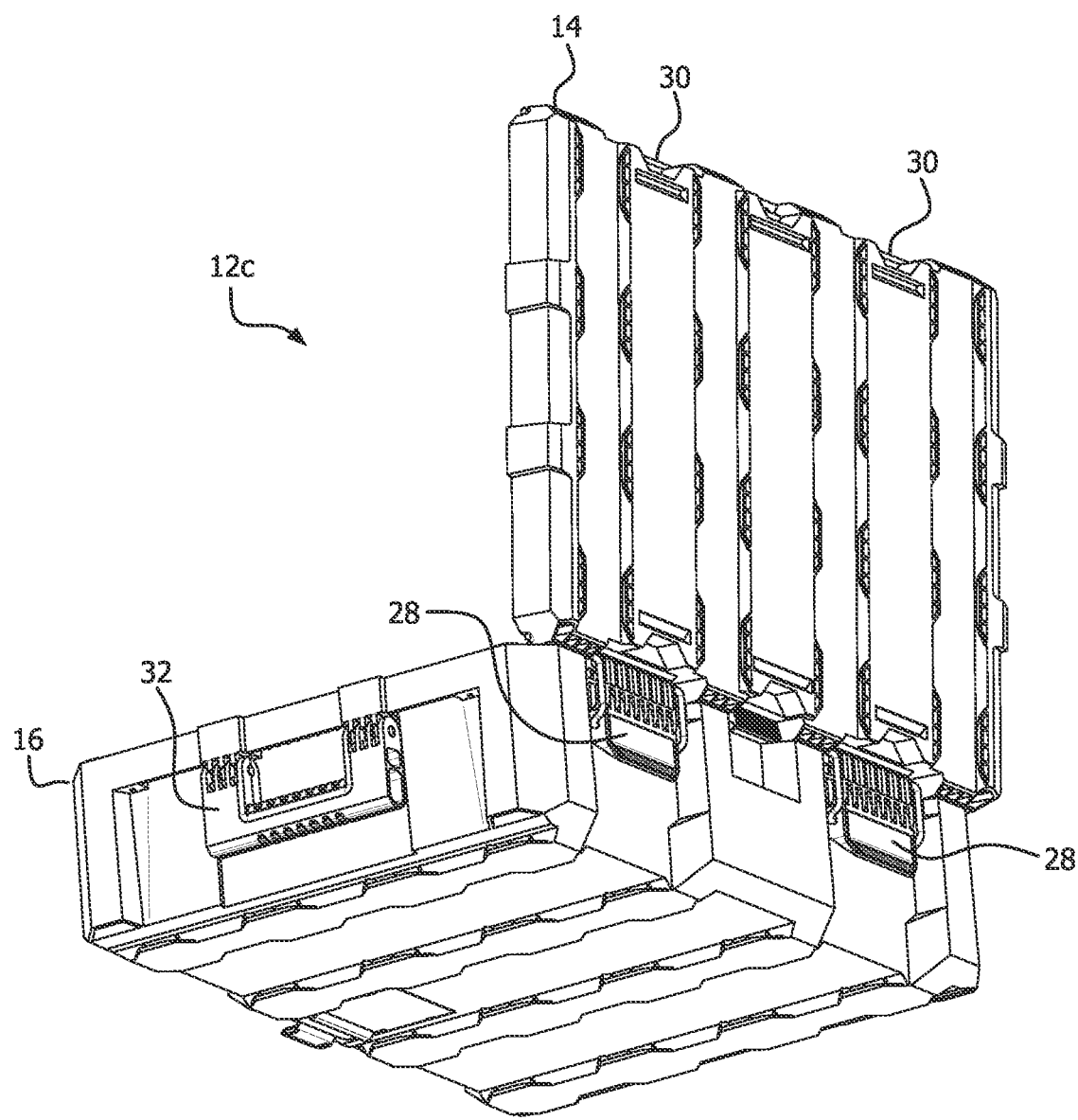
Figure 17C:
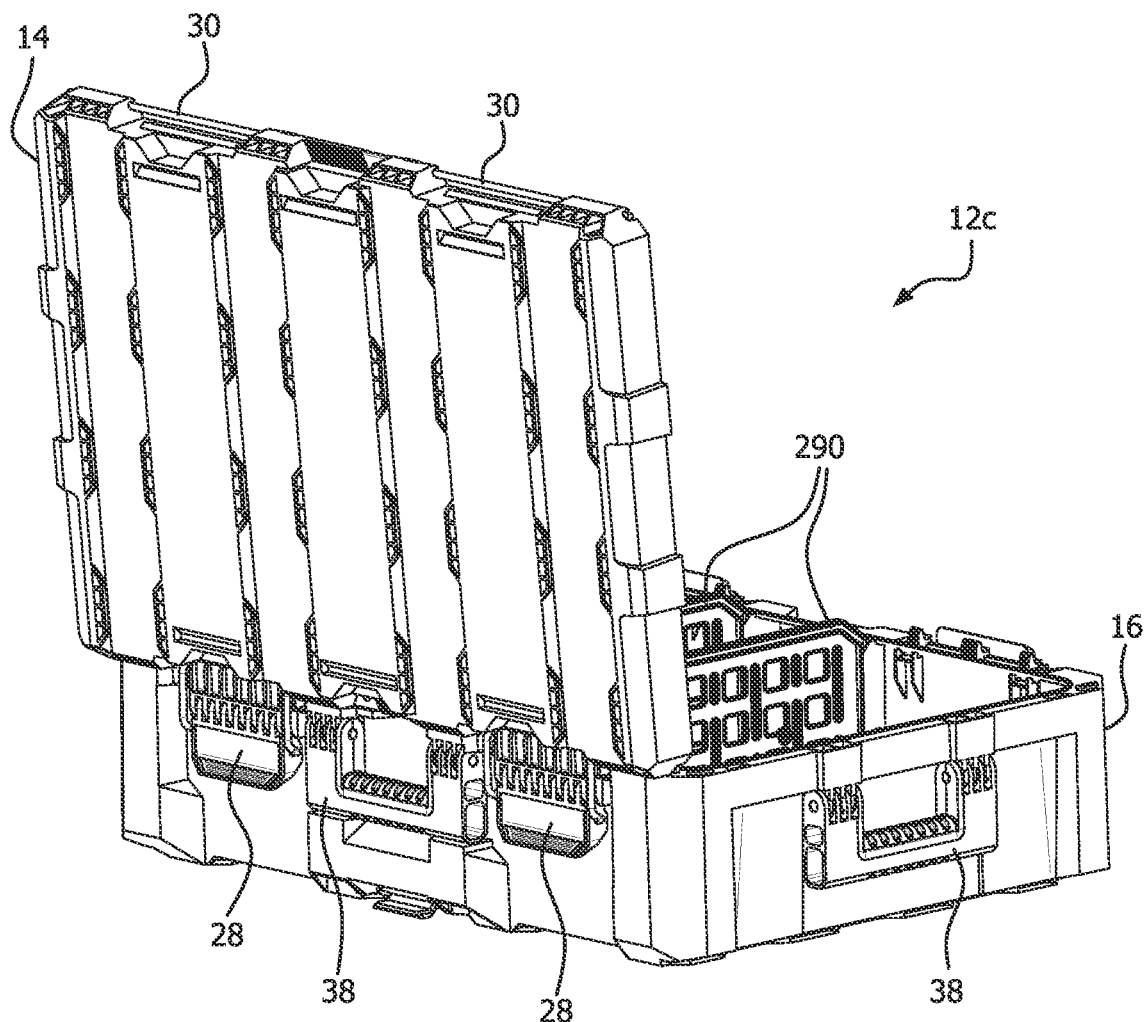
Figure 17D:
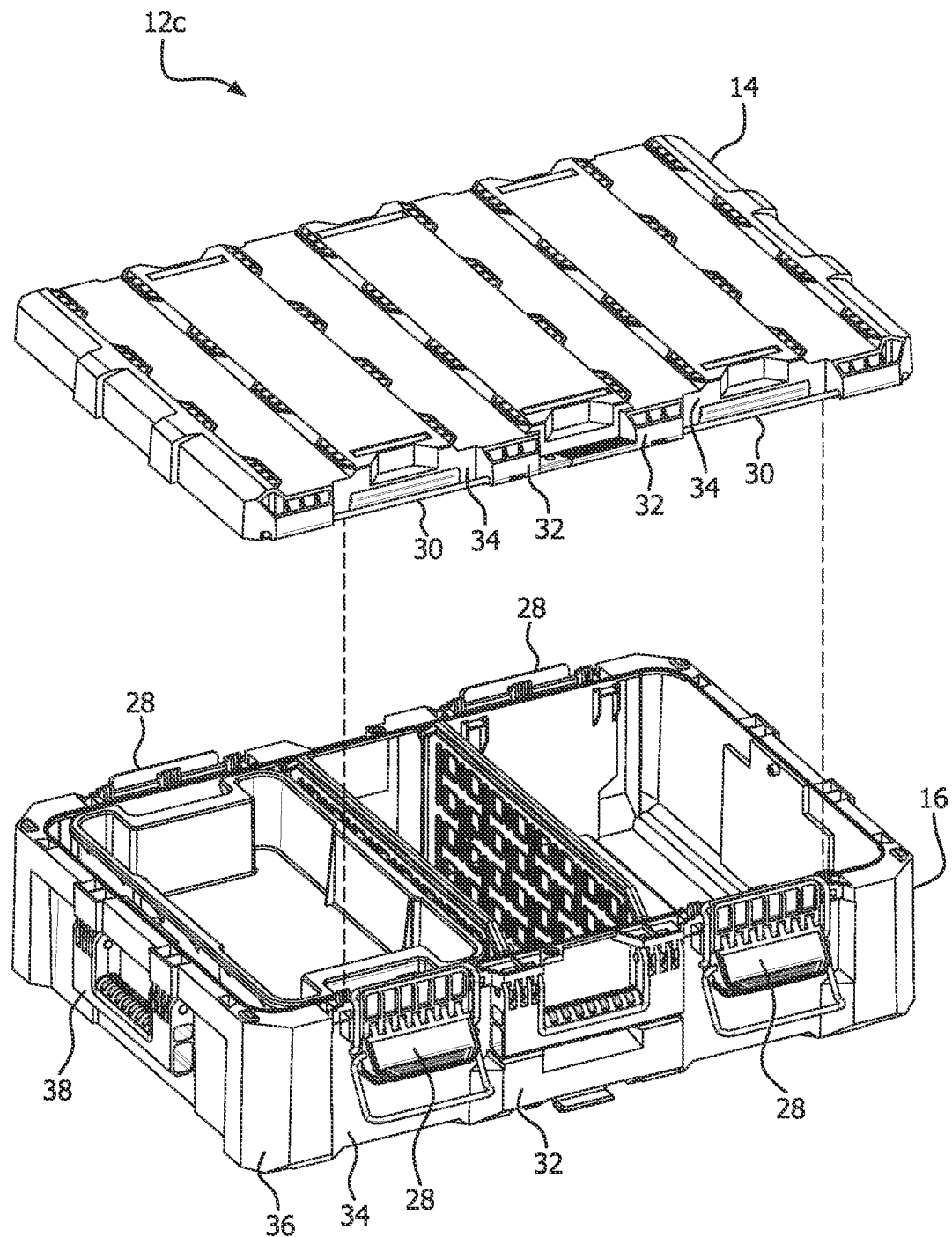
Figure 18A:
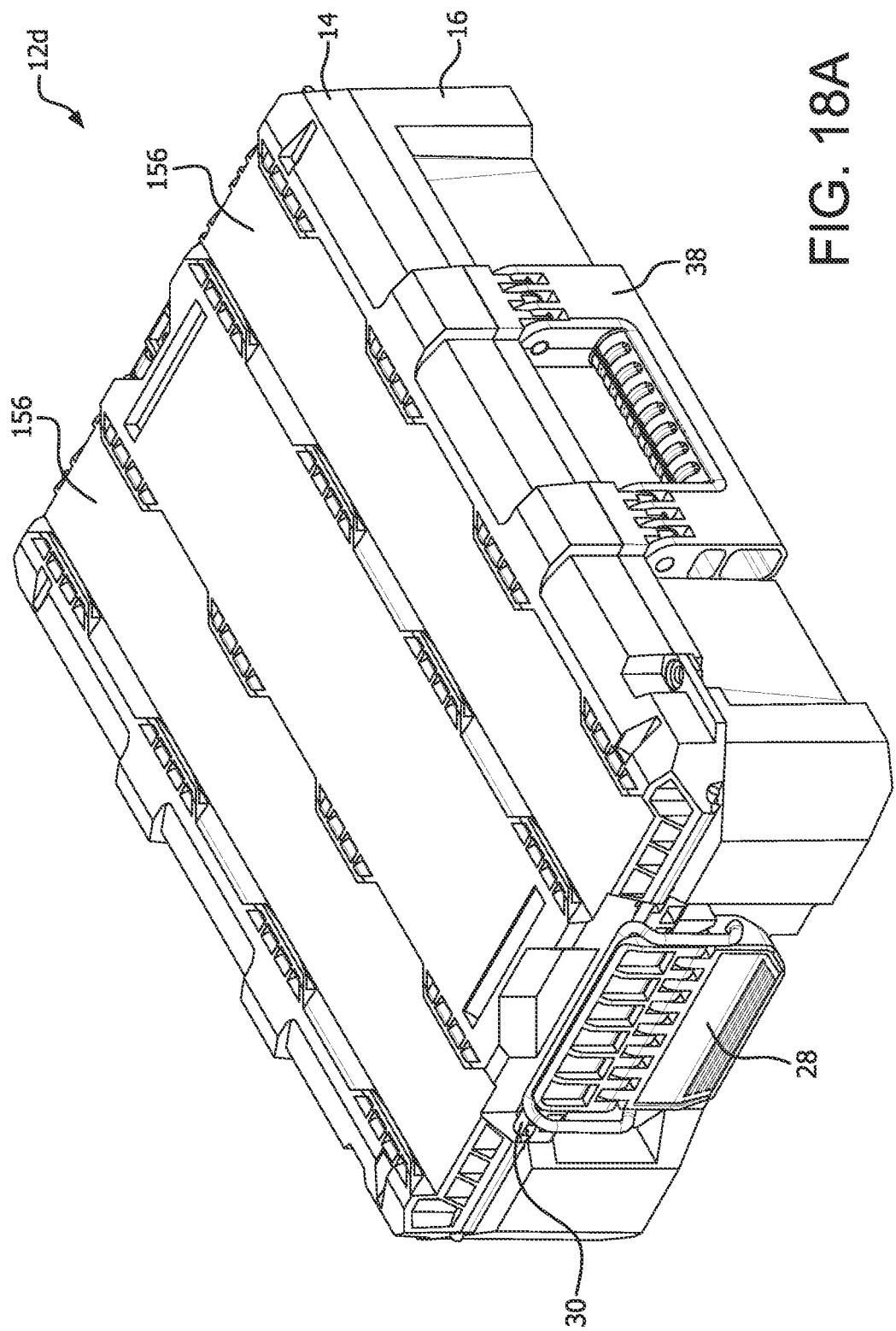
FIGS. 18A, 18B, 18C, 18D, 18E, 18F and 18G depict perspective, top, bottom, left, right, back and front views, respectively, of a medium storage box in accordance with an example embodiment.
Figure 18B:
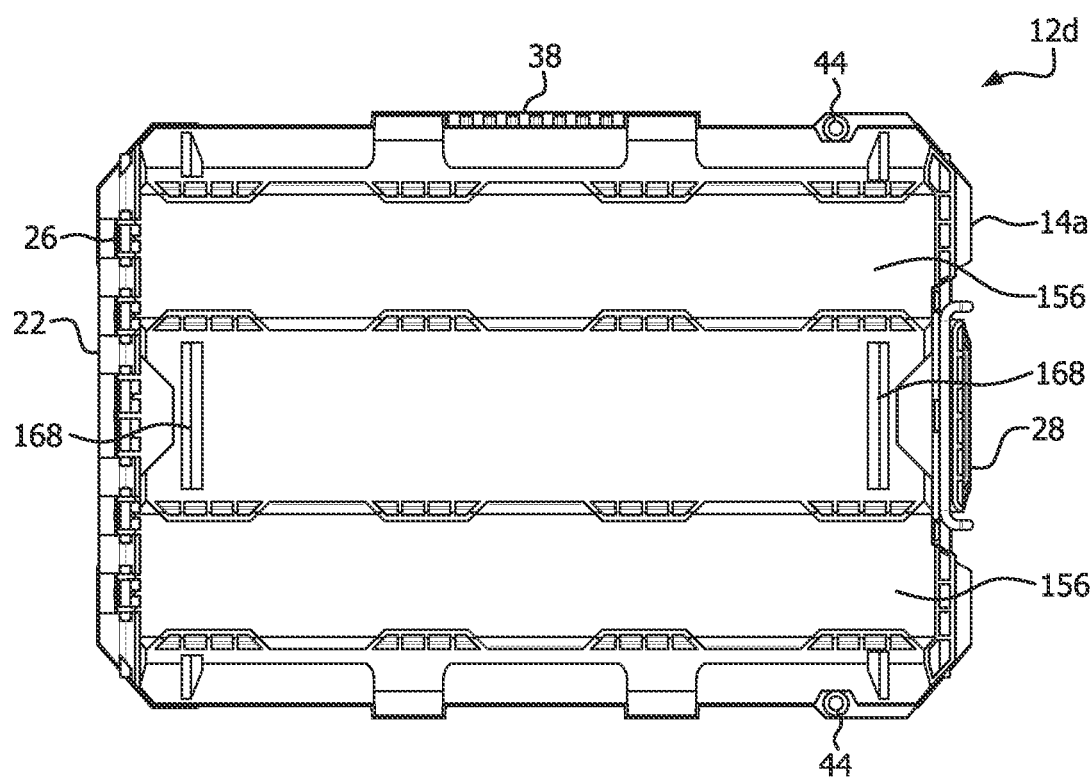
Figure 18C:
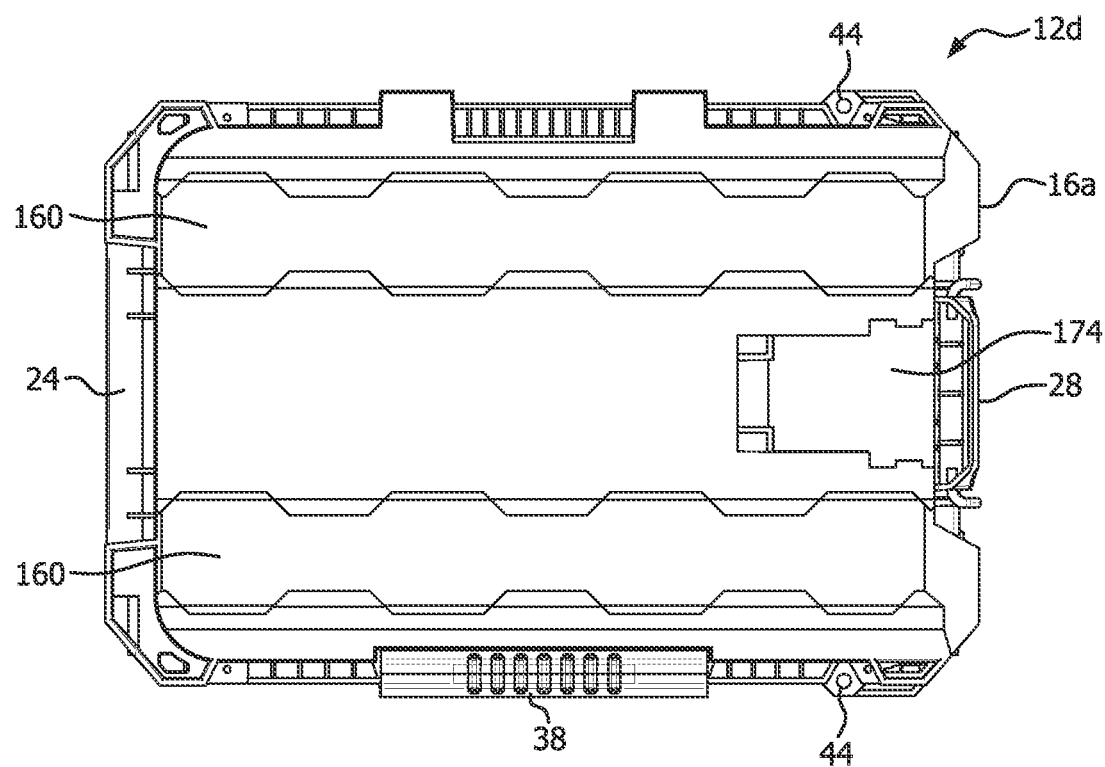
Figure 18D:
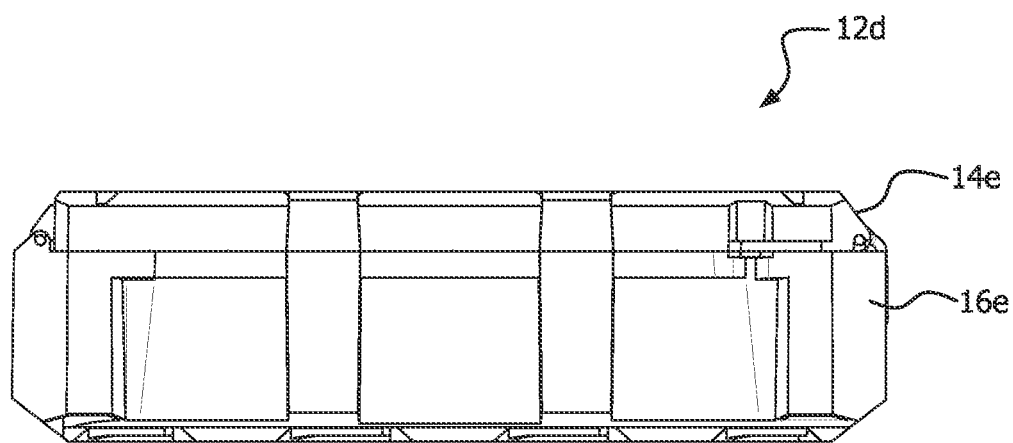
Figure 18E:
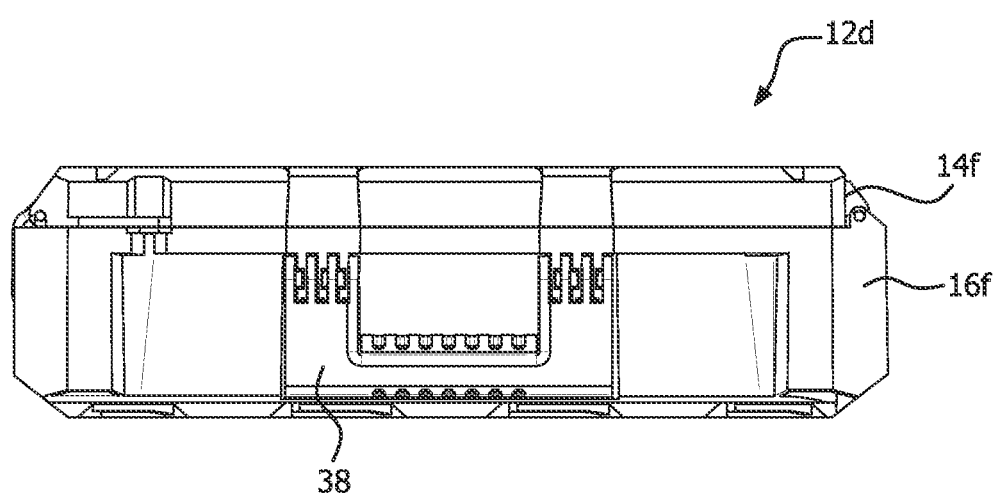
Figure 18F:
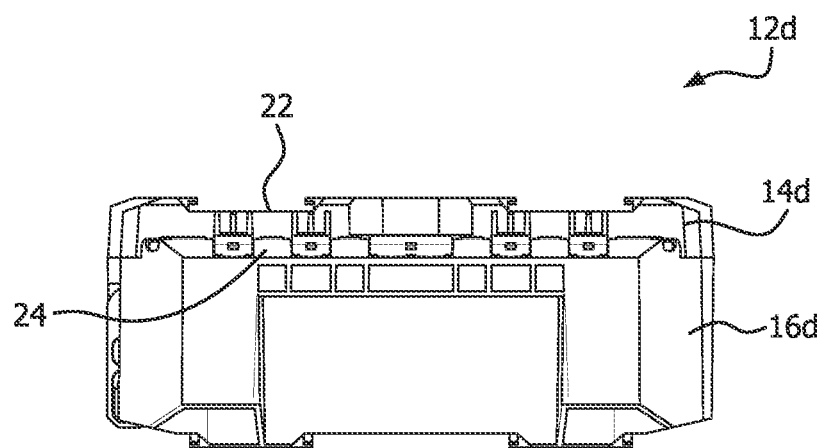
Figure 18G:
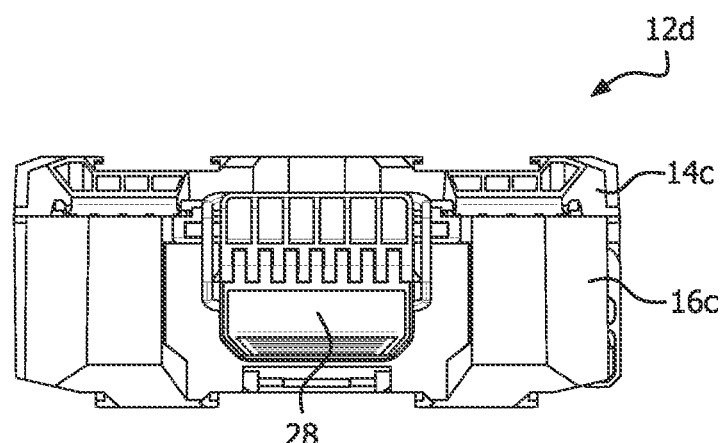
Figure 19A:
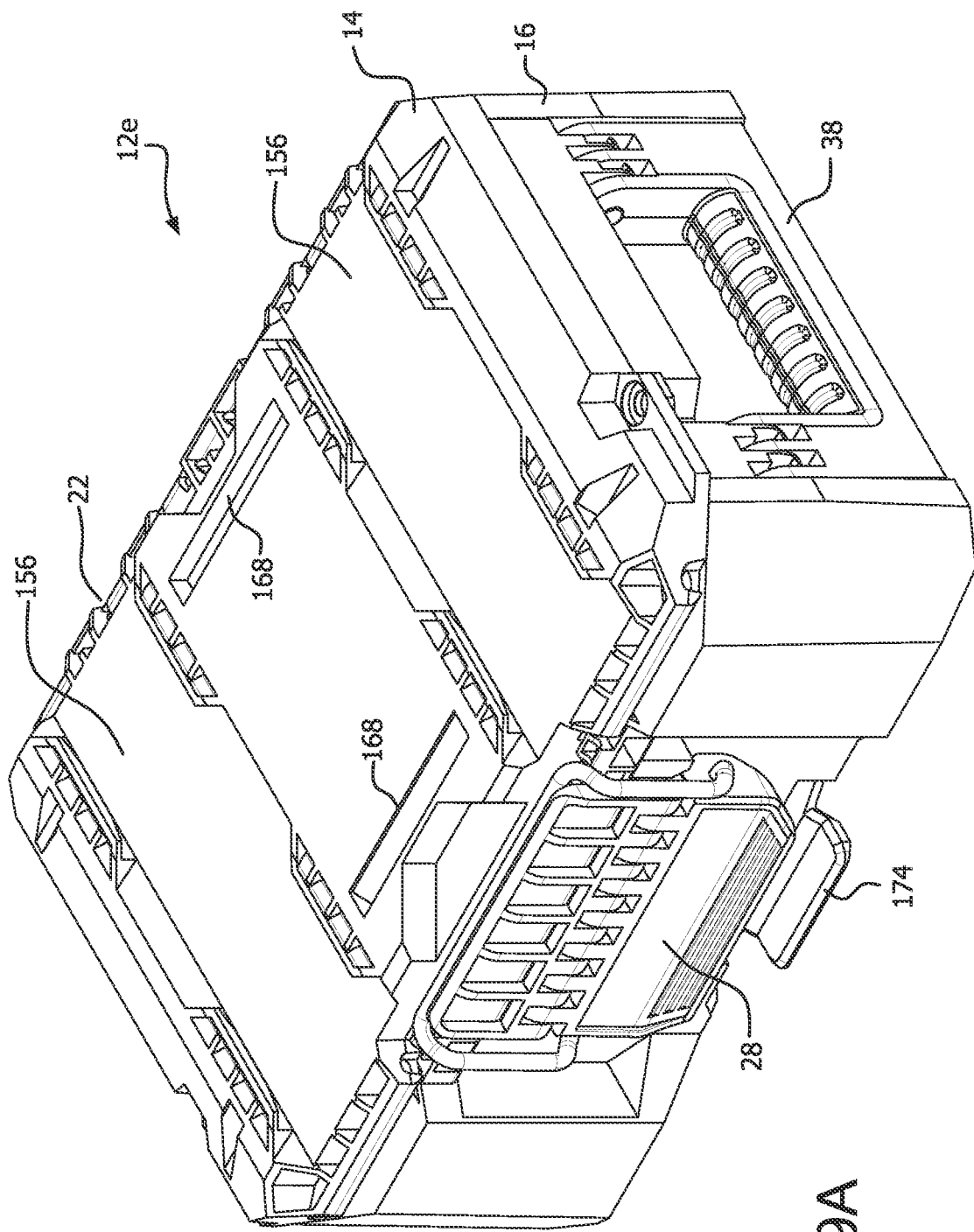
FIGS. 19A, 19B, 19C, 19D, 19E, 19F and 19G depict perspective, top, bottom, front, back, left and right views, respectively, of a compact organizer in accordance with an example embodiment.
Figure 19B:
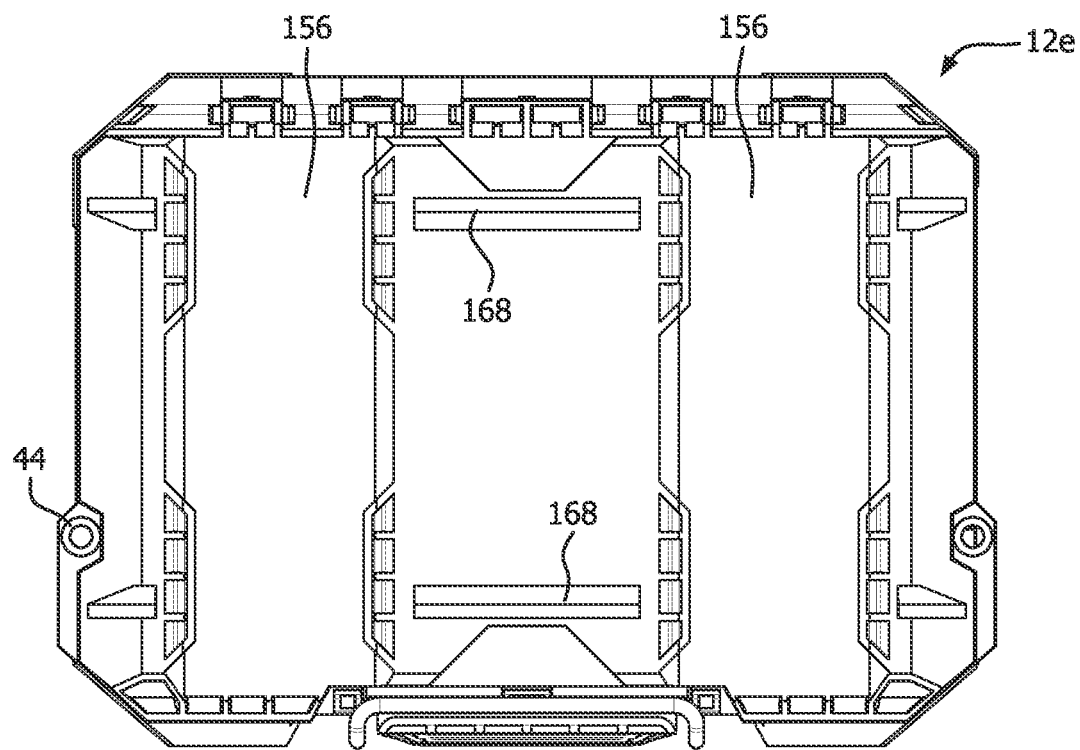
Figure 19C:
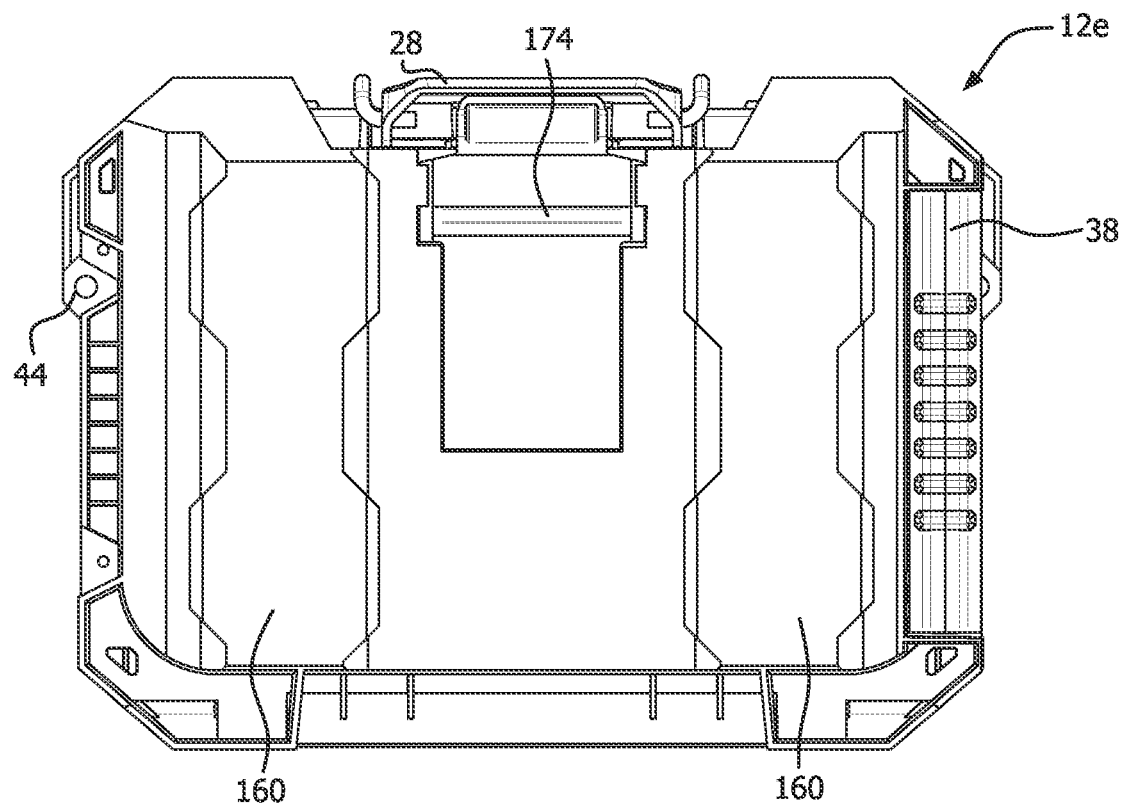
Figure 19D:
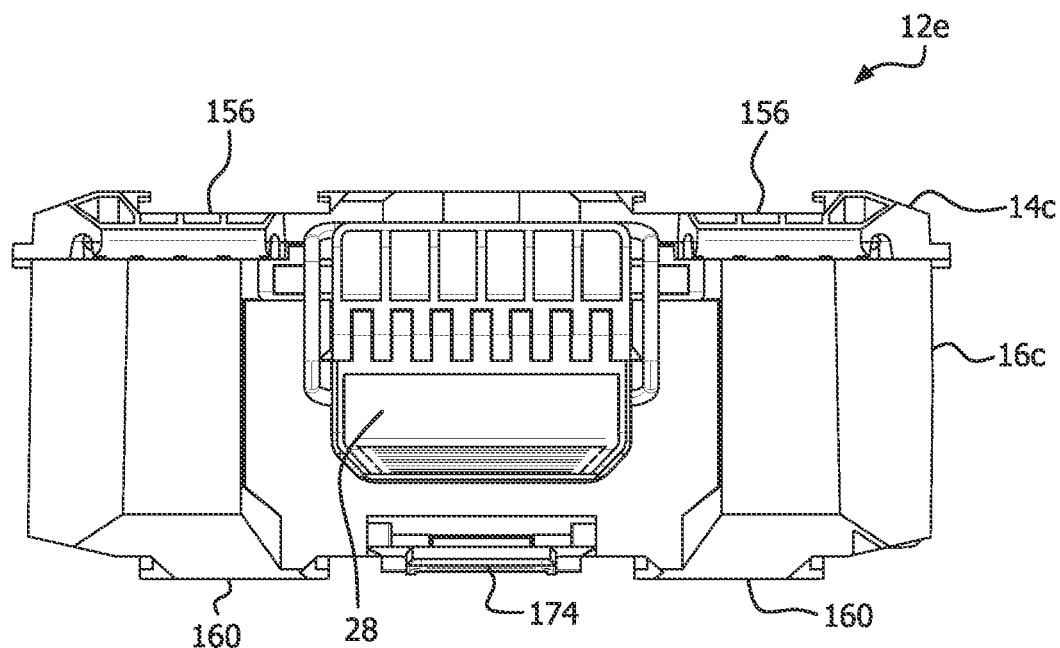
Figure 19E:
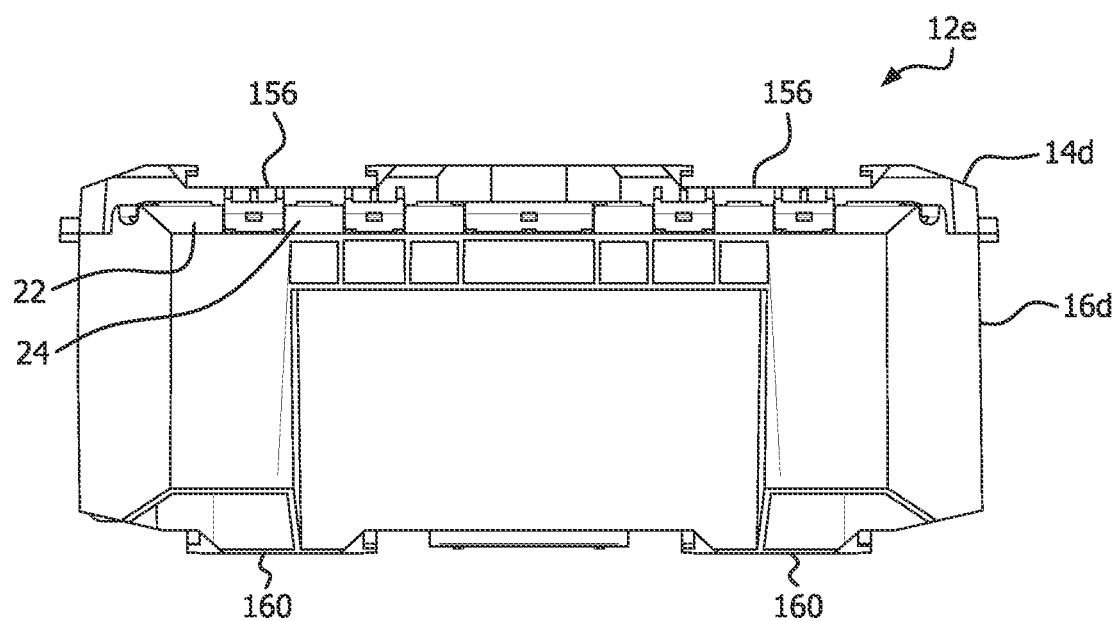
Figure 19F:
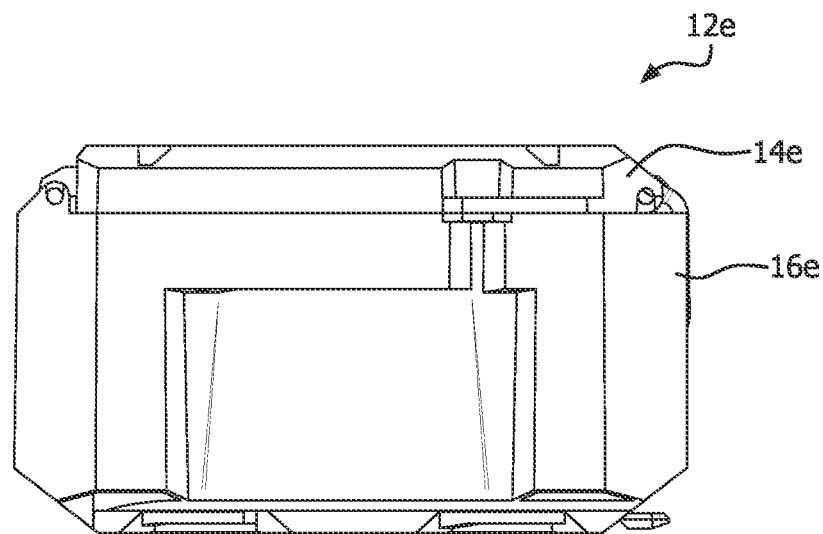
Figure 19G:
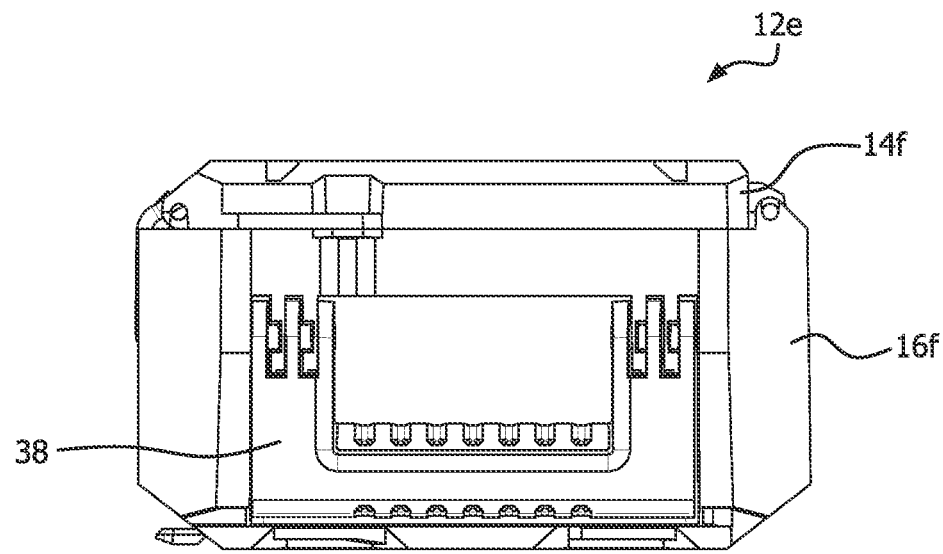
Figure 20A:
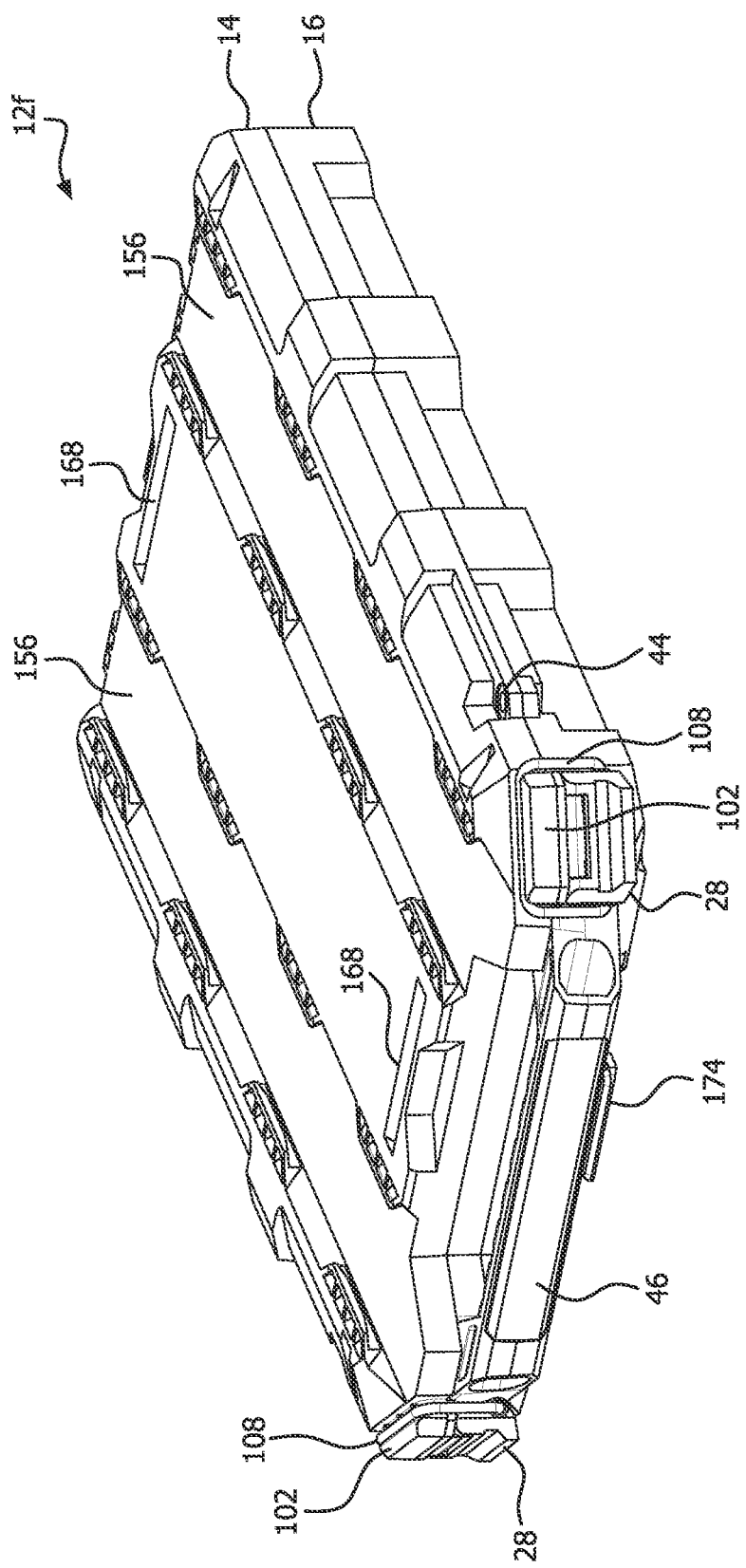
FIGS. 20A, 20B, 20C, 20D, 20E, 20F and 20G depict perspective, top, bottom, left, right, back and front views, respectively, of a low profile organizer in accordance with an example embodiment.
Figure 20B:
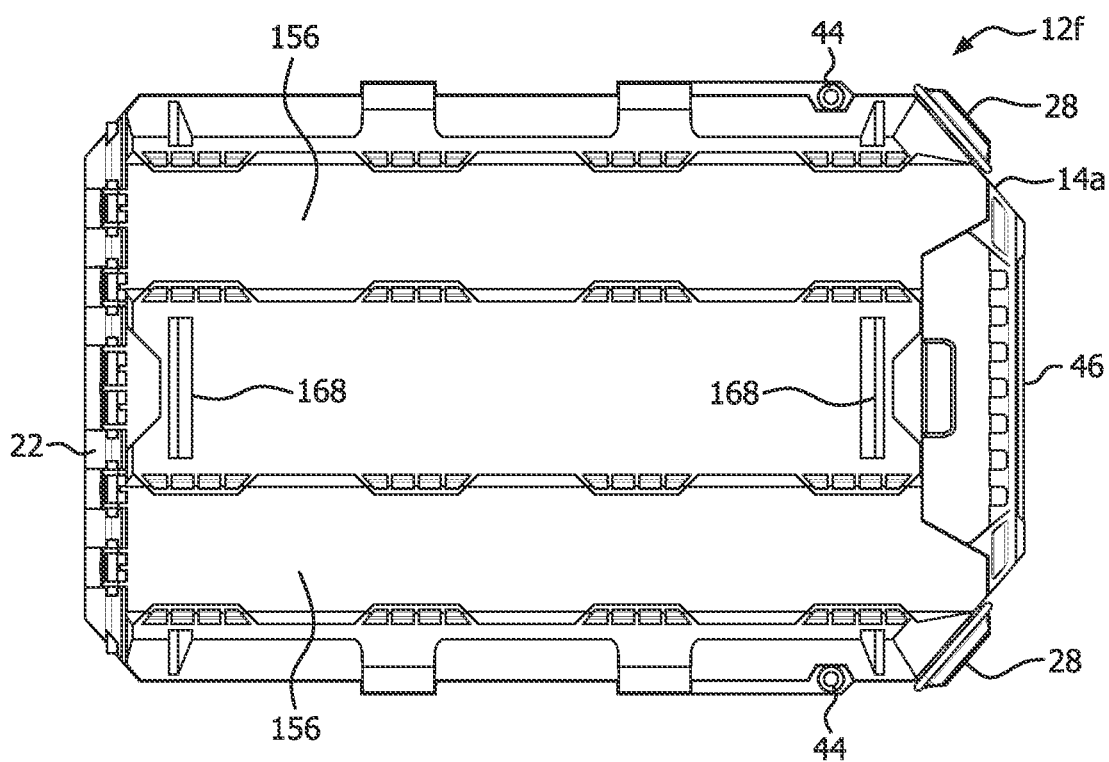
Figure 20C:
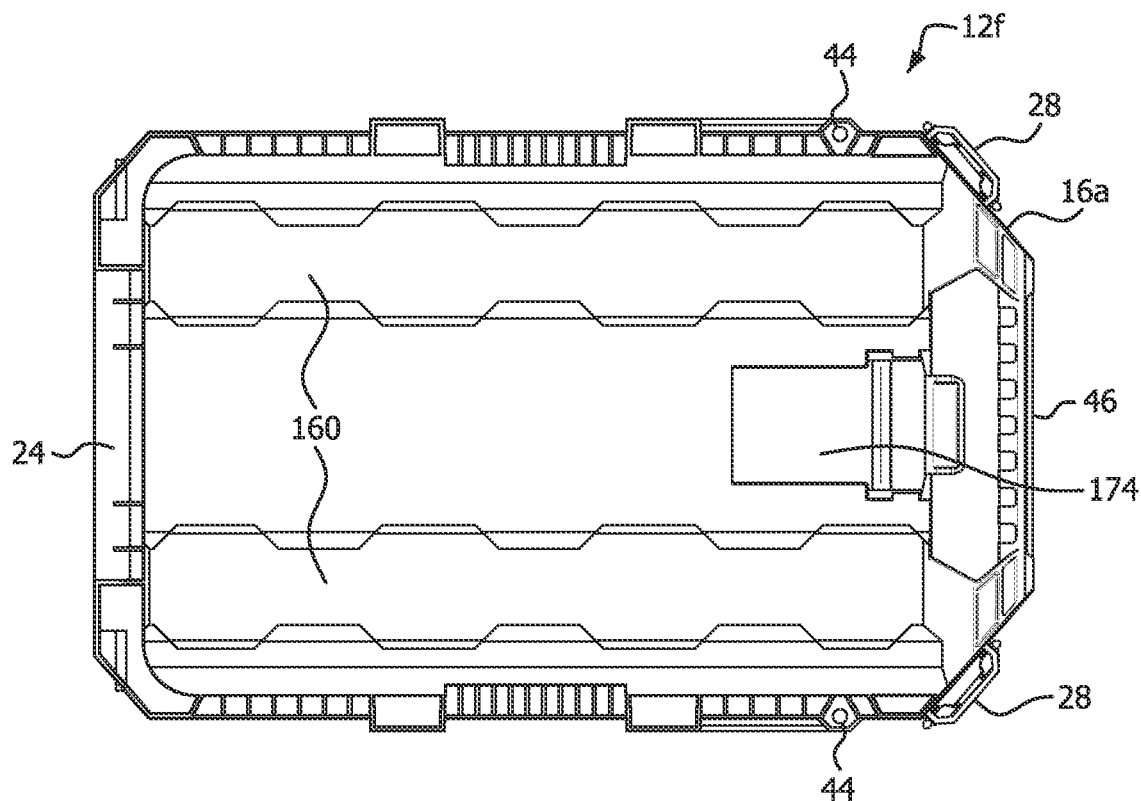
Figure 20D:
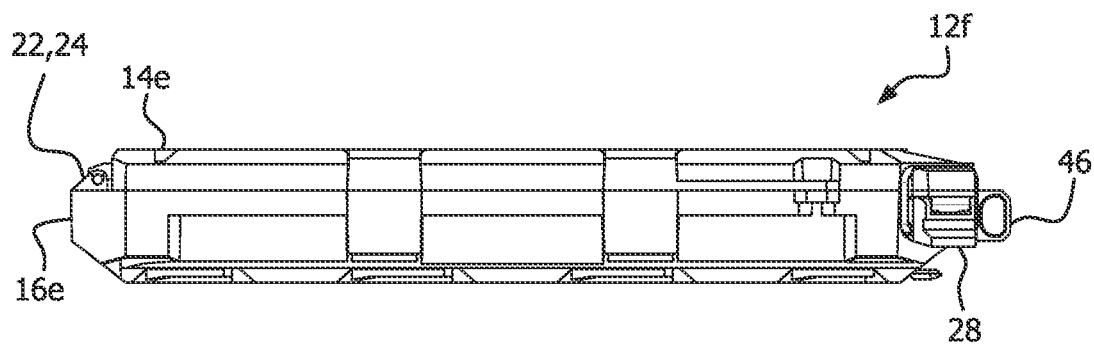
Figure 20E:
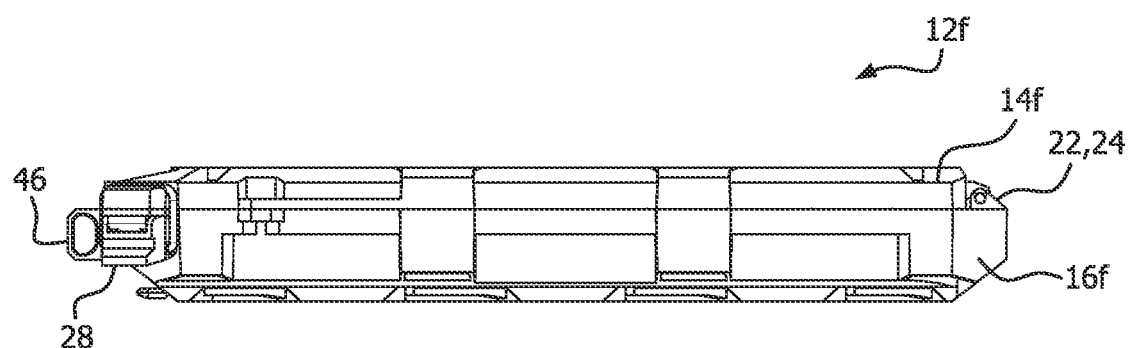
Figure 20F:
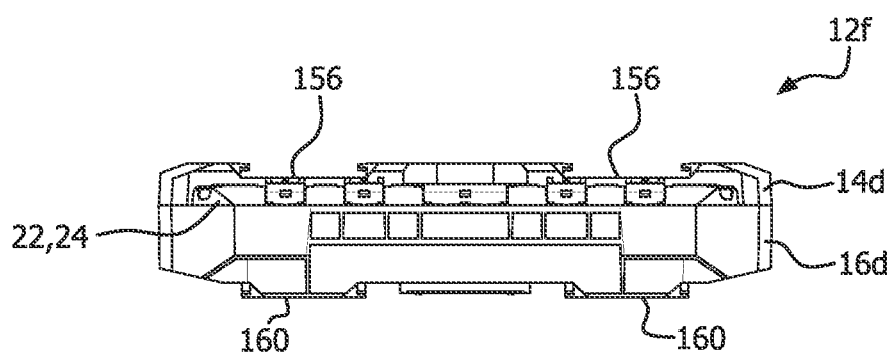
Figure 20G:
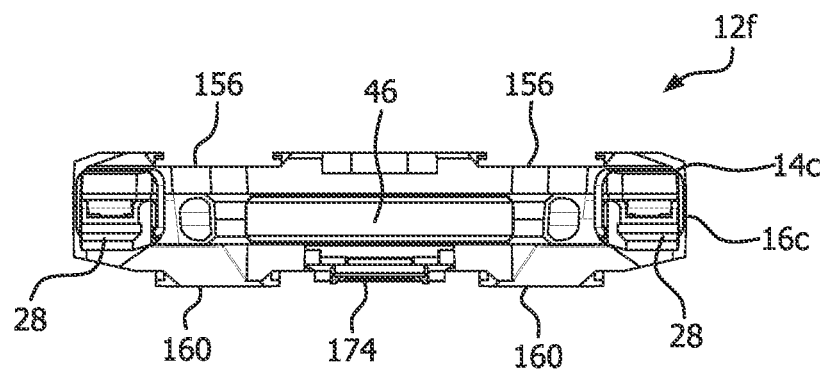
Figure 21A:
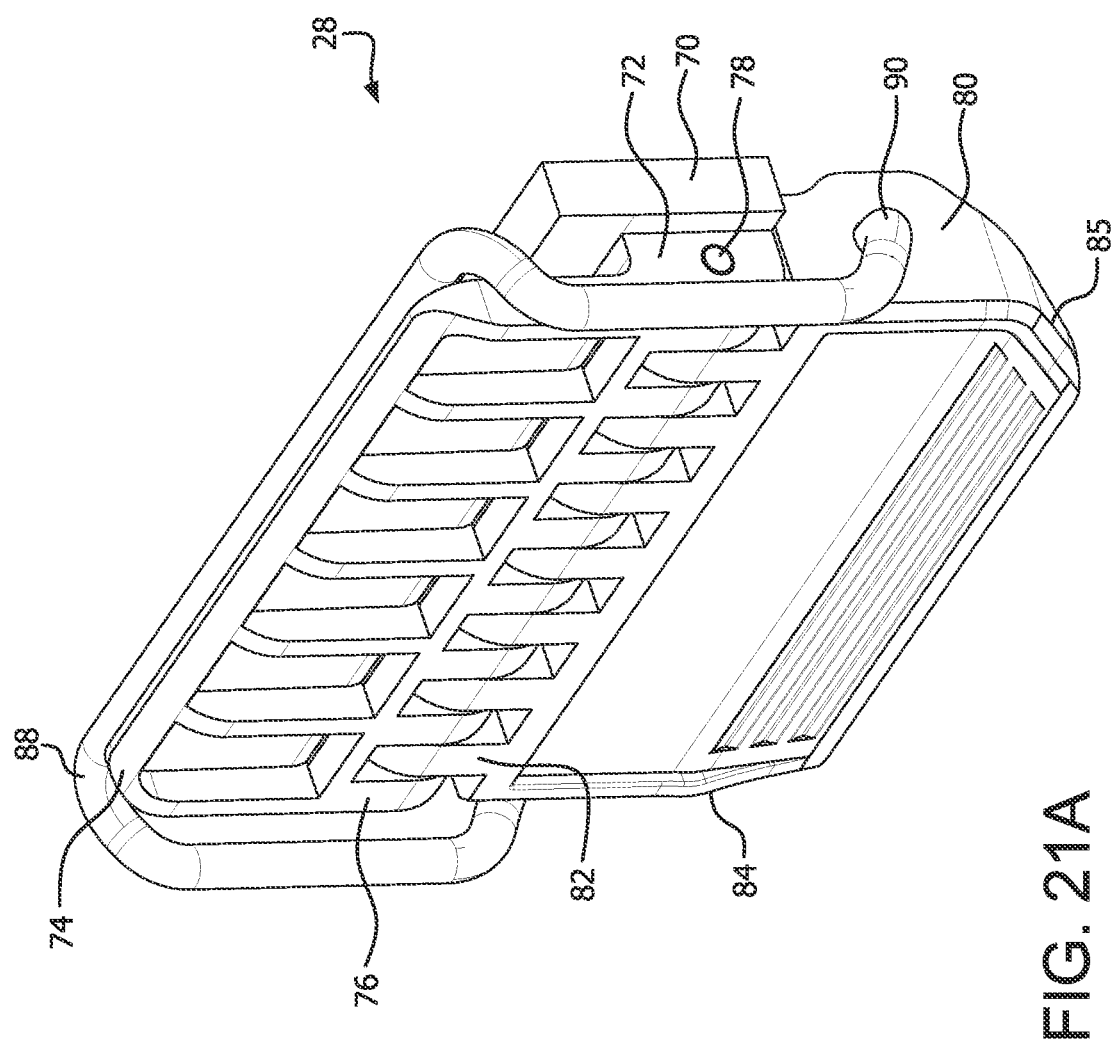
FIGS. 21A, 21B, 21C, 21D, 21E, 21F and 21G depict perspective, front, back, top, bottom, left and right views, respectively, of a latch in accordance with an example embodiment.
Figure 21B:
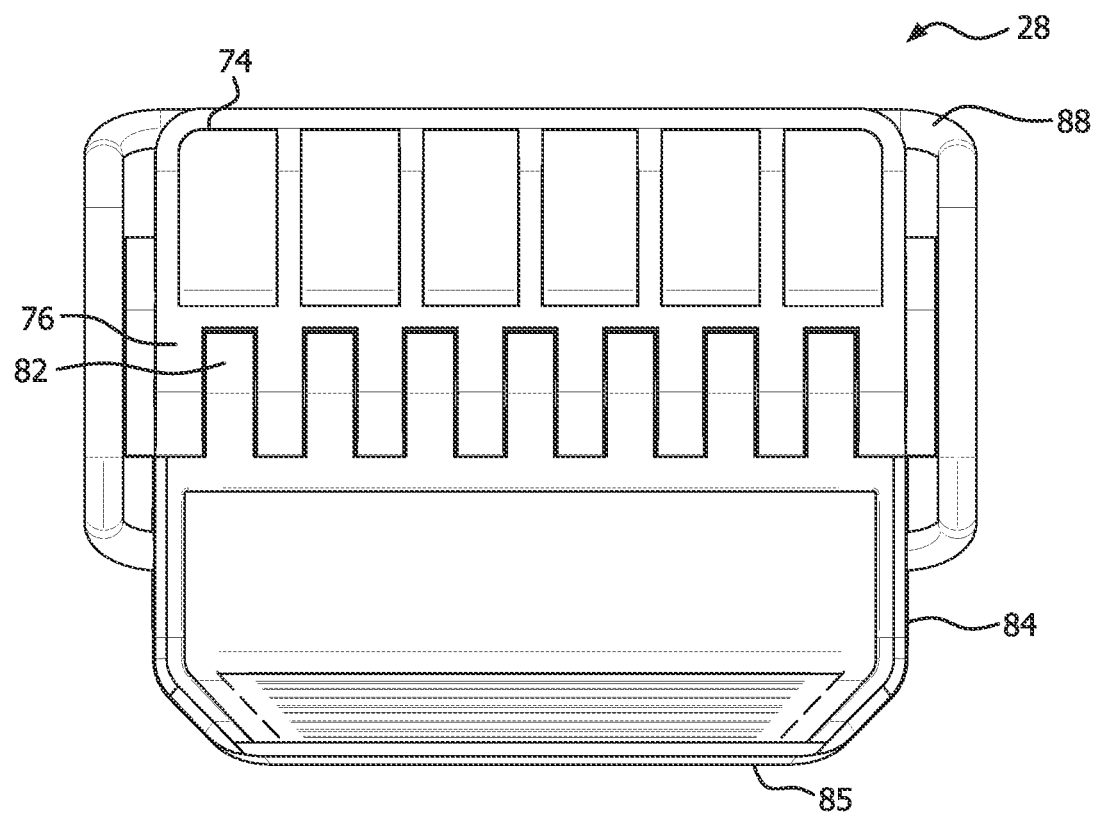
Figure 21C:
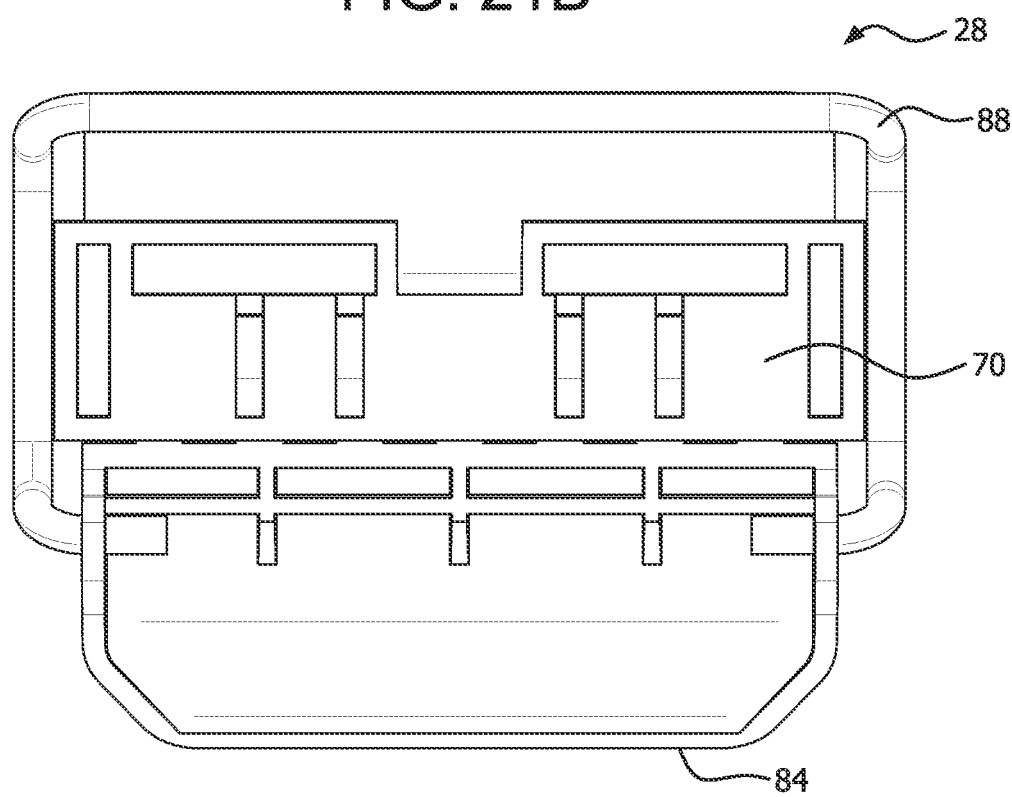
Figure 21D:
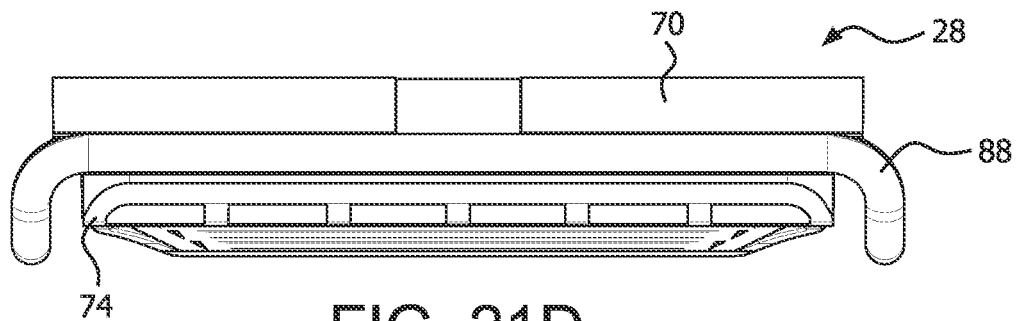
Figure 21E:
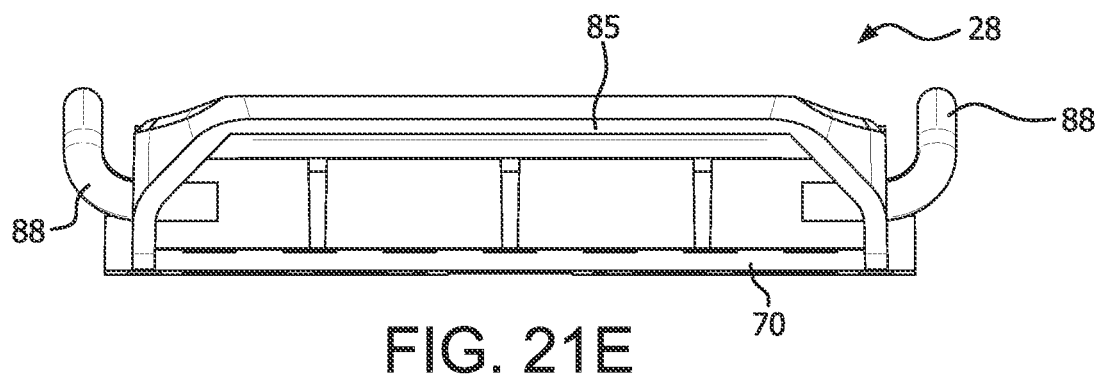
Figures 21F, 21G:
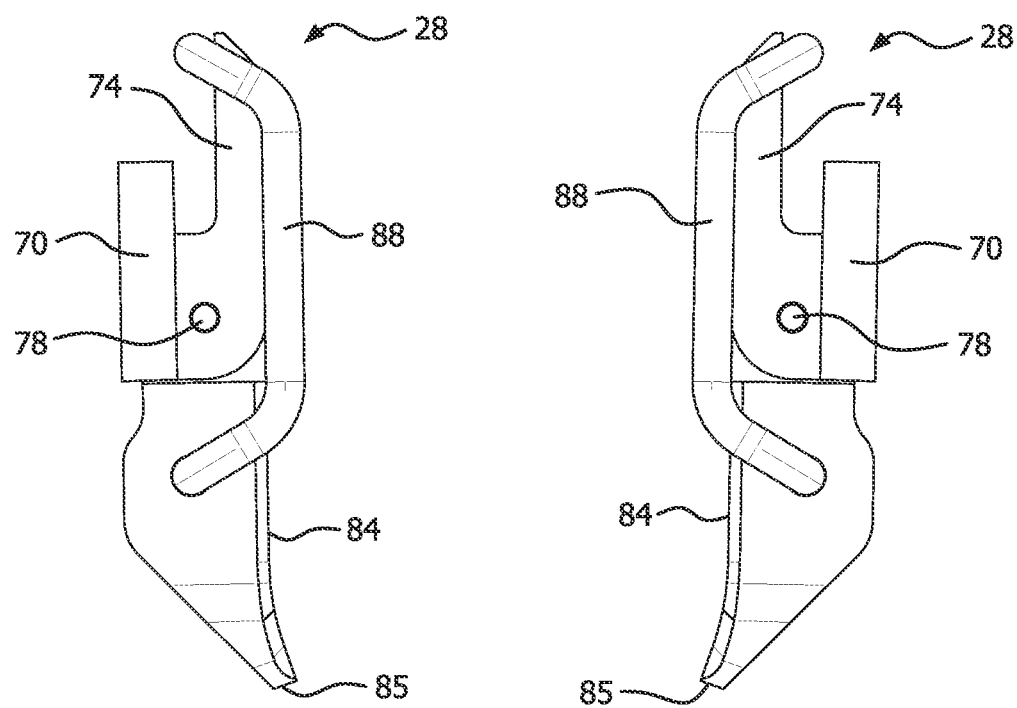
Figure 22A:
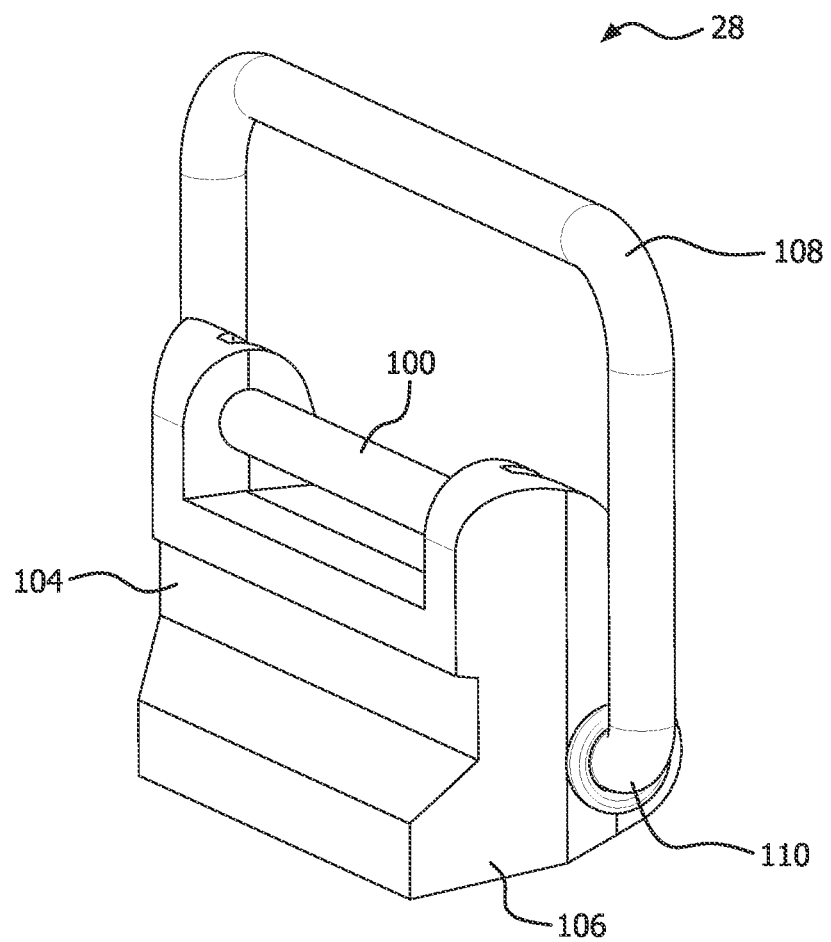
Figure 22B:
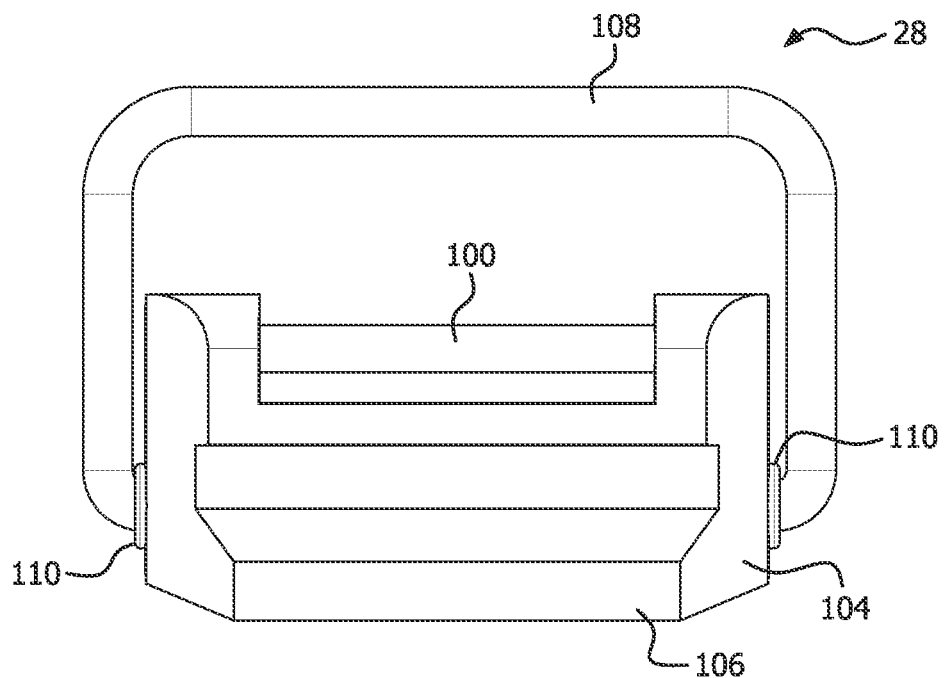
Figure 22C:
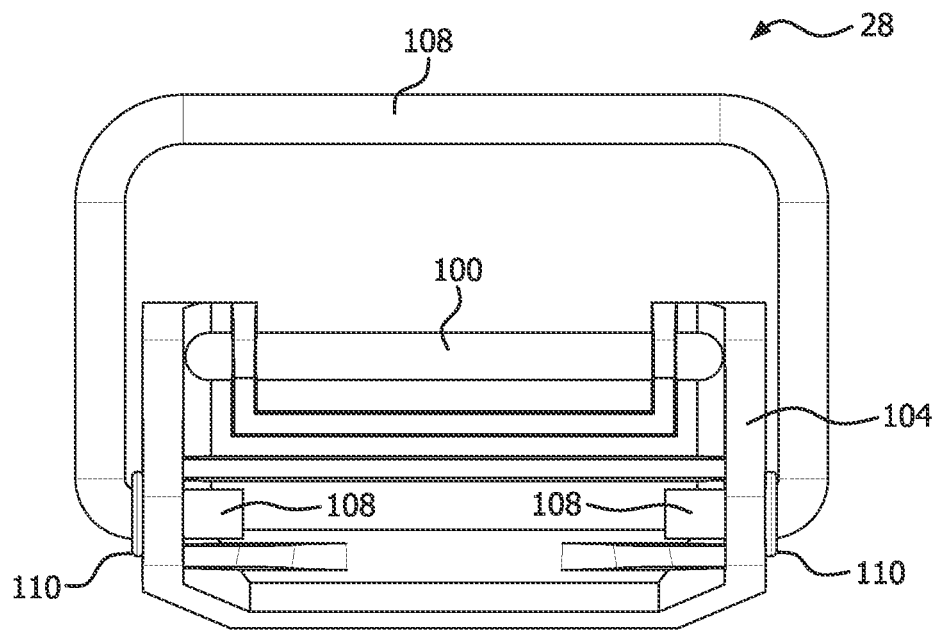
Figure 23A:
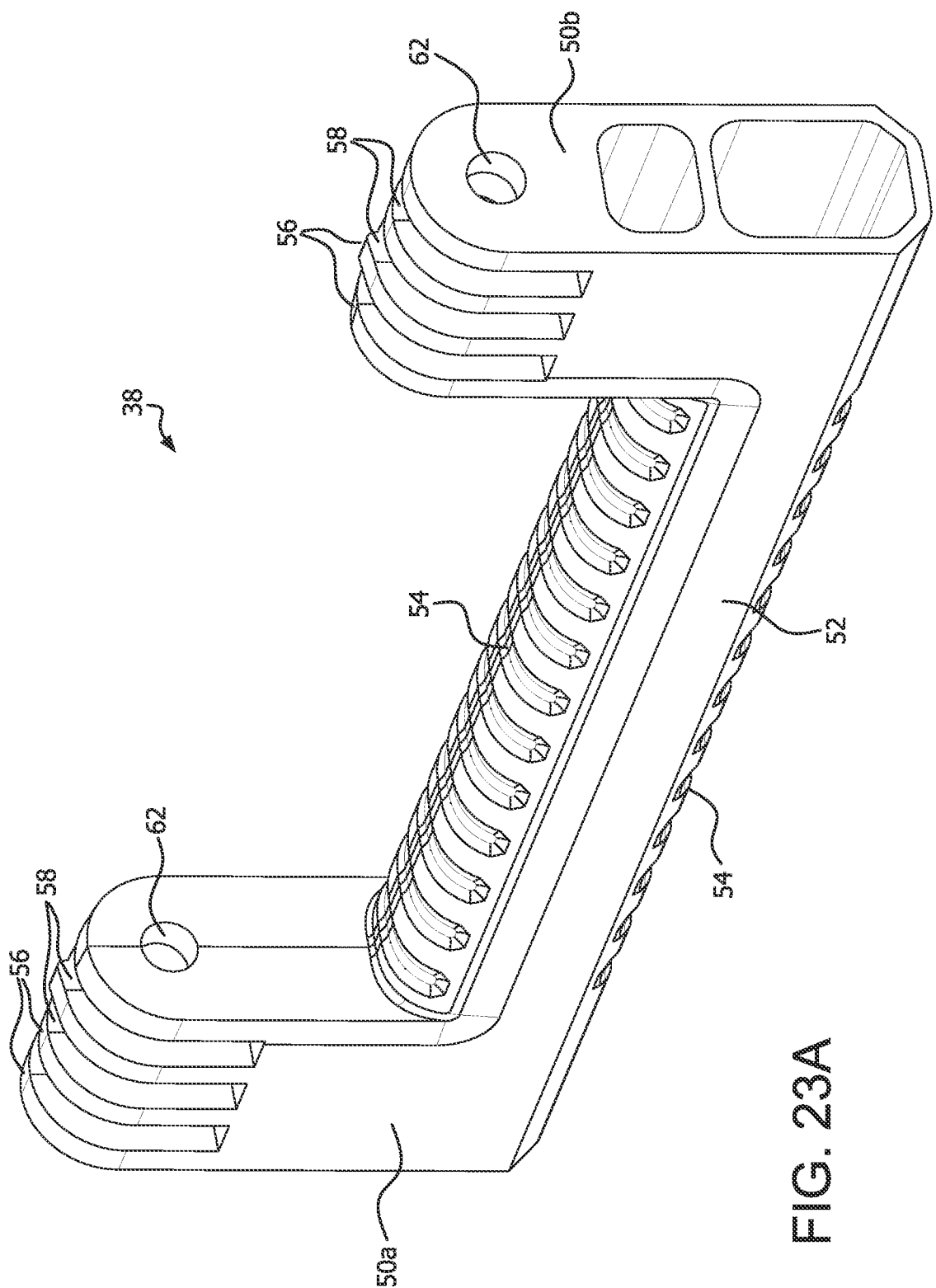
FIGS. 23A, 23B, 23C, 23D, 23E, 23F and 23G depict perspective, front, back, top, bottom, left and right views, respectively, of an example pivotable handle in accordance with an example embodiment.
Figure 23B:
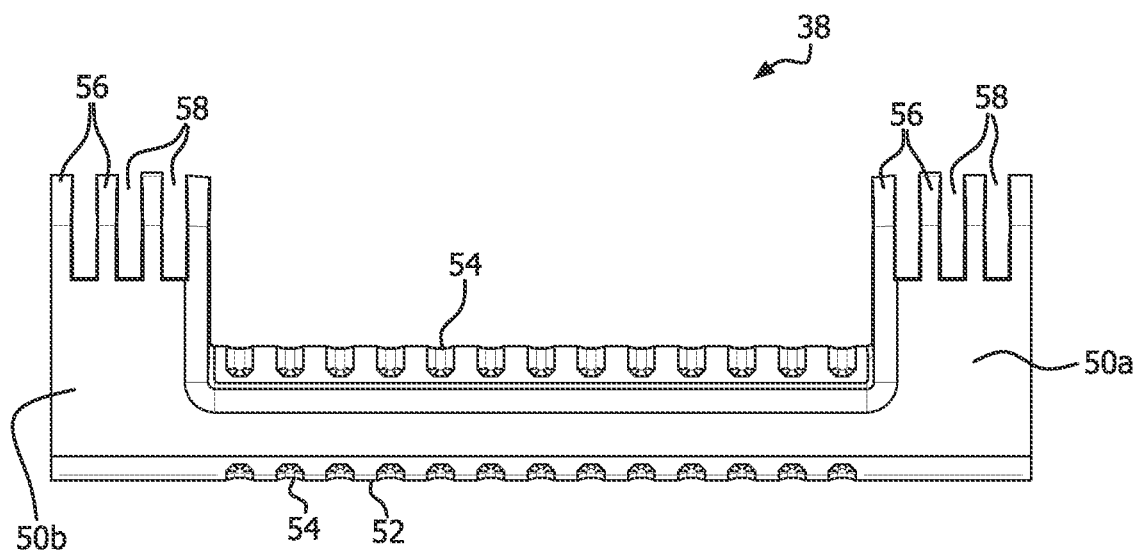
Figure 23C:
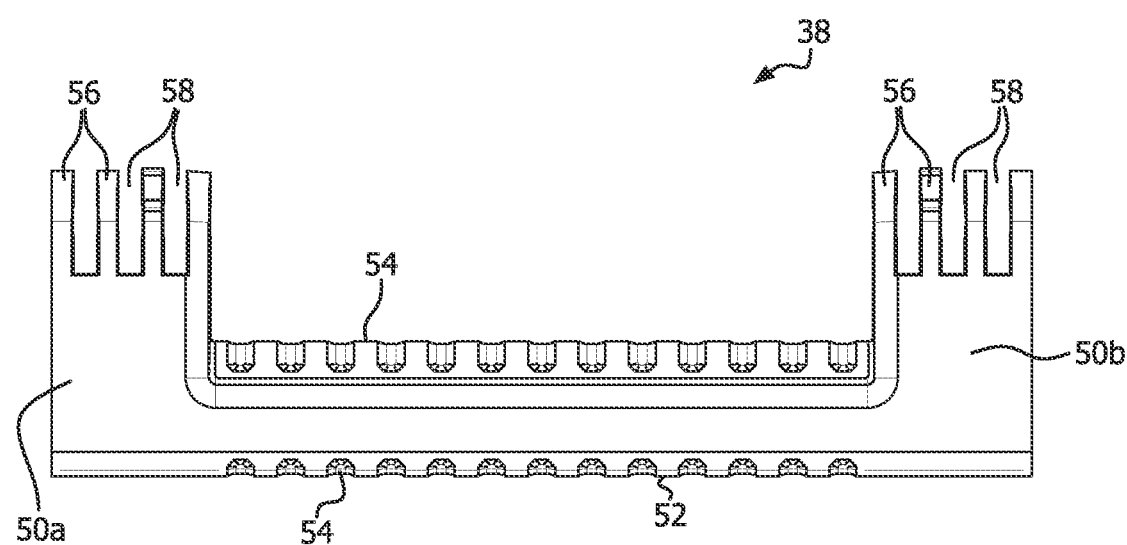
Figure 23D:
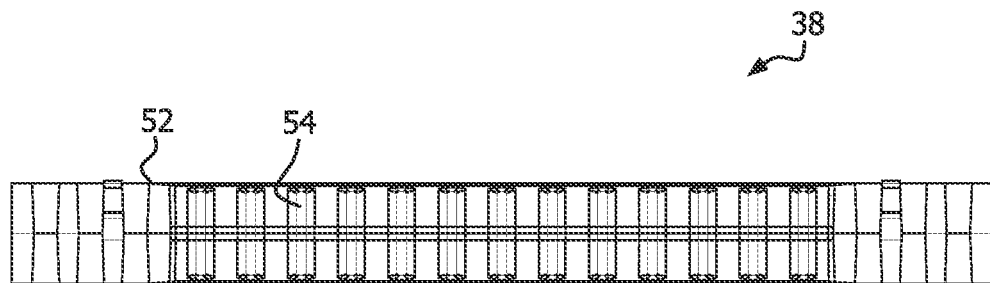
Figure 23E:
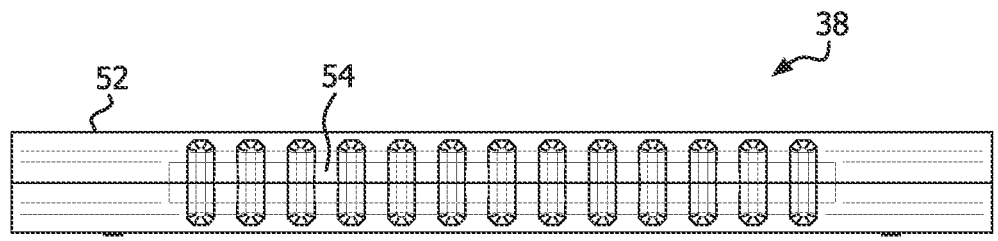
Figures 23F, 23G:
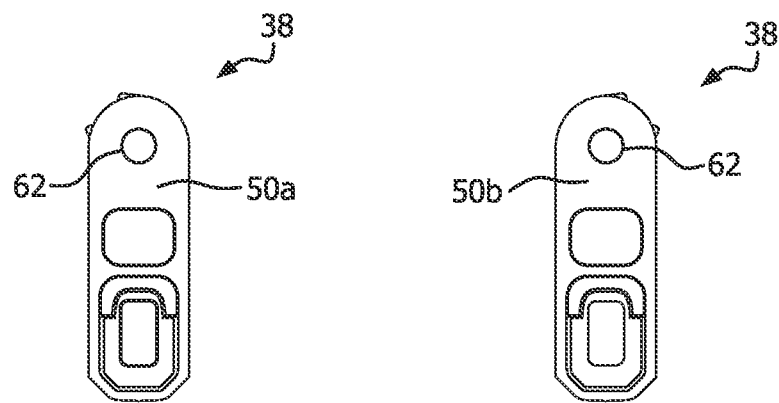

An example handle 38 that is pivotable relative to its box 12 will now be described with reference to FIGS. 23A through 23G which depict perspective, front, back, top, bottom, left and right views, respectively, of an example pivotable handle. A handle 38 has handle legs 50a, 50b, each being pivotably mounted at one end thereof to a side wall 13c-13f of a box 12 and being joined to a handle grip portion 52 at an opposite end thereof. The handle grip portion between the handle legs 50a, 50b can be provided with rubberized grip material or a textured portion indicated at 54 to facilitate a user's grip and comfort when gripping the handle 38. The pivotably mounted ends of the legs can be implemented, for example, by forming them with fingers 56 and grooves 58 that interleave with corresponding fingers and grooves provided on the box 12 where the handle 38 is disposed. For example, the box 12 can be provided with corresponding fingers 60 and grooves 58 therebetween in a thicker area 32 of the side wall, as shown in FIG. 17A, to engage with the fingers 56 and grooves 58 of the handle 38. Aligned apertures 62 in the fingers 56 of the handle 38 and in the side wall fingers 60 can receive a rod therein for pivotable engagement with each other.

Medium Storage Box 12d

FIGS. 18A through 18G depict perspective, top, bottom, left, right, back and front views, respectively, of an example medium storage box 12d. The medium storage box 12d has a latch 28 on its front wall 13c, and a hinge with hinge members 22, 24 on its back wall 13d. A pivotable handle 38 is provided on at least one of its side walls 16f, for example. The latch 28 and the handle 38 are described in connection with FIGS. 21A-21G and FIGS. 23A-23G, respectively. Aligned apertures 44 are provided in the top and bottom portions 14 and 16 to function as a padlock eyelet and receive a shackle of a lock when the top portion or lid 14 on the box 12d is closed to lock the contents of the box 12d. The top portion 14 has components 156 on its top exterior surface 14a to engage components 160 on the bottom exterior surface 16a of another box in accordance with an example box-to-box connection system 150, and a feature on its front wall (e.g., 14c) such as a latch bar 30 or recess to engage the latch 28 as described in connection with FIGS. 21A-21G. The bottom portion 16 has components 160 on its bottom exterior surface 16a for the box-to-box connection system 150 described in connection with FIGS. 24A through 29C. For example, the box 12d has a connection system 150 comprising channels 156 on it top exterior surface 14a that can interact with guides 160 on the bottom exterior surfaces 16a of other boxes 12 stacked on the top of the box 12d, and guides 160 on its bottom exterior surface 16a that can interface with channels 156 on the top exterior surfaces 14a of boxes 12 on which the box 12d is stacked.

Unlike boxes 12a, 12b and 12c, wherein one or more of latch(es) 28 can be mounted on each of opposite sides of the box to allow opening its top portion 14 from either of the opposite sides of the box, the medium storage box can comprise a hinge between the top portion 14 and the bottom portion 16 of the box 16d on one side thereof, and at least one latch 28 on the side of the box 12*d* opposite the hinge, to allow opening the top portion from only one side of the box. The hinge can comprise, for example, top portion hinge members (e.g., latch knuckles) 22 that interleave with bottom portion hinge members (e.g., latch knuckles) 24. A hinge rod or pin 26 can be inserted into aligned apertures of the hinge members 22, 24 to pivotably connect them to each other.

Compact Organizer 12*e*

FIGS. 19A through 19G depict perspective, top, bottom, front, back, left and right views, respectively, of an example compact organizer 12*e*. The compact organizer 12*e* has a latch 28 on its front wall 13*c*, and a hinge with hinge members 22, 24 on its back wall 13*d*. A pivotable handle 38 is provided on at least one of its side walls 16*f*, for example. The latch 28 and the handle 38 are described in connection with FIGS. 21A-21G and FIGS. 23A-23G, respectively. Aligned apertures 44 are provided in the top and bottom portions 14 and 16 to function as a padlock eyelet and receive a shackle of a lock when the top portion or lid 14 on the box 12*d* is closed to lock the contents of the box 12*e*. The top portion 14 has components 156 on its top exterior surface 14*a* to engage components 160 on the bottom exterior surface 16*a* of another box in accordance with an example box-to-box connection system 150, and a feature on its front wall (e.g., 14*c*) such as a latch bar 30 or recess to engage the latch 28 as described in connection with FIGS. 21A-21G. The bottom portion 16 has components 160 on its bottom exterior surface 16*a* for the box-to-box connection system 150 described in connection with FIGS. 24A through 29C. For example, the box 12*e* has a connection system 150 comprising channels 156 on it top exterior surface 14*a* that can interact with guides 160 on the bottom exterior surfaces 16*a* of other boxes 12 stacked on the top of the box 12*e*, and guides 160 on its bottom exterior surface 16*a* that can interface with channels 156 on the top exterior surfaces 14*a* of boxes 12 on which the box 12*d* is stacked.

Unlike boxes 12*a*, 12*b* and 12*c*, wherein one or more of latch(es) 28 can be mounted on each of opposite sides of the box to allow opening its top portion 14 from either of the opposite sides of the box, the compact organizer 12*e* can comprise a hinge between the top portion 14 and the bottom portion 16 of the box 16*d* on one side thereof, and at least one latch 28 on the side of the box 12*d* opposite the hinge, to allow opening the top portion 14 from only one side of the box 12*d*. The hinge can comprise, for example, top portion hinge members (e.g., latch knuckles) 22 that interleave with bottom portion hinge members (e.g., latch knuckles) 24. A hinge rod can be inserted into aligned apertures of the hinge members 22, 24 to pivotably connect them to each other.

Low Profile Organizer 12*f*

FIGS. 20A through 20G depict perspective, top, bottom, left, right, back and front views, respectively, of an example low profile organizer 12*f*. The low profile organizer 12*f* has two latches 28 at opposite corners of along its front wall 13*c*, and a hinge with hinge members 22, 24 on its back wall 13*d*. A fixed handle 46 is provided on its front walls 16*c*, for example. Aligned apertures 44 are provided in the top and bottom portions 14 and 16 to function as a padlock eyelet and receive a shackle of a lock when the top portion or lid 14 on the box 12*d* is closed to lock the contents of the box 12*f*. The top portion 14 has components 156 on its top exterior surface 14*a* to engage components 160 on the bottom exterior surface 16*a* of another box in accordance with an example box-to-box connection system 150, and a feature on its front wall (e.g., 14*c*) such as a recess 108 to engage a small version of the latch 28 as described below in connection with FIGS. 22A-22G. The bottom portion 16 has components 160 on its bottom exterior surface 16*a* for the box-to-box connection system 150 described in connection with FIGS. 24A through 29C. For example, the box 12*f* has a connection system 150 comprising channels 156 on it top exterior surface 14*a* that can interact with guides 160 on the bottom exterior surfaces 16*a* of other boxes 12 stacked on the top of the box 12*f*, and guides 160 on its bottom exterior surface 16*a* that can interface with channels 156 on the top exterior surfaces 14*a* of boxes 12 on which the box 12*f* is stacked.

Unlike boxes 12*a*, 12*b* and 12*c*, wherein one or more of latch(es) can be mounted on each of opposite sides of the box to allow opening its top portion 14 from either of the opposite sides of the box, the low profile organizer 12*f* can comprise a hinge between the top portion 14 and the bottom portion 16 of the box 16*f* on one side thereof, and at least one latch 28 on the side of the box 12*f* opposite the hinge, to allow opening the top portion 14 from only one side of the box 12*f*. The hinge can comprise, for example, top portion hinge members (e.g., latch knuckles) 22 that interleave with bottom portion hinge members (e.g., latch knuckles) 24. A hinge rod can be inserted into aligned apertures of the hinge members 22, 24 to pivotably connect them to each other.

The latches 28 on the low profile organizer 12*f* will now be described in connection with FIGS. 22A through 22G in accordance with another example embodiment. FIGS. 22A through 22G depict perspective, front, back, top, bottom, left and right views, respectively, of an example small version of a latch 28.

The latch 28 comprises a mounting bar 100 that is pivotably connected to the bottom portion 16 of the low profile organizer 12*f*. The mounting bar 100 is disposed over a grooved lip 102 that extends from a corner of the top portion 14. A pivotable clamping piece 104 is pivotably connected to the mounting bar 100. The pivotable clamping piece 104 comprises a finger pad 106 and a 108. The clamp bar 108 is configured to be received in a groove in the top surface 14*a* of the corner of top portion 14 of the box 12*f* (e.g., in a groove formed in the lip 102) when the latch 28 is in a locked position. When a user lifts the finger pad 106, the pivotable clamping piece 104 swings towards the grooved lip 102 to release the clamp bar 108 to achieve an unlocked position for the latch 28. Apertures 110 in the pivotable clamping piece 104 receive respective ends of the clamp bar 108 and allow the clamp bar 108 to rotate therein when the pivotable clamping piece 104 is rotated by the user relative to the mounting bar 100.

It is to be understood that latches 28 are not limited to the configurations shown in FIGS. 21A-21G and 23A-23G.

Box-to-Box Connection System 150

Figure 24A:
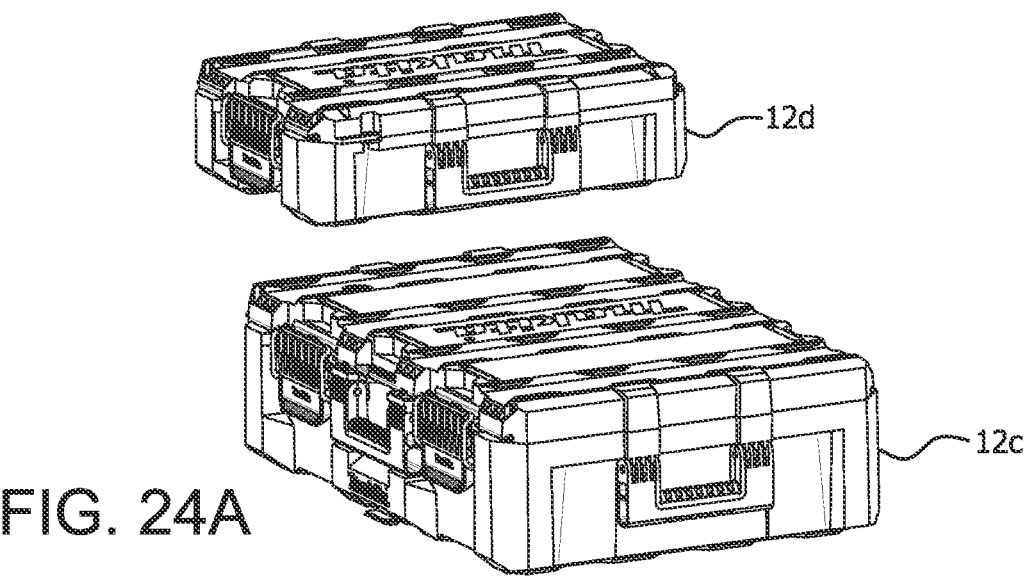
FIGS. 24A, 24B and 24C depict respective views of a storage box being stacked upon and interconnected to another storage box using a box-to-box connection system in accordance with an example embodiment.
Figure 24B:
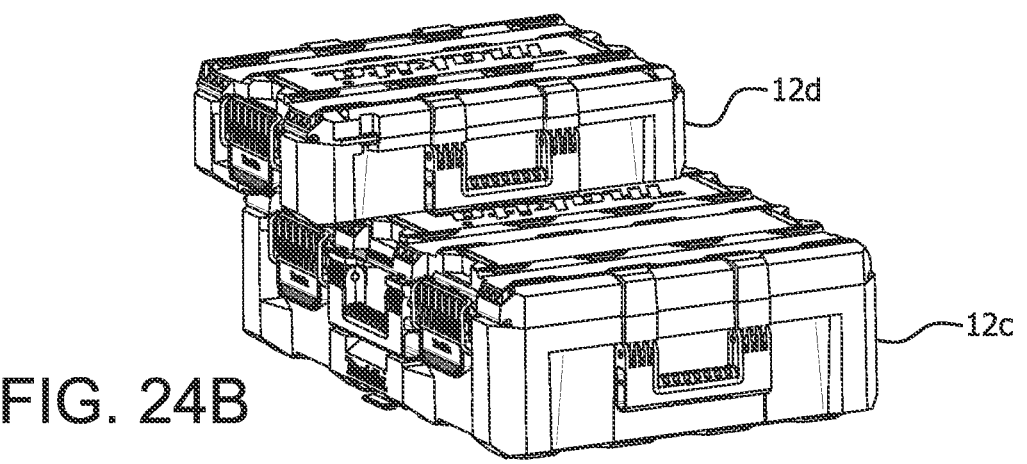
Figure 24C:
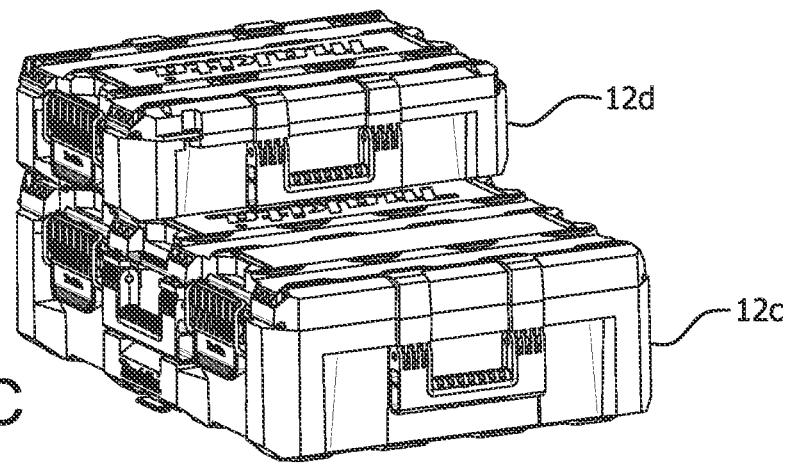

An example box-to-box connection system 150 for interconnecting a box 12 to a top exterior surface 13*a* (e.g., a top portion exterior surface 14*a*) or a bottom exterior surface 13*b* (e.g., a bottom portion exterior surface 16*a*) of another box 12 will now be described with reference to FIGS. 24A through 29C in accordance with an example embodiment. FIGS. 24A, 24B and 24C depict respective views of a storage box (e.g., a medium storage box 12*d*) being stacked upon and interconnected to another storage box (e.g., a large storage box 12*c*) using a box-to-box connection system 150 in accordance with an example embodiment. It is to be understood that the box-to-box connection system 150 can be implemented on different sizes of boxes and other accessories (e.g., a wall mount system as shown in FIGS. 30 and 31A through 31C). Further, it is to be understood that different box-to-box connection systems can be used with the modular storage system 10 (e.g., as illustrated in FIGS. 78A through 98B described below).

Figure 26A:
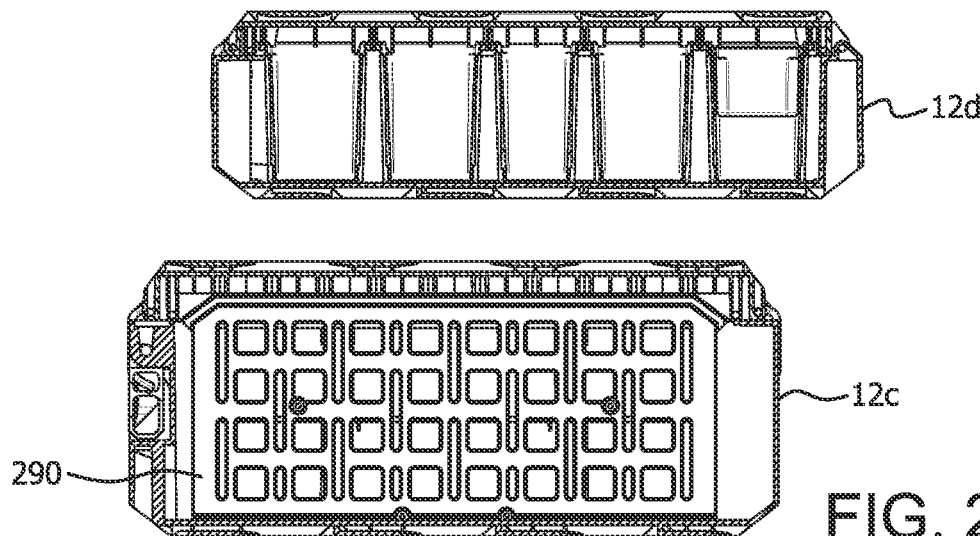
FIGS. 26A, 26B and 26C depict respective cross-section views of the top box being stacked upon the bottom box by a back to front translation of the top box relative to the bottom box in the stack, using the box-to-box connection system in accordance with an example embodiment.
Figure 26B:
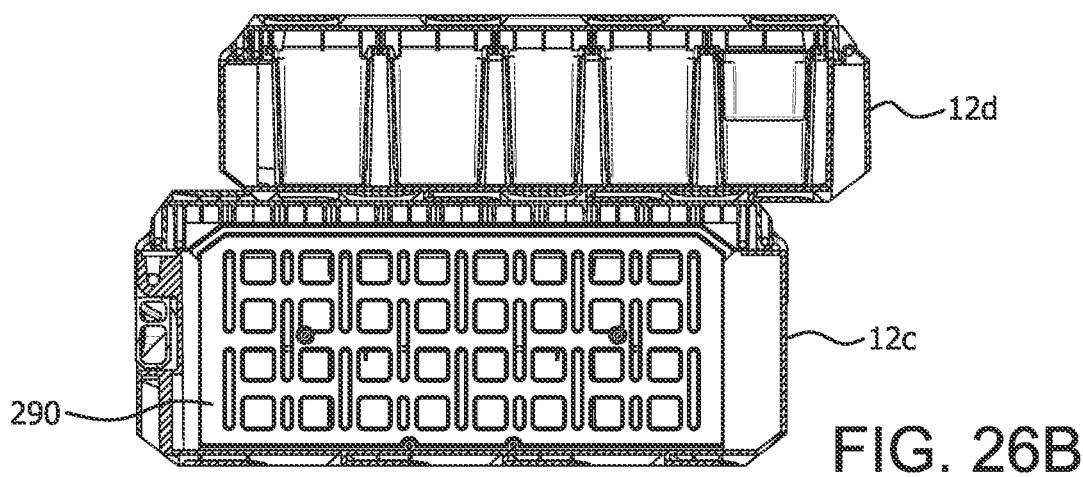
Figure 26C:
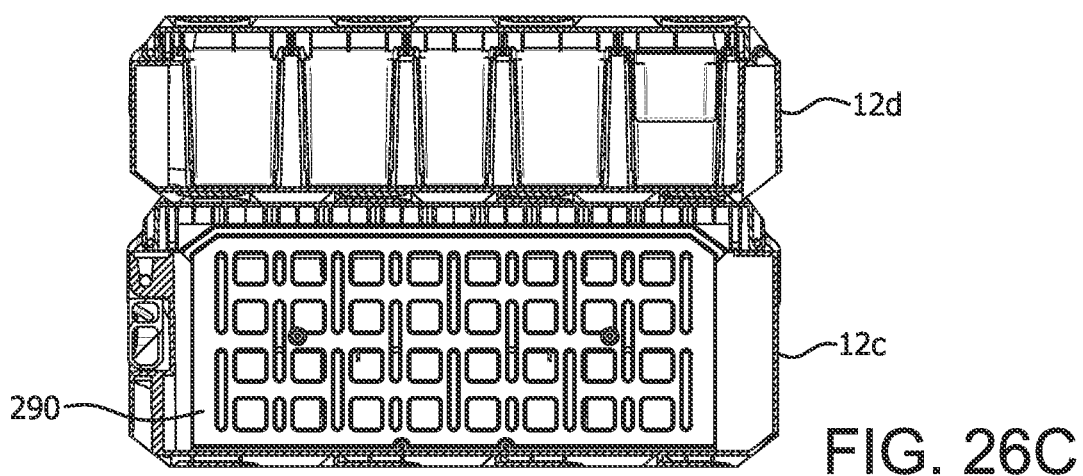

In accordance with an advantageous aspect of the box-to-box connection system 150, FIGS. 25A, 25B and 25C depict respective cross-section views of the top box 12*d* in FIGS. 24A, 24B and 24C being stacked upon the bottom box 12*c* by a front to back translation of the top box 12*d* relative to the bottom box 12*c* in the stack shown using the box-to-box connection system 150. FIGS. 26A, 26B and 26C depict respective cross-section views of the top box 21*d* being stacked upon the bottom box 12*c* by a back to front translation of the top box 12*d* relative to the bottom box 12*c* in the stack shown using the box-to-box connection system 150. As described below, the top and bottom boxes in a stacked configuration are provided with respective box-to-box connection system components that are advantageously configured to make initial alignment or registration of the boxes relative to each other simple and versatile for easy and fast stacking, and are also generally self-clearing when exposed to debris.

Figure 27A:
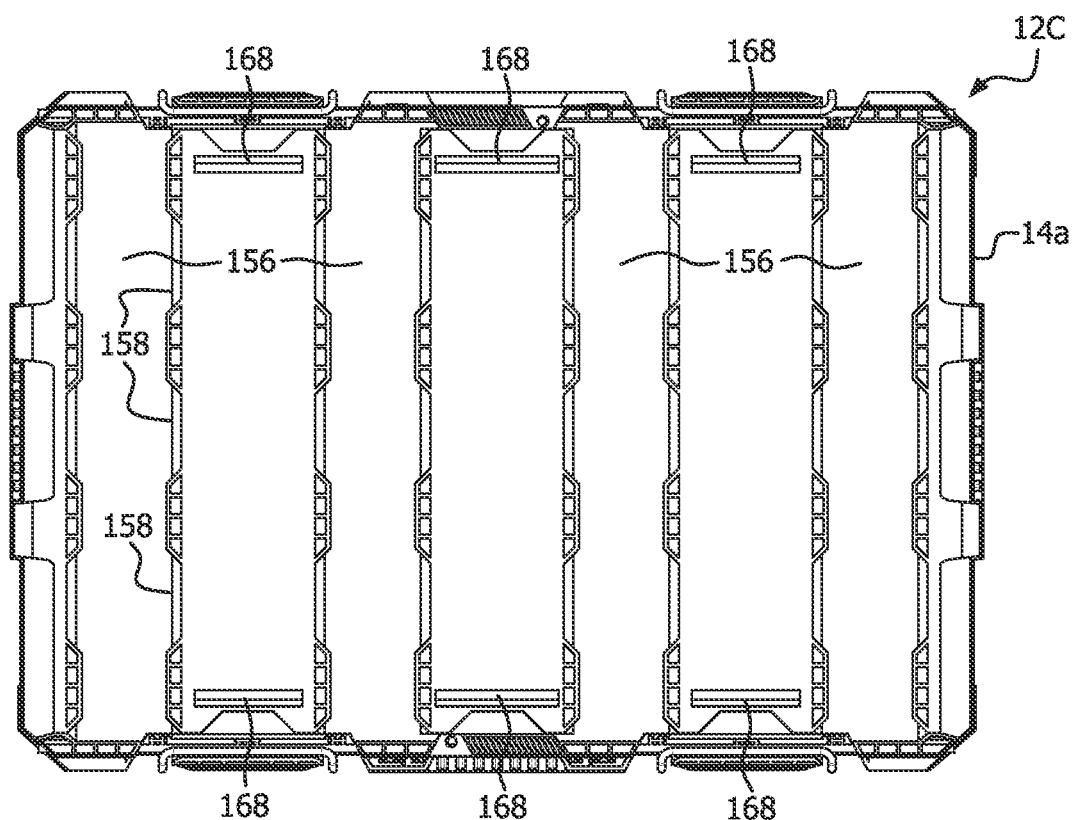
FIGS. 27A and 27B are, respectively, top and bottom views of a storage box having a box-to-box connection system in accordance with an example embodiment.
Figure 27B:
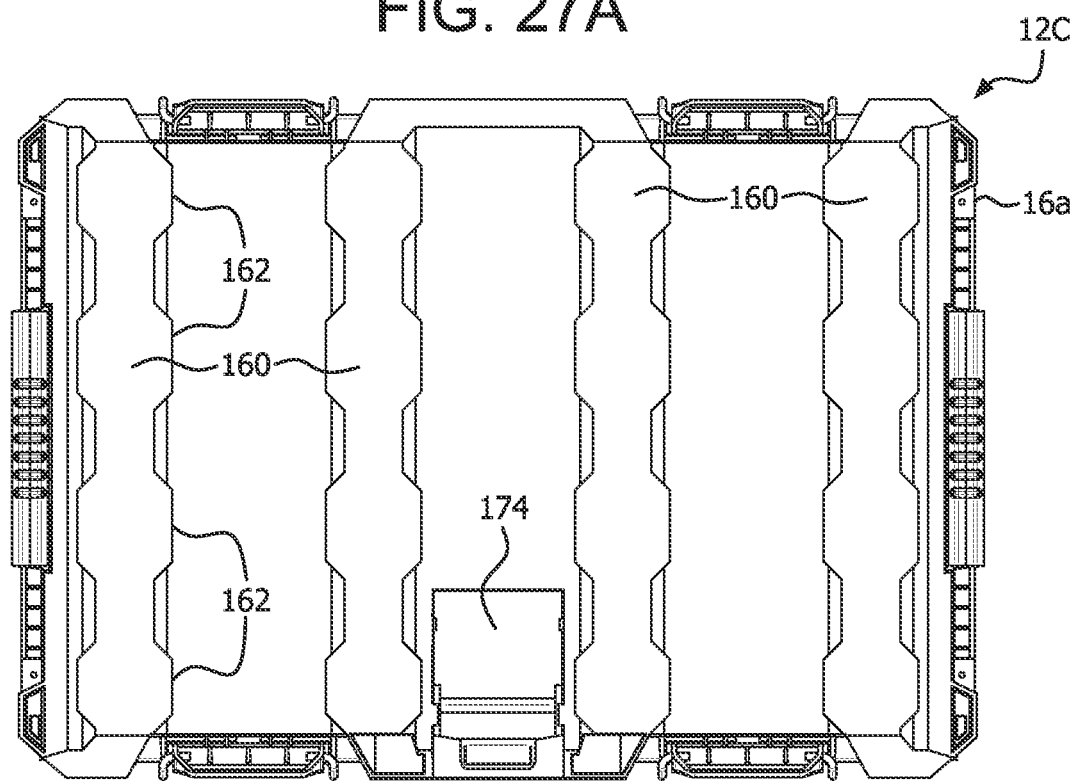

The respective box-to-box connection system components will now be described with reference to FIGS. 27A through 27F and described with respect to two stacked large storage boxes 12*ci* and 12*c*2 by way of an example. FIGS. 27A and 27B are, respectively, top and bottom views of a large storage box 12 having a box-to-box connection system 150 in accordance with an example embodiment. The box-to-box connection system components provided on a top surface 14*a* of a box 12*c* comprise channels 156 and a receptacle 168 for a locking cleat member 174. The box-to-box connection system components provided on a bottom surface 16*a* of the box 12*c* comprise guides 160 configured to be received in the channels 156 and the locking cleat member 174. As shown in the FIGS. 27A through 27F, the channels 156 and guides 160 extend along an entire dimension of the box 12 (e.g., the width dimension of box 12*c*) and the channels 156 are open on their respective ends. It is to be understood that the channels 156 and guides 160 can extend along an entire length dimension of a box 12, depending on the type of box 12 and its intended orientation relative to other boxes in a stacked configuration of a storage system 10. The channels 156 and guides 160 extend continuously along the width dimension of the box 12*c*. In other words, the side walls of each channel 160 are continuous and extend along a width or length dimension of a box 12, and the respective ends of the channel 160 are open for self-clearing of any debris. The guide 156 can be a unitary raised member extending from a bottom surface 16*a* of a box 12 along a width or length dimension of a box 12. This continuity of the channels 156 and guides facilitates alignment and registration of two boxes 12 relative to each other by the user for stacking purposes.

Figure 27C:
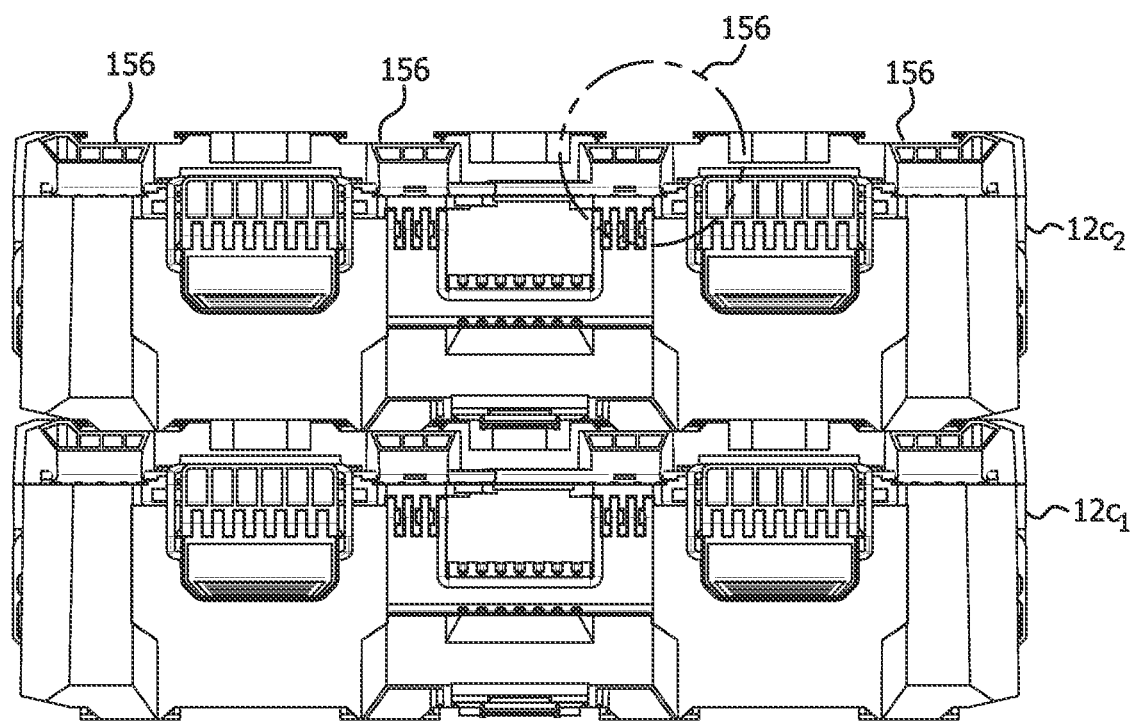
FIGS. 27C and 27D are, respectively, a front view of two stacked and interconnected storage boxes using a box-to-box connection system in accordance with an example embodiment, and a partial enlarged cross-section view of a box-to-box connection system component provided on a top surface of a storage box, in accordance with an example embodiment.
Figure 27D:
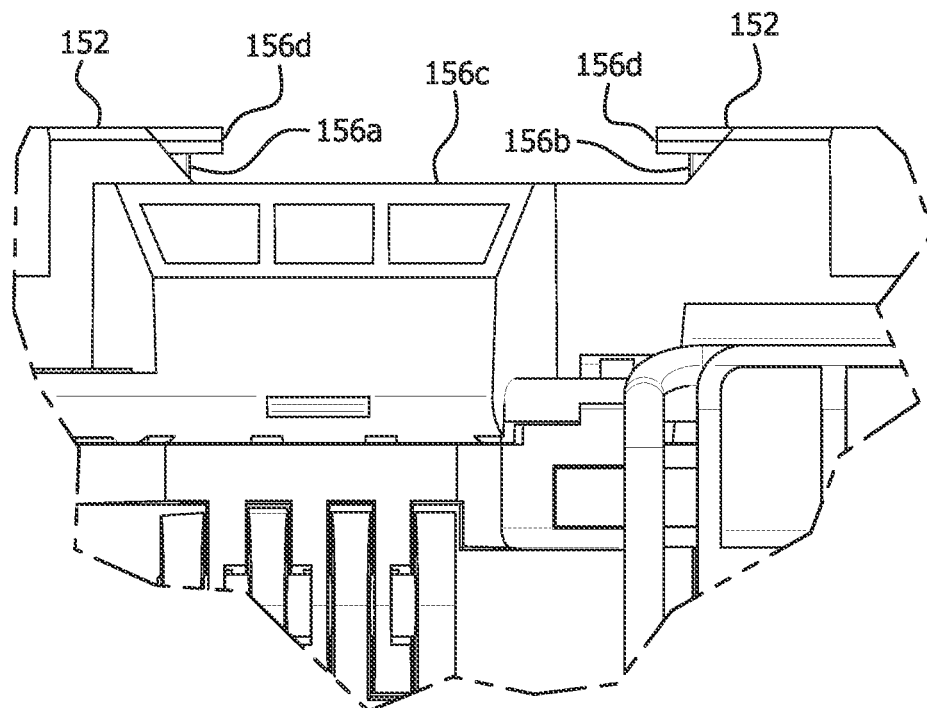
Figure 27E:
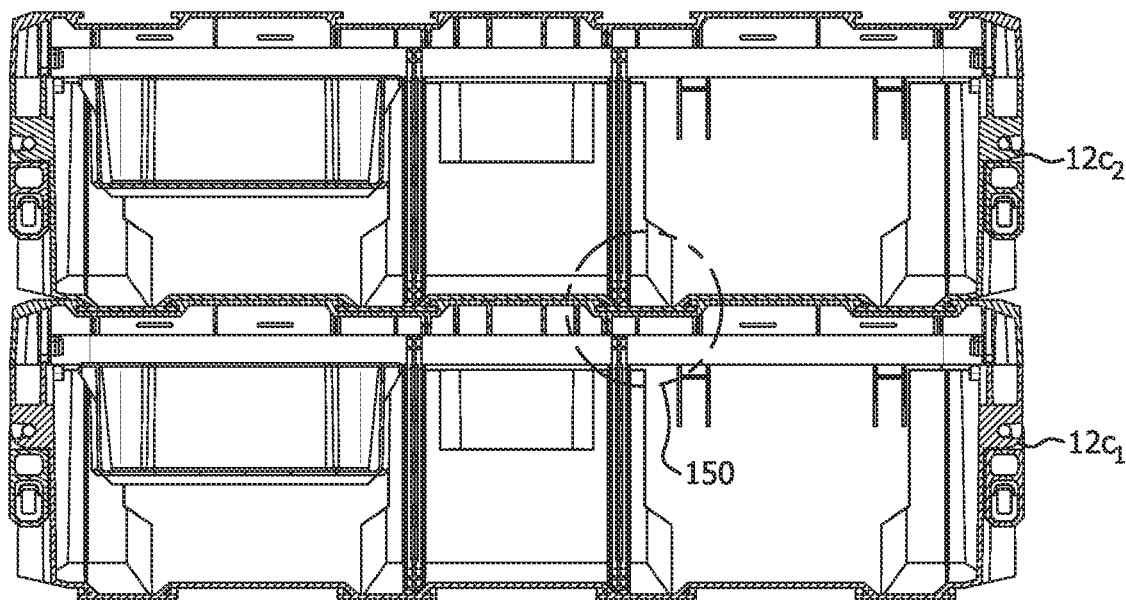
FIGS. 27E and 27F are, respectively, a cross-section view of the two stacked and interconnected storage boxes in FIGS. 27C and 27D, and a partial enlarged cross-section view of a box-to-box connection system component provided on a bottom surface of top storage box engaged with a box-to-box connection system component provided on a top surface of a bottom storage box, in accordance with an example embodiment.
Figure 27F:
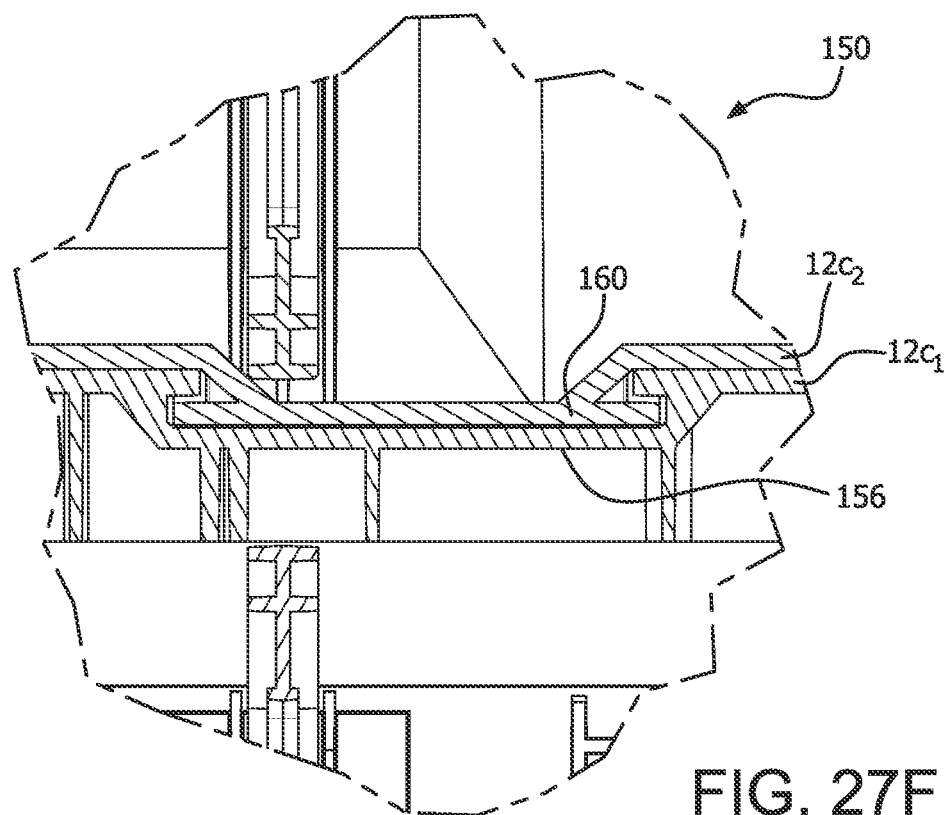
Figure 28A:
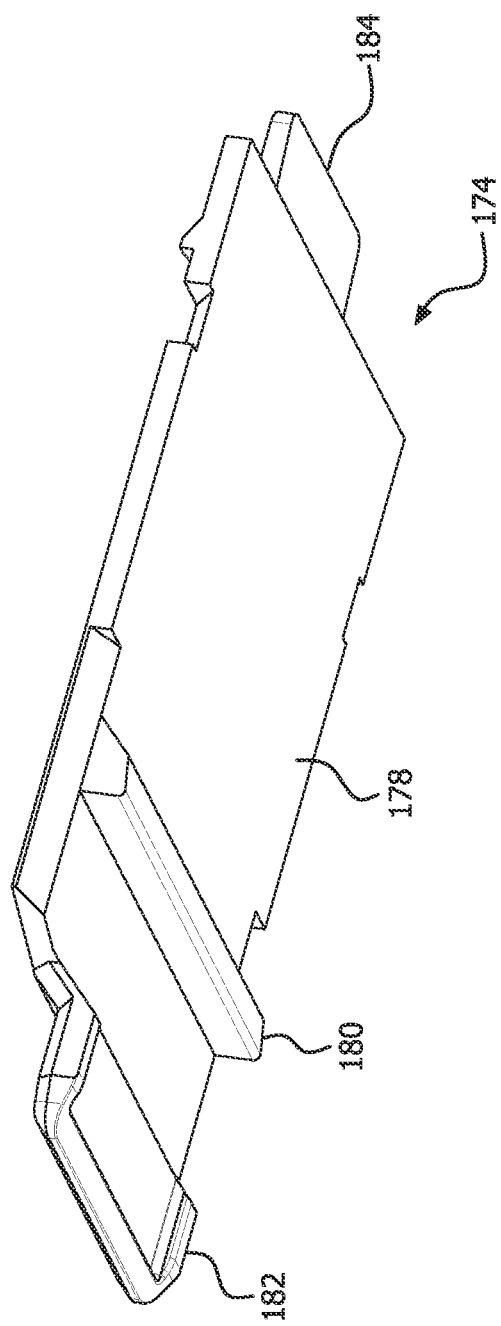
FIGS. 28A, 28B, 28C, 28D, 28E, 28F and 28G are perspective, top, bottom, left, right, back and front views, respectively, of a locking cleat member in accordance with an example embodiment.
Figure 28B:
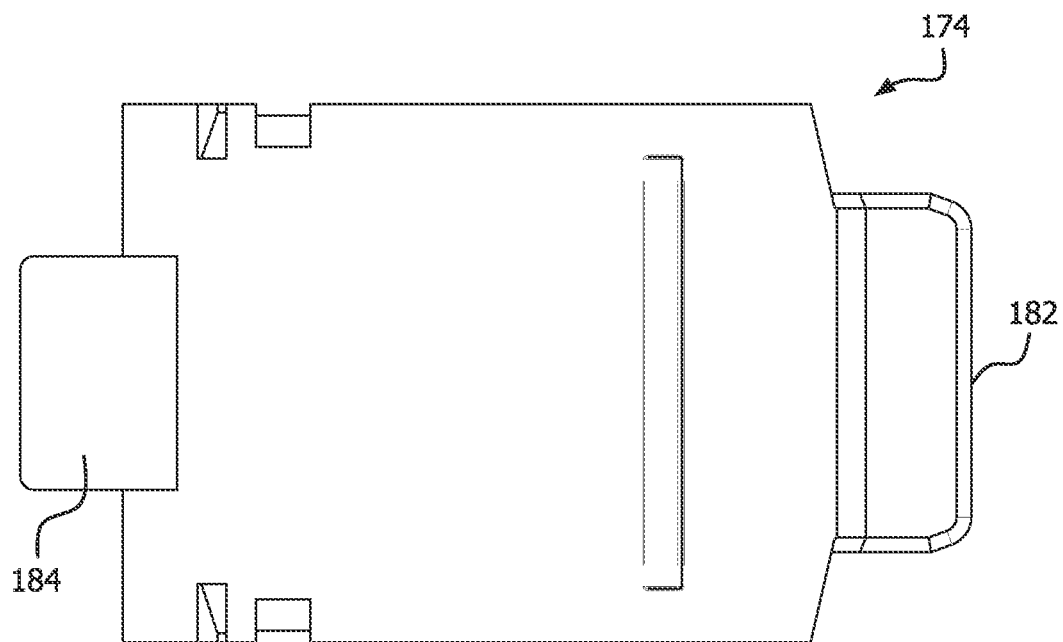
Figure 28C:
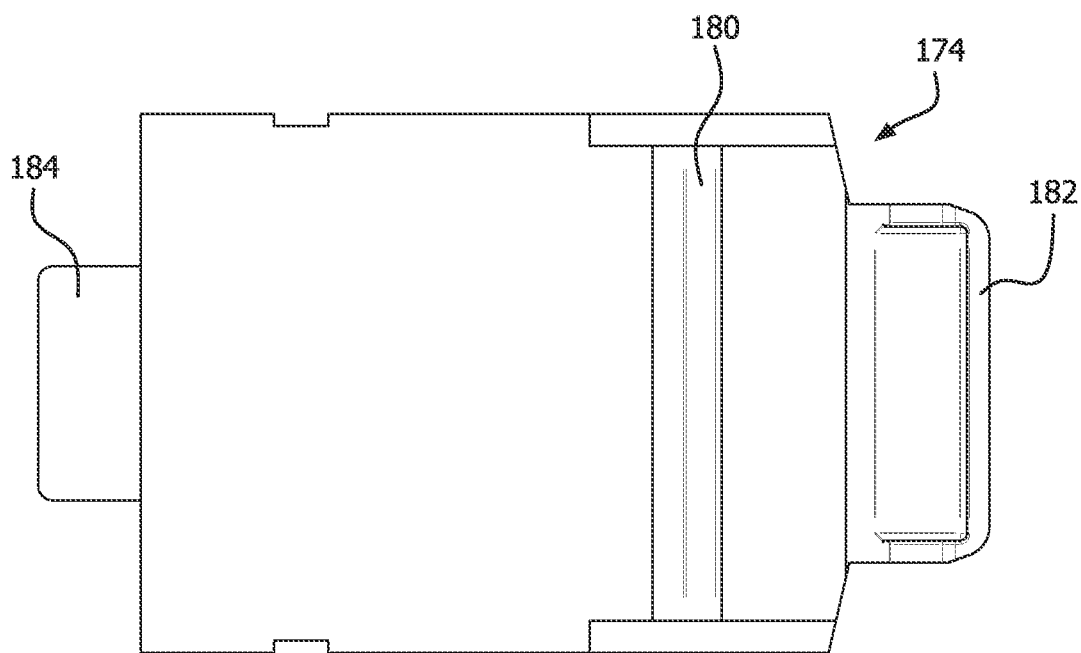
Figure 28D:
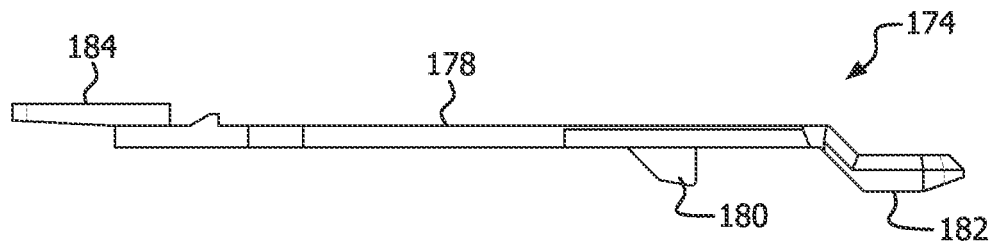
Figure 28E:
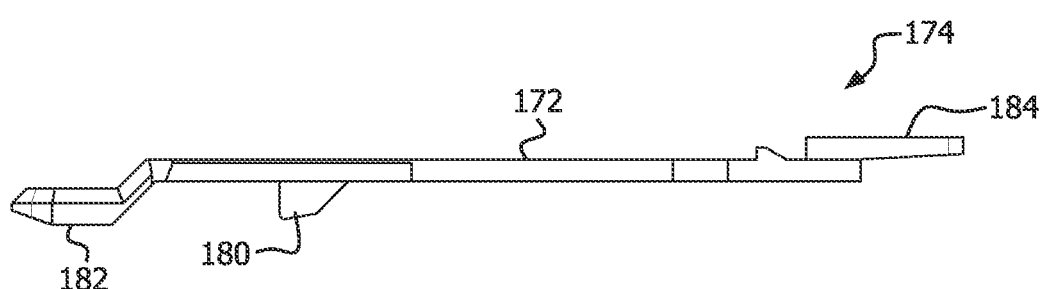
Figure 28F:
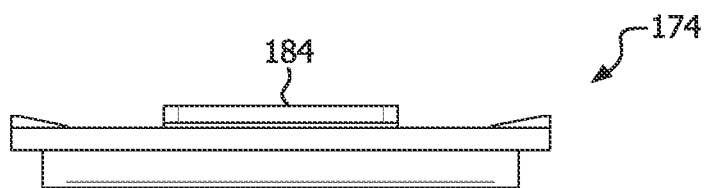
Figure 28G:
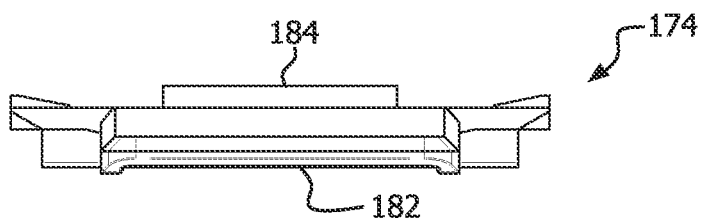

FIGS. 27C and 27D are, respectively, a front view of the two stacked and interconnected storage boxes 12*ci* and 12*c*2, and a partial enlarged cross-section view of an example channel 160 in accordance with an illustrative embodiment. The channel 160 is formed as a cavity in the top surface 14*a* of the box 12 and comprises side walls 156*a*, 156*b* and a bottom 156*c*. A top edge 156*d* of the side walls 156*a*, 156*b* partially extends over channel cavity. FIGS. 27E and 27F are, respectively, a cross-section view of the two stacked and interconnected storage boxes 12*ci* and 12*c*2, and a partial enlarged cross-section view of the guide 160 on the bottom surface 16*a* of top storage box 12*c*2 engaged with the channel 156 provided on the top surface 14*a* of the bottom storage box 12*ci*. The connection system components 156 and 160 on the boxes 12*ci* and 12*c*2 are essentially level and therefore encourage the boxes 12*ci* and 12*c*2 to be level when stacked and the guides and channels are engaged.

As illustrated in FIGS. 27A and 27B, the channels 158 can be provided with a plurality of notches 158 in the top edges 156*d*. The guides 160 can each have tabs 162 extending therefrom in a lateral direction. The tabs 162 are configured to be aligned with the notches 158 for insertion of a guide 160 into a channel 156, and be misaligned with respect to the notches 158 such that portion(s) of a channel edge 156*d* where there is no notch 158 provide a surface to prevent the guide 160 from being lifted out of the channel 156. The guide tabs 162 and the channel notches 158 do not interfere with the versatility of the front to back and back to front engagement afforded by the box-to-box connection system 150. The arrangement of the channel notches 158 and the guide tabs 162 permits a box 12 to be placed at different points along the top of another box 12 to find notch 158 and tab 162 alignment for insertion of a guide 160 into a channel 156 at various points, obviating the need to commence feeding guides 160 of a box 12 into channels 156 of another box from the front and rear edges of the boxes 12, respectively. Thus, the alignment of boxes 12 for stacking is easy and fast for the user. The extension of the channels 156 along a length or width dimension of a box 12 (e.g., front to back) presents essentially open cavities that discourage debris from collecting on the top surface 14*a* of a Box. The corresponding extension the guides 160 along a length or width dimension of a box 12 likewise discourages debris from collecting on the bottom surface 16*a* of a box 12. The channels 156 and guides 160 are therefore advantageous over other box-to-box connection systems that employ recesses which are prone to collecting debris and becoming clogged and therefore less able to interconnect with components on another box.

Where the direction of the channels 156 and guides 160 is considered, for example, as a longitudinal direction, then cooperation between complementary channels 156 and guides 160 between two stacked boxes 12 prevents latitudinal movement relative to the longitudinal direction of the channels 156 and guides 160. In accordance with another aspect of the box-to-box connection system 150, an integrative locking system 166 is provided that releasably prevents longitudinal movement (e.g., front to back relative movement of the stacked boxes 12*ci* and 12*c*2 in FIGS. 27C through 27F), whereby a locking cleat 174 on the bottom surface 16*a* of a top box 12 extends downwardly to releasably cooperate with a receptacle 168 on the top surface 14*a* of a bottom box 12, as shown in FIGS. 27A and 27B.

Figure 29A:
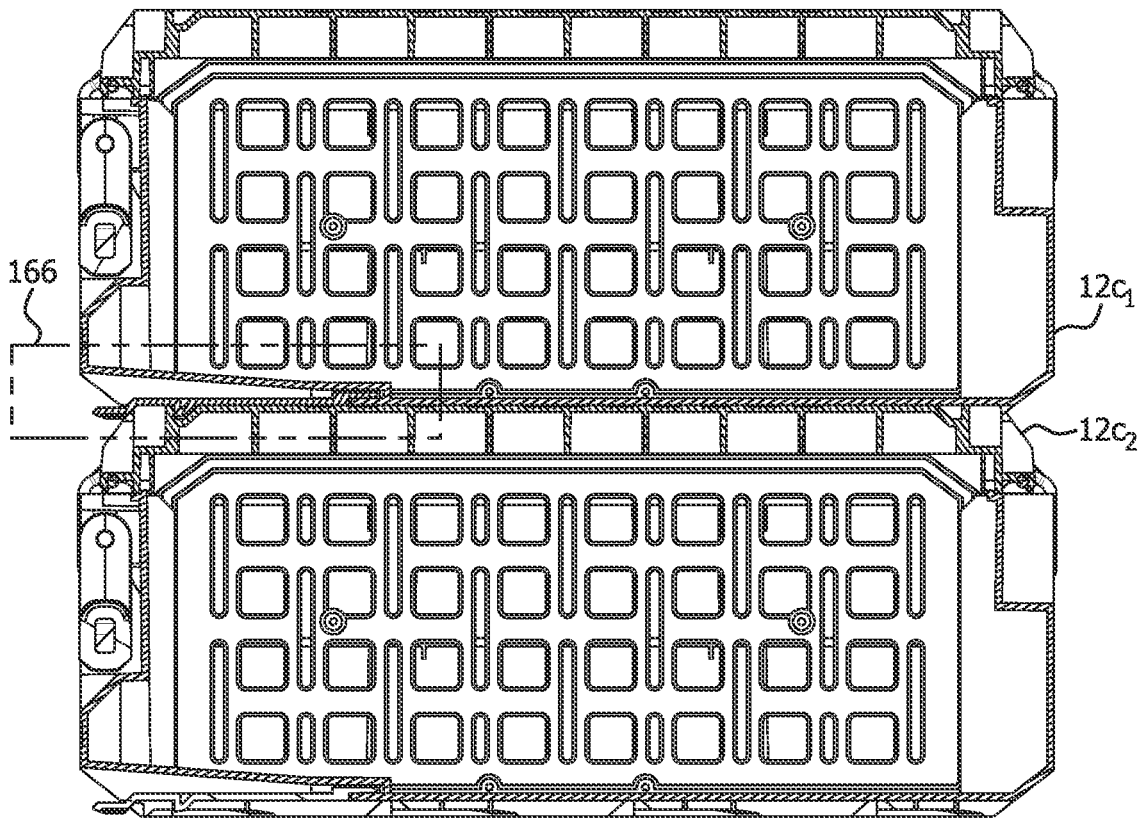
FIG. 29A is a cross-section view of the two stacked and interconnected storage boxes in FIGS. 27C and 27D, and FIGS. 29B and 29C are partial enlarged cross-section views of an integrative locking system, in accordance with an example embodiment.
Figure 29B:
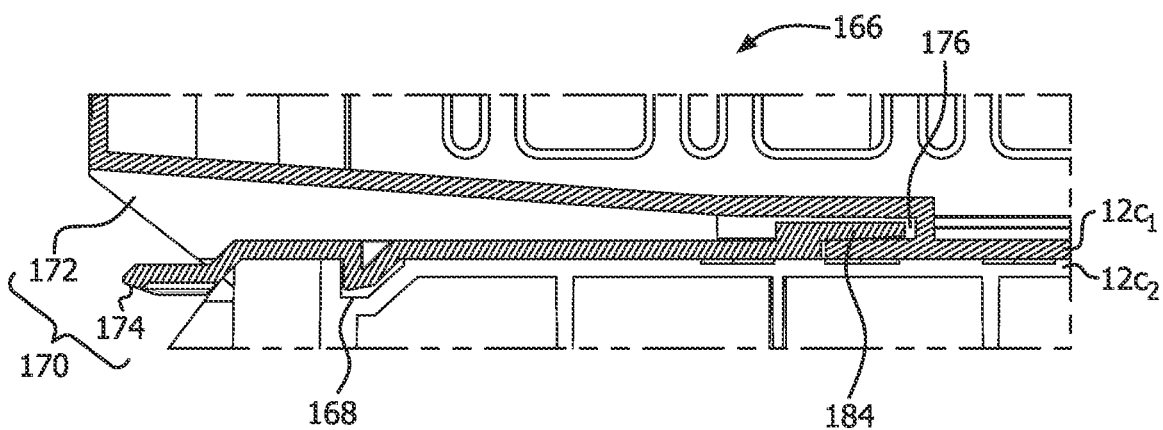
Figure 29C:
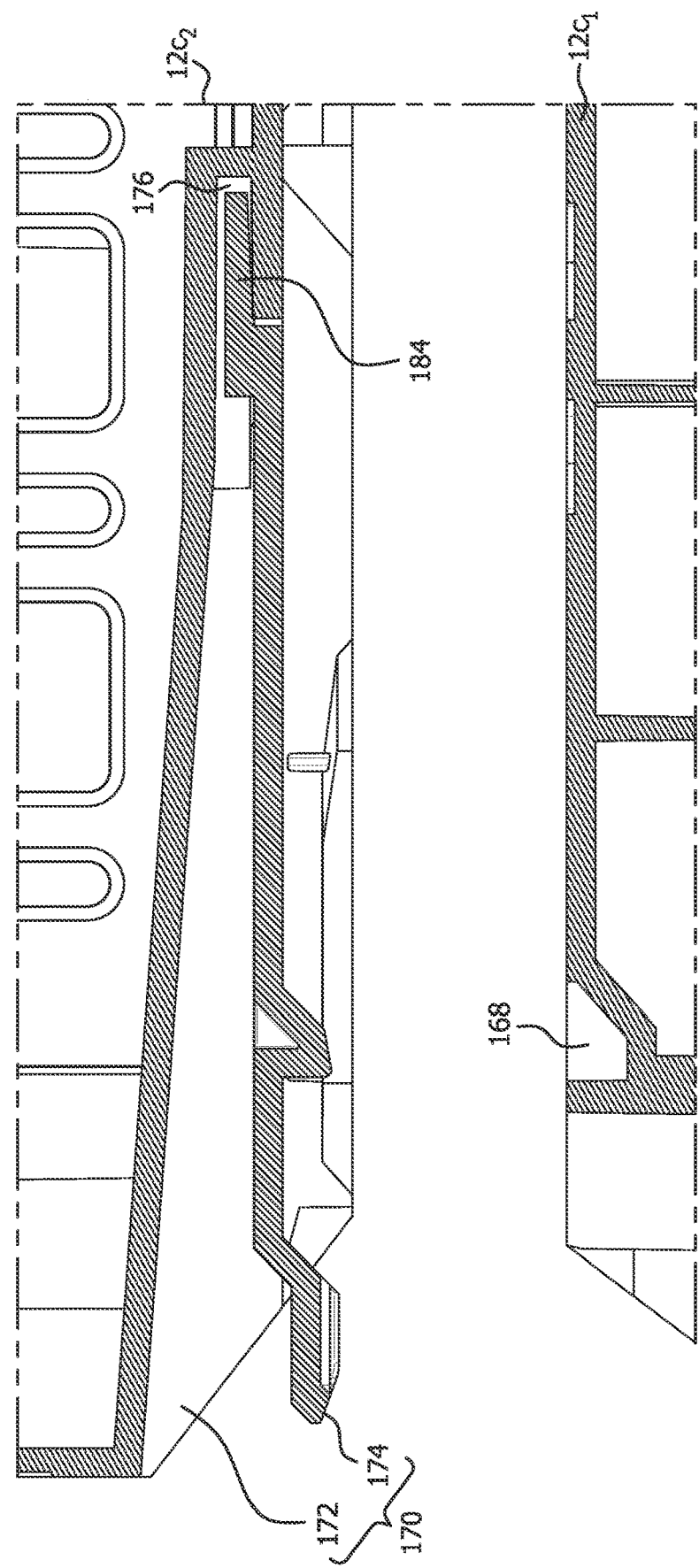

FIGS. 28A, 28B, 28C, 28D, 28E, 28F and 28G are perspective, top, bottom, left, right, back and front views, respectively, of a locking cleat member 174 in accordance with an example embodiment. FIG. 29A is a cross-section view of the two stacked and interconnected storage boxes 12*ci* and 12*c*2 in FIGS. 27C and 27D, and FIGS. 29B and 29C are partial enlarged cross-section views of an integrative locking system 166 implemented in the interconnected storage boxes 12*ci* and 12*c*2 in accordance with an example embodiment.

The integrative locking system 166 comprises a receptacle 168 provided on a top surface 14*a* of a bottom box 12, and a locking cleat member 174 provided on a bottom surface 16*a* of a top box 12. The receptacle 168 can be, for example, a depression molded into the rim or periphery of the top surface of 14*a* and dimensioned to receive a cleat 180 in a locking cleat assembly 170 that is releasable, for example, locking cleat member 174 is manually pivoted by a user. An example locking cleat assembly 170 comprises graduated depression 172 in the bottom surface 16a of top box 12c2 dimensioned to receive the locking cleat member 174 that has narrow end toward box 12 interior and wider end toward box exterior side wall. The molding of the box 12 to form the graduated depression 172 can result in corresponding raised portion in the interior surface 16b of the box 12. The graduated depression has a U-channel 176 at the narrow end which is dimensioned to receive an anchor member 184 of the locking cleat member 174. The locking cleat member 174 further comprises a flat member 178 that is dimensioned to anchor one end thereof in the graduated depression 172 via the anchor member 184 and have a finger hold member 182 that extends from side wall of the top box but not outside perimeter boundaries of the stacked boxes 12ci and 12c2. For example, the top and bottom portions 14 and 16 of the boxes have recesses in their side walls (e.g., one of 13c-13f) so that the finger hold member 182 extends from the graduated depression 172 and is accessible by a user but does not extend beyond perimeter of boxes 12 defined by thicker areas 32 of their side walls.

As stated above, a cleat 180 extends from the flat member 178 and is dimensioned to be snug fit into the receptacle 168 when the top box guides 160 slide along the channels 156 of the bottom box sufficiently to align the locking cleat 180 on the top box over the receptacle 168 in the bottom box. The boxes 12 are configured to have receptacles 168 on one or both opposing ends of their top surface 14a in the longitudinal direction of the channels 156. Multiple receptacles 168 can be provided as shown in FIG. 27A to allow the locking cleat members of multiple boxes 12 to be engaged with receptacles 168 when more than one other box is stacked on the box 12. When a user applies manual finger pressure on the finger hold member 132 of a locking cleat member 174 on a top box (e.g., box 12c1), the flat member 178 pivots (and can flex based on its material) toward the top of the graduated depression 172 in the top box 12ci, causing the cleat 180 to disengage from the receptacle 168 and allowing the top box (e.g., box 12c2) to translate longitudinally relative to the corresponding channel 156 in the bottom box (e.g., box 12c1).

The locking cleat member 174 and receptacle 168 in bottom and top portions 16 and 14 of two stacked, respectively, do not allow a stacked box to be removed from the other box without manually releasing the cleat 180 from the receptacle 168. The locking cleat member 174 has a low profile and is easy to access by the user with only one hand to release the cleat 180 from the receptacle 168, yet does not interfere with other box features such as latches 28 or a handle 38 and is protected from accidental contact by other objects that could result in unintended release of the cleat 180 from the receptacle 168. In accordance with another advantageous feature of the example box-to-box connection system 150, a user can operate a latch(es) 28 to open the lid portion 14 of a box 12 (e.g., box 12ci) to access its contents while having another box (e.g., box 12c2) stacked thereon.

Wall Mount System 200

Figure 30:
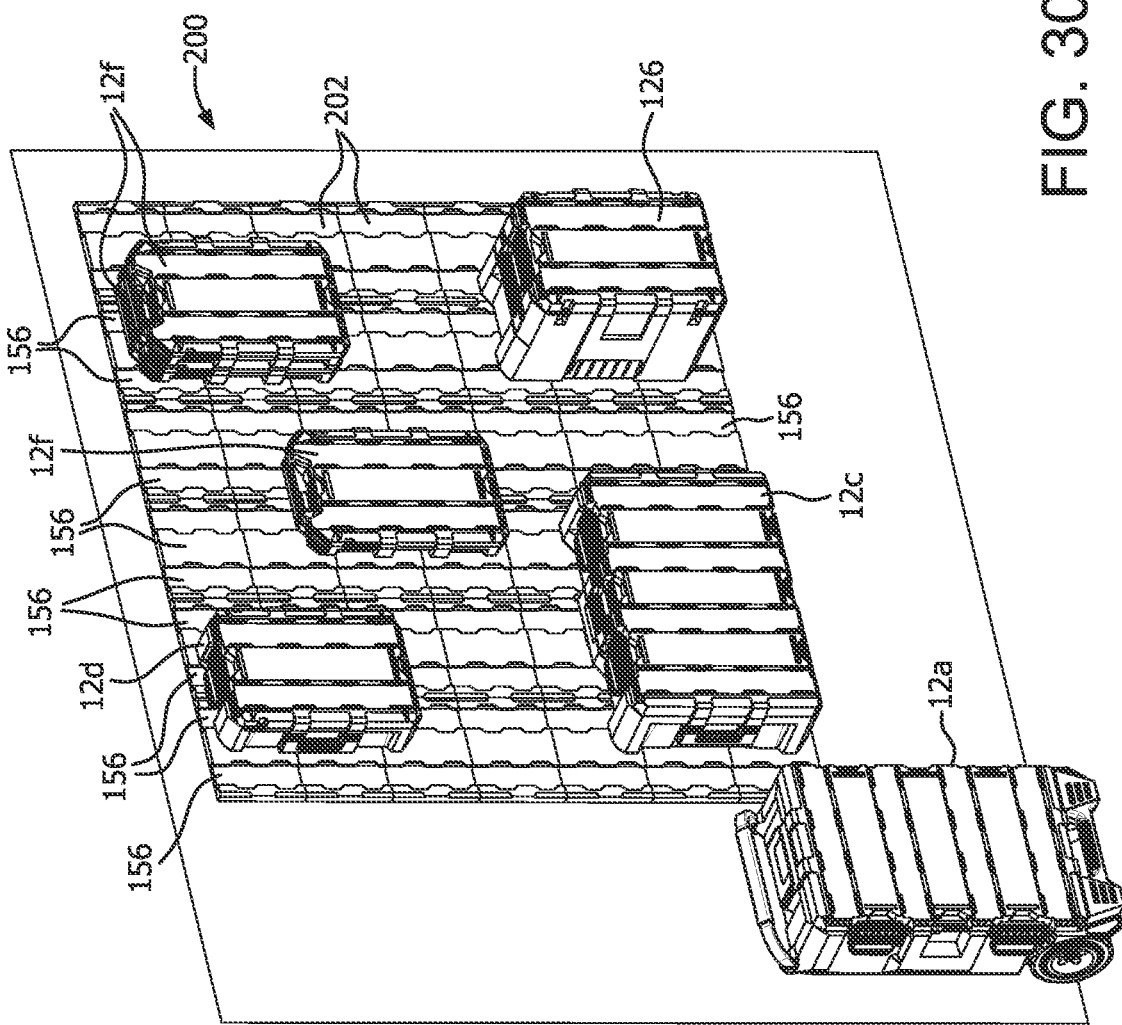
FIG. 30 is a perspective view of a wall mount system for storage boxes in accordance with an example embodiment.

Features of the above-described example box-to-box connection system 150 can be advantageously incorporated into various wall mount systems for vertically storing boxes 12 in the modular storage system on a wall at a home or base location when not stacked on a rolling base box 12a for transport to another site, for example. FIG. 30 is a perspective view of a wall mount system 200 for storage boxes 12 in accordance with an example embodiment. The wall mount system 200 comprises panels 202 each having channels 156 as described above. The panels 202 are arranged and secured (e.g., by conventional means such as by wall anchors and fasteners) to a wall in a grid pattern such that their respective channels 156 together form continuous channels 156 across a vertical dimension, for example, of the grid pattern. The panel channels 156 cooperate with guides 160 on bottoms of various boxes 12. For example, the wall mount system 200 in FIG. 30 accommodates a large storage box 12c, a portable storage box 12b, a medium storage box 12d, and two low profile organizers 12f One of the low profile organizers 12f connected to the wall mount system 200 has another low profile organizers 12f stacked on its top surface 14a. The panels 202 can be provided with one or more receptacles 168 that can cooperate with a locking cleat member 174 of a box 12, and/or another box brace component or accessory that can be fixed or removably attachable to the panels 202 or the boxes to support the boxes 12 against the wall.

Figure 31B:
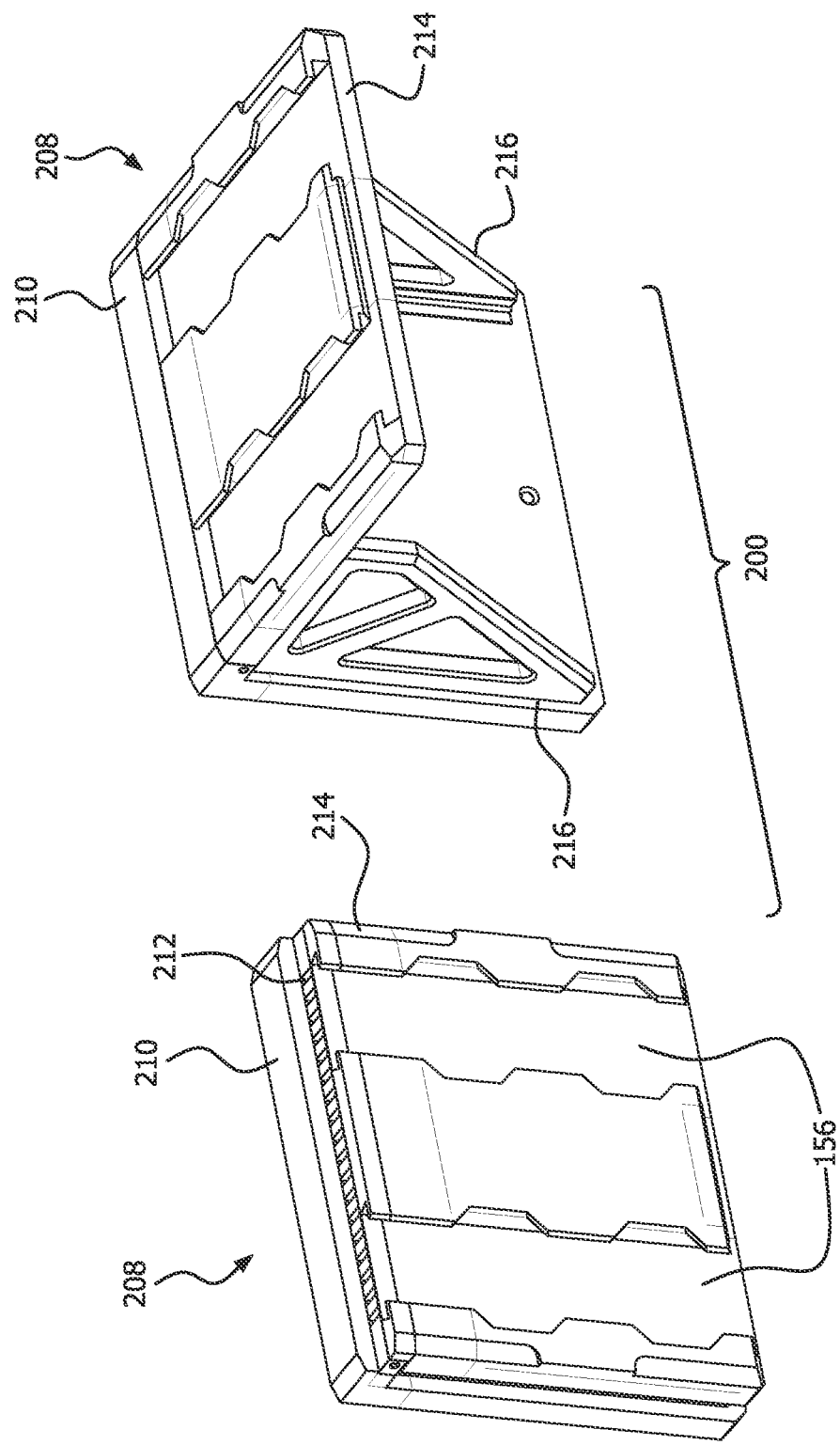
FIGS. 31B and 31C are perspective views of example folding shelves for the wall mount system of FIG. 31A.
Figure 31C:
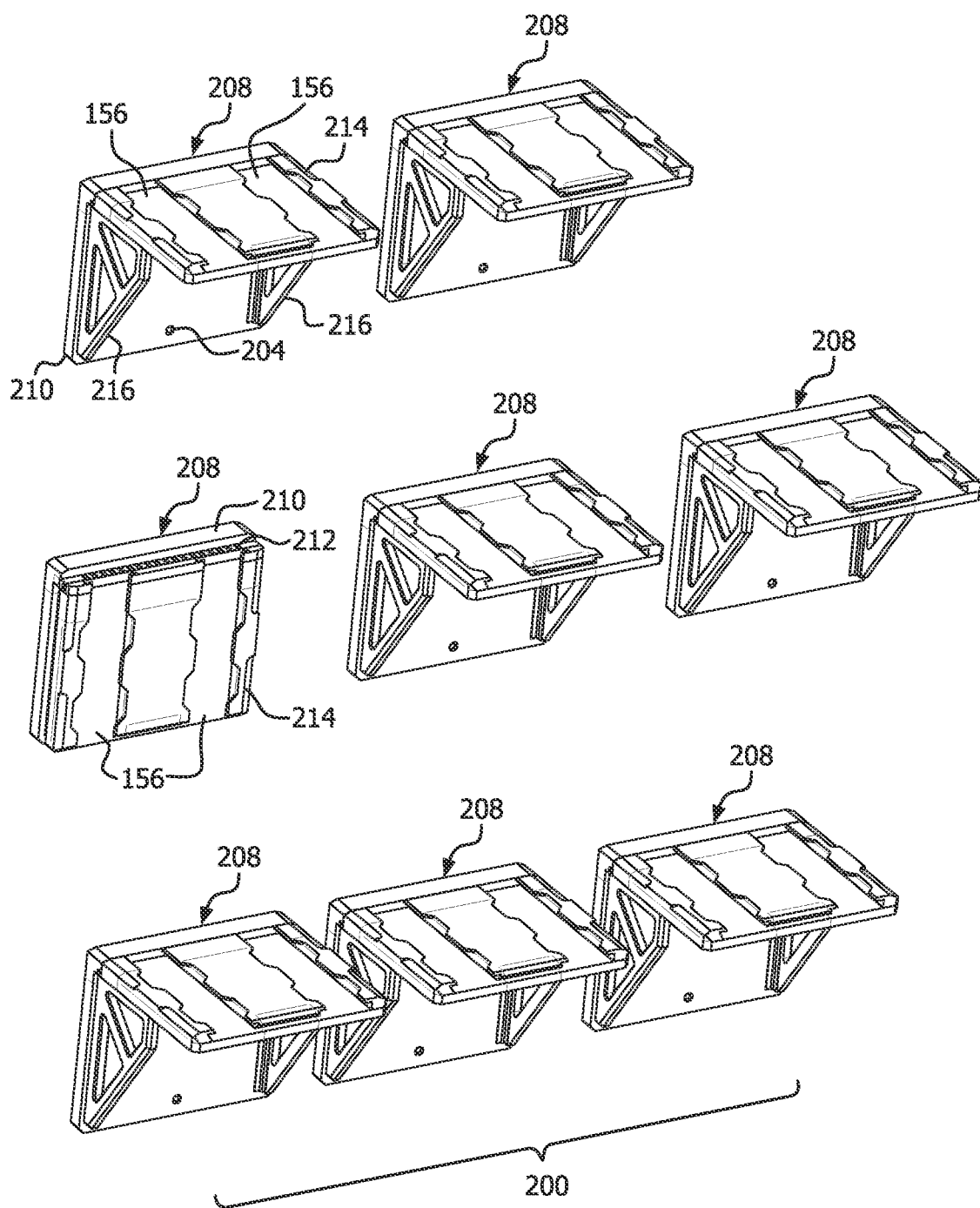
Figure 32A:
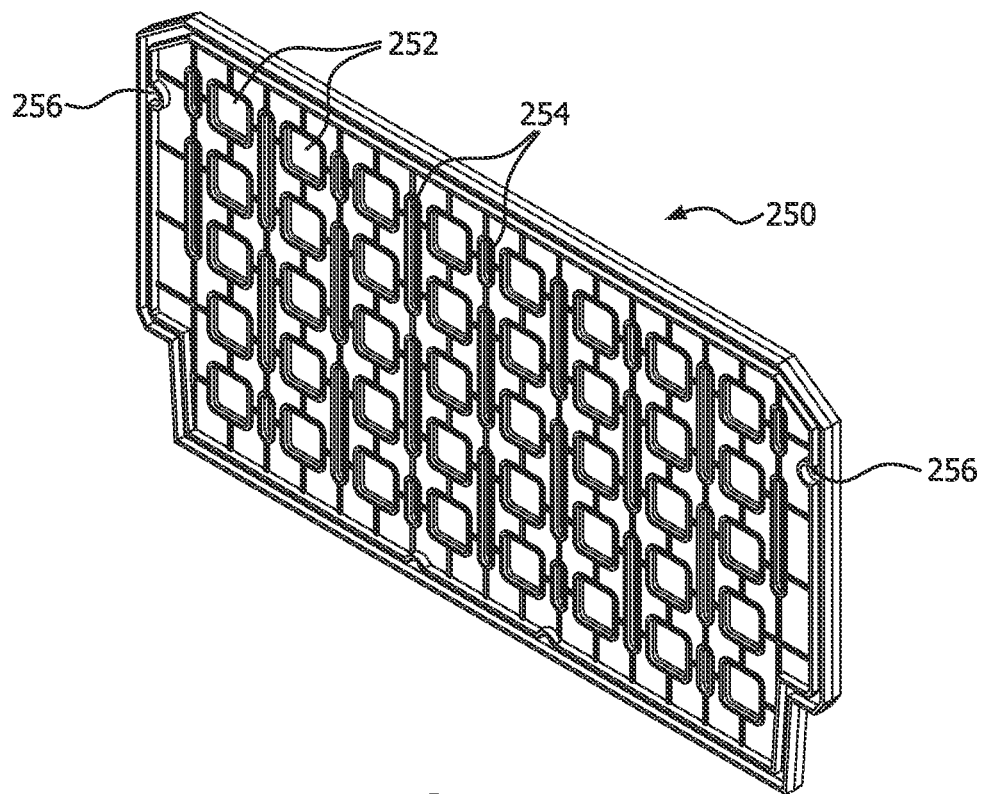
FIGS. 32A and 32B are perspective and front views, respectively, of a divider for a rolling base box constructed in accordance with an example embodiment.
Figure 32B:
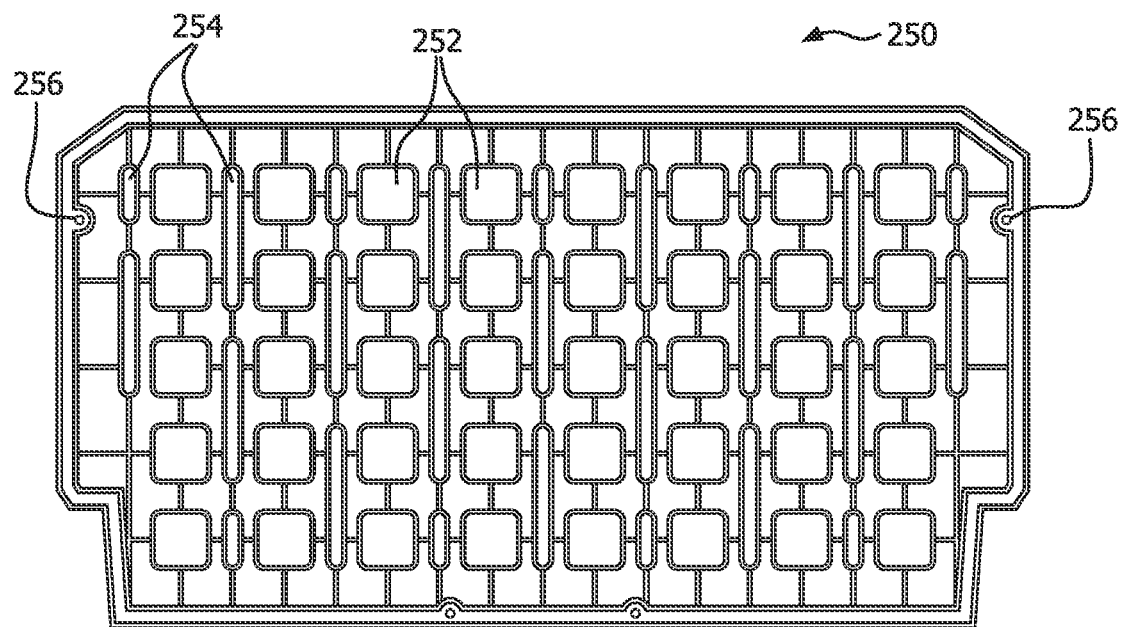

FIG. 31A is a perspective view of a wall mount system 200 for storage boxes in accordance with another example embodiment wherein one or more of a folding shelf assembly 208 is secured to a wall (e.g., by conventional means such as by wall anchors and fasteners). For example, a panels 202 and a folding shelf assembly 208 can be provided with one or more fastener holes 204 as illustrated in FIG. 31B to receive a fastener screwed or otherwise inserted into the wall. In contrast to the panels 202 in the wall mount system 200 in FIG. 30, the folding shelf assembly 208 in the wall mount system 200 shown in FIG. 31A can be mounted spaced apart from other folding shelf assemblies 208, or can be secured side by side on the wall to support the same box such as a large storage box 12c. The folding shelf assembly 208 comprises a mounting portion 210 that is secured to a wall, a shelf 214 with channels 156, a hinge 212 that pivotably connects the shelf 214 to the mounting portion 210, and folding brackets 216. The brackets 216 can be folded flat against mounting portion 210 when the folding shelf assembly 208 is folded or closed, and can be pivoted away from the mounting portion 210 when the folding shelf assembly 208 is unfolded or opened. FIGS. 31B and 31C are perspective views of different arrangements of example folding shelf assemblies 208 with at least one folding shelf assembly 208 folded and at least one folding shelf assembly 208 unfolded for example. An advantage of the wall mount system 200 in FIG. 31A over the wall mount system 200 in FIG. 30 is that the folding shelf assemblies 208 allow a user to open or remove a box lid 14 and access the contents of the box 12 without the contents falling out of the box while it is in storage in the wall mount system.

Figure 104:
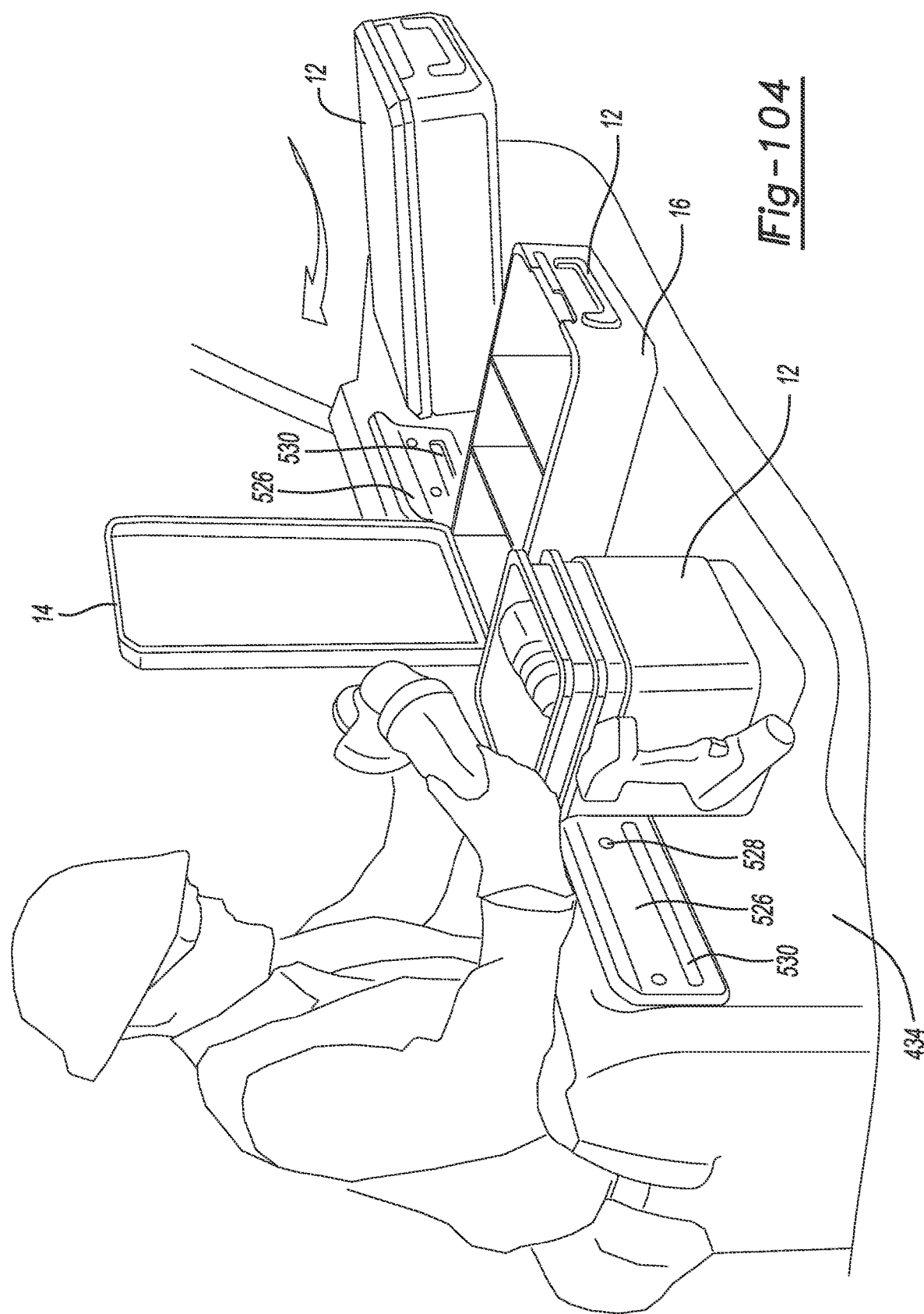

In accordance with another embodiment, a cleated mount bar 526 can be provided for mounting on the sides of a truck bed 434 as shown in FIG. 104. The cleated mount bar 526 can be a unitary piece dimensioned to extend along most sizes of truck beds 434 or consist of small panels that can be connected side by side. The cleated mount bar 526 is secured to the side of a truck bed 434 or other vertical surface in a conventional manner as indicated by the fastener receptacles 528. The cleated mount bar 526 comprises a cleat receptacle 530 that engages a feature on a box to releasable connect the box 12 to the cleated mount bar 526. For example, a box 12 can have an integral or removably mounted accessory with a cleat configured to releasably engage the cleat receptacle 530. For example, an angled cleat on a box 12 can be inserted into the cleat receptacle 530 by initially tilting the free end of box 12 upwardly relative to the cleat receptacle 530 such that when the box is levelized, the cleat engages a retaining edge at the top of the cleat receptacle 530.

Internal Organization Features of Boxes 12

The boxes 12 of the modular storage system 10 are provided with different advantageous features and accessories for internal organization of boxes 12 to facilitate versatile and convenient customization of the boxes 12 to suit different users' individual needs. Example features and accessories are described below with respect to different sizes of boxes using the boxes 12a through 12f as examples. It is to be understood that the features and accessories for internal organization of boxes 12 in accordance with the example embodiments of the present disclosure are not limited to the boxes 12a through 12f or the specific implementations of the features and accessories shown in the drawing figures of the present disclosure.

Figure 33A:
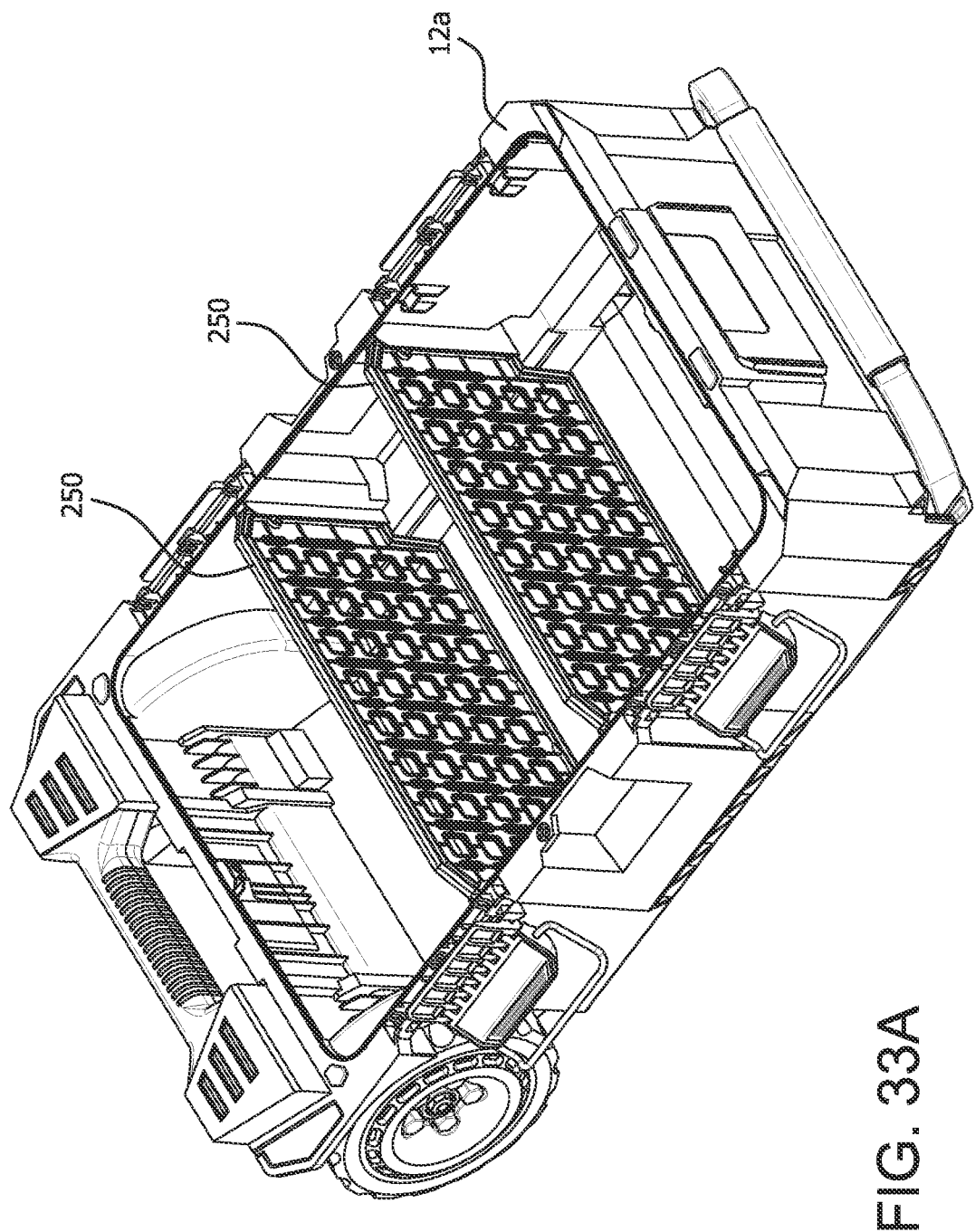
FIGS. 33A and 33B are perspective views of the dividers of FIGS. 32A and 32B inserted into and removed from the rolling base box, respectively, in accordance with an example embodiment.
Figure 33B:
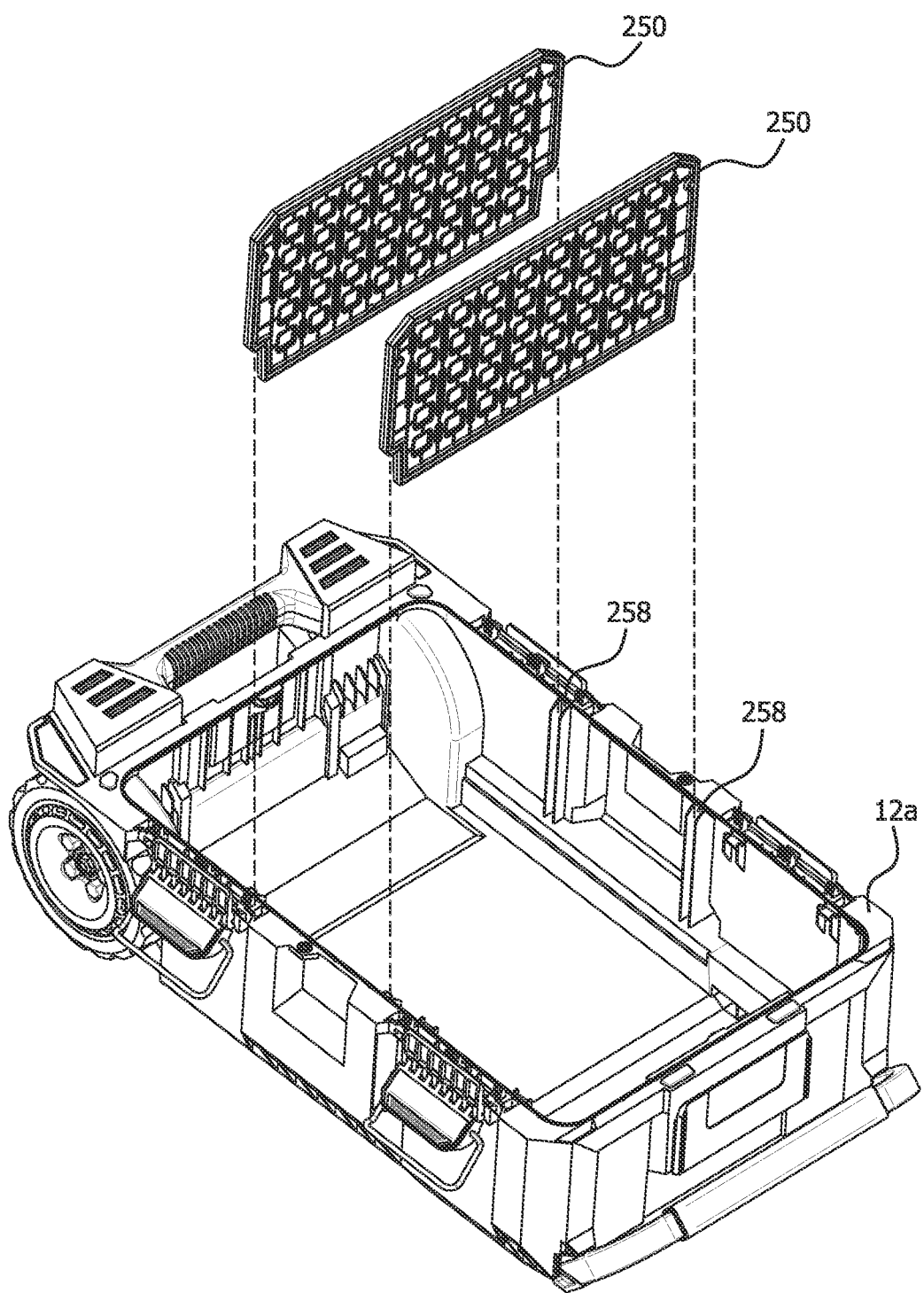

In accordance with an example embodiment, a rolling base box 12a can be provided with one or more internal dividers 250 as shown in FIGS. 32A and 32B, and FIGS. 33A and 33B. The dividers 250 can have a thickness, for example, on the order of 0.4-0.5 inches (in), length dimensions designed to fit the divider snugly between two opposite side walls 16e, 16f, and height dimensions to optionally rest against an interior surface 16b of the bottom portion 16 of the box 12a and/or an interior surface 14b of the top portion 14 of the box 12a, to divide the inner volume or storage compartment 18 of the box into smaller portions to organize items and separate them from each other within the respective smaller portions of the compartment 18. For example, the height of the divider 250 can be selected to abut both inner surfaces 14b, 16b of the top and bottom portions 14, 16 of the box 12a to prevent items in one portion from entering another portion from intended or unintended box motion (e.g., during box transport, or a disturbance of the box when stored or otherwise intended to be stationary). The edges and corners of the divider 250 can be shaped to cooperate with contours within the box 12a. As shown in FIGS. 33A and 33B, a rolling base box 12a can have one or more slots 258 dimensioned to receive the thickness of the divider 250 in a snap-fit configuration for manual insertion and removal of the divider 250 into and from the slot 258.

Figure 68:
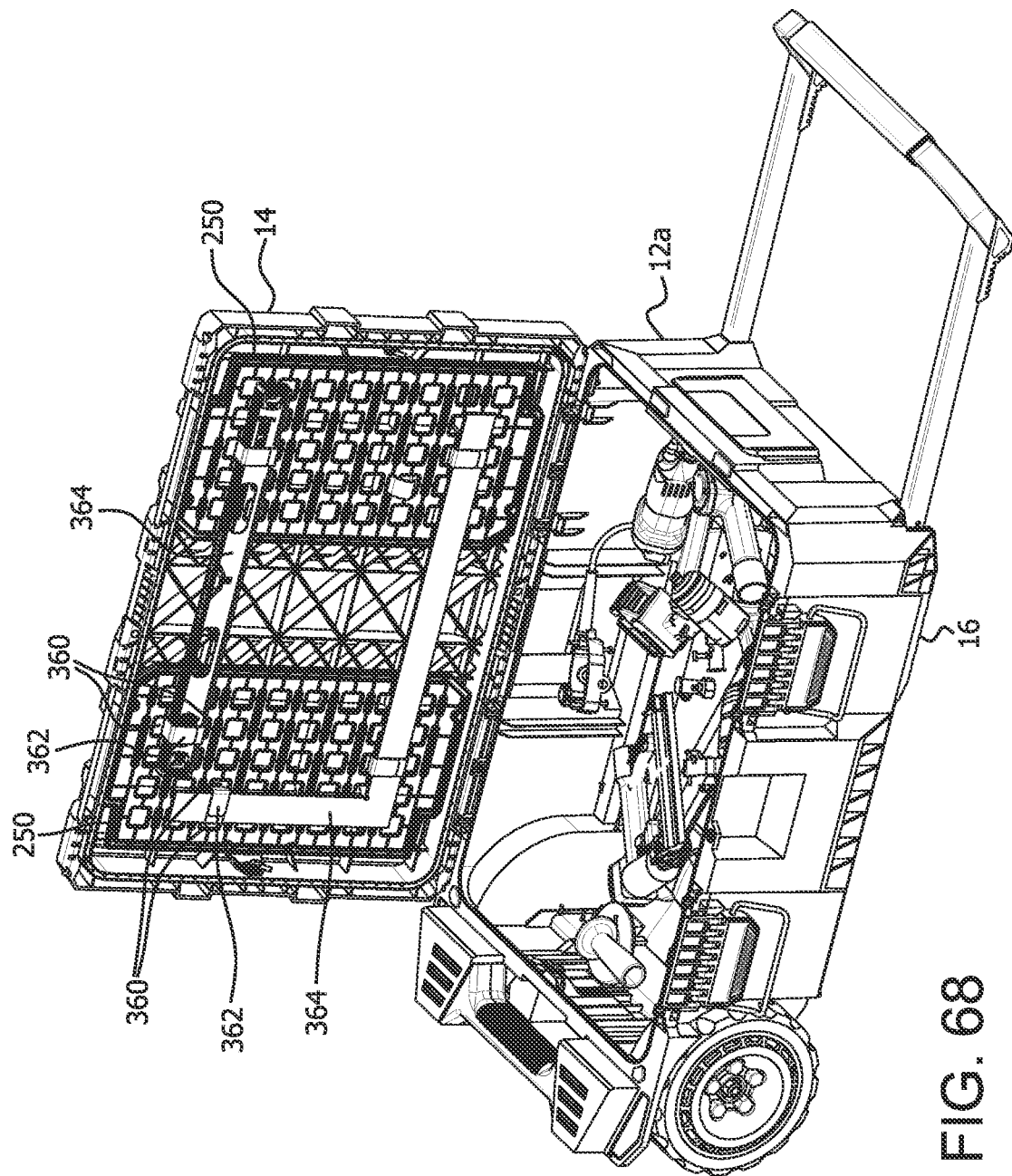
FIG. 68 is a perspective view of a lid on a rolling base unit that is configured to have dividers affixed to the lid and items affixed to the dividers for lid storage in accordance with an example embodiment.
Figure 69:
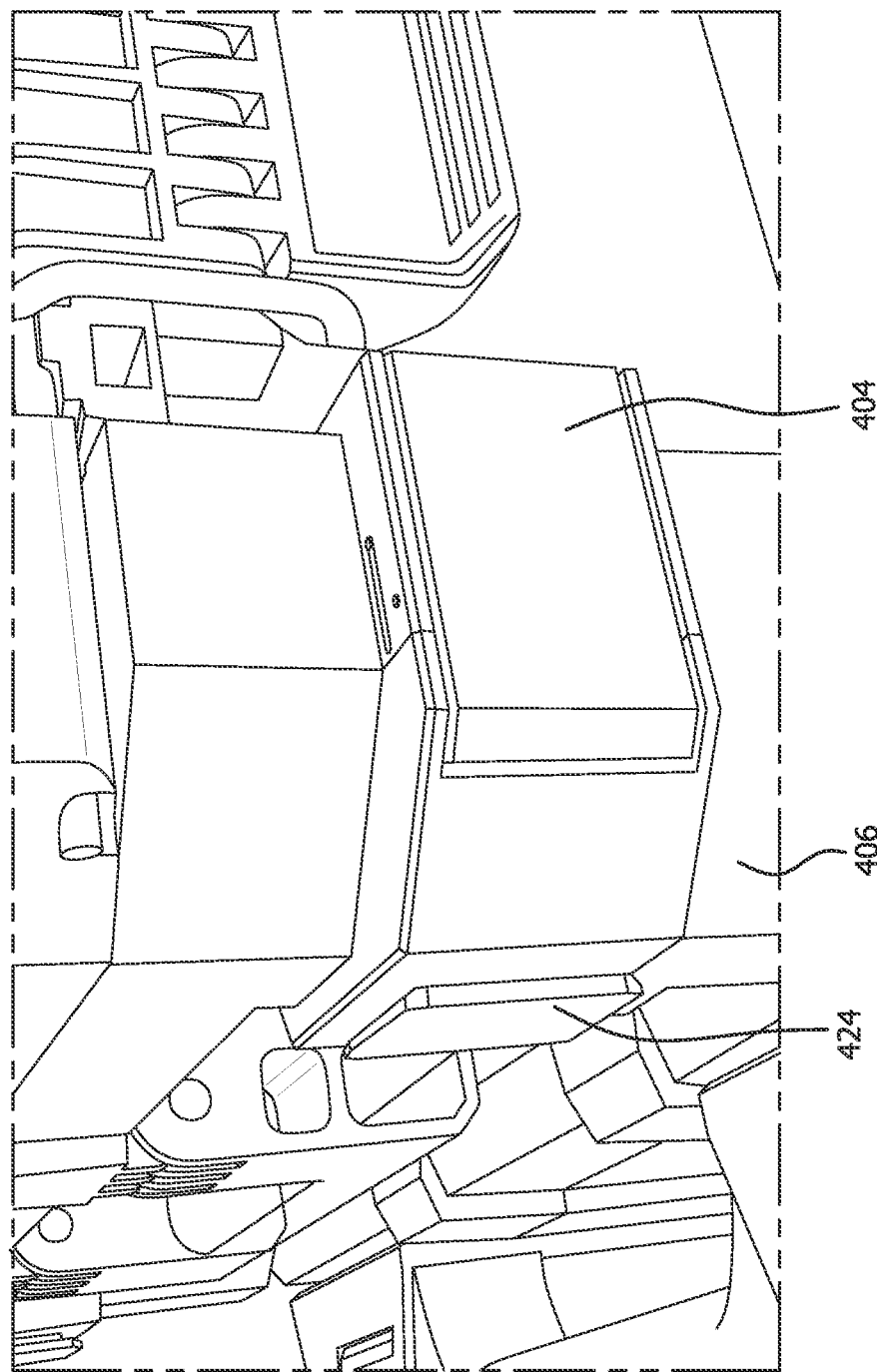
FIG. 69 is a perspective view of a corner clamp affixed to a box in accordance with an example embodiment.
Figure 70:
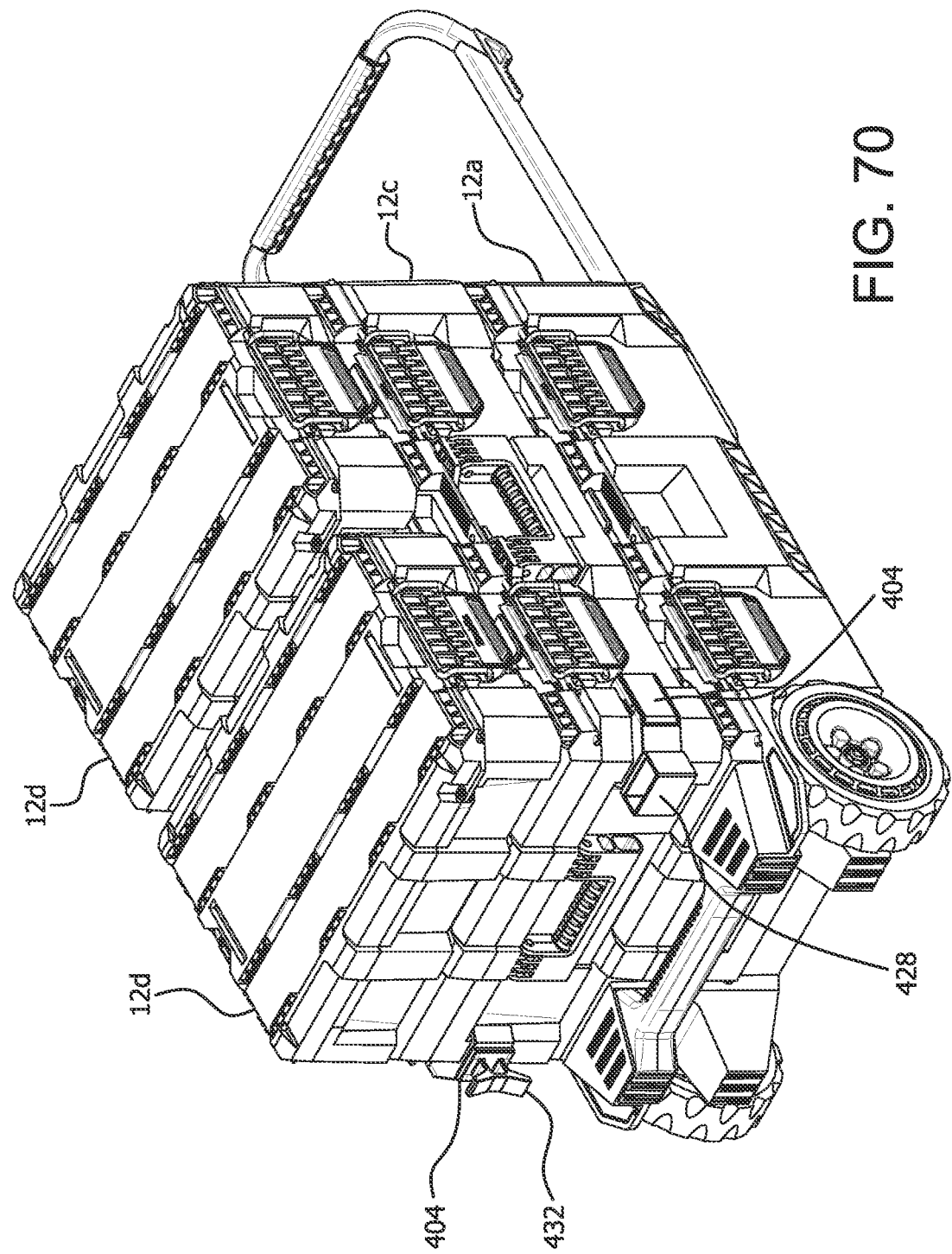
FIG. 70 is a perspective view of a box in a modular storage system of stacked boxes that has corner clamps affixed to opposite corners thereof in accordance with an example embodiment.

With continued reference to FIGS. 32A and 32B, and FIGS. 33A and 33B, and with reference to FIG. 68, a number of fastener holes 256 are provided in the divider 250 to securely affix the divider 250 to an inner surface 14b of the top portion 14 of the rolling base box 12a. As shown in FIG. 68, the divider 250 is advantageously dual purposed for use as yet another internal organization tool mounted on the interior surface of a lid 14, instead of use as a compartment divider as shown in FIGS. 33A and 33B. As shown in FIG. 67, the divider 250 can be provided with pockets 394 of one or more different sizes to store tools (e.g., pens, drill bits, screw driver, and the like). Panels with pockets 392 can also be affixed to the side walls 16c through 16f of the rolling base box 12a as shown in FIG. 67.

A planar surface of the divider 250 can be designed, for example, as a Modular Lightweight Load-carrying Equipment or MOLLE-type board or flexible interface with columns and rows of apertures 252 and slots 254 to create a webbing design that can be used to connect items 364 thereto by different methods such, but not limited to, as a flexible strap 362 interwoven into one or more slot(s) 254 of the webbing design; or fastener(s) on a lid mounted item that engage with corresponding one(s) of the aperture(s) 252; or cleats or other mounting features 360 on a lid mounted item that releasably engage with corresponding one(s) of the slot(s) 254; or a rigid mounting assembly having (a) a Velcro® strap, fastener or other mounting hardware to connect the mounting assembly to the divider 250 via one or more of the apertures 252 or slots 254 and (b) a releasable connection feature that engages a cooperating connection feature provided on a tool or other item for convenient access. Thus, the divider 250 planar surface having a MOLLE-type interface can removably secure tool holders or item holders, or the tools or items 364 themselves, to the divider's planar surface.

Figure 99:
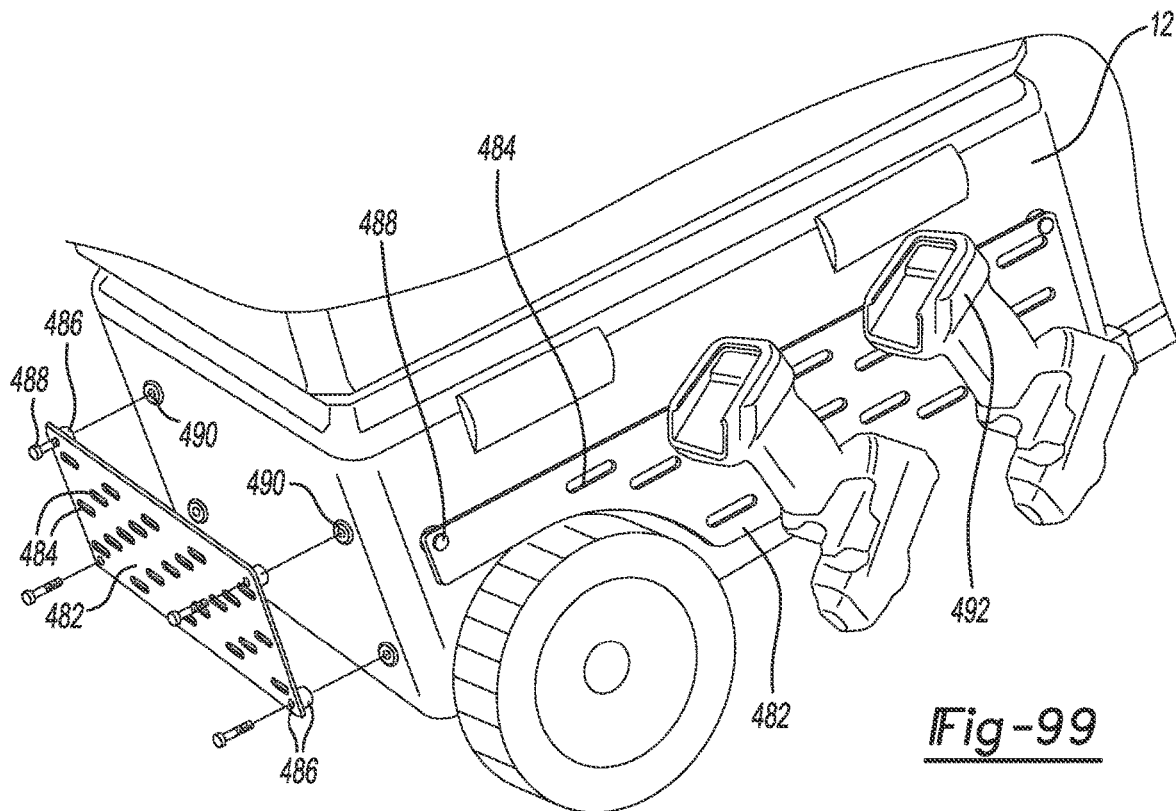
FIG. 99 is a perspective view of a box having an external mounting board connected thereto in accordance with an example embodiment.

As shown in FIG. 99, the divider 250 or other shape of MOLLE-type interface board 482 can be mounted to the exterior of the rolling base box 12a or other box 12. The MOLLE board can have slots 484 or other shapes of apertures, and a spacer with fastener receptacle 486 to receive a fastener 488 for insertion into a box screw receptacle or bolt 490 to secure the board 482 to the exterior of the box 12. Thus, a tool 492 can be releasably and conveniently mounted on and accessible from the external MOLLE board 482. Also, the external MOLLE board(s) 482 can each extend the transport and storage capacity of the box 12 to which it is connected in accordance with an advantageous feature of the example embodiments of the modular storage system 10.

Figure 34A:
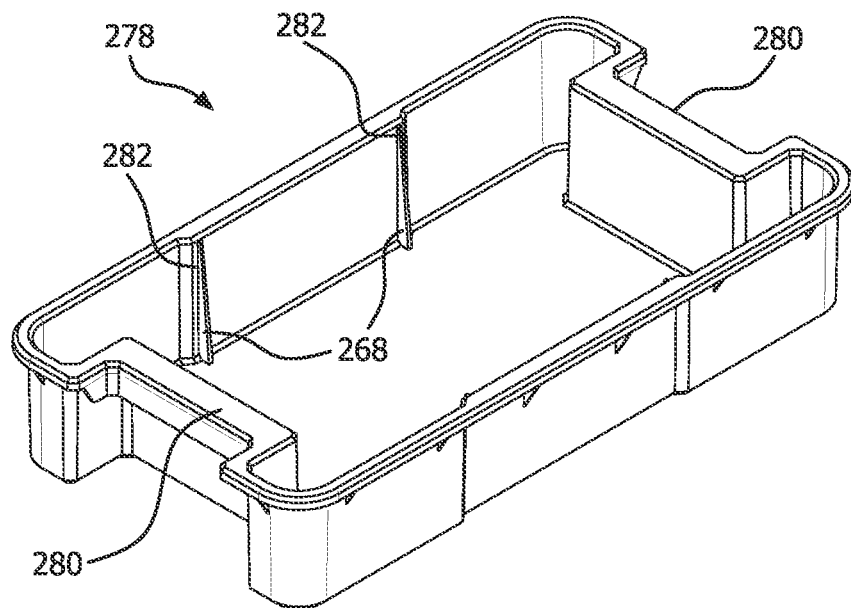
FIGS. 34A and 34B are perspective views of a tray for a rolling base box constructed in accordance with an example embodiment.
Figure 34B:
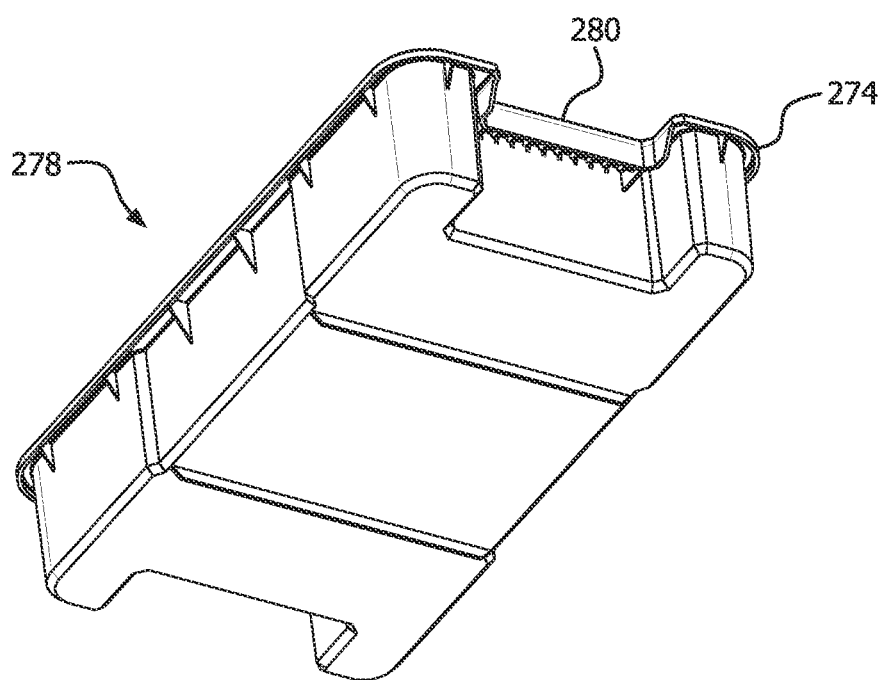

The interior of a rolling base box 12a can be further customized for organization using a removable tray. FIGS. 34A and 34B are perspective views of an example tray 278 for a rolling base box 12a in accordance with an example embodiment. FIGS. 35A and 35B provide perspective views of the tray 278 inserted into and removed from an example location in the rolling base box, and FIG. 35C is a partial enlarged perspective view of interior supports 276 in the rolling base box 12a for the tray 278. The tray 278 has a lip 274 configured to abut the interior supports (e.g., molded hangers) 276 in the side wall of the box 12a. The tray 278 is also configured with integral inset side handles 280. Tray divider ribs 268 create retention slots in the tray side walls to receive a tray divider 282 that can be a partial divider as indicated in FIG. 34A to retain a stored item in place, or a divider that extends across a dimension of the tray to create a separate storage compartment. The tray 278 can be advantageously configured to store different types of items and, in particular, provide a battery solution tray. For example, the central area between the tray dividers 282 can be used for a power inverter or charger. The areas on either side of the central area can be used to hold respective one of a 5 amp hour battery and 2 amp hour battery, for example. The charger can have an interface to an AC power source at a home, office or shop location. The batteries can have interfaces for charging using the charger such that the battery solution tray provides a convenient way of transporting tools to work locations without power supplies and charging the tools.

Figure 36A:
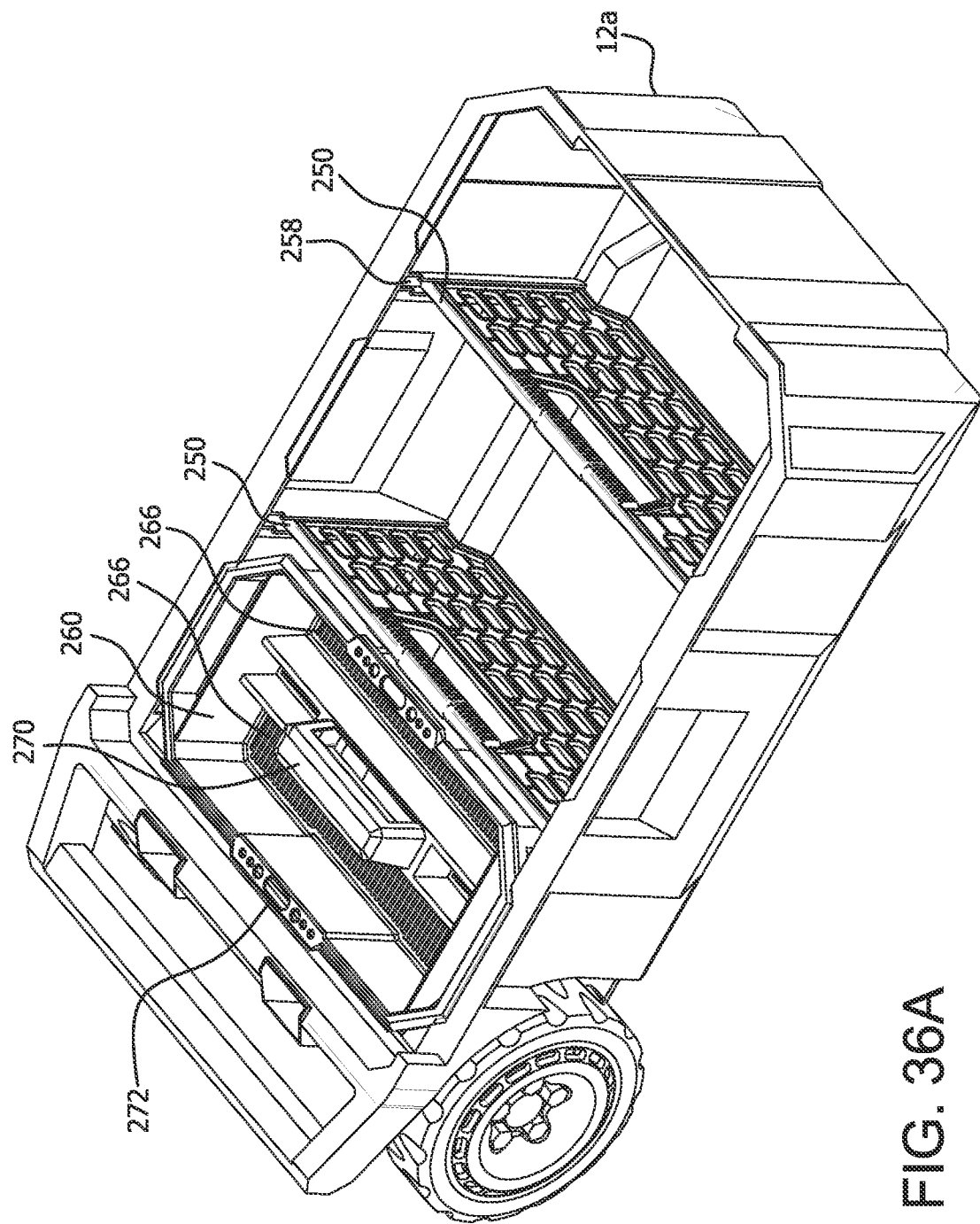
FIGS. 36A and 36B are perspective and top views, respectively, of a tray constructed in accordance with another example embodiment and shown inserted into a rolling base box.
Figure 36B:
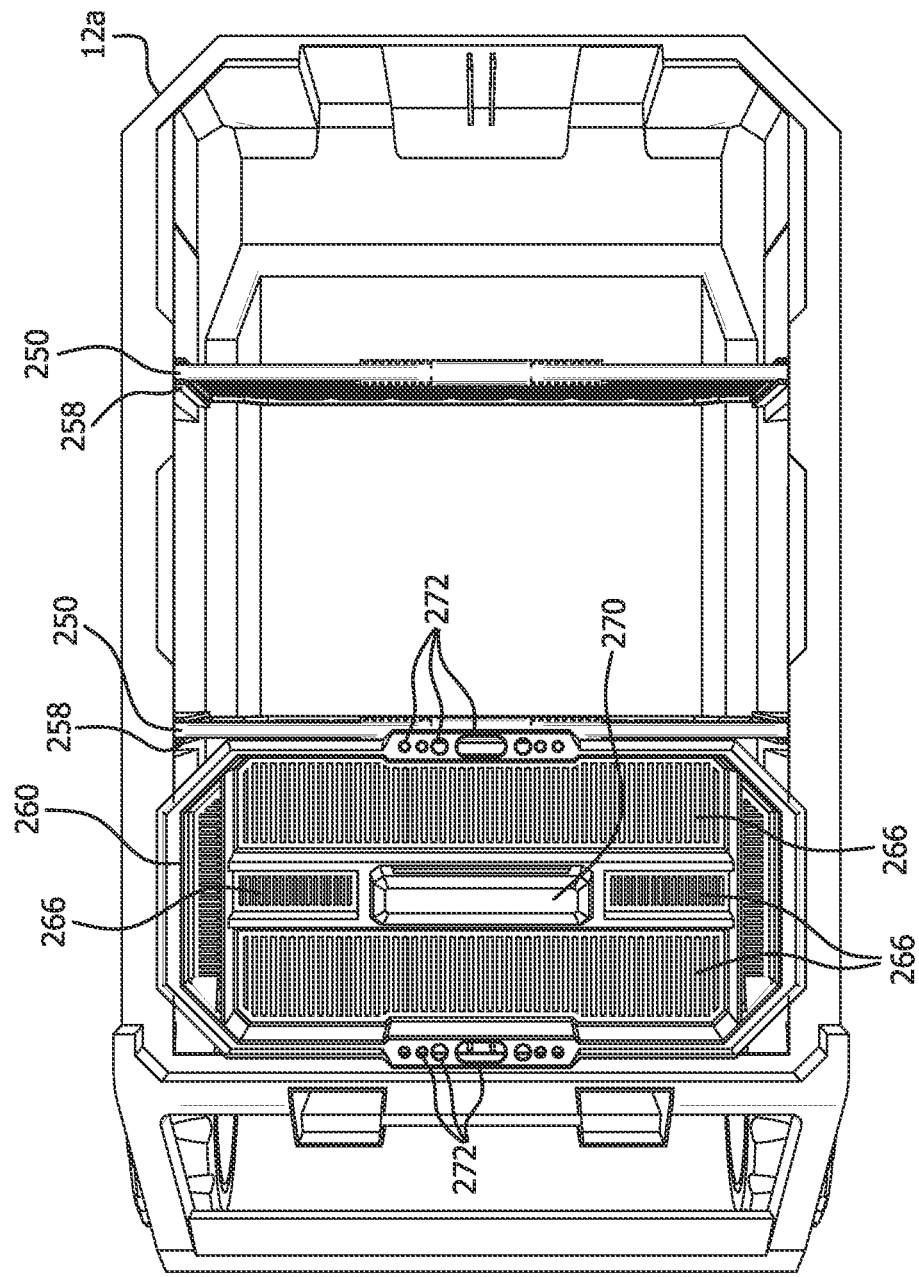

FIGS. 36A and 36B are perspective and top views of a tray 260 constructed in accordance with another example embodiment for use in a rolling base box 12a. The tray 260 has different integrated storage compartments 266 and a central integral handle 270 and apertures 272 in its rim to accommodate a pencil, shaft of a screw driver, drill bit or other tool for convenient access when the lid 14 is removed. The tray 260 can be configured with a top rim that cooperates with the edges of the box 12a. The tray can fit, for example, into each third of the box 12a divided by two dividers 250 as shown. The tray 260 can have top edges with an overhang dimensioned to contact and partially overlap portions of the top edge of storage compartment 18 opening in the box 12a. The tray 260 has large internal area(s) 266 for stowing hand tools, for example, as well as slots 272 in the rim thereof to receive the blades or shafts of hand tools or writing instruments, and other smaller storage areas therein for smaller item storage such as screws or other fastener hardware.

Figure 37A:
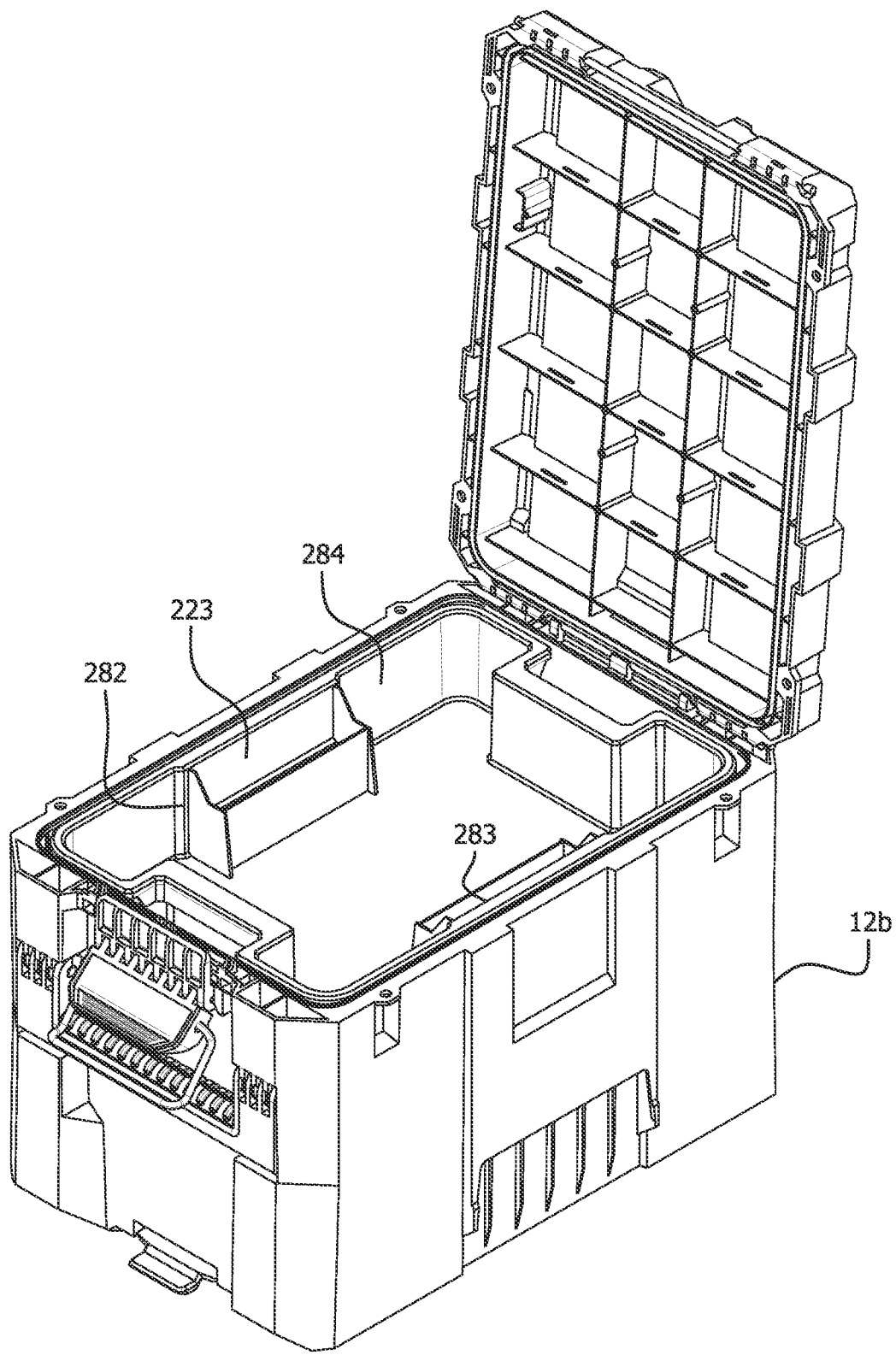
FIGS. 37A and 37B are perspective views of a tray inserted into and removed from a portable storage box, respectively, in accordance with an example embodiment.
Figure 37B:
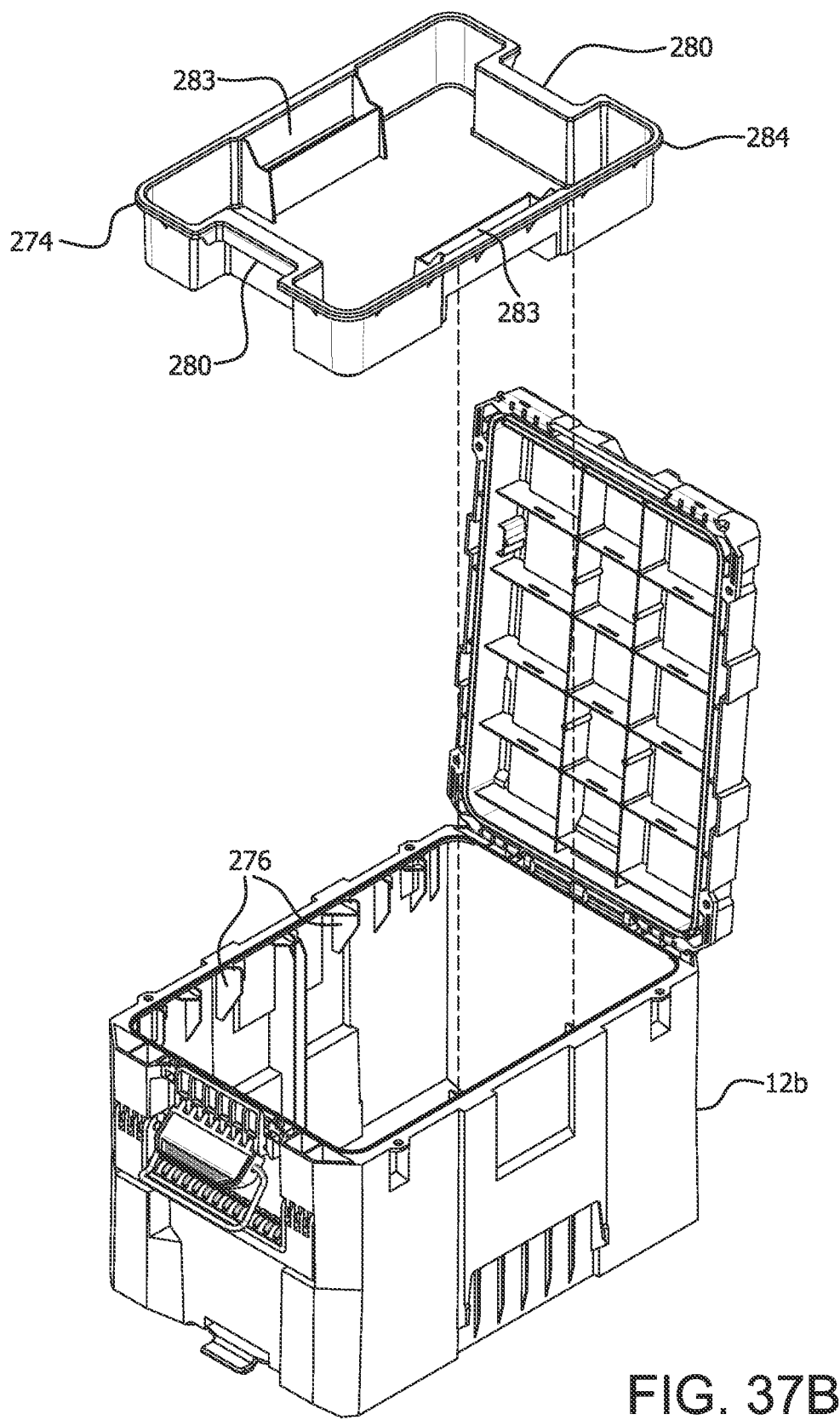
Figure 38A:
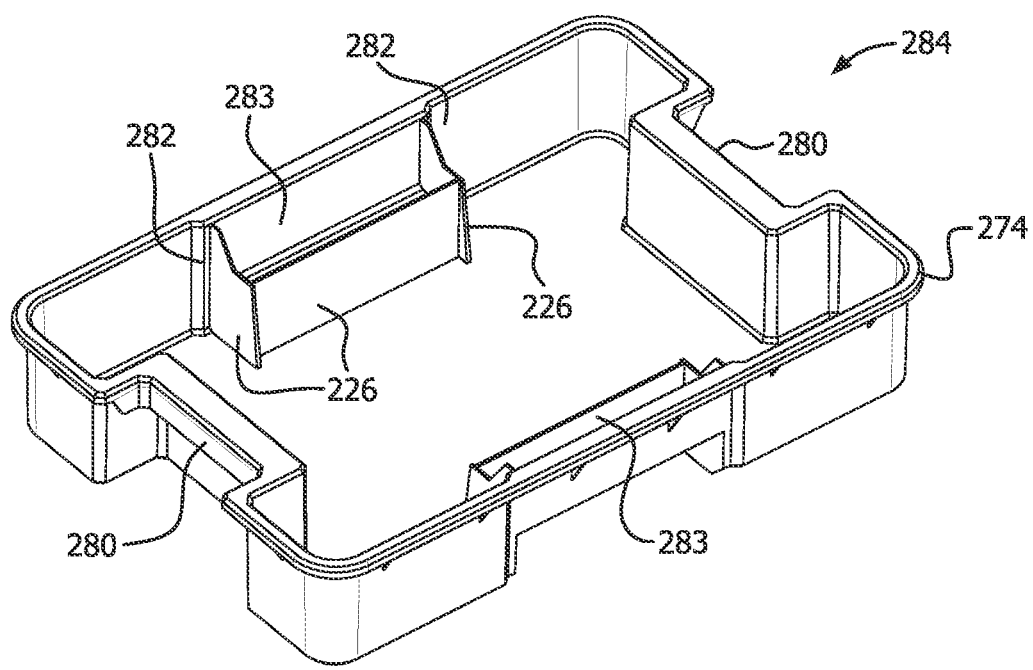
FIGS. 38A, 38B, 38C, 38D, 38E, 38F, 38G and 38H are top perspective, bottom perspective, top, bottom, left, right, front and back views, respectively, of the tray shown in FIG. 37B.
Figure 38B:
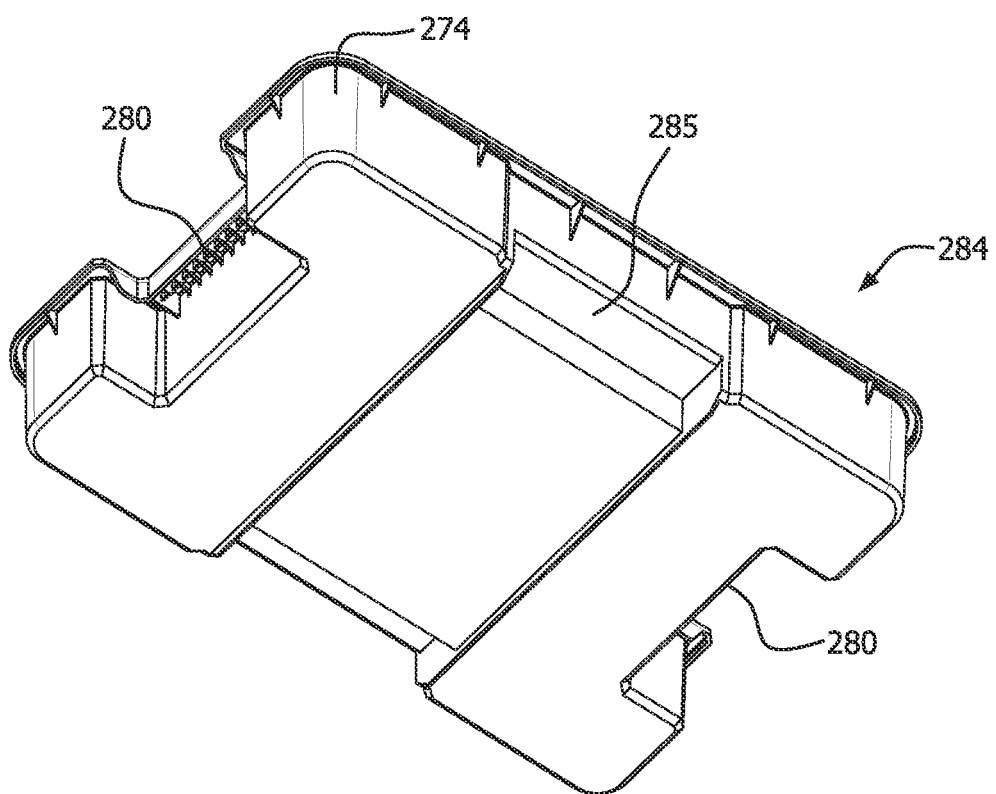
Figure 38C:
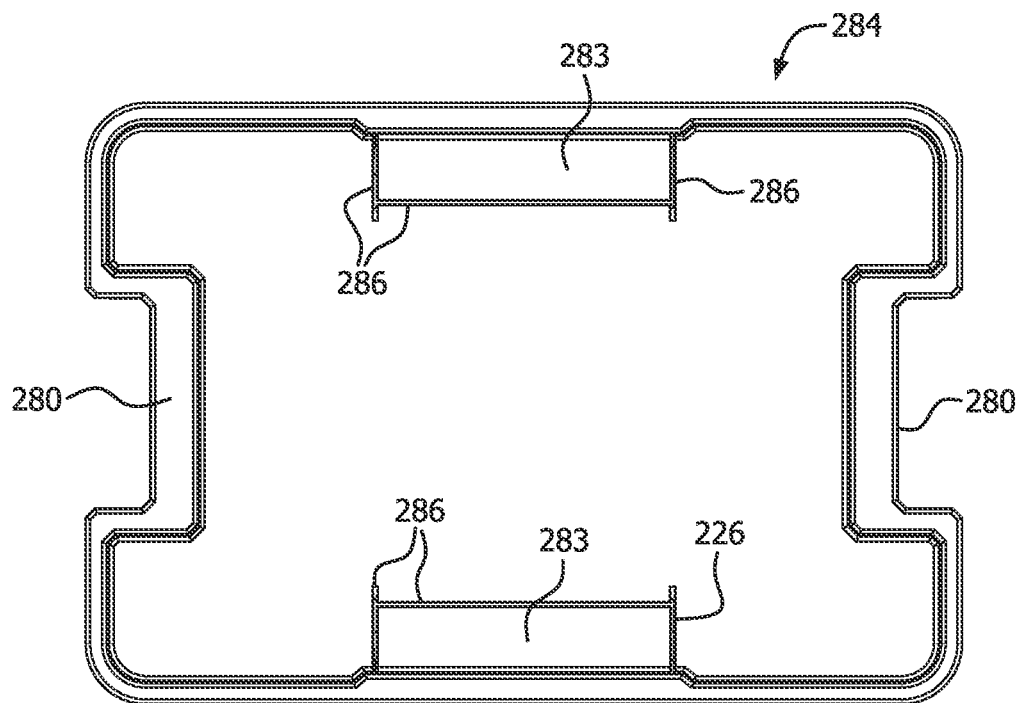
Figure 38D:
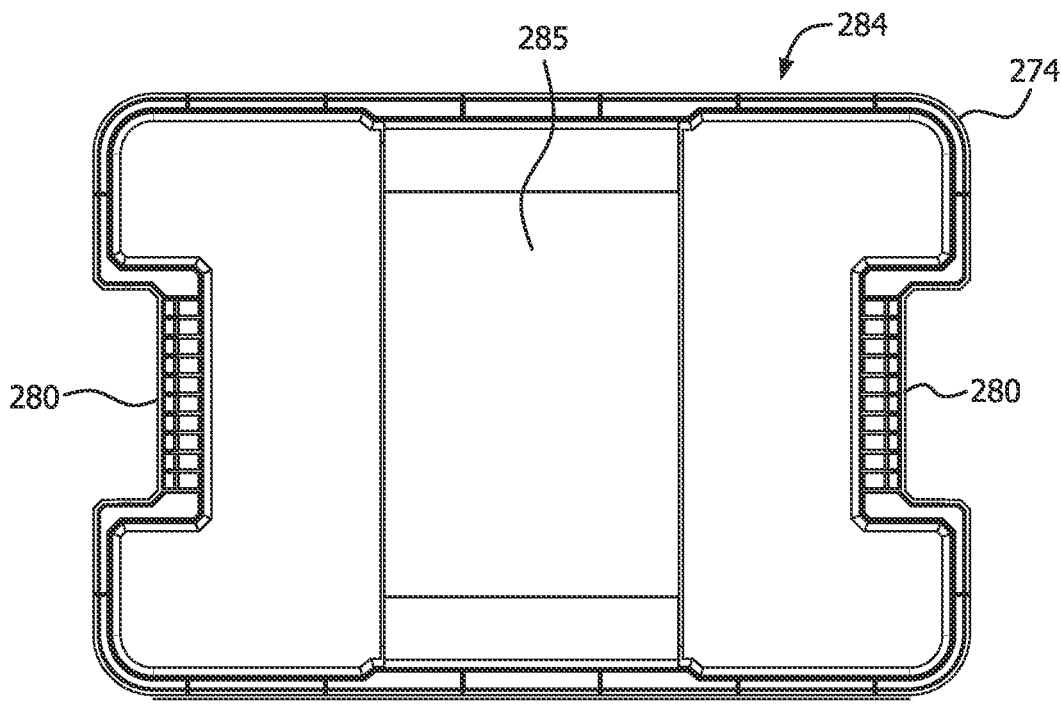
Figure 38E:
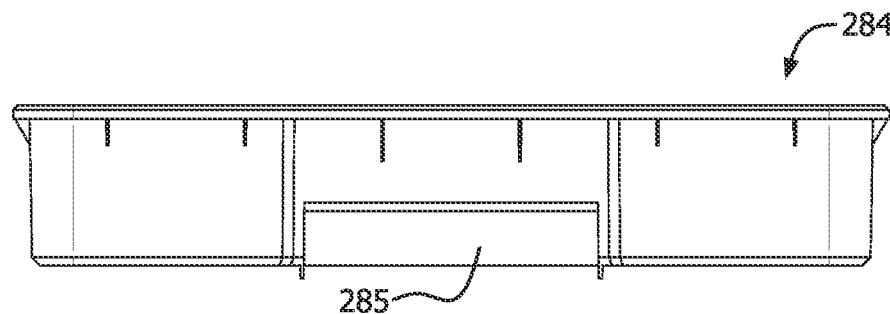
Figure 38F:
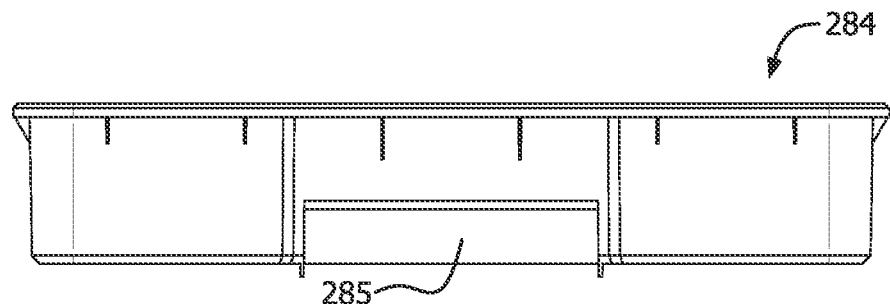
Figures 38G, 38H:
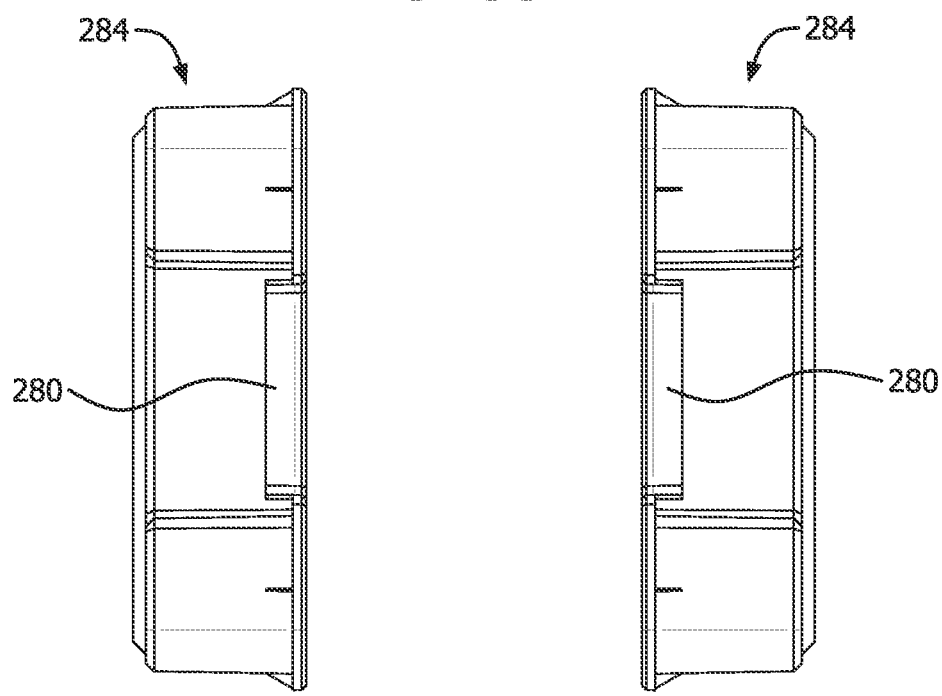

The interior of a portable storage box 12*b* can be further customized for organization using a removable tray. FIGS. 37A and 37B are perspective views of an example tray 284 for a portable storage box 12*b* in accordance with an example embodiment. FIGS. 37A and 37B provide perspective views of the tray 284 inserted into and removed from the opening to the bottom portion 16 of the portable storage box 12*b*.

Figure 39:
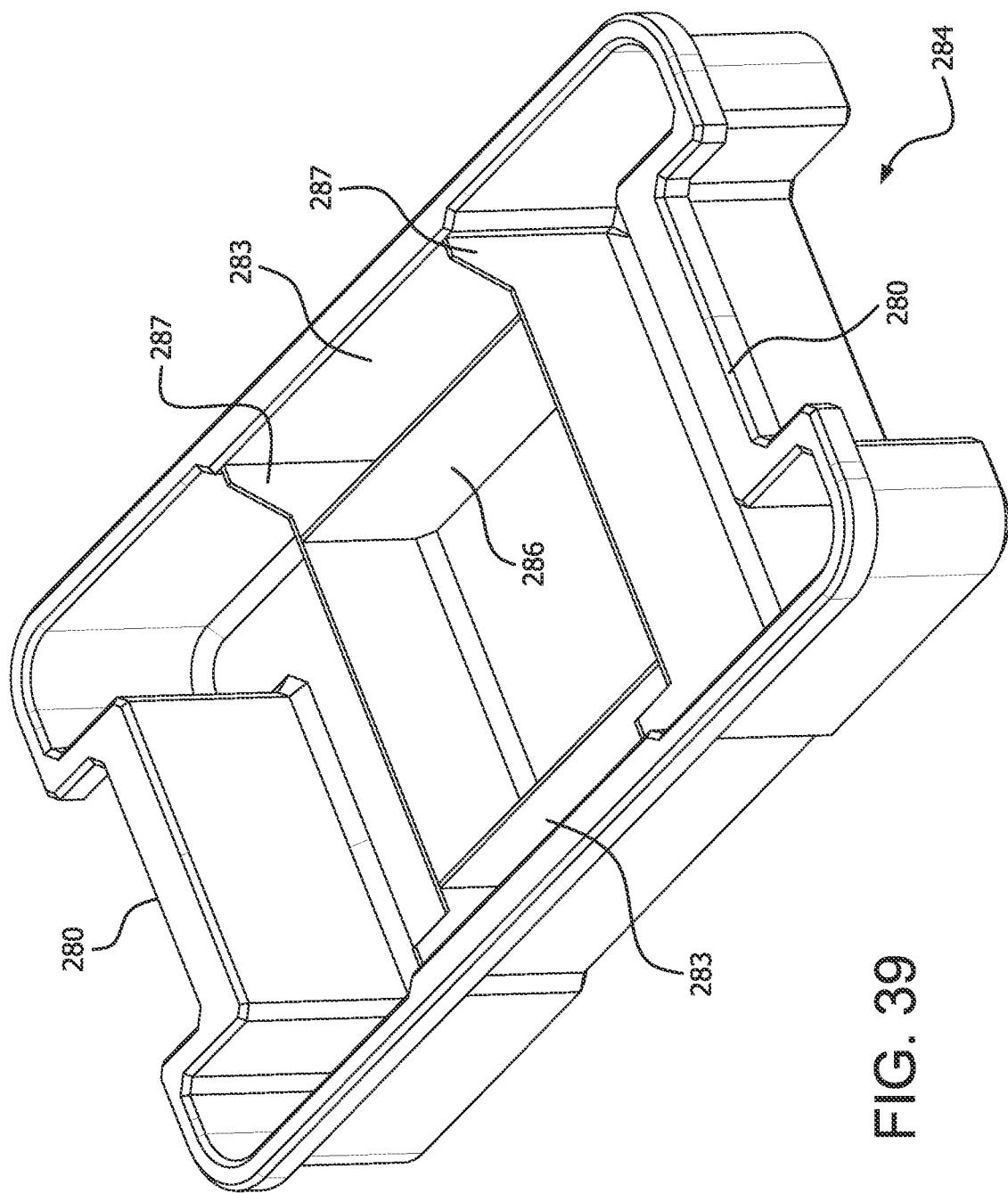
FIG. 39 is a perspective view of a tray constructed in accordance with another example embodiment for insertion into a portable storage box.

FIGS. 38A, 38B, 38C, 38D, 38E, 38F, 38G and 38H are top perspective, bottom perspective, top, bottom, left, right, front and back views, respectively, of the tray 284. The tray 284 has integral inset side handles 280, and at least partial tray dividers 282 which can also be walls 286 that define a compartment 283. The walls 286 can provide reinforcement to the tray bottom in the area where the tray lip 274 is supported by molded hangers 276 in the portable storage box 12*b*. With reference to FIG. 39, the compartments 283 can also define a central area therebetween that is dimensioned for a charger for a battery solution tray as described above in connection with the tray 278 for the rolling base box 12*a*. The bottom of the tray 285 can be molded with a recess 285 at a particular location to accommodate certain larger tools that can be stored in the bottom portion 16 of the portable storage box 12*b* such a circular saw.

Figure 40A:
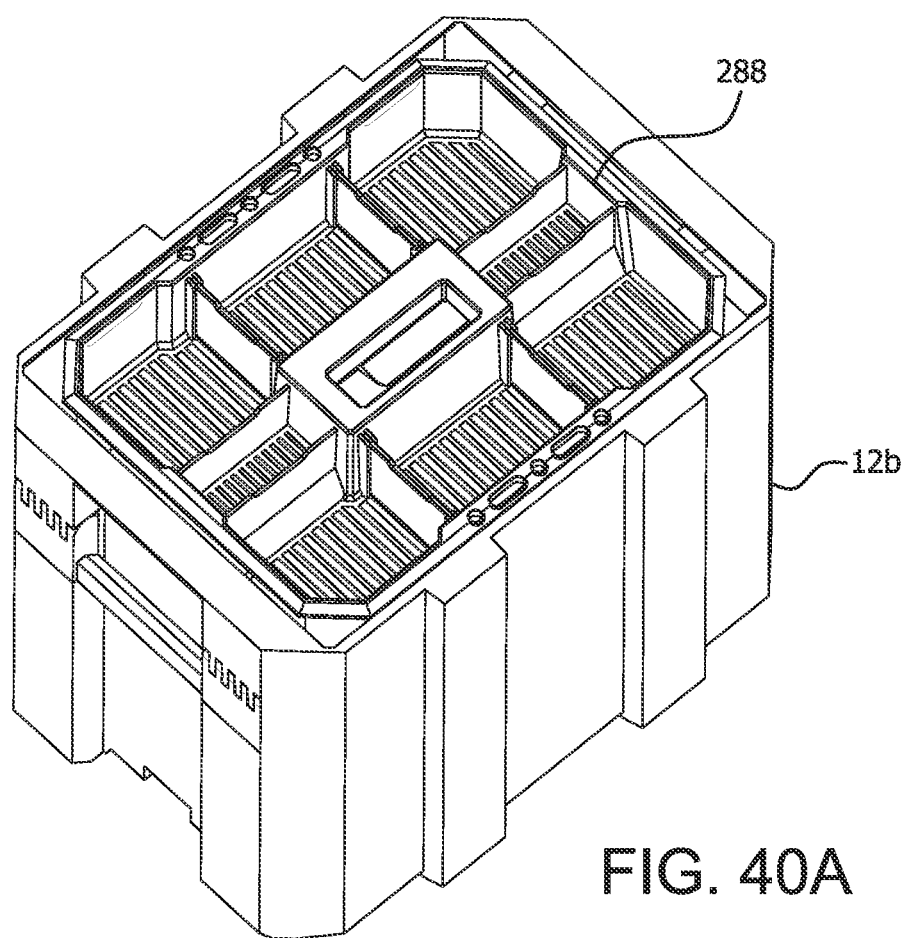
FIGS. 40A and 40B are perspective views of a tray constructed in accordance with yet another example embodiment and shown inserted into and removed from the portable storage box, respectively.
Figure 40B:
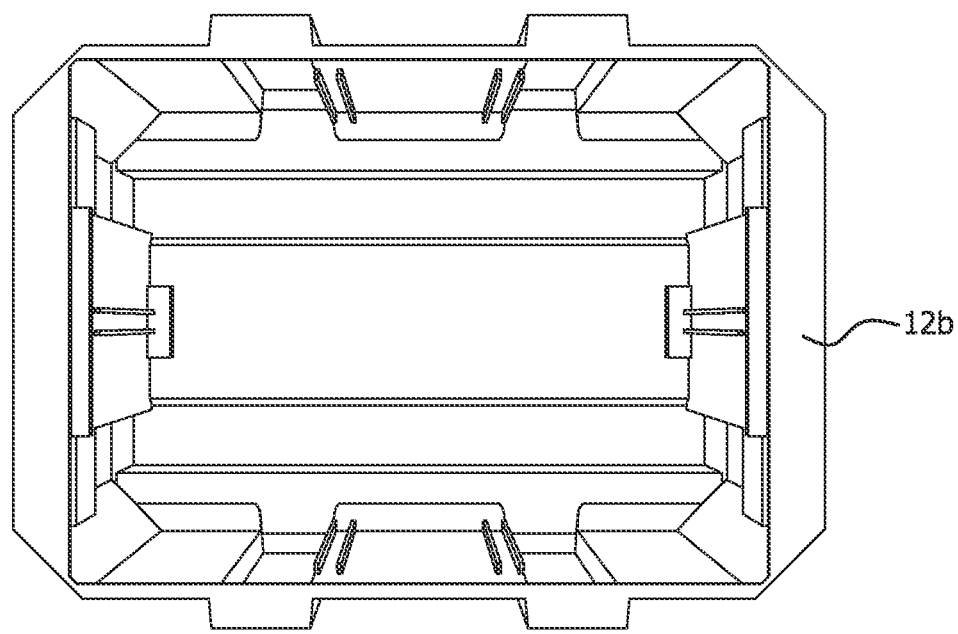
Figure 40C:
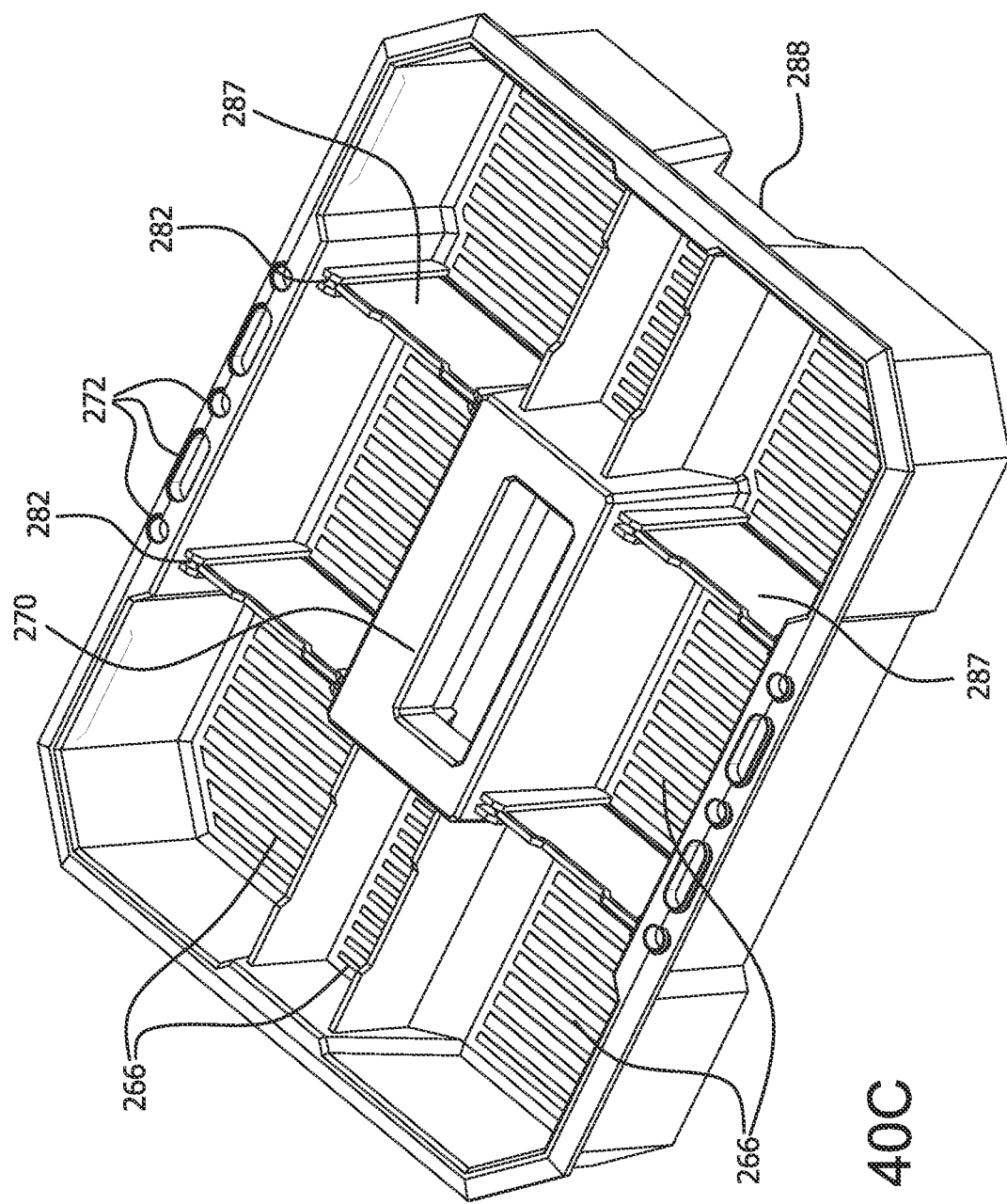
FIG. 40C is a perspective view of the tray in FIGS. 40A and 40B.
Figure 41A:
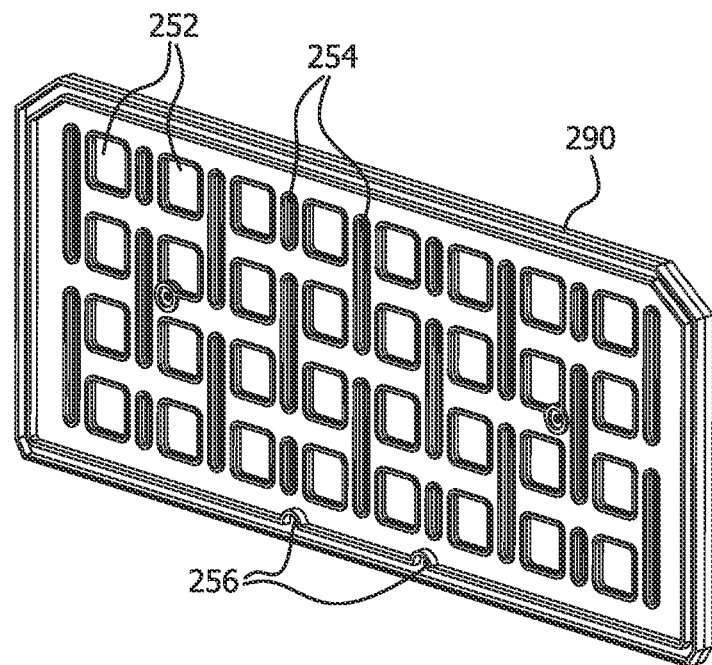
FIGS. 41A and 41B are perspective and front views, respectively, of a divider for a large storage box constructed in accordance with an example embodiment.
Figure 41B:
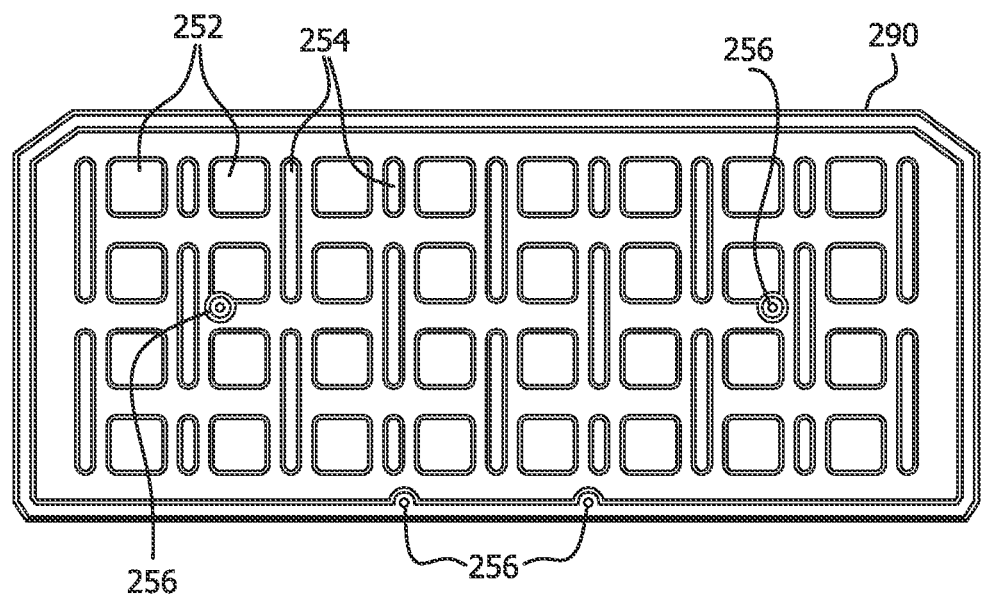

FIGS. 40A and 40B are perspective views of a tray 288 constructed in accordance with another example embodiment and shown inserted into and removed from the portable storage box 12*b*, respectively. FIG. 40C is a perspective view of the tray 288. The tray 288 can have a central integral handle 270 and apertures 272 in its rim to accommodate a pencil, shaft of a screw driver, drill bit or other tool for convenient access when the lid 14 is removed. The tray 288 can be configured with a top rim that cooperates with the edges of the box 12*b*. The tray 288 can fit, for example, into the opening of the bottom portion 16 of the box 12*b*. The tray 288 can have different sizes of storage compartments 266 defined by dividers 282 some of which can be removable dividers as indicated at 287.

Figure 42A:
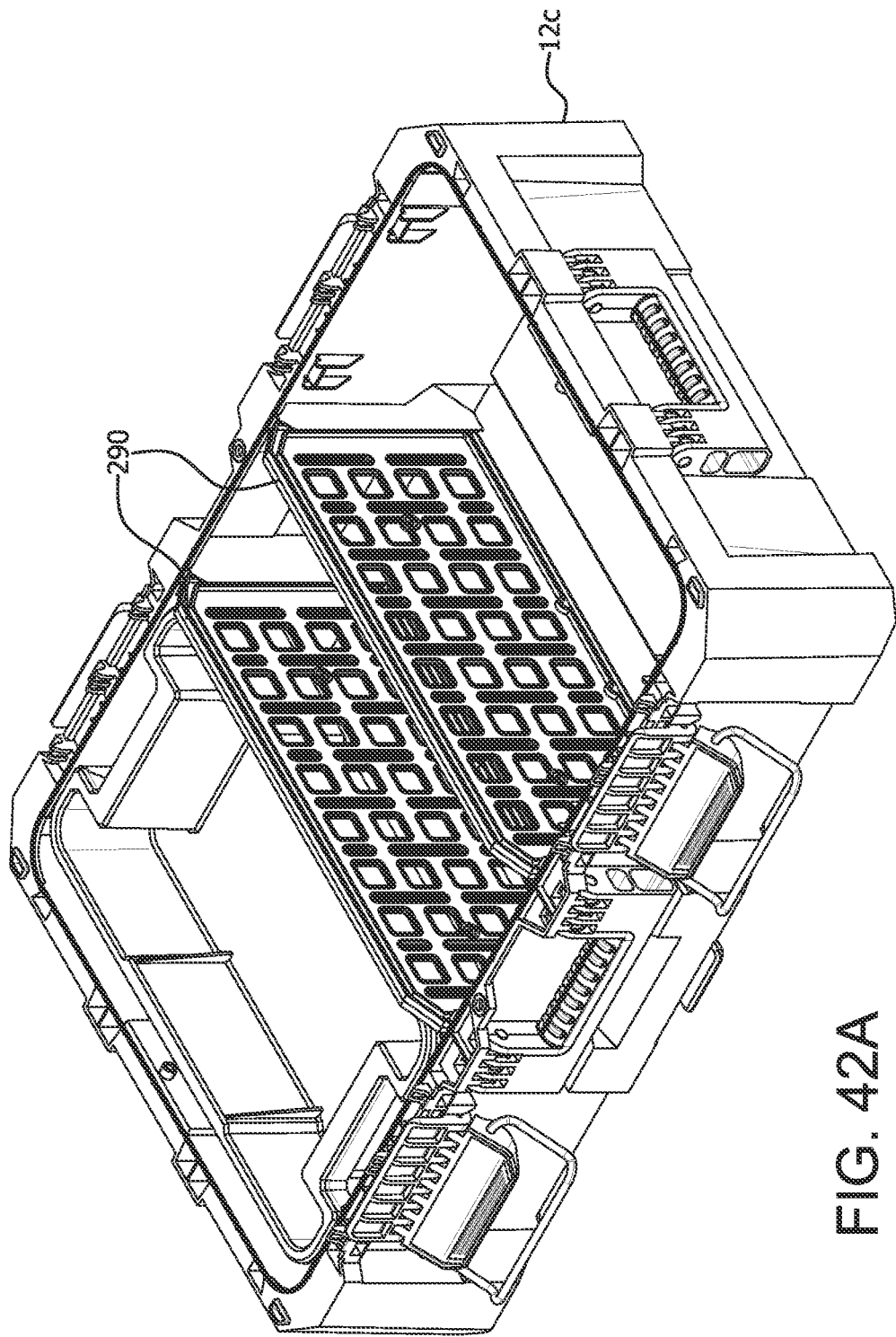
FIGS. 42A and 42B are, respectively, perspective views of plural dividers of FIGS. 41A and 41B inserted into the large storage box, and of the dividers of FIGS. 41A and 41B together with a tray constructed in accordance with an example embodiment aligned for insertion into the large storage box, respectively.
Figure 42B:
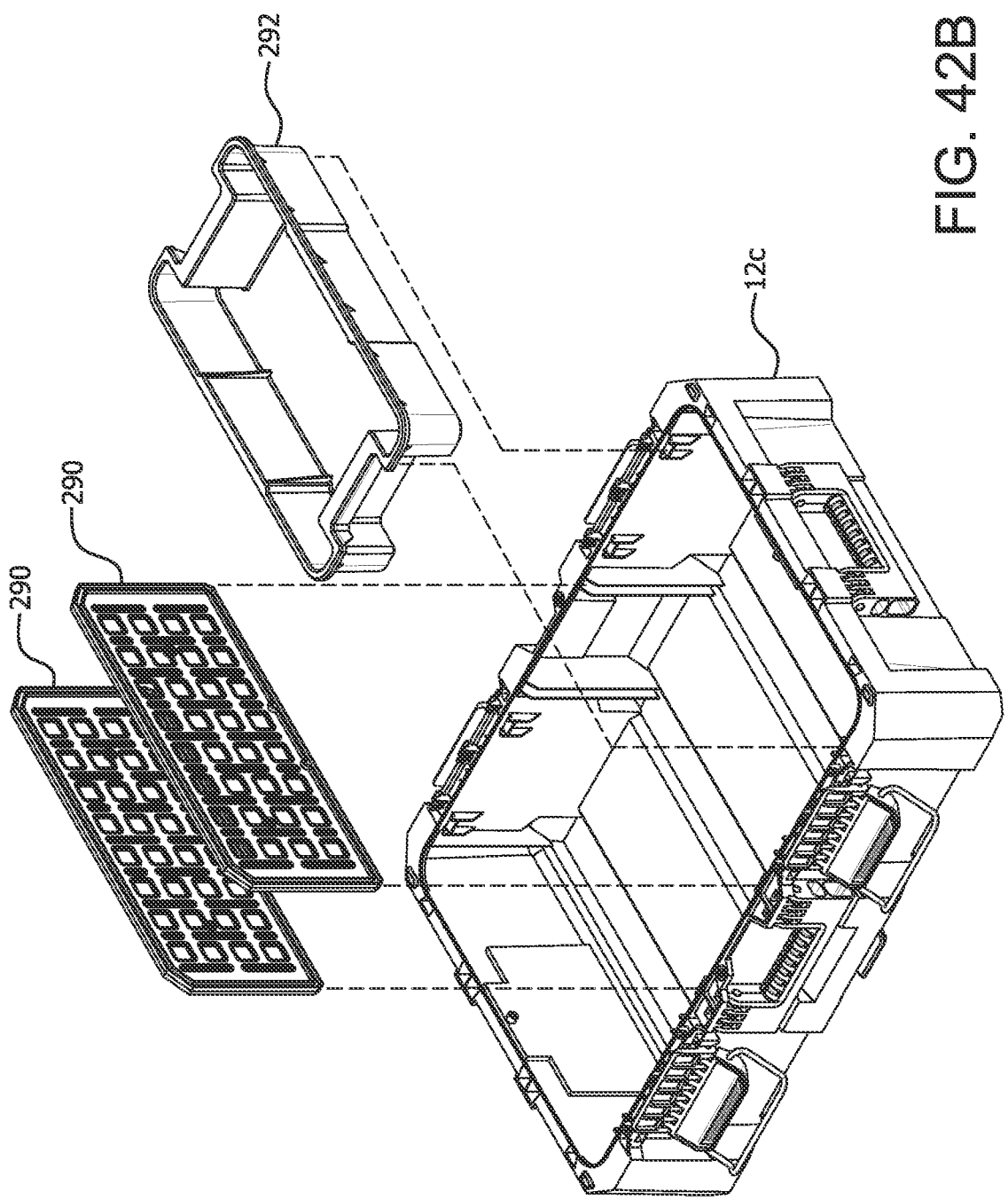

In accordance with an example embodiment, a large storage box 12*c* can be provided with one or more internal dividers 290 as shown in FIGS. 41A and 41B, and FIGS. 42A and 42B. The dividers 290 are similar the dividers 250 in that they can have a thickness, for example, on the order of 0.4-0.5 inches (in), length dimensions designed to fit the divider snugly between two opposite side walls 16*e*, 16*f*, and height dimensions to optionally rest against an interior surface 16*b* of the bottom portion 16 of the box 12*c* and/or an interior surface 14*b* of the top portion 14 of the box 12*c*, to divide the inner volume or storage compartment 18 of the large storage box 12*c* into smaller portions to organize items and separate them from each other within the respective smaller portions of the compartment 18. For example, the height of the divider 290 can be selected to abut both inner surfaces 14*b*, 16*b* of the top and bottom portions 14, 16 of the box 12*c* to prevent items in one portion from entering another portion from intended or unintended box motion (e.g., during box transport, or a disturbance of the box when stored or otherwise intended to be stationary). The edges and corners of the divider 290 can be shaped to cooperate with contours within the large storage box 12*c*. As shown in FIGS. 42A and 42B, a large storage box 12*ca* can have one or more slots 258 (FIGS. 33A and 33B) dimensioned to receive the thickness of the divider 290 in a snap-fit configuration for manual insertion and removal of the divider 290 into and from the slot 258.

With continued reference to FIGS. 41A and 41B, and FIGS. 42A and 42B, a number of fastener holes 256 are provided in the divider 290 to securely affix the divider 290 to an inner surface 14*b* of the top portion 14 of the large storage box 12*c*. In a manner similar to the divider 250 for the rolling base box 12*a* and shown in FIG. 68, the divider 290 is advantageously dual purposed for use as yet another internal organization tool mounted on the interior surface of a lid 14 of a large storage box 12*c*, instead of use as a compartment divider as shown in FIGS. 42A and 42B. A planar surface of the divider 290 can be designed, for example, as a MOLLE-type board or flexible interface with columns and rows of apertures 252 and slots 254 to create a webbing design that can be used to connect items thereto by different methods, in manner similar to the divider 250 described above. In a manner similar to the divider 250 shown in FIG. 67, the divider 290 can be provided with pockets 394 of one or more different sizes to store tools (e.g., pens, drill bits, screw driver, and the like). Panels with pockets 392 can also be affixed to the side walls 16*c* through 16*f* of the large storage box 12*c* in a manner similar to the side wall panels with pockets 392 shown in the rolling base box 12 as in FIG. 67.

Figure 43A:
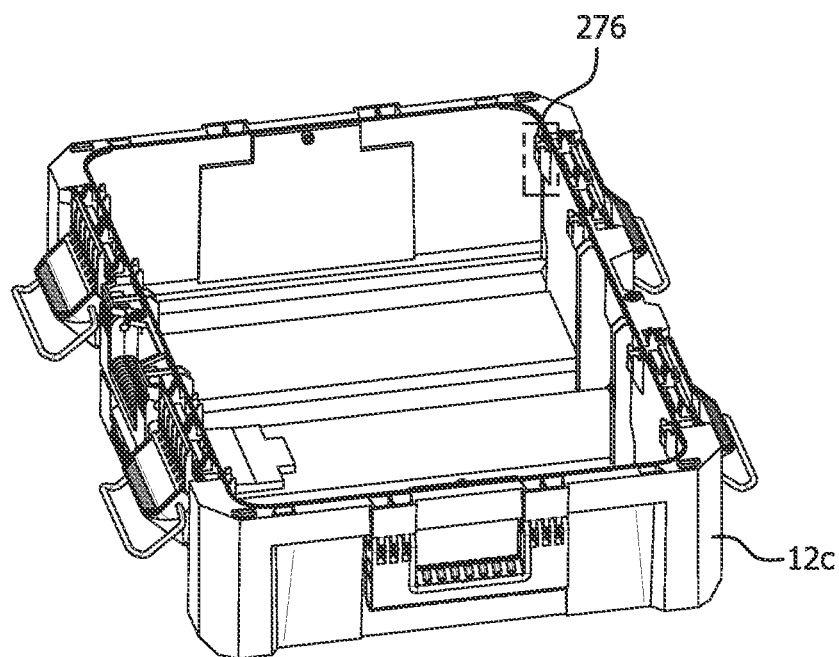
FIGS. 43A and 43B are, respectively, a perspective view of the large storage box with the dividers and tray of FIGS. 42A and 42B removed, and a partial enlarged perspective view of interior supports for the tray in the large storage box, in accordance with an example embodiment.
Figure 43B:
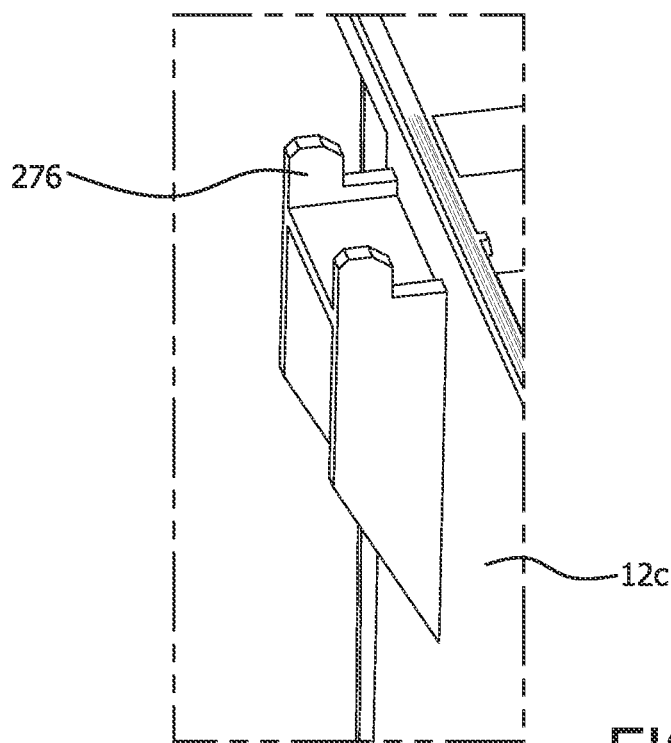
Figure 44A:
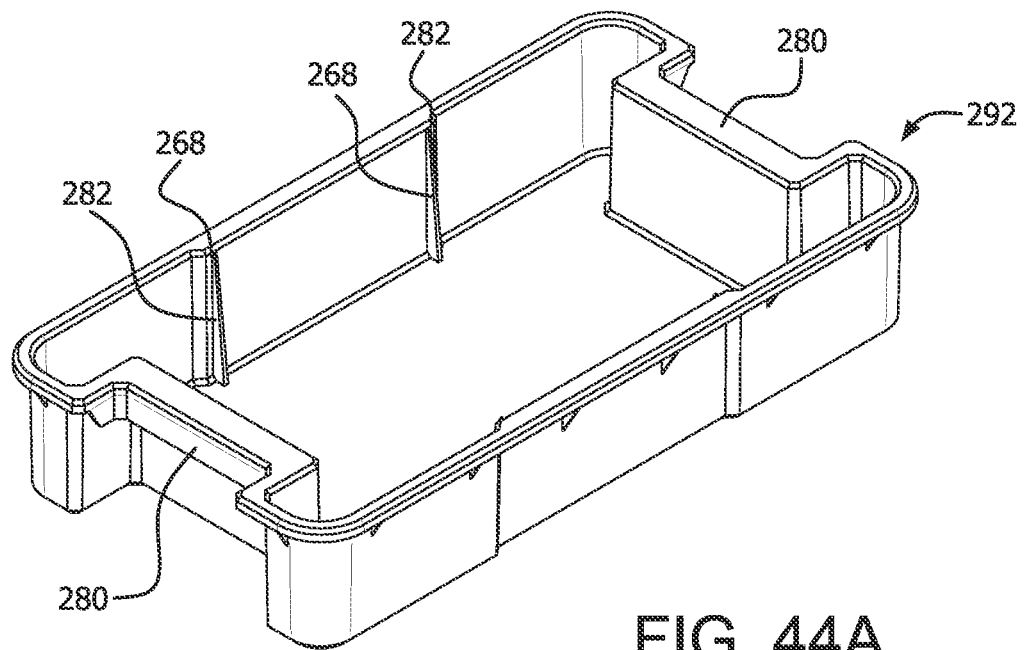
FIGS. 44A, 44B and 44C are perspective views of the tray of FIGS. 42A and 42B
Figure 44B:
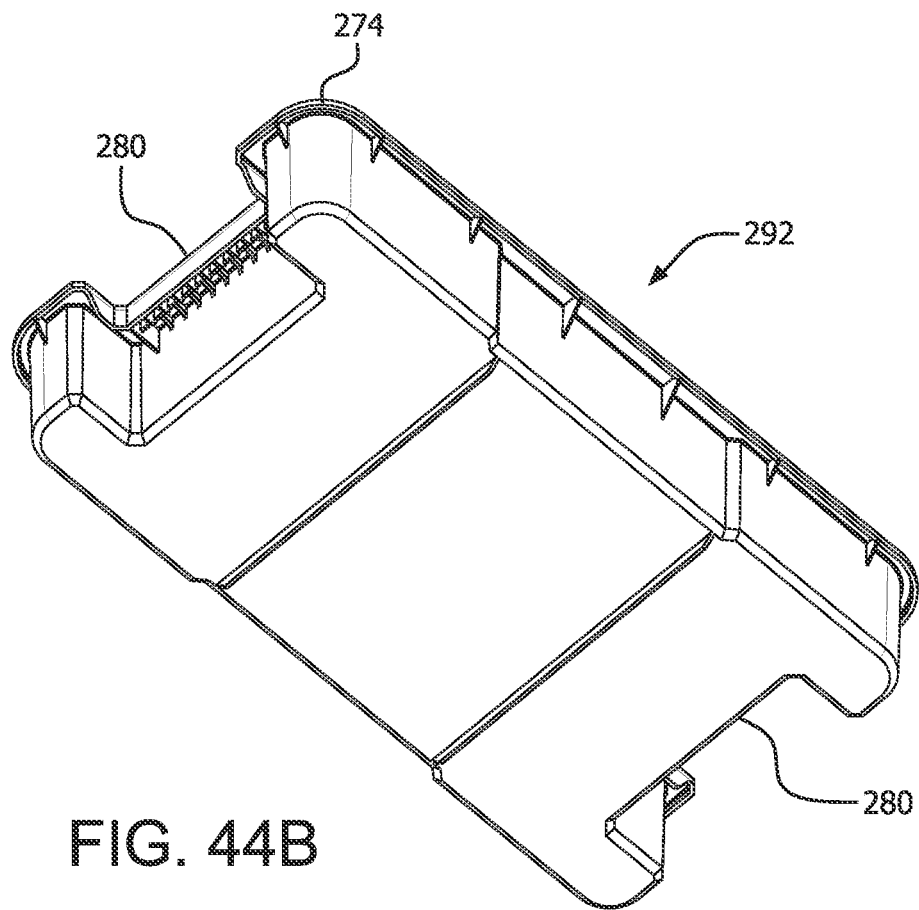
Figure 44C:
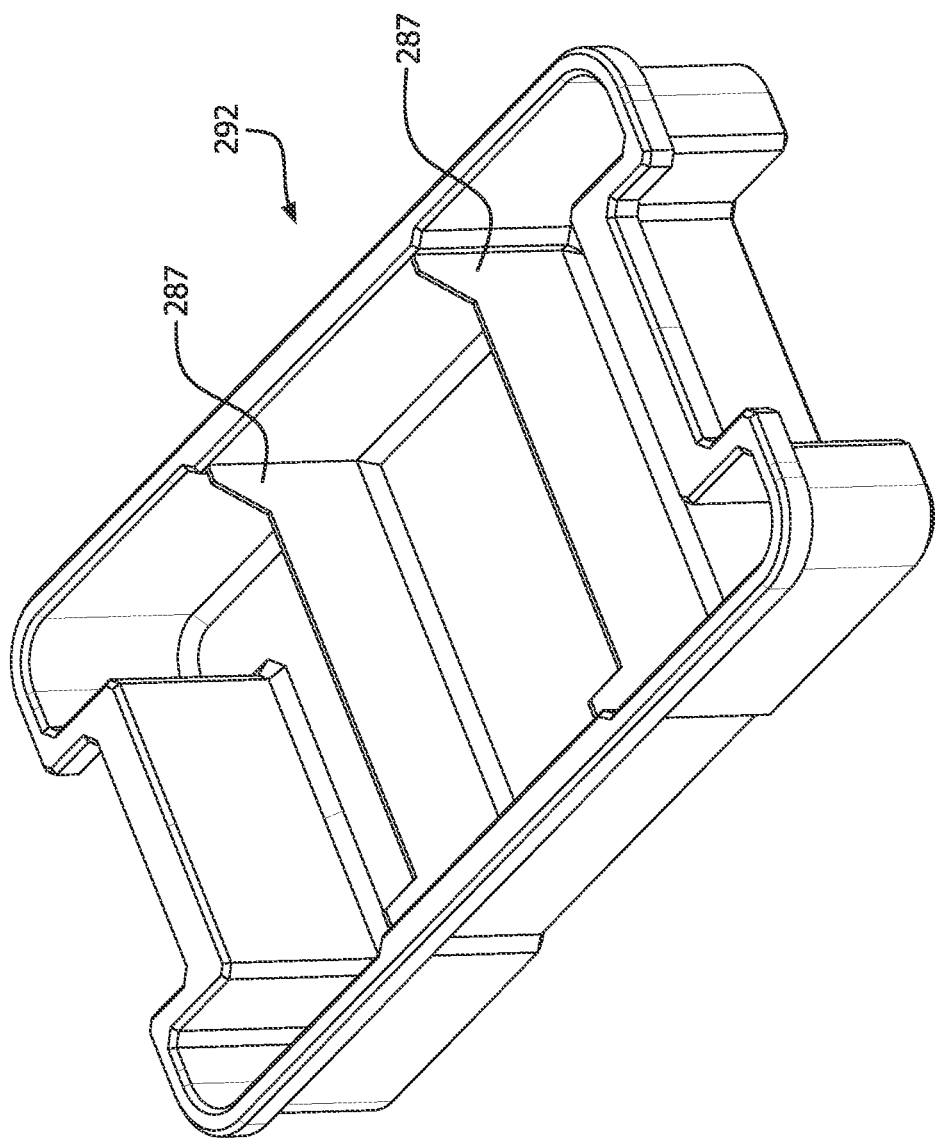
Figure 47A:
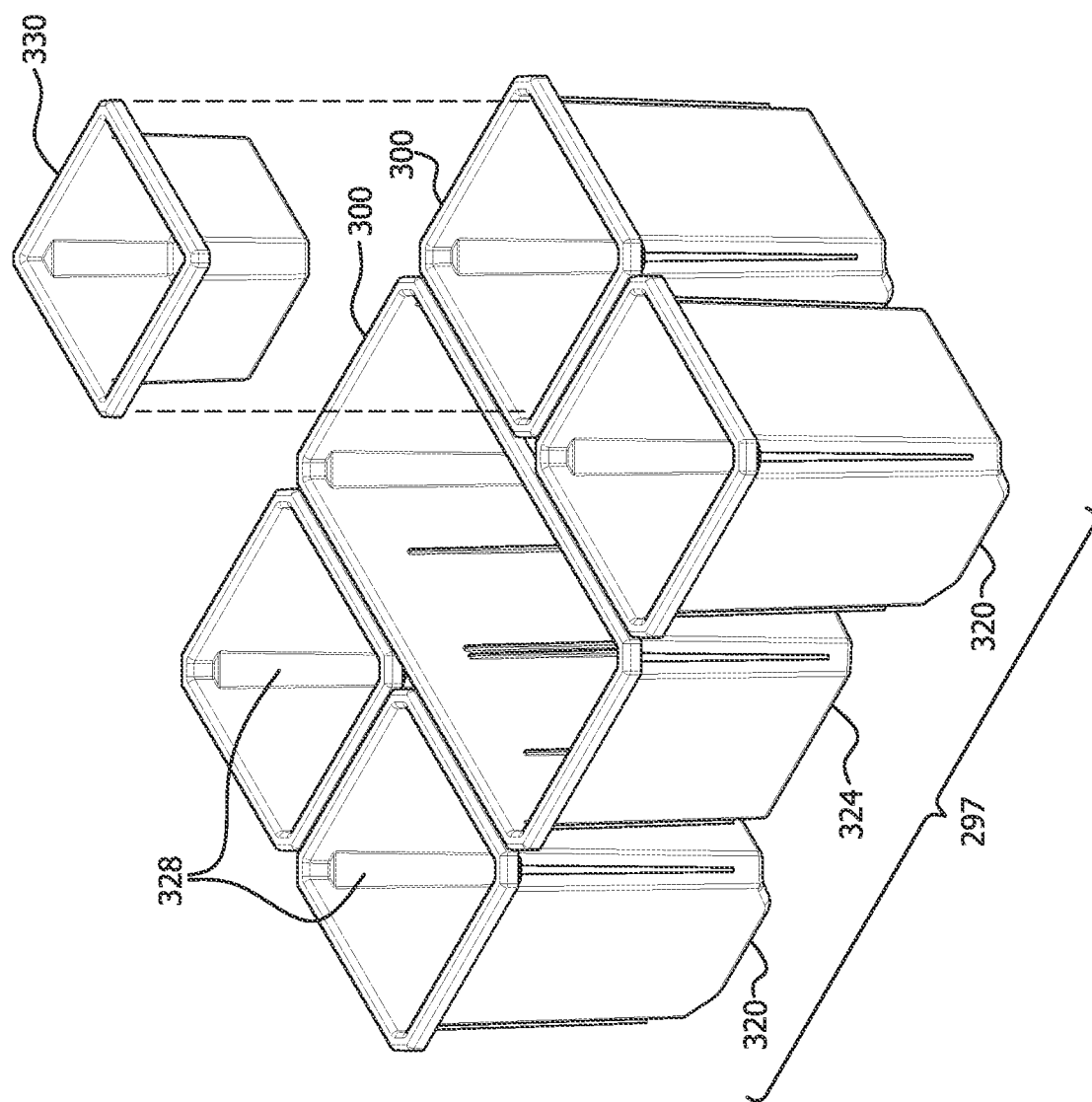
Figure 47D:
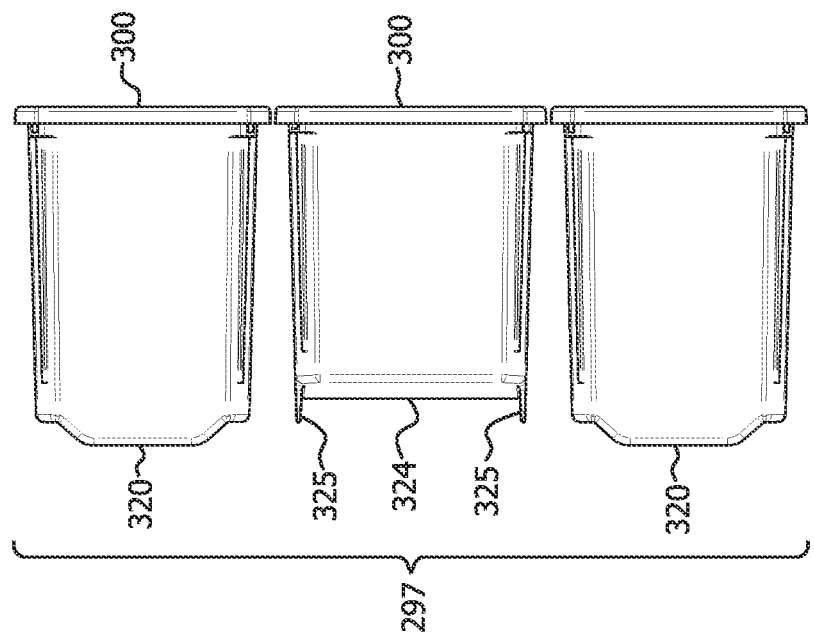
FIGS. 47C and 47D are, respectively, top and side views of the arrangement of bins shown in FIGS. 47A and 47B.
Figure 47C:
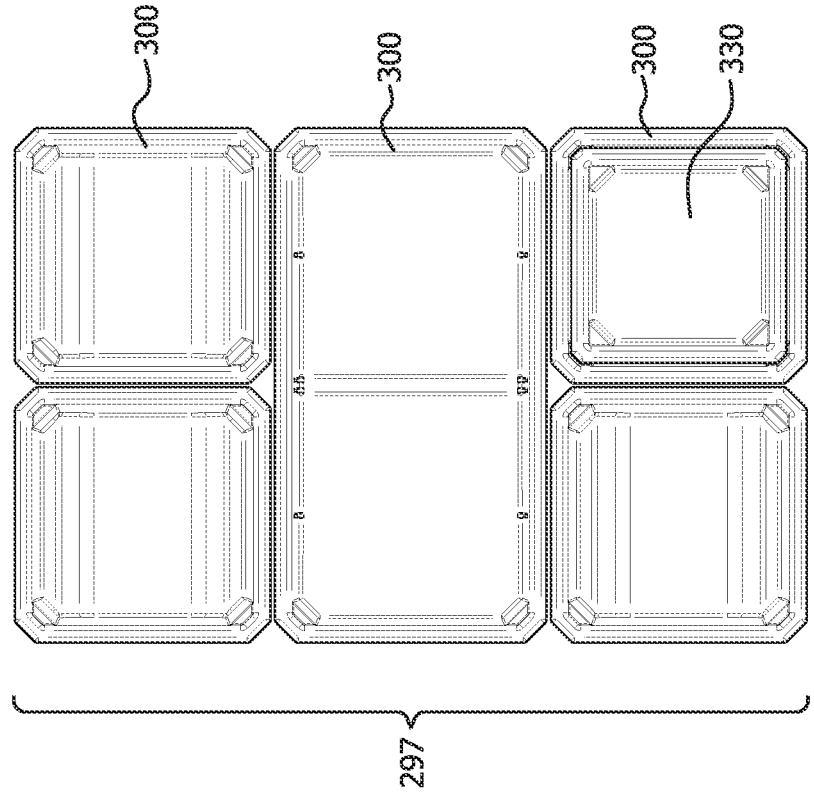

FIG. 42 shows an example tray 292 constructed in accordance with an example embodiment and aligned for insertion into the large storage box 12*c*. As shown in FIGS. 43A, 43B and 44C, the tray 292 has a lip 274 configured to abut the interior supports (e.g., molded hangers) 276 in the side wall of the box 12*c*. The tray 292 is also configured with integral inset side handles 280. Tray divider ribs 268 create retention slots in the tray side walls to receive a tray divider 282 that can be a partial divider as indicated in FIG. 44A to retain a stored item in place, or a divider 287 that extends across a dimension of the tray to create a separate storage compartment as shown in FIG. 44C. The tray 292 can be therefore also advantageously configured to store different types of items and, in particular, provide a battery solution tray as described above in connection with the tray 250 for the rolling base unit 12*a*.

The molded hangers 276 along the side walls of the boxes 12*a*-12*c* described above can be used to cooperate with fasteners (e.g., hooks or slots) in soft bags to hang them within the box 12*a*-12*c* storage compartment 18. In accordance with another example embodiment, a soft sided bag can comprise cleats along a top edge thereof that cooperate with dividers 250, 290 and edges of a box 12*a*-12*c* (e.g., a portion of a cleat hangs over an edge of a divider or box, or inserts into a slot provided in the sides of the box).

The interiors of a medium storage box 12*d*, a compact organizer 12*e*, and low profile organizer 12*f* can be further organized and customized using various arrangements of bins. The arrangement of bins can cover the entire bottom interior surfaces 16*b* of these boxes 12*e-f*.

Figure 58:
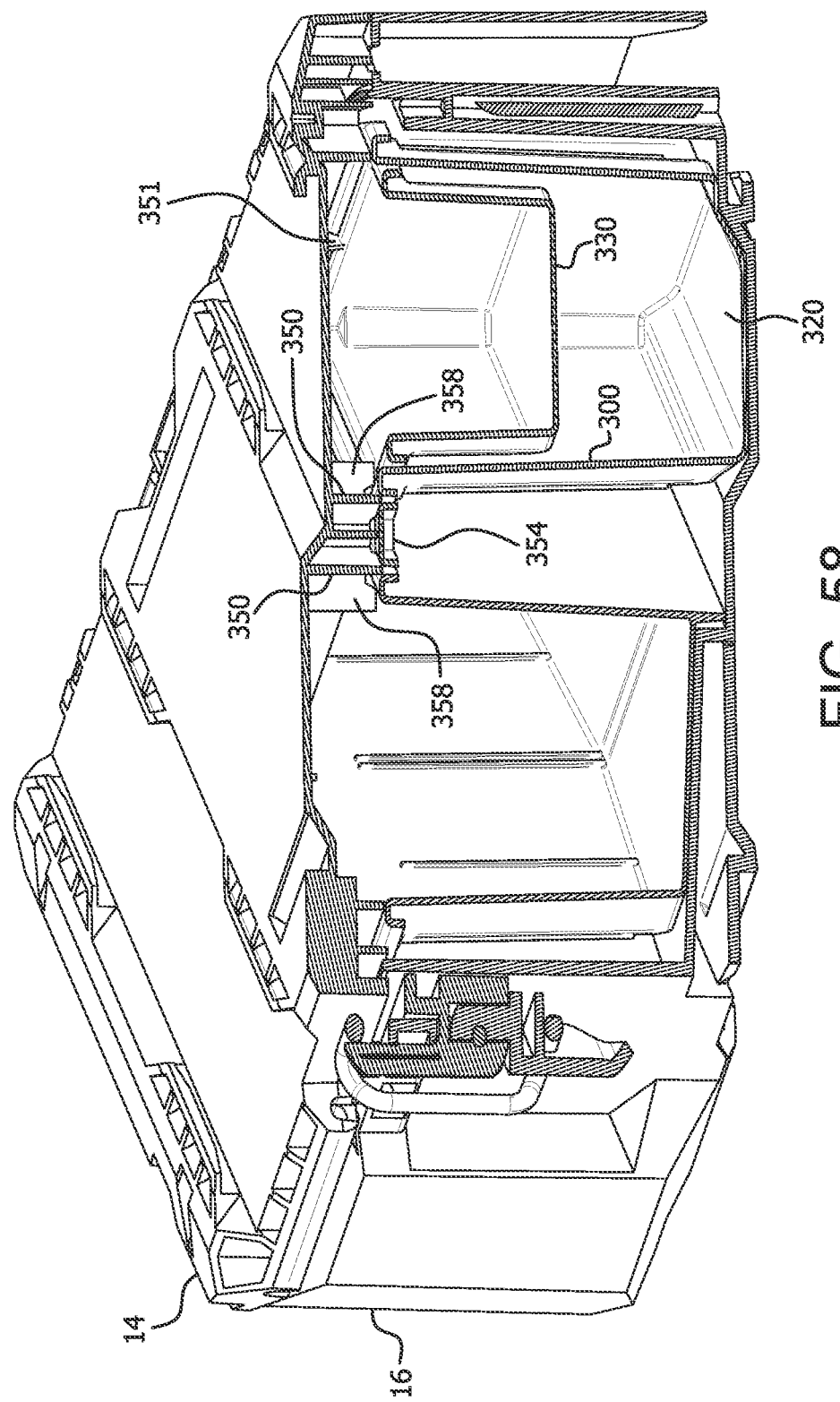
FIG. 58 is a partial cross-section view of a lid mounted on a bottom portion of a storage organizer having bins therein, and an inner bin within one of the bins, in accordance with an example embodiment.
Figure 59B:
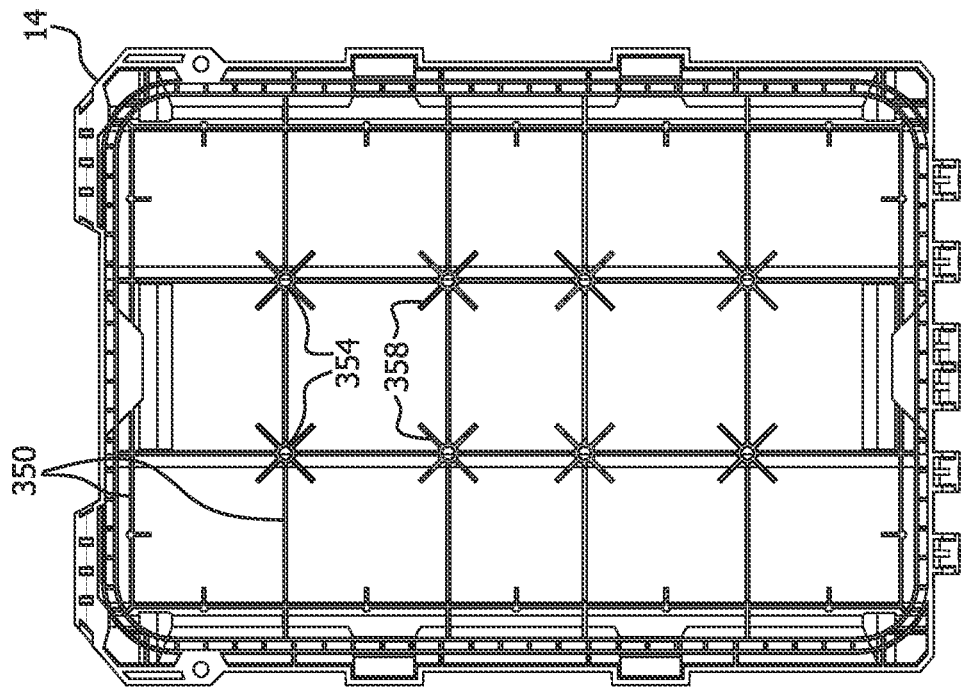
FIGS. 59A and 59B are, respectively, an exterior view and an interior view of a lid for a medium storage box in accordance with an example embodiment.
Figure 59A:
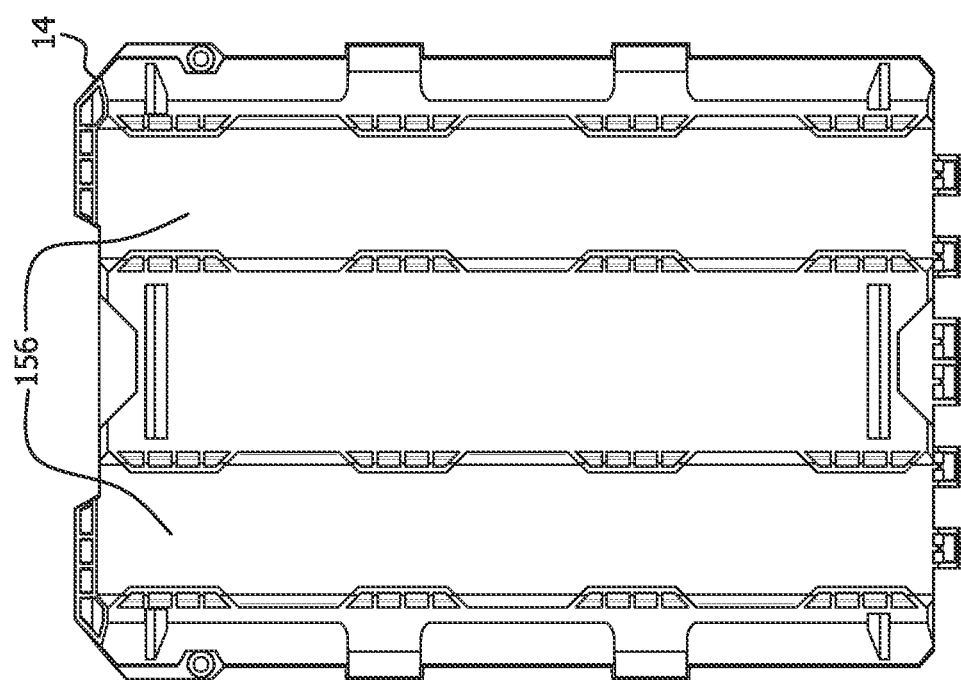

FIGS. 45A, 45B and 45C depict an example arrangement 296 of individual receptacles or bins 300 for use in a medium storage box 12*d* in accordance with an example embodiment. As shown, the bins 300 can be different sizes in terms of length and width, and can also have different depths as shown by the inner bin 330 that can be placed within a bin 300. FIG. 46 is another perspective view of the arrangement of bins 296 shown in FIGS. 45B and 45C but having an inner bin 330 placed in a different bin 300 in accordance with another example embodiment. Some of the bins 300 have a contoured and protruding portion 320 on the exterior bin bottom that abuts ribs or complementary contours in the interior bottom surface 16*b* of the box as shown in FIG. 58. Other bins 300 have a flat bottom 324 with or without legs to cooperate with a complementary interior bottom surface 16*b* of the box 12. The contours 320 or legs 325 of the bins 300 and/or the complementary contours or ribs in the interior bottom surface 16*b* of the box 12 operate together to maintain the bins at their corresponding location within the box 12 and within the bin arrangement (e.g., 296).

The bins 300 can have inset external corners and corresponding interior corner protrusions as shown in the FIGS. 45A though 45C to cooperate, for example with features on lid 14 or interior bottom surface 16*b* of a box 12. The opening defined by the curved rim or edge of the bin 330 can be dimensioned to be received within the opening defined by the curved rim or edge of the bin 300. The interior corner protrusions of the bins 300 as shown in the FIGS. 45A though 45C can engage with the underside of the outer edge of the bin 330 rim to maintain the position of the bin 330 at a corresponding height relative to the top edge of the bin 300.

Figure 48A:
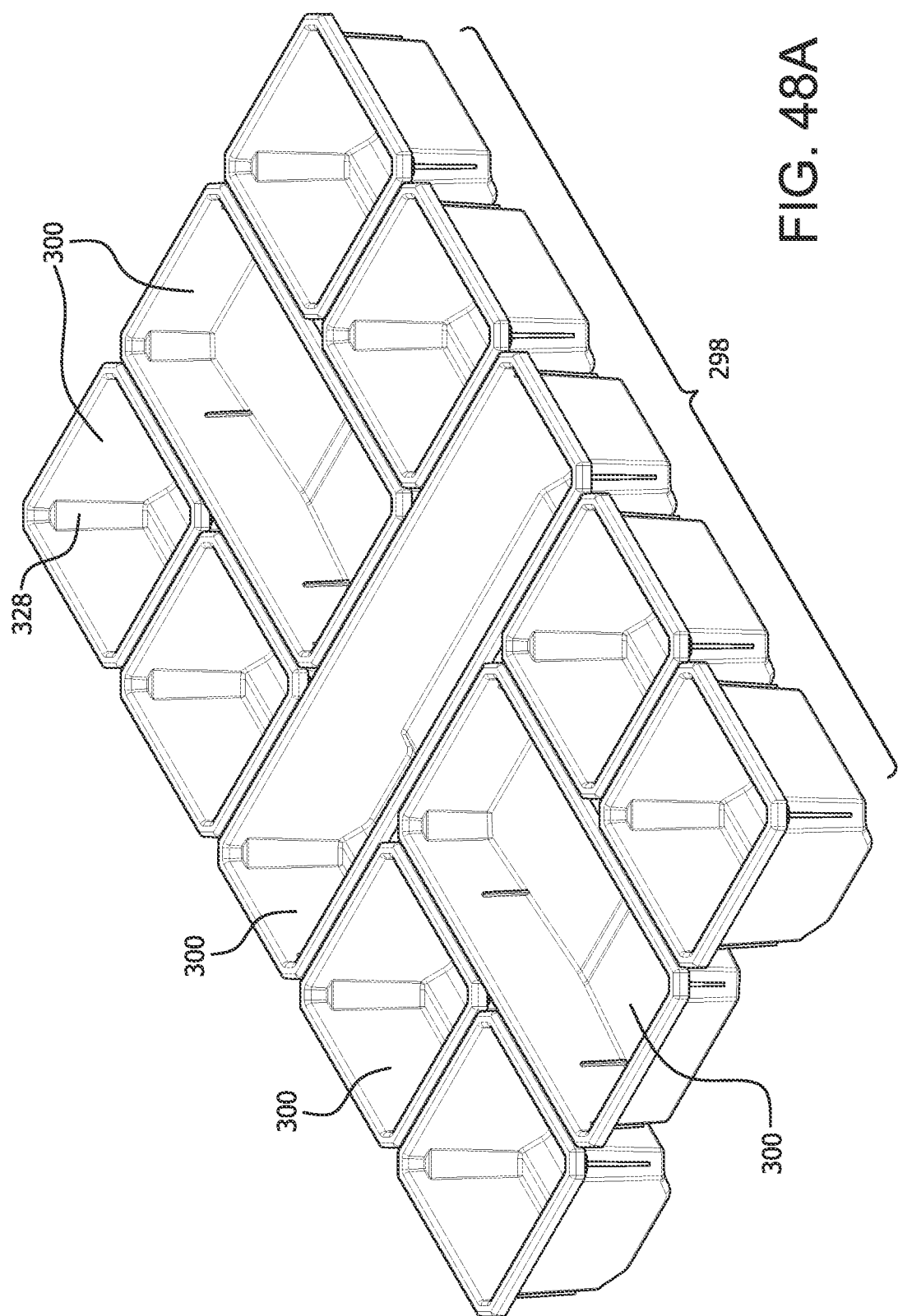
FIGS. 48A, 48B and 48C are, respectively, perspective, top and side views of an arrangement of bins for use in a low profile organizer in accordance with an example embodiment.
Figure 48C:
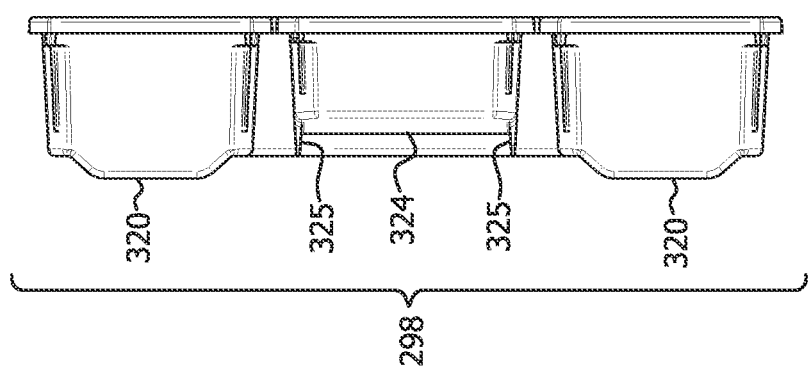
Figure 48B:
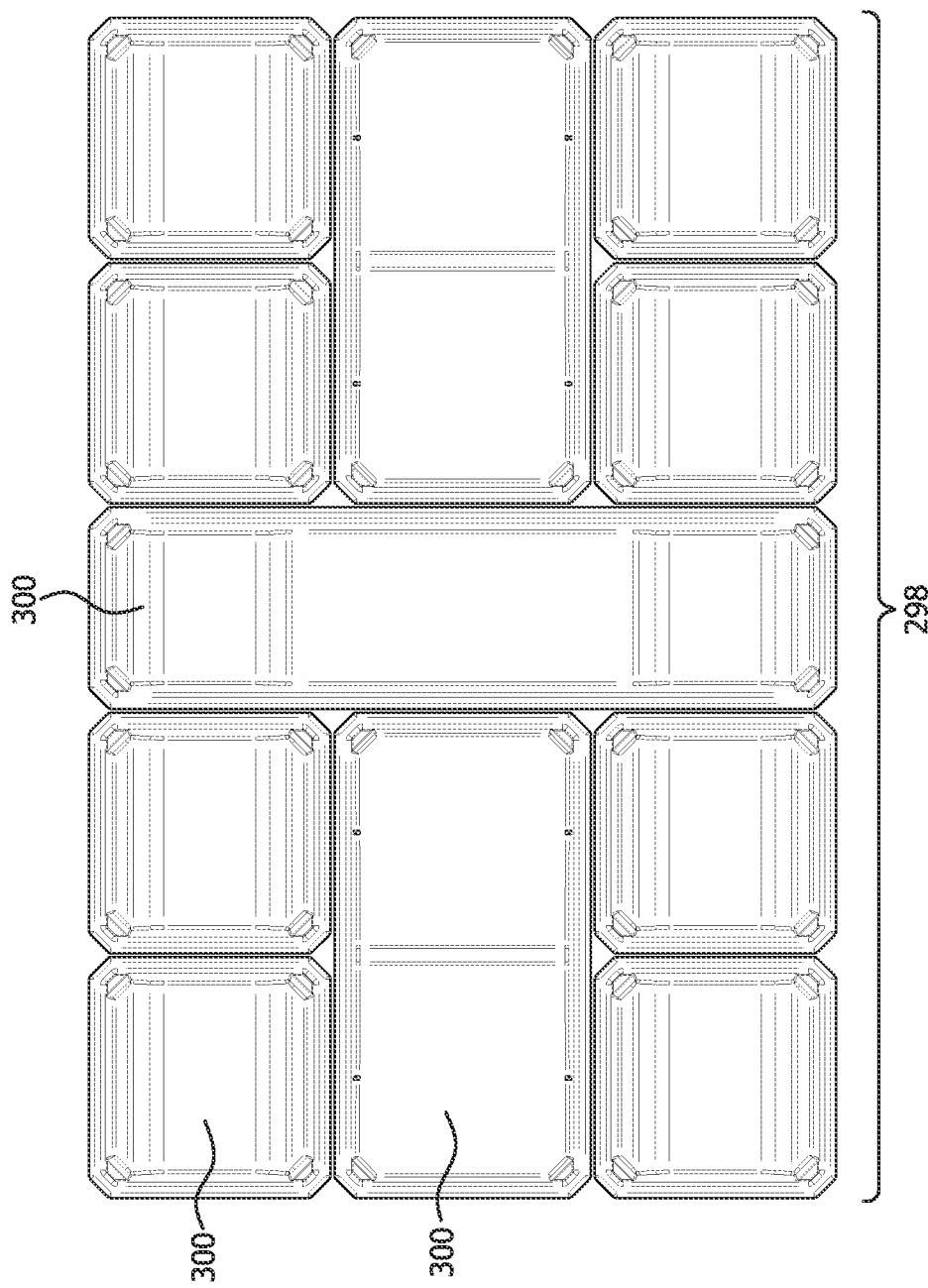
Figure 49A:
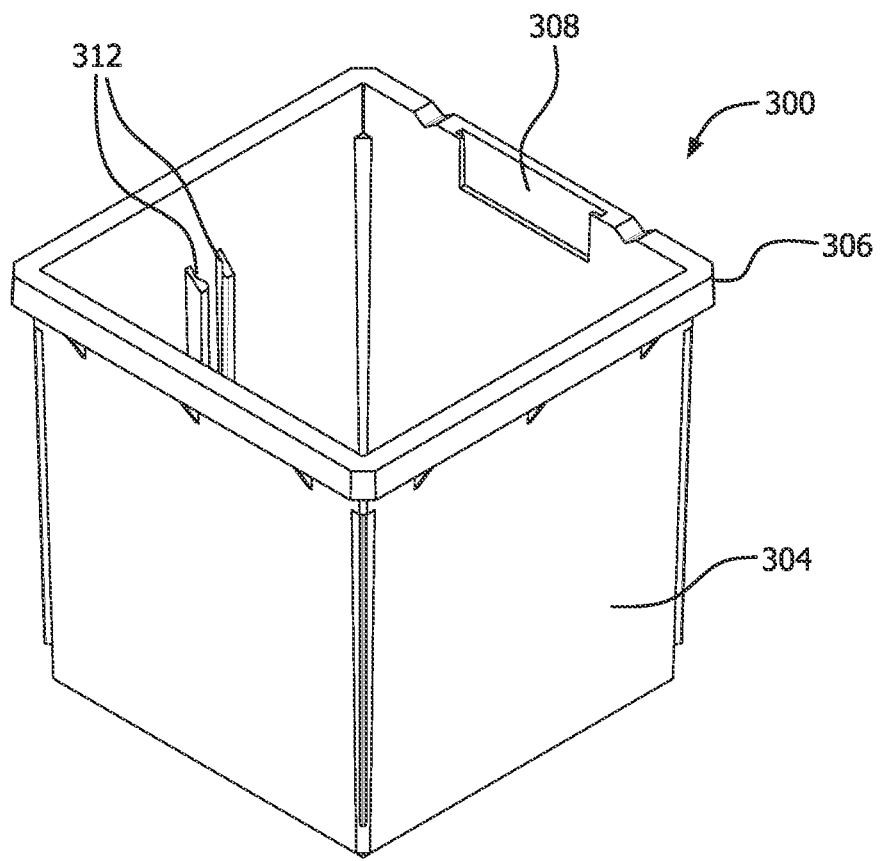

FIGS. 47A through 47D depict an example arrangement 297 of individual bins 300 for use in a compact organizer 12*e* in accordance with an example embodiment, and also show an inner bin 330 removed and inserted into one of the bins 300. FIGS. 48A, 48B and 48C depict an example arrangement 298 of individual bins 300 for use in a low profile organizer 12*f* in accordance with an example embodiment. The depth of the low profile organizer 12*f* is less than that of the other boxes 12*d* and 12*e* and therefore the bins 300 are more shallow.

The bins 300 and 330 are particularly useful for organizing and storing small items such as different types of fasteners, for example. As described below with respect to advantageous lid 14 features, the lids 14 can be configured to abut the bins 300 and 330 to discourage migration of small parts out of a bin during intended or unintended movement of the box 12.

It is to be understood that different numbers, and sizes and configurations or arrangements of bins can be used with the boxes 12*d* through 12*f* than shown with respect to the arrangements 296, 297 and 298 of bins shown in the drawing figures. For example, some of the bins 300 can be omitted to leave space in a box for an elongated item (e.g., pliers or scissors). Also, the opening defined by the curved rim or edge of the bin 300 can be dimensioned to receive the bottom of another bin 300 for stacking purposes within a box.

Figure 50A:
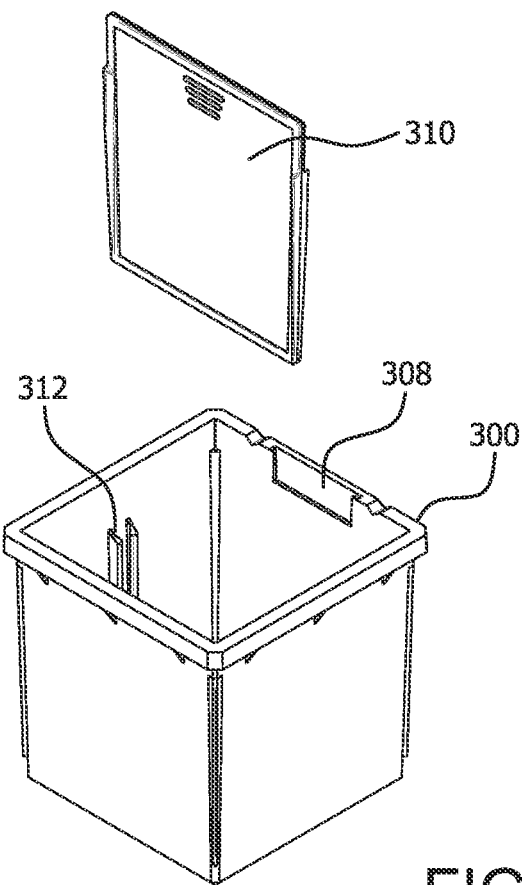
FIGS. 50A and 50B are, respectively, perspective views of the bin of FIGS. 49A, 49B, 49C, 49D, 49E, 49F and 49G showing a bin divider removed and inserted into the bin in accordance with an example embodiment.
Figure 50B:
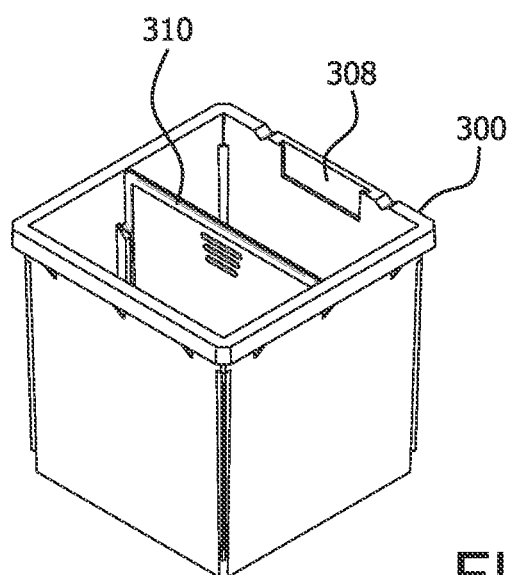

FIGS. 49A through 49G depict another configuration for a bin 300 in accordance with an example embodiment. The bin 300 can have a lip 306 at its top opening similar to the bins shown in FIGS. 45A through 48C. A label area 308 can be provided. As described below, the lids 14 of the boxes can be clear or translucent which enables a user to see contents of the bins 300 and 330 as well as to read any labels or markings applied to the label area 308. The bins 300 can each be provided with one or more pairs of opposite ribs 312 or slots that are configured to receive a removable divider 310 as shown in FIGS. 50A and 50B. The oblong bins 300 shown in FIGS. 45A through 48C can similarly have one or more pairs of opposite ribs 312 or slots that are configured to receive a removable divider 310. As described below, the bottom exterior surface of a bin 300 can have a recess 316 and a notch or channel 317 that can cooperate with features such as a protrusion and ribs, respectively, in the bottom surface 16*b* of a box 12. The bottom interior surface of a bin 300 can be smooth or have an elevated area 318 corresponding in shape to the recess 316 and channel 317 depending on how the bin bottom is molded.

Figure 51:
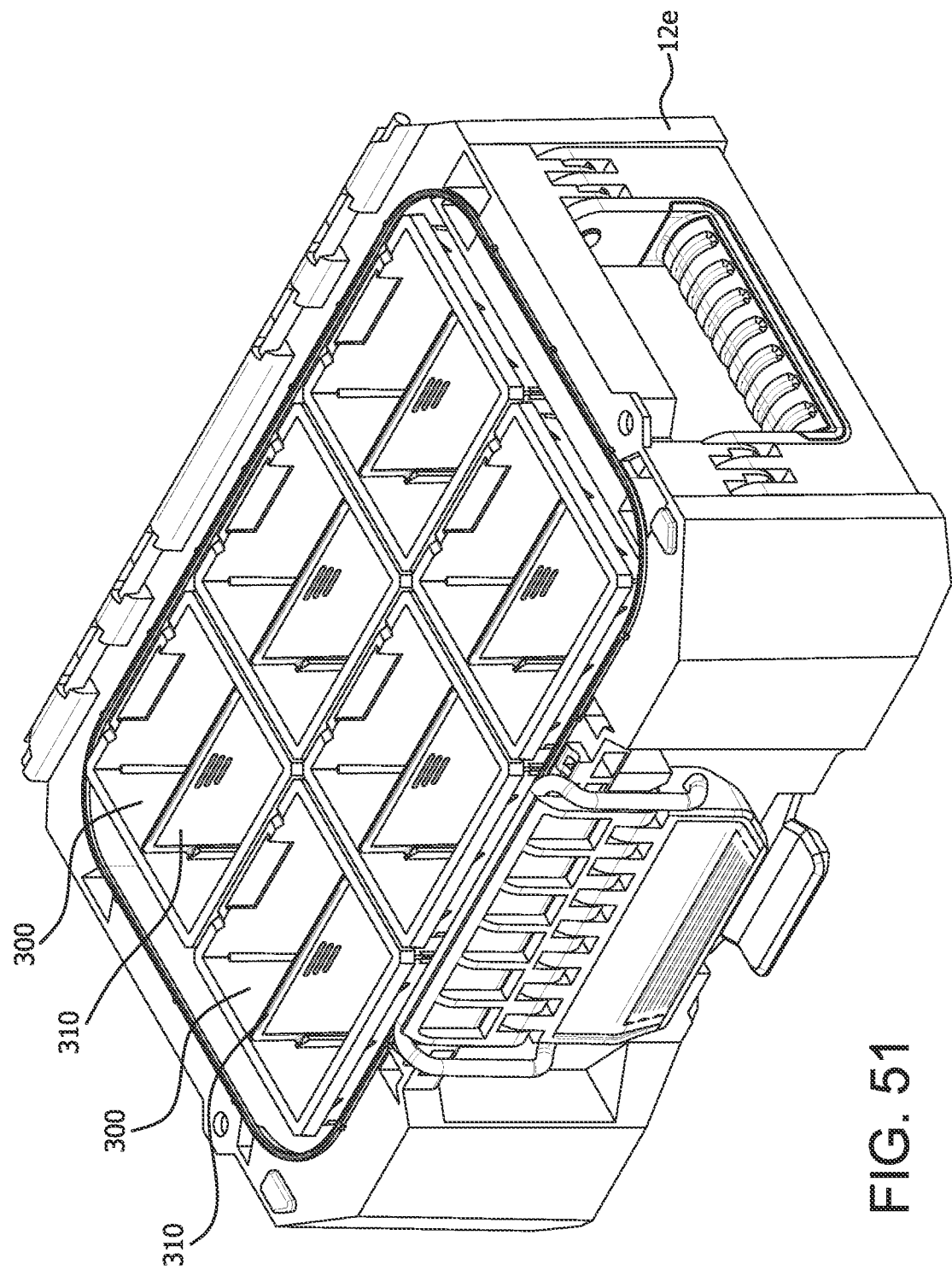
FIG. 51 is a perspective view of a plurality of the bin of FIGS. 50A and 50B in an arrangement of bins for use as a tray in a compact organizer in accordance with an example embodiment.
Figure 53A:
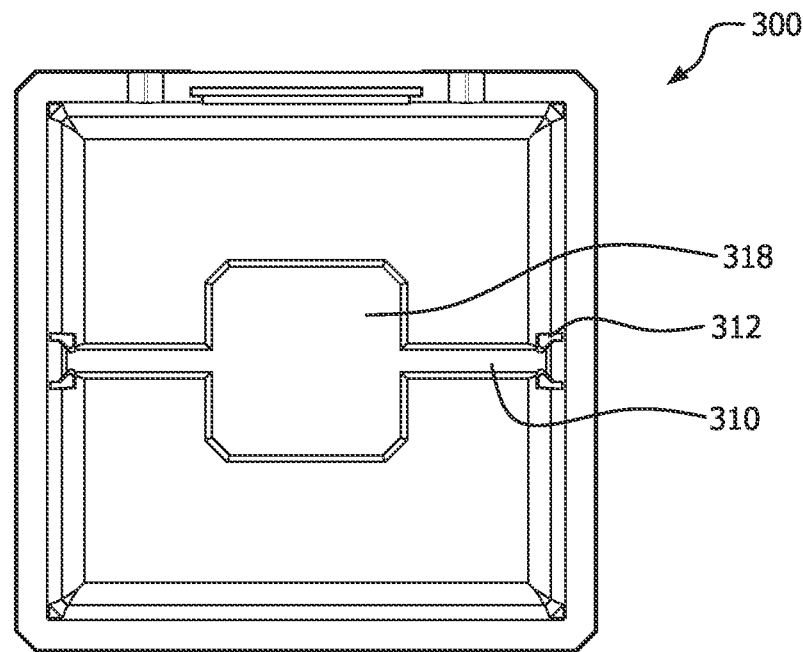
FIGS. 53A and 53B are enlarged top and bottom views, respectively, of the bin of FIGS. 50A and 50B.
Figure 53B:
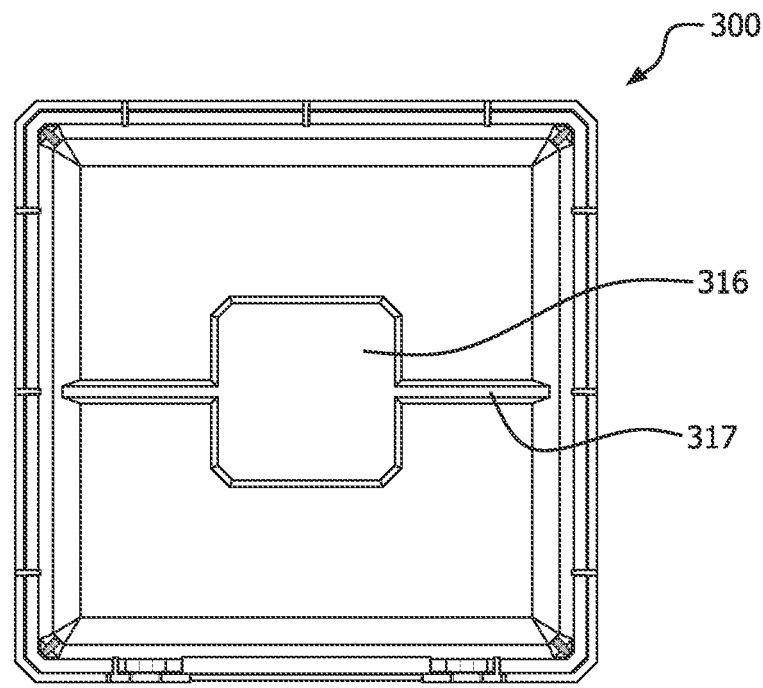

FIG. 51 shows an example arrangement of bins 300 with dividers 310 arranged in a compact organizer 12*e*. The bins 300 can be retained in position within a box 12 using an alignment tray 332 in accordance with an example embodiment. For example, as shown in FIGS. 49A through 49G and in the enlarged views of a bin 300 in FIGS. 53A and 53B, a bin 300 can be provided with at least one recess 316 on the bottom exterior surface thereof that can engage a feature such as a complementary protrusion 338 provided on the bottom inner surface 16*b* of a box 12 or on an alignment tray 332 configured for placement on the bottom inner surface 16*b* of the box 12. The inner circumference of a recess 316 and the outer circumference of a protrusion 338 are dimensioned, respectively, similarly with respect to each other to provide a releasable snug-fit or snap-fit engagement with each other while allowing a user's manual force on a bin 300 to separate the bin recess(es) 316 from coordinating or complementary protrusion(s) on the a box 12 surface 16*b* or alignment tray 332. Also, the depth of the recess 316 and/or the height of the protrusion 338 can be dimensioned to increase the manual force used to separate the bin from the box or tray, or decrease a moment arm of the bin relative to the box or tray. Also, the shape of a recess 316 and a protrusion 338 are similar or, if different, at least part of a recess 316 accommodates a protrusion 338, and the shape is selected from a basic shape (e.g., a geometric shape with few sides or having symmetrical sides) or a more complex shape (e.g., an intricate shape with several sides and/or an irregular shape) to prevent translation of the bin 300 relative to the box 12 in the plane of the bottom interior surface 16*b* of the box.

Figure 52:
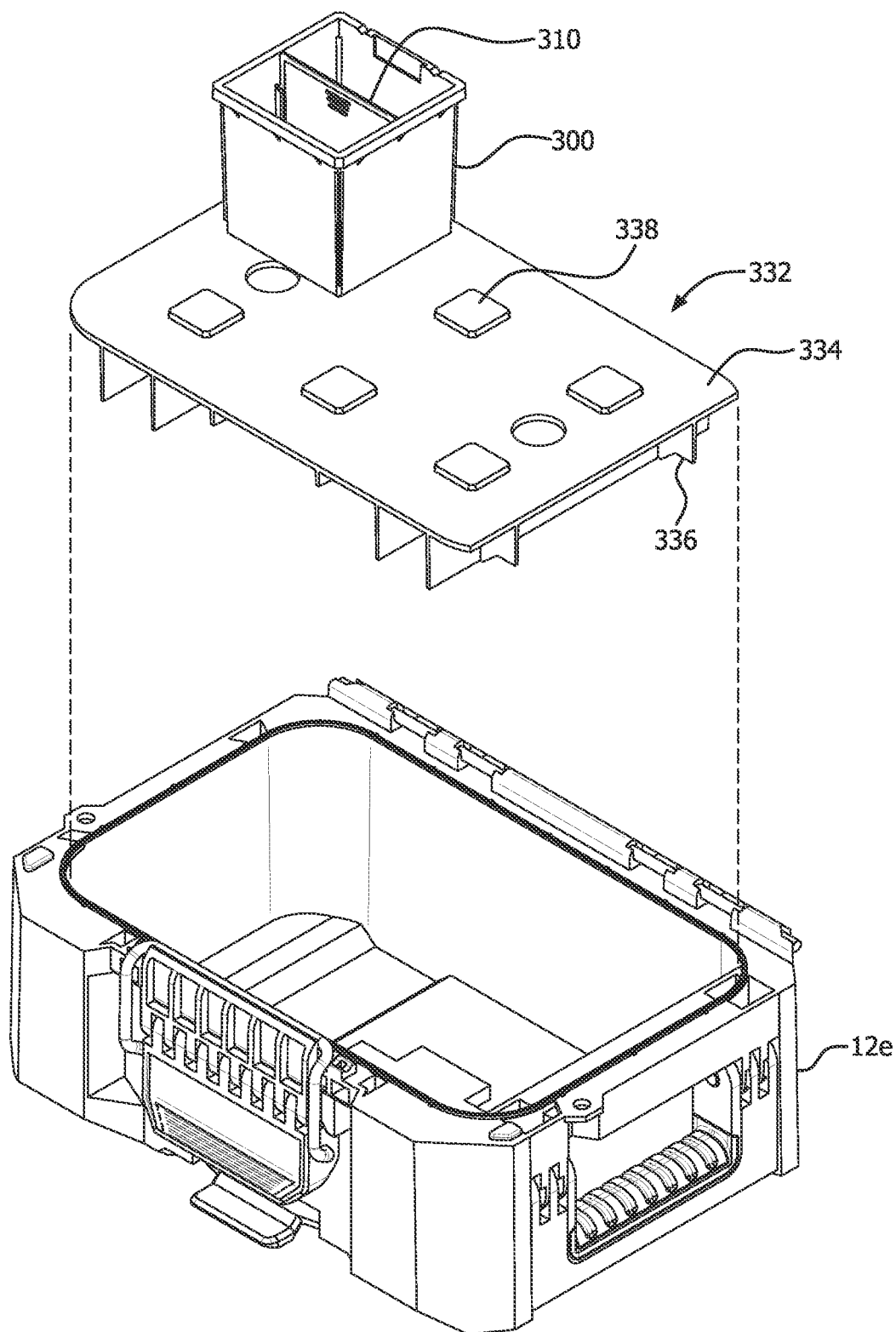
FIG. 52 is a perspective view of the bin of FIGS. 50A and 50B on an alignment tray for a compact organizer in accordance with an example embodiment.

A distribution pattern of one or more recesses 316 in a bin 300 can corresponds to at least part of a distribution pattern of protrusions 338 extending from a surface of a box 12 or a planar member 334 of a tray 332. For example, the spacing between two recesses 316 corresponds to the spacing between two protrusions 338 to allow one or more of the recesses 316 to receive corresponding ones of the protrusions 338. Corresponding distribution patterns of one or more recesses 316 in a bin 300 and one or more protrusions 338 in a box 12 or tray 332 can be symmetrical or irregular, and can have different densities (e.g., the number of recesses and protrusions within a designated square area) depending on the sizes of the bins 300, box 12 and tray 332 and on the respective inner and outer circumferences of the recesses 316 and protrusions 338 and the distances therebetween. For example, a different and more dense pattern of bin recesses 316 and tray protrusions 338 is shown in FIGS. 64B, 64D and 66A, 66B as compared with those in FIGS. 52, 53A and 53B. The tray 332 can be provided with one or more footers 336 to displace the bottom exterior surface of the tray 332 away from the bottom 16*b* of the box 12 to allow storage of tools underneath the tray 332 or to accommodate contours in the bottom surface 16*b* of the box. The tray 332 can also have one or more finger holes dimensioned to accommodate respective user fingers to allow a user to grip and lift the tray 332 from the box 12.

Figure 106:
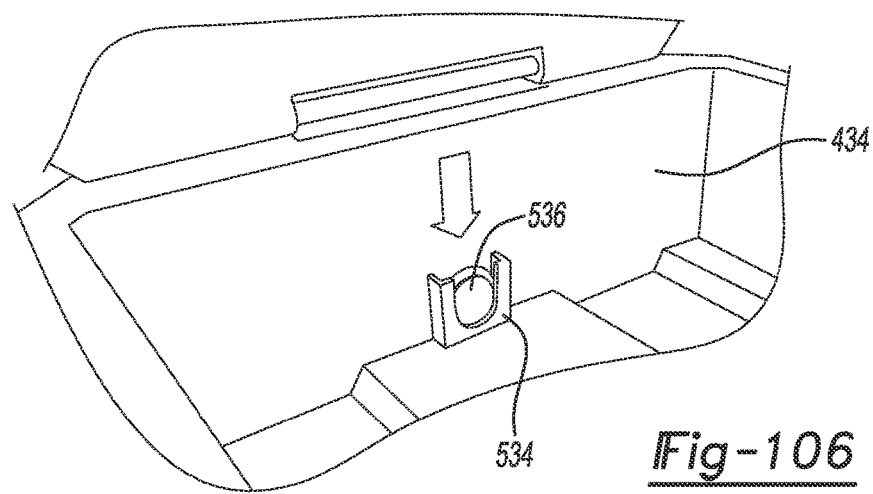

In accordance with another embodiment, a box 12 interior can be configured to releasably hold an air tag with unique identifier to facilitate wireless monitoring of box 12 locations. FIG. 106 is a partial view of a storage box 12 interior with integrated air tag holder 534 and a removable air tag 536 inserted therein in accordance with an example embodiment. The integrated air tag holder 534 can be molded, for example, as an integrated slot in an interior side wall 13c-13c or on an interior surface 14b 16b of a box and dimensioned to receive the air tag 536 in the slot, and secure the air tag 536 within the box 12e while protecting the air tag 536 from box contents.

Box Lids 14

The interior structure of the top portion or lid 14 of a box 12 in the modular storage system 10 will now be described with reference to FIGS. 54A through 68. The interior features of the lids 14 described in accordance with example embodiments realize many advantages such as, but not limited to, increased versatility and storage options for, and easier user access to, stored items in the modular storage system 10. In addition to other lid features described herein, the lid for each box 12 can be provided with a seal along its interior perimeter and have clearances and tolerances with respect to the box 12 enclosure to achieve at least an Ingress Protection rating of IP65 and can be configured for a minimum of IP66 dust and water rating (e.g., up to IP68).

Figure 54A:
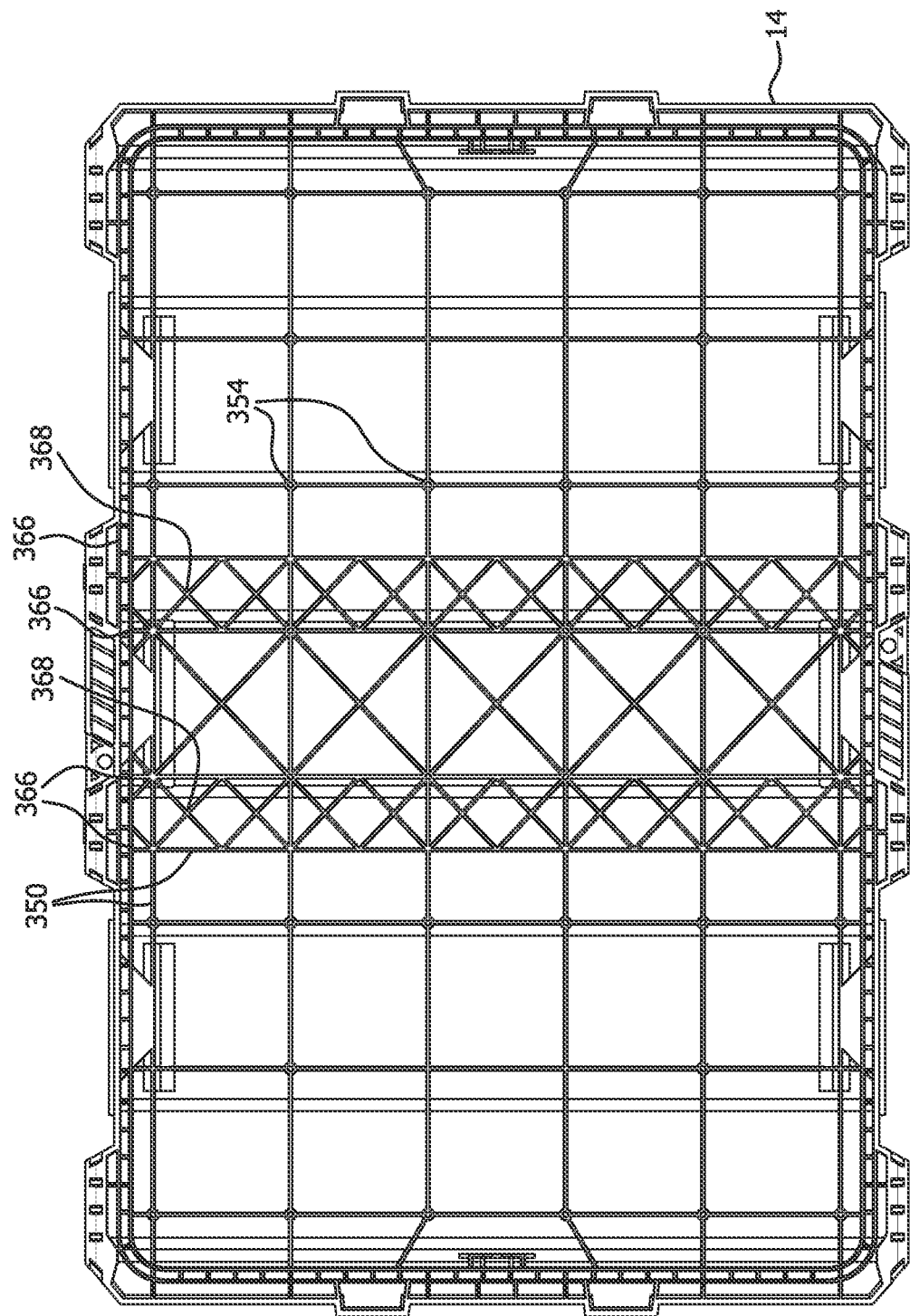
Figure 54B:
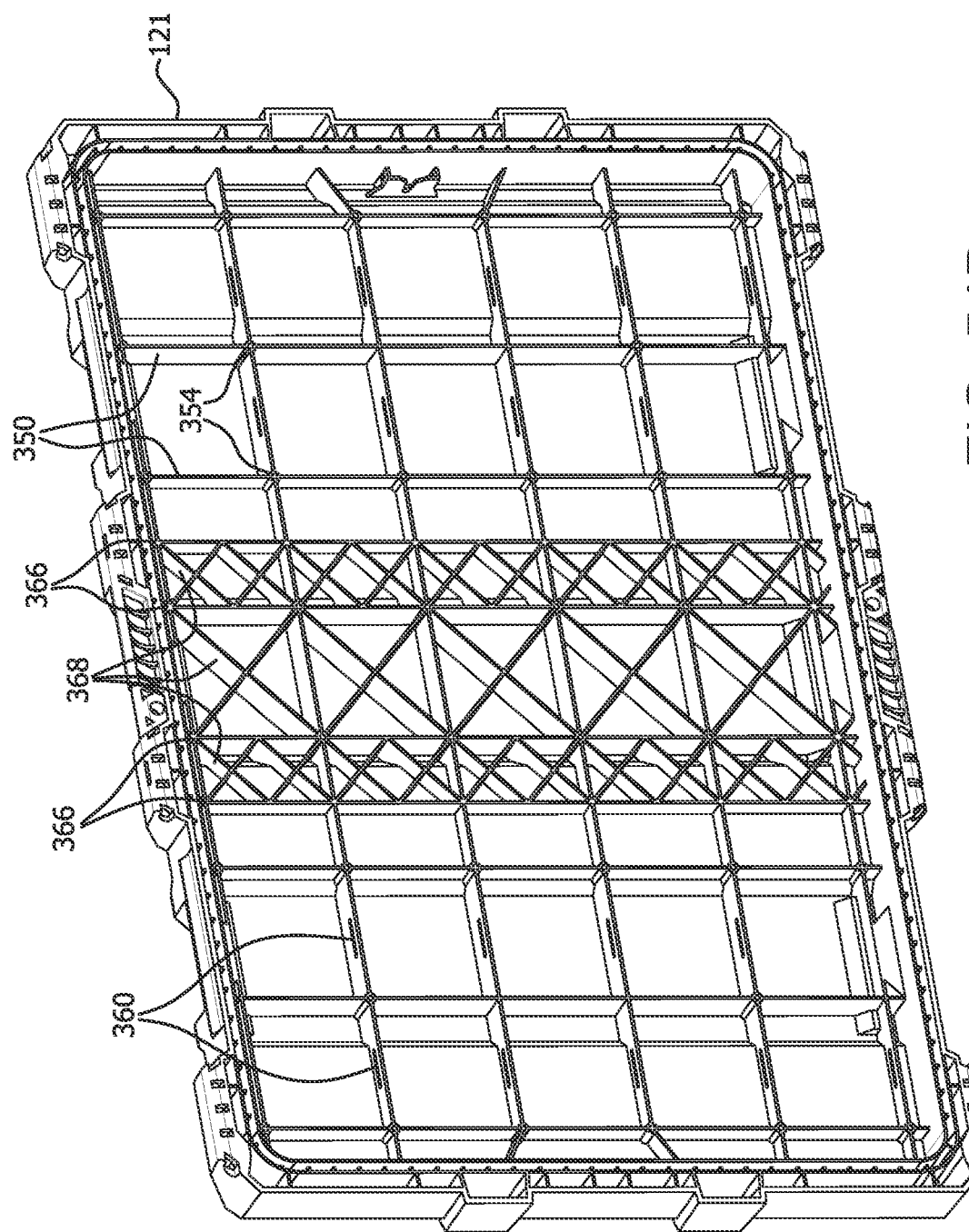

FIGS. 54A and 54B depict an example interior surface 14b of a top portion or lid 14 of a rolling base box 12a. The same sized lid 14 and configuration shown in FIGS. 54A and 54B can also be used for a large storage box 12c. The top portion 14 can be a clear or opaque lid structure with an internal surface 14b comprising a grid pattern of ribs 350, and a plurality of receptacles (e.g., screw bosses) 354 provided in accordance with a boss pattern that can include all or only a subset of intersections of at least two of the ribs 350. Each receptacle 354 is configured to provide a hole or channel in which a screw or other fastener, or a pin, can be inserted therein to allow for items to be affixed to the lid 14 in a convenient and versatile manner. Such lid storage is useful for additional specialized organization to complement bulk storage available in the storage compartment 18 or bottom portion of a box, and is particularly useful for items that often find their way to the bottom of a storage box 12 due to their thinner or overall smaller size (e.g., hand tools, drilling and driving bits, chargers and batteries, and so on).

The ribs 350 increase structural strength of the lid 14 structure to prevent flexing thereof under a designated weight tolerance (e.g., 200 pounds standing or stationary weight applied to the top portion of the box such as from other boxes stacked on top of the box). For example, rib 350 height and the plastic volume can be selected to reduce to a desired amount the deflection distance in response to a force (e.g., a standing load). The grid pattern of ribs can be designed to have a more dense pattern in some areas of the lid structure (e.g., its middle section) than other areas of the lid structure (e.g., end sections of the lid structure that are disposed on opposite side of a more densely reinforced middle section). An example pattern of greater density can be centered double trusses 366 and with more diagonal ribs providing a reinforcing lattice structure 368 therebetween, or otherwise smaller areas defined by intersecting ribs 350.

Figure 56A:
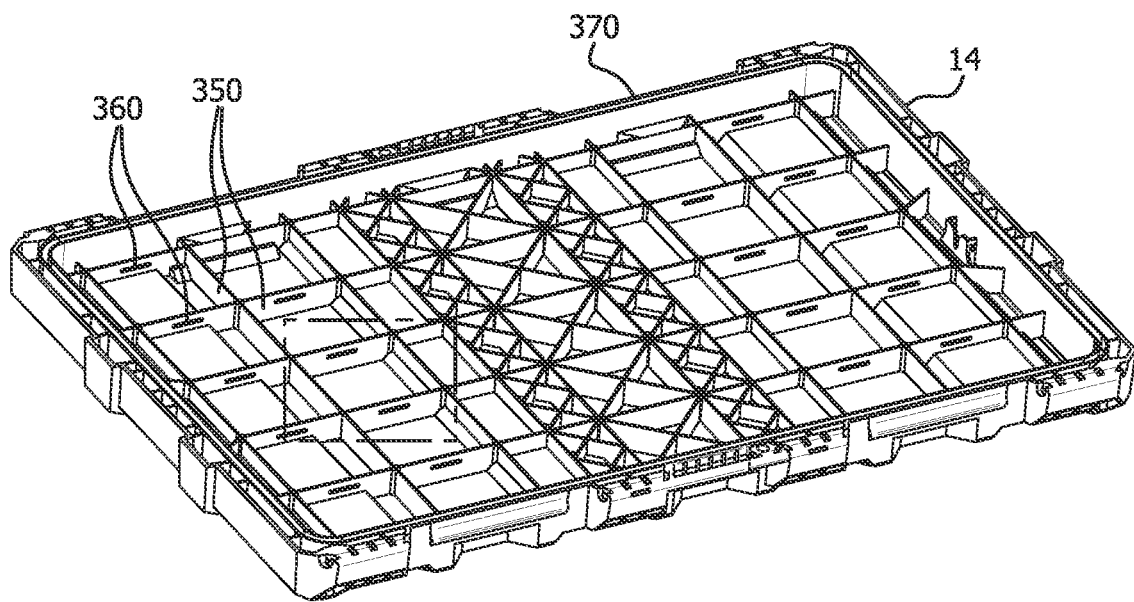
FIGS. 56A and 56B are, respectively, a perspective view and a partial enlarged view of a box lid constructed in accordance with an example embodiment.
Figure 56B:
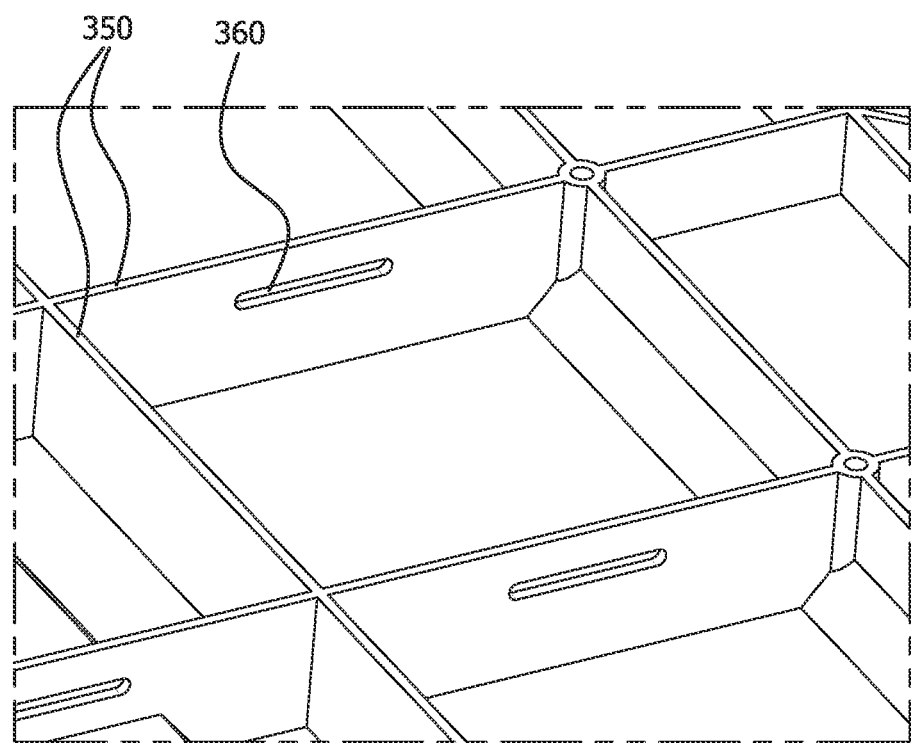

With continued reference to FIGS. 54A and 54B and with reference to FIGS. 56A and 56B, the top portion or lid 14 of a box has slots or undercuts 360 provided in at least one of the ribs 350. These undercuts 360 are also advantageous features that accommodate snap-fit or fastened accessories or tools to be connected to the lid 14. For example, an accessory or tool can be provided with a cleat or cleats that mate with one or more of the slots 360 to releasably hold the accessory or tool against the underside 14b of the lid 14 when not in use, and to allow for convenient access and detachment of the accessory or tool from the lid 14 when needed.

Figure 55:
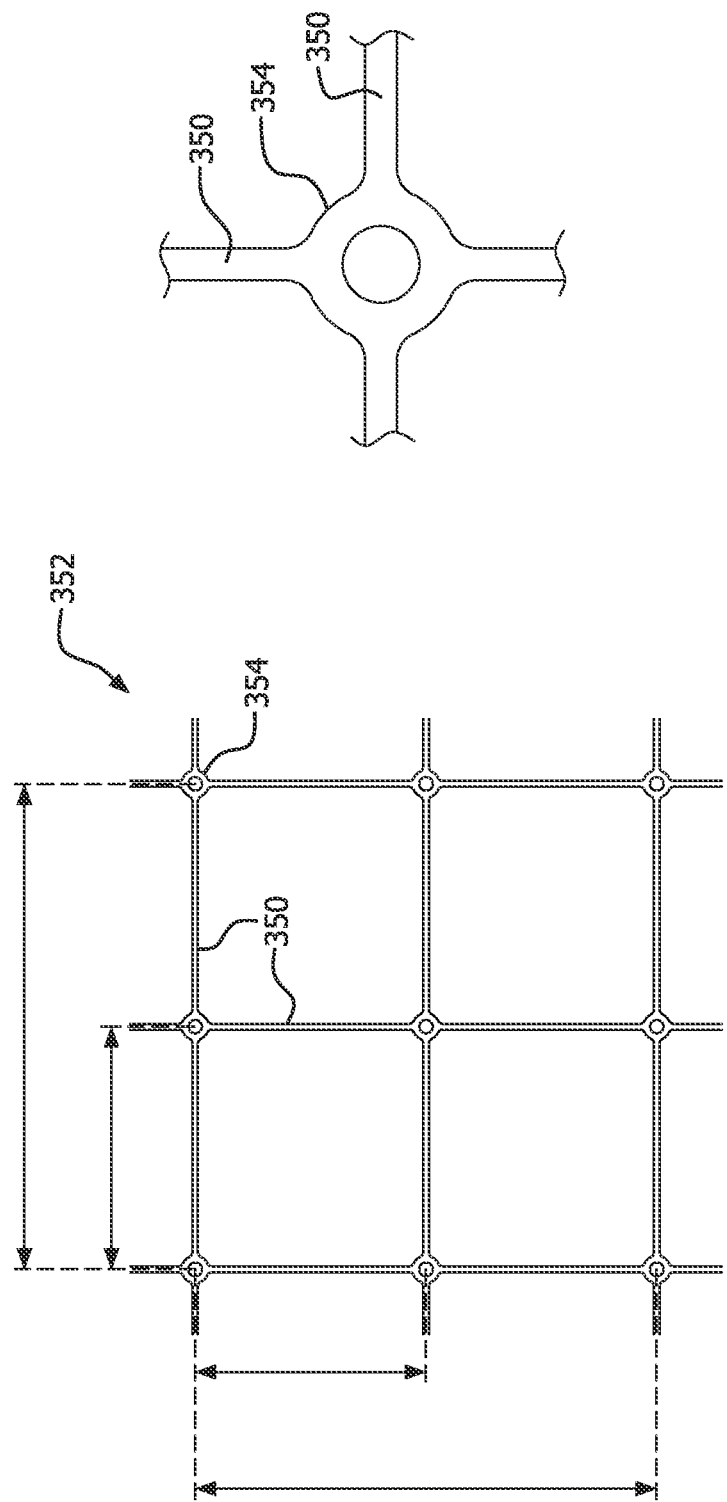
FIG. 55 is a partial view of a box lid with an arrangement of bosses, and an enlarged view of a boss, in accordance with an example embodiment.

As shown in FIG. 55, the selected boss 354 size at the rib 350 intersections or elsewhere on the lid 14 can have an outer diameter of 10 millimeters (mm) and an internal dimension of 3.5 mm×3.5 mm, for example, to fit a standard #10 screw, or other dimensions to securely receive a self-tapping 0.25 inch screw, for example. Example grid spacing between adjacent bosses on a lid 14 can be, for example, on the order of 90-96 mm. A fastening mount to the screw boss can also be a two-part item wherein a first part employs pressure to securely fit into a screw boss 354 provided on the underside of the lid 14, and a second part screws into the first part to ensure fitting of the fastener into the screw boss 354. It is to be understood that different boss 354 sizes can be used to cooperate with different types of fasteners such as a wing nut, slotted or Phillips head screw or other fastener such as a snap fit plug. The bosses 354 allow different accessories and/or items to be connected to the lid 14 such as, for example, holders for various tools such as for blades for different types of saws (e.g., circular, reciprocating, diamond, and cut-off saw, among others) or drill or driver bits, cordless devices (e.g., light source, radio), cables and cable management accessories, hand tools, and so on. For example, a bar structure can be mounted between two screw bosses 354 and span essentially any distance across the lid 14, thereby allowing a tool with a clip to be removably mounted to the bar structure and therefore to the lid 14 (e.g., a power adapter, a tape measure, or other items that are provided with belt clips). Also, a pressure slotted accessory can be affixed to the lid 14 via fasteners in corresponding screw bosses. The pressure slotted accessory is a board or other substrate with increasing thickness from one end to the other, or a board of uniform thickness with graduated pedestal. In either example, the thickest portion of the pressure slotted accessory is oriented toward the bottom of the planar part of the lid 14 when it is open relative to the bottom portion 16 of a box 12. The accessory can have one or more straps or bands that apply retention pressure on a tool or item located under the strap(s) to retain the tool or item against the board. When the lid 14 is open, the increased thickness of the pressure slotted accessory toward the bottom part thereof reduces the effect of gravity pulling the tool or item downward and off the pressure slotted accessory board or substrate.

Figure 57A:
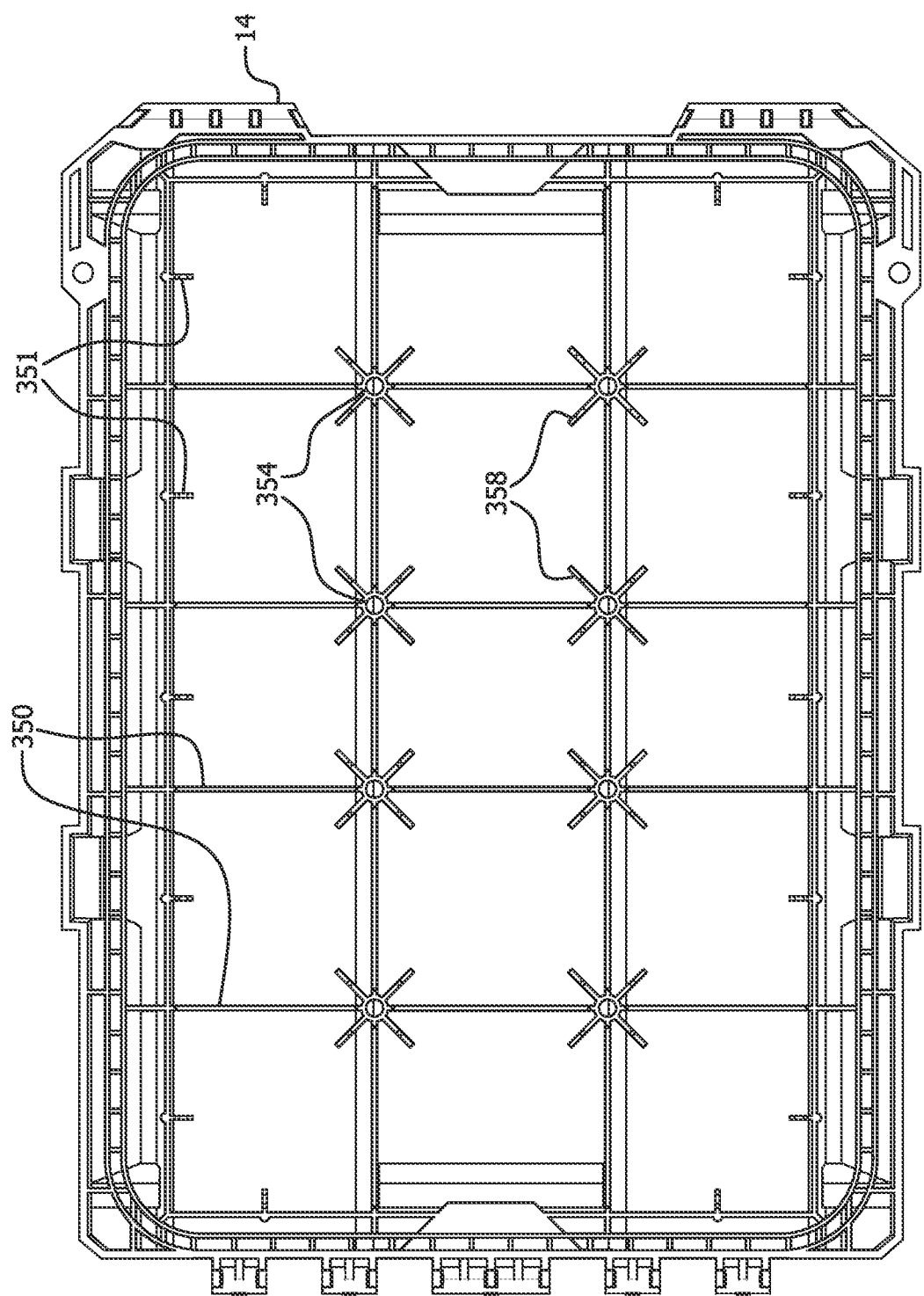
FIGS. 57A and 57B are, respectively, interior views of a lid portion and a bottom portion of a box in accordance with an example embodiment.
Figure 60:
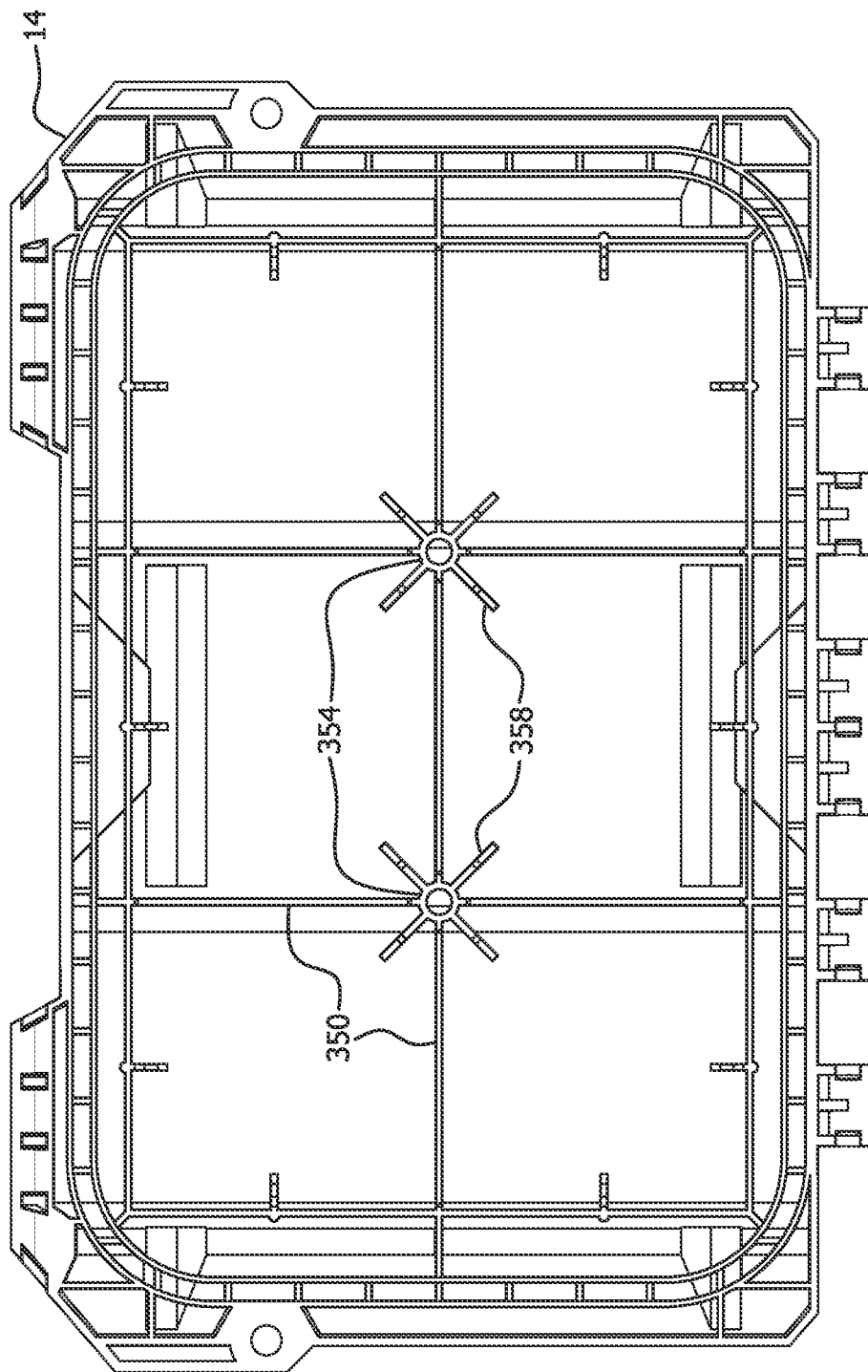
FIG. 60 is an interior view of a lid for a compact organizer in accordance with an example embodiment.
Figure 61B:
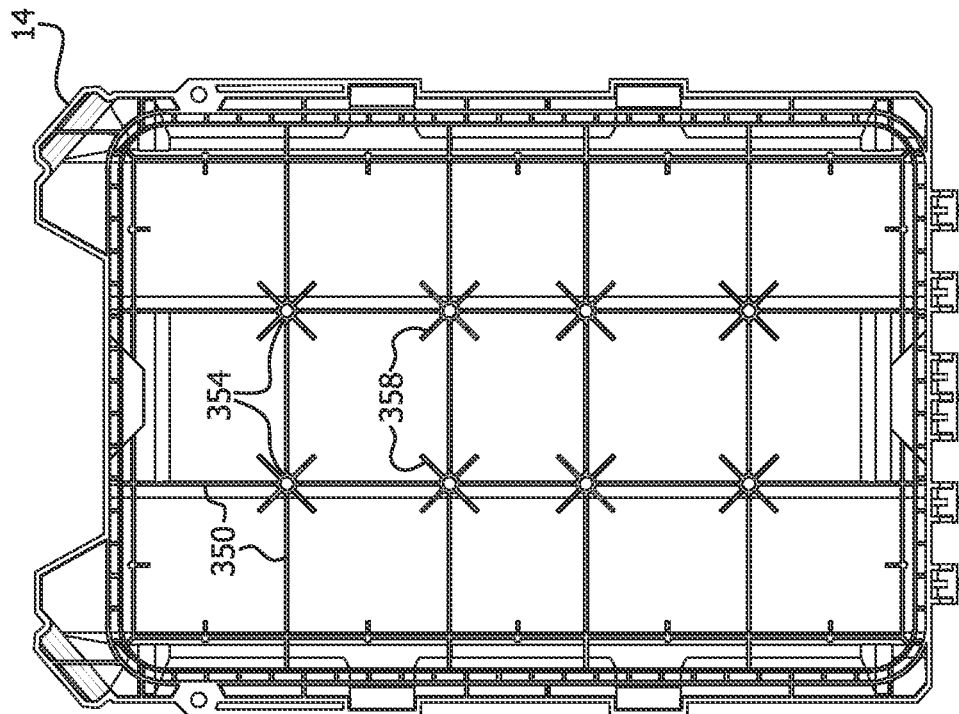
FIGS. 61A and 61B are, respectively, an exterior view and an interior view of a lid for a low profile organizer with an example embodiment.
Figure 61A:
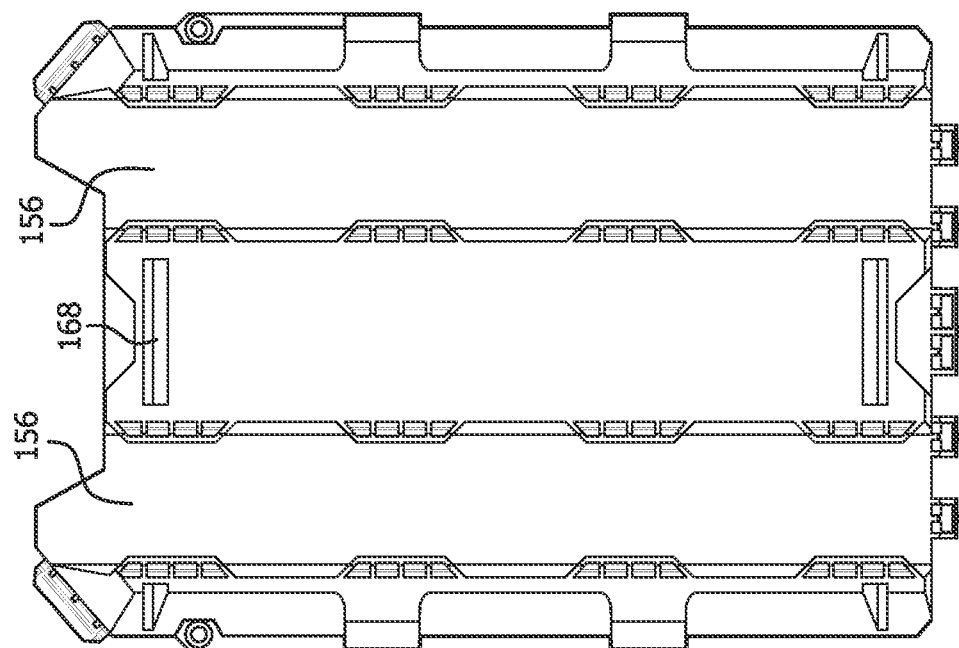
Figure 62:
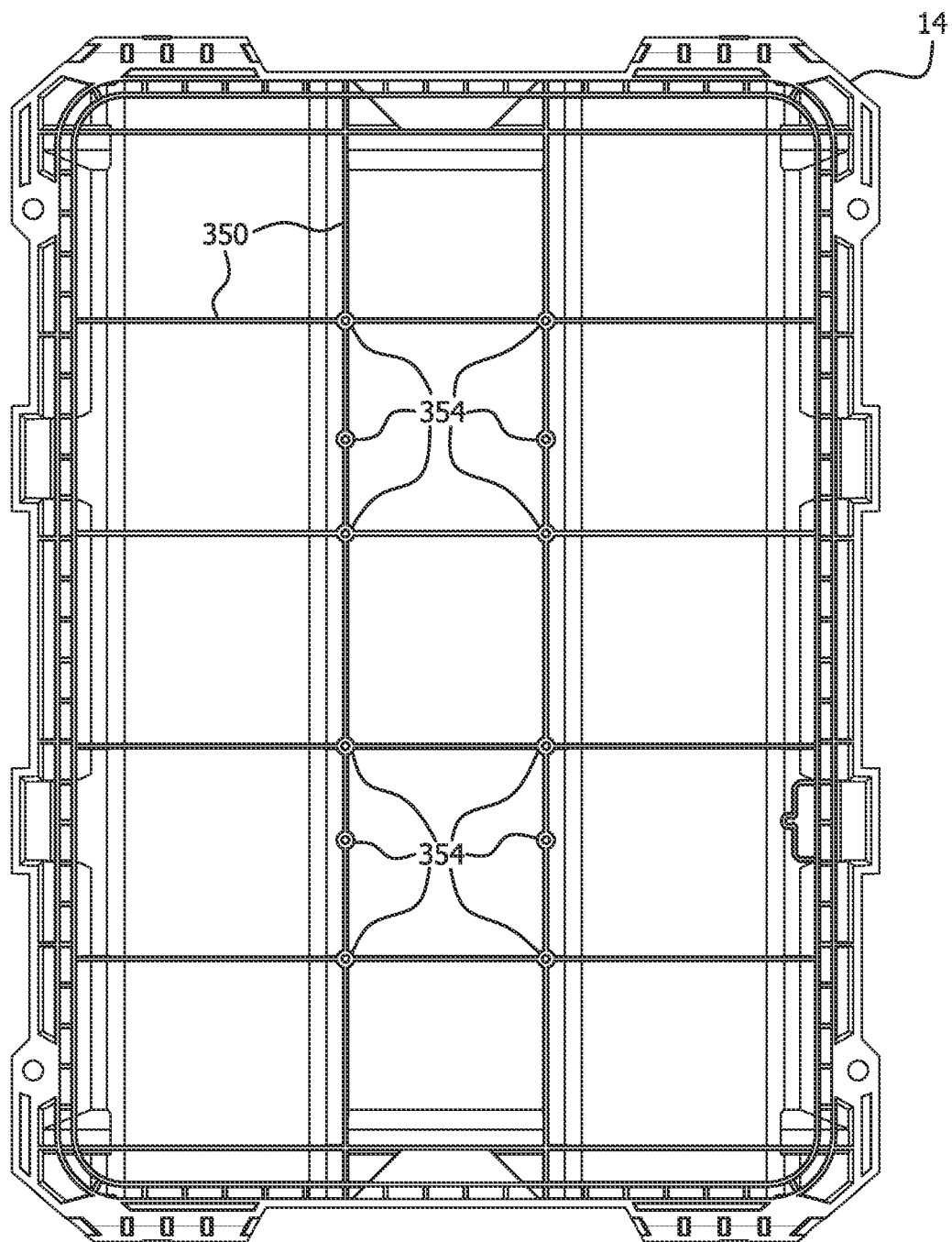
FIG. 62 is an interior view of a lid for a portable storage box in accordance with an example embodiment.
Figure 63:
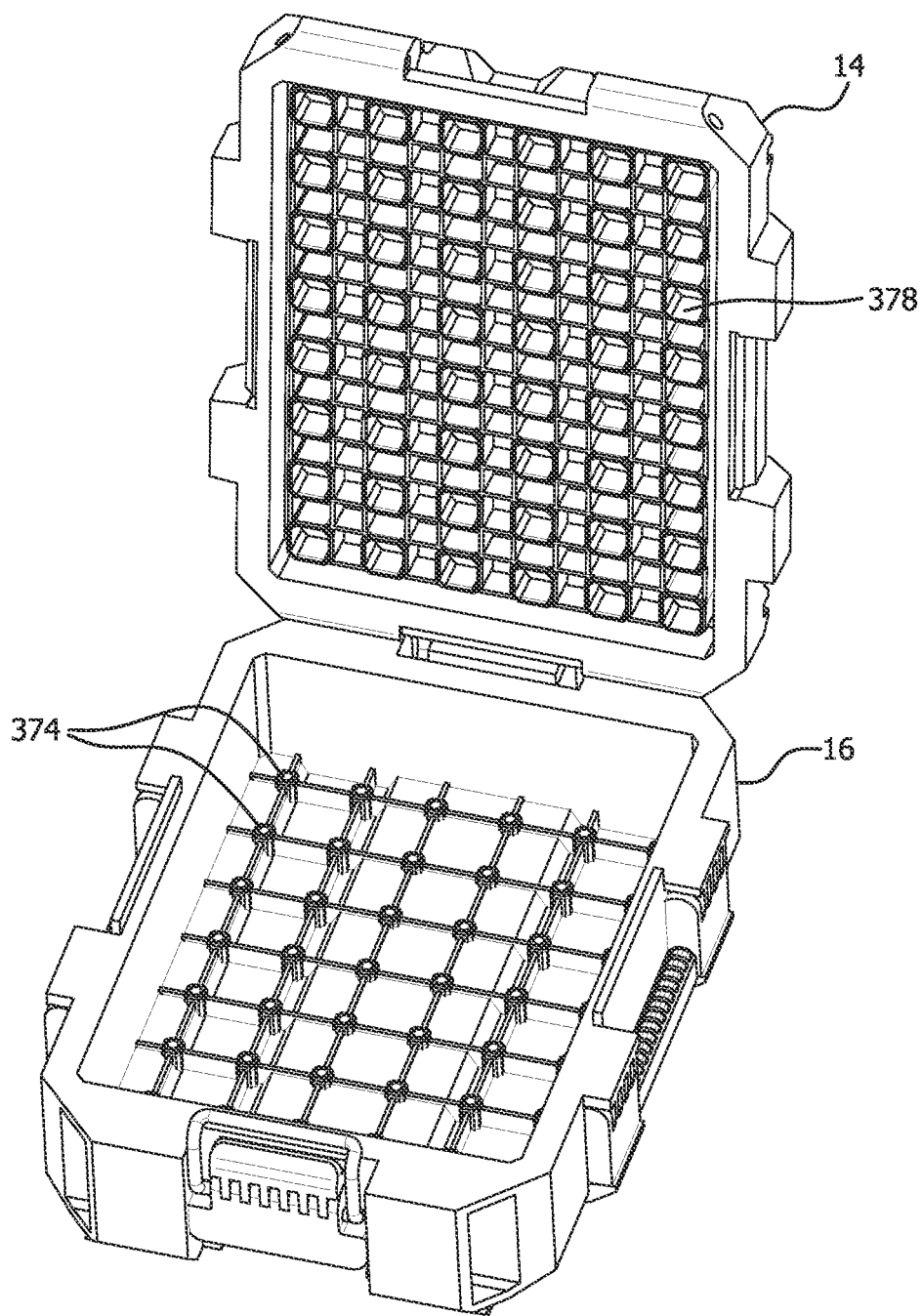
FIG. 63 is a perspective view of a box with a lid portion having a rib pattern that cooperates with an alignment feature in a bottom portion of a box to retain bins in accordance with an example embodiment.
Figure 64A:
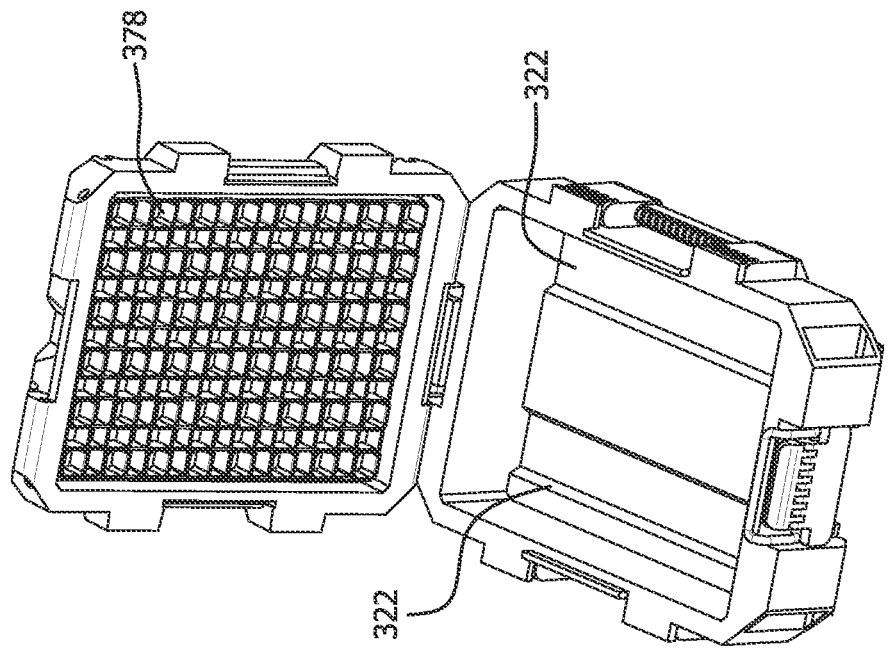
FIG. 64A is a perspective view of a box with a lid portion having a rib pattern that cooperates with an alignment feature in a bottom portion of a box to retain bins in accordance with an example embodiment.
Figure 64B:
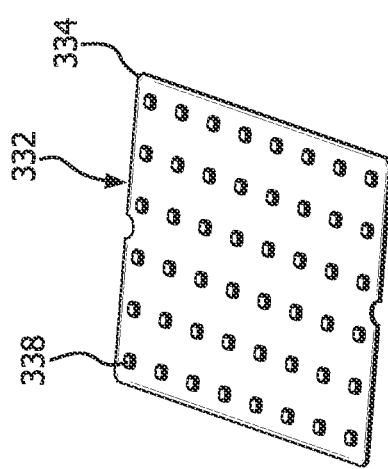
FIG. 64B is a perspective view of an alignment tray for use in the box shown in FIG. 64A in accordance with an example embodiment.
Figure 64C:
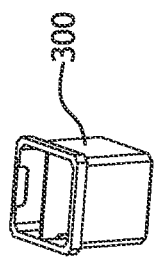
FIGS. 64C and 64D are, respectively, perspective top and bottom views of a bin for use with the alignment tray in FIG. 64B in accordance with an example embodiment.
Figure 64D:
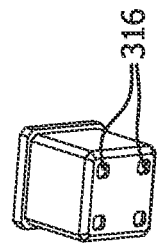
Figure 65C:
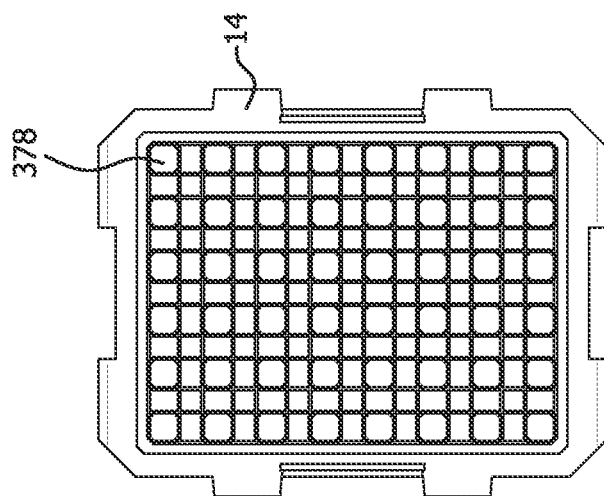
FIGS. 65A, 65B and 65C are internal views of respective lids having different rib grid patterns in accordance with example embodiments.
Figure 65B:
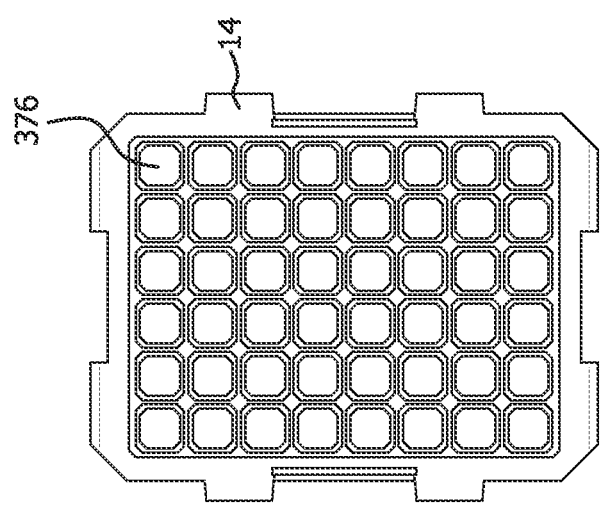
Figure 65A:
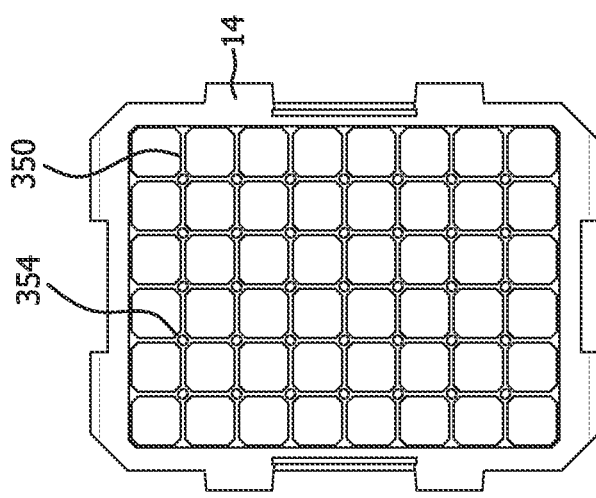

As described below, the tops of ribs 350 that surround areas defined by portions of intersecting ribs 350 in the grid pattern on a lid 14 can cooperate with the upper edges of internal organization bins 300 shaped similarly to the these areas and placed in the bottom portion 16 of a box 12 to prevent items (e.g., fasteners of different types) in bins 300 from escaping their respective bins when the lid 14 is closed over the bottom portion of the box. The grid patterns of the ribs 350 can vary among the respective sizes of boxes 12a-f and therefore permit these respective boxes to accommodate different numbers and locations of internal organization bins 300 and withstand varying amounts of standing forces. FIGS. 54A, 57A and 60 illustrates example amounts of grid spacing and resulting grid patterns with different sizes of areas that accommodate internal organization bins 300.

Figure 57B:
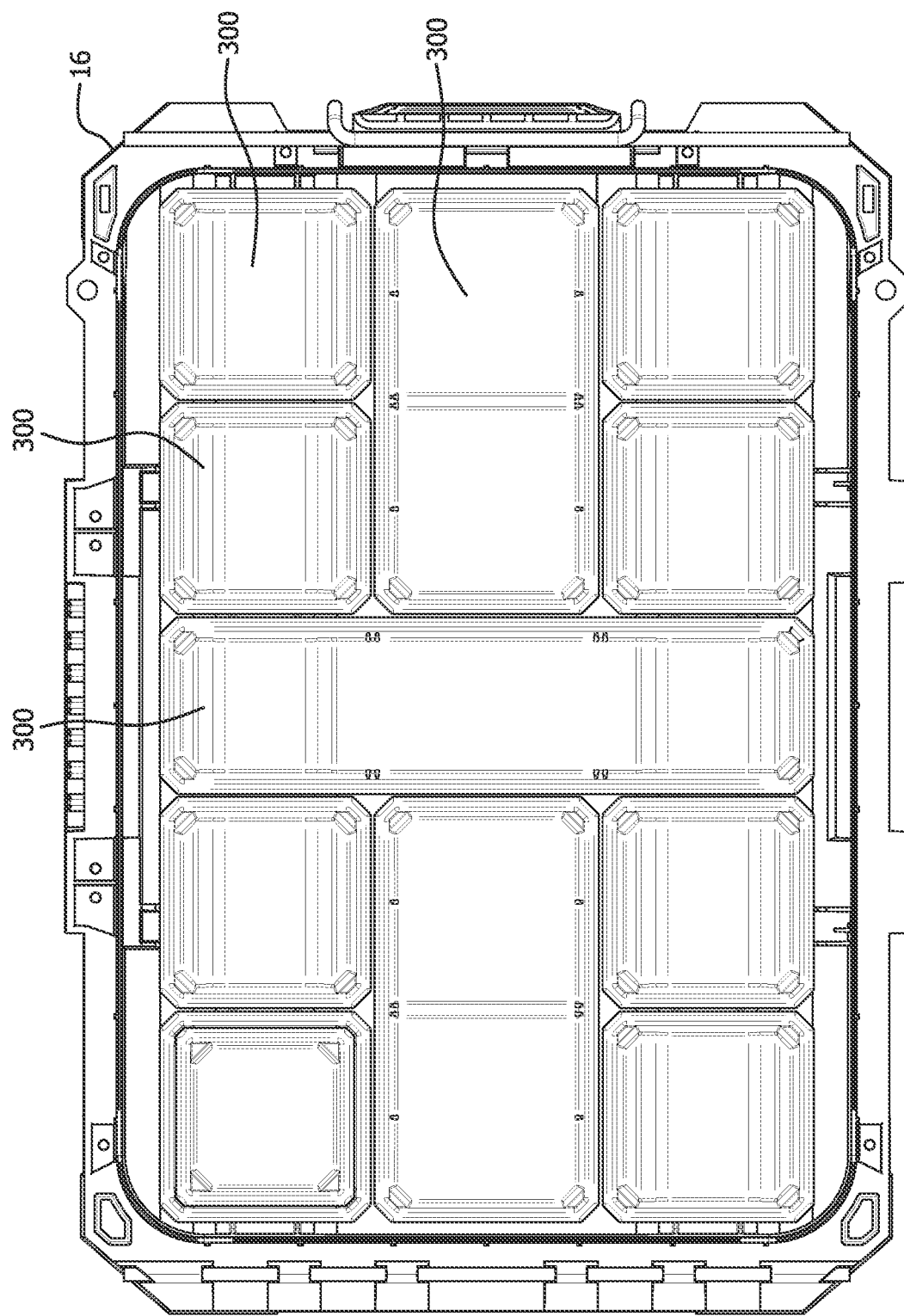

For example, FIG. 57A is a planar view of the interior surface 14b on an example lid 14 for a storage organizer with lid features such as rib 350 spacing and 'X' ribs 358 provided at selected bosses 354 to retain bins 300 arranged in a bottom portion of the box as shown in FIG. 57B. FIG. 57B is a planar view of the interior of the bottom portion 16 of the box 12d with the different bins 300 arranged therein in, for example, a symmetrical layout of bins of various sizes. At least the ribs 350 proximal to the rim or outer circumference of the lid 14 have tabs 351 that engage the bins arranged proximally to the outer circumference of the lid.

In accordance with example embodiments, a lid 14 is provided with rib and tab features that stabilize different types of internal organizer bins (e.g., bin 300, inner bin 330) within the box 12. FIG. 58 is a partial cross-section view of a lid 14 mounted on a bottom portion of a box 12 having internal bins 300 therein, and an inner bin 330 within one of the bins 300. A rib 350 can have a tab 351 to hold a bin 300 at the middle of at least one of its four sides as illustrated in FIGS. 57A and 58 to thereby hold the bin 300 in place within the bottom portion 16 and prevent shifting of the bin during transport of the box 12.

As shown in FIGS. 57A, 58, 60 and 61B, for example, the 'X' ribs 358 are provided at respective intersection points of the ribs 350 on the lid 14 to align and hold an inner bin 330 as illustrated in FIGS. 57A and 58. The X' ribs 358 can be configured at the intersections of ribs where bosses 354 are located. In accordance with an embodiments, the center of an 'X' rib 358 can include or be a boss 358 or other connection point. Alternatively, the 'X' rib 358 structure be implemented as an accessory, whereby a detachable 'X' rib 358 accessory can be secured at a boss location 358 on the lid 14 where needed to hold down bins of various sizes (e.g., an inner bin 330).

The lid 14 of a medium storage organizer and low profile organizer 12f (e.g., FIGS. 59A and 59B and FIGS. 61A and 61B), a compact organizer 12e (e.g., FIG. 60), and a portable storage box 12b (e.g., FIG. 62) can have respective ribbing patterns formed in accordance with alternative embodiments in accordance with the different box sizes and functions (e.g., to cooperate with bins therein, and/or releasable mount items therefore for storage and convenient access). It is to be understood that the lids 14 can be formed from a clear material such as polycarbonate, or of an opaque material such as polypropylene, depending on the different box functions (e.g., an opaque and clear lid 14 options can be provided for a box to accommodate box content privacy or visibility goals, respectively).

With reference to FIGS. 63 through 66B, lids can have different gridded ribbing and/or alignment ribbing configurations to align with different internal organization bins 300 and cooperate with different box bottom alignment structures. As shown in FIG. 65C and in accordance with a first alternative example rib design embodiment 378, the interior surface 14b of the lid 14 is formed using gridded ribbing and alignment ribbing. This rib design can align bins 300 from the top and bottom in any orientation, and a lid rib sits flush to top edges of bin(s) to prevent parts migration. Alignment tray protrusions cooperate with recesses formed in the bottom(s) of the bin(s) (e.g., FIGS. 63 through 64D). With reference to FIG. 65B and in accordance with a second alternative example rib design embodiment 376, the interior surface of the lid 14 is formed using a reverse ribbing pattern. The reverse ribbing pattern creates a desirable visual effect from the inside of the lid and can prevent most parts from migrating because a lid rib sits, for the most part, flush to top edges of bin(s) except, depending on bin size, for a few gaps that may allow small parts to travel. This second rib design also does not align bins from the top like the first alternative design in FIG. 65C. With reference to FIG. 65A and in accordance with a third example rib design embodiment 350, the interior surface of the lid 14 is formed using gridded ribbing 350 and mounting holes or bosses 354. This third design is used in the example lids 14 shown in FIGS. 54A, 57A, 59B, 60, 61B and 62, and provides a grid pattern of ribs 350 that is easier to see through and therefore has improved visibility of stored items from the exterior of the box 12. The mounting holes or bosses 354 can also be advantageously used for mounting accessories and tools as described above when the lid is not being used with bins 300 as a parts organizer. Since the ribs 350 sit flush to top edges of bin(s), this rib design also prevents parts migration, and uses the least plastic compared to the first and second rib designs.

The lid 14 can be removable from the box (e.g., the rolling base ox 12a) altogether and placed with the rib 350 grid pattern facing upward to allow convenient access to tools or items 364 secured thereto or otherwise stored thereon (e.g., a battery and charger, an arrangement of bits for a powered drill, a flashlight or other light source, a measuring tape, a level, and/or screw driver, among other items) by the use of the bosses and fasteners, and rib slots 360 and straps 362 (e.g., elastic straps). In addition to the rib 350 grid pattern and screw bosses 354 provided integrally to the lid, a box storage compartment divider 250, 290 can be removed from the storage compartment or inner volume of the box 12 and affixed to the lid 14 (e.g., via screws in selected screw bosses) to provide a MOLLE-board type interface as shown in FIG. 68.

Alternatively, the lid 14 can be affixed to the bottom portion 16 of a box 12 instead of removable therefrom. For example, a cable can have a first end with a screw that can be secured to the lid 14 via a fastener in a screw boss provided on one of the side walls 14c-14f of a box extending between the front and back sides of the box, for example. Alternatively, the first end of the cable can be permanently screwed in and sealed within an aperture in the lid 14. The second end of the cable can be provided with a shaped end that can be placed in one end of a key hole fitting provided in a divider groove in a side wall 16c-16f of the bottom portion 16 of the box 14. Installment of the key hole fitting can be disposed opposite the installment of the first end of the cable when the lid 14 is closed over the bottom portion 14 of the box. The other end of the key hole fitting is shaped and/or is smaller to accommodate the thickness of the cable but also prevent the shaped end of the cable from being removed therefrom. A cable can be installed on one or both side walls of a box 12.

As shown in FIG. 105, a box, bucket, or crate 12 can have a flexible lid 532 as shown in FIG. 105. Also, lids 14 of differing heights can be provided for a box 12, which in exemplary implementations can accommodate different accessories (lights and power supply or battery), and provide for different volumes of interior space within the box 12.

Figure 100:
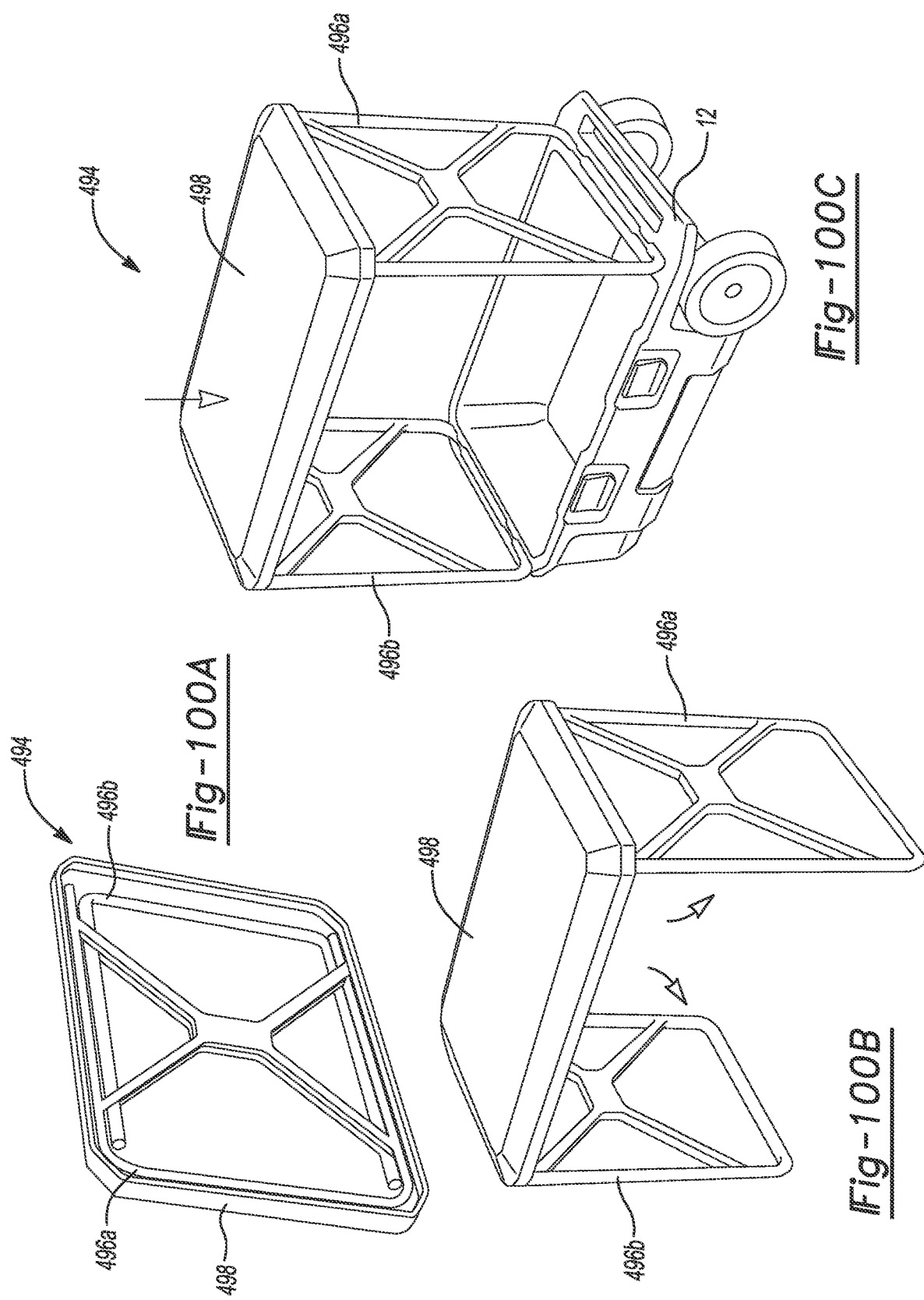
FIGS. 100A and 100B are perspective views of a work surface lid folded and unfolded, respectively, in accordance with an example embodiment.
FIG. 100C is a perspective view of the work surface lid of FIGS. 100A and 100B unfolded and deployed on a storage box in accordance with an example embodiment.
Figure 101:
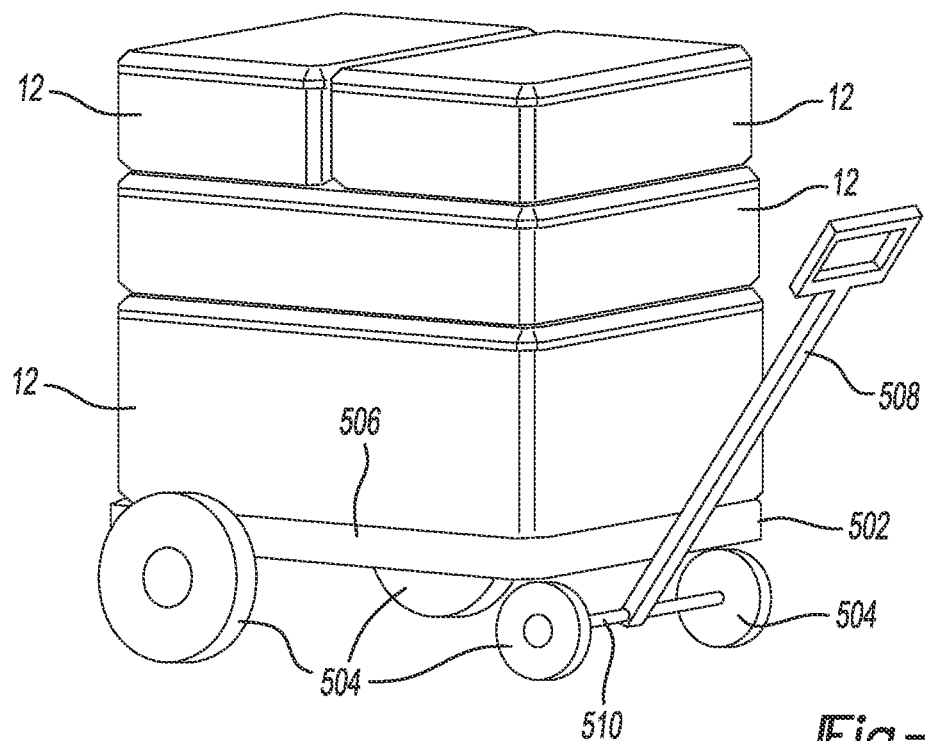

With reference to FIGS. 100A through 100C, a lid 14 can be dual purposed by being configured as a removable and collapsible raised work surface lid 494, in addition to providing cover for and access to the interior of the box 12. An example work surface lid 494 has a work surface 498 and folding legs 496a, 496b that pivot toward and are stowed against the work surface 498 when the work surface 498 is deployed as a lid. A lid mechanism for connecting the latch 28 to the lid 494 is omitted for clarity of the drawing figures but can be implemented, for example, as described herein with respect to the top portion 14 engagement with a latch 28. The folding legs 496a, 496b can be opened and mounted in receptacle or groove in the bottom portion 16 of the box when the work surface 498 is deployed and in use as a work surface.

Figure 77:
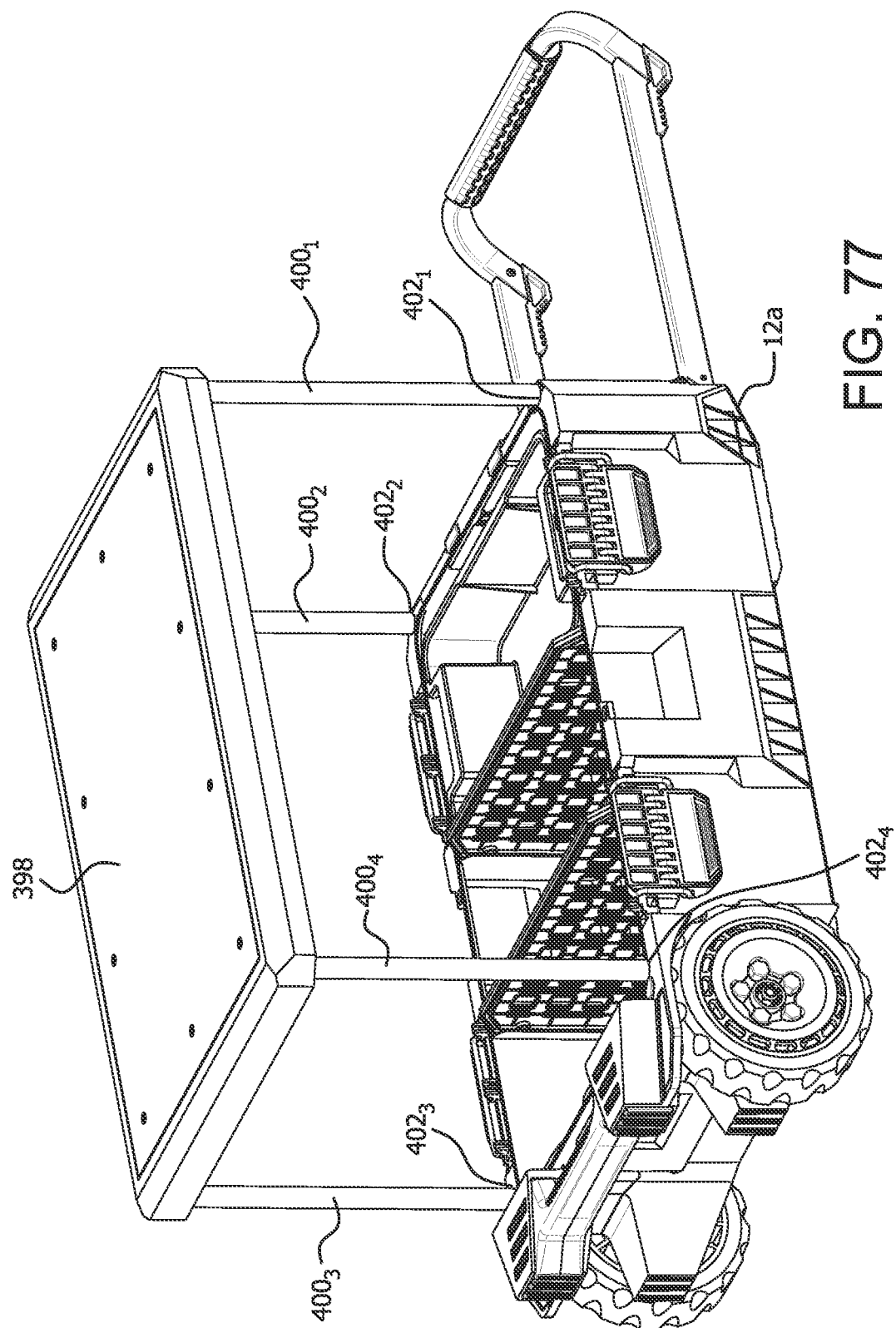
FIG. 77 illustrates a removable work surface lid for a box in accordance with an example embodiment.

FIG. 77 depicts a lid 14 that can be dual purposed by being configured as a removable work surface lid 398 in accordance with another example embodiment. The work surface 398 and the bottom portion 16 of the box 12a can both be provided with apertures in the corners (e.g., 4021 through 4024) thereof to removably receive opposite ends of legs 4001 through 4004. When the work surface lid 398 is not in use as a work surface, the legs 4001 through 4004 can be stowed inside the box 12a or connected to the exterior of a box 12 in a modular storage system 10 using an exterior organization accessory such as a MOLLE-board 482 (FIG. 99) or a corner clamp 404 described with reference to FIGS. 69 through 75B.

Lids 14 can also be provided with differing exterior mounts or features designed for different themes of uses such as camping, sports spectating and other recreational uses, or performing different types of jobs or trades such as carpentry, plumbing, vehicle maintenance, and so on.

Lids 14 can be provided with lights mounted thereon and can be provided with a motion sensor or on/off switch that is activated to turn a lid light off when the lid is closed on the case. A charger or light or battery mounted on a lid can be powered by one or more photovoltaic or solar cells provided on the exterior of the case. LED lights can be provided along the interior or exterior of a case and powered via a battery pack or the solar cells.

Figure 76B:
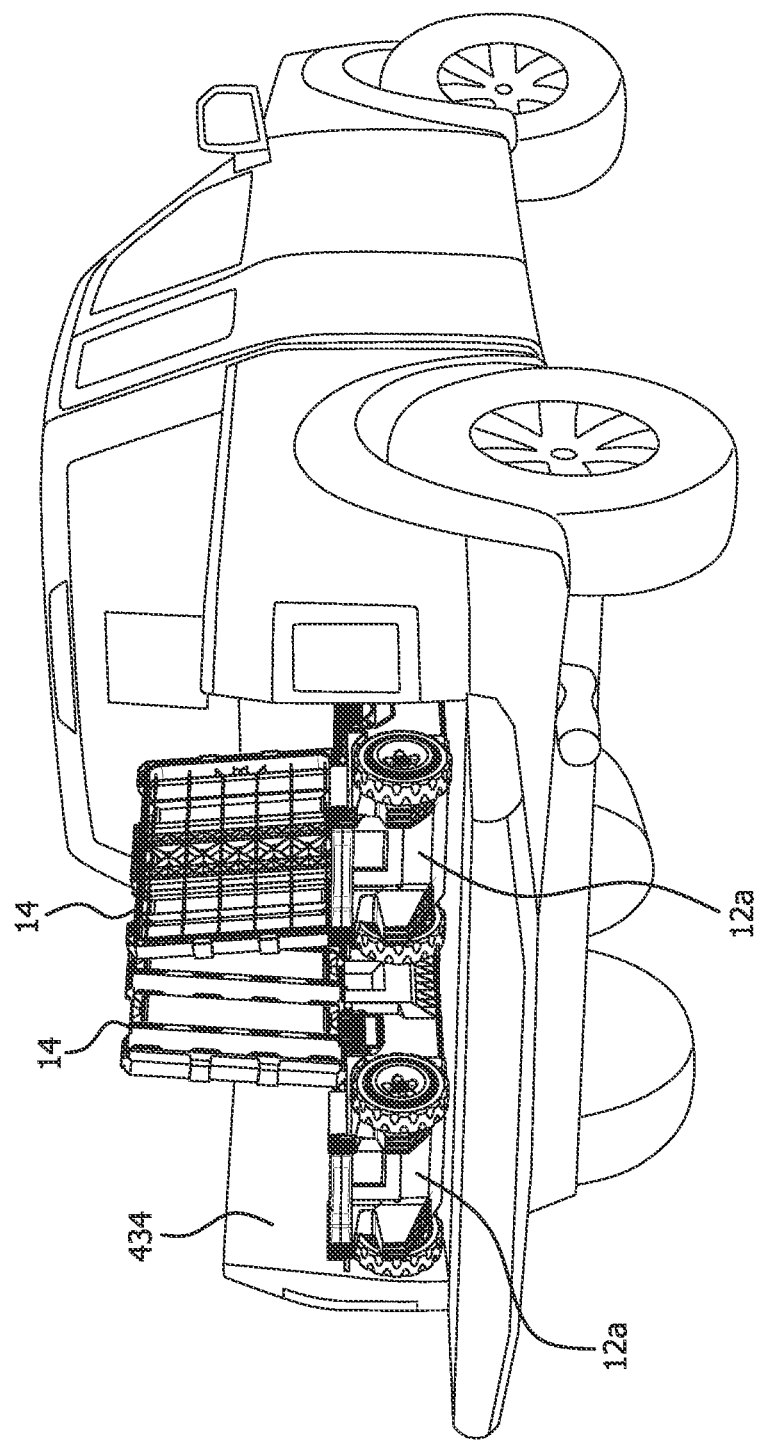
FIG. 76B illustrates two boxes constructed in accordance with an example embodiment arranged therein in a truck bed.

As explained above on connection with FIGS. 17A through 17D, a lid can provide dual sided latch hinge operation whereby, in exemplary implementations, a lid 14 with hinges on two opposite sides thereof allows convenient access to the contents of the box 12 on which the lid is deployed from either side of the case. This arrangement is particularly convenient when the box (e.g., a rolling base unit 12a) is loaded onto a truck bed 434 and a user can reach the box contents from either side of the truck bed 434 as shown in FIG. 76B.

In accordance with an example embodiment, a lid 14 can be configured as an organizer lid comprising a thin case with at least one side being a clear or semitransparent lid and storage cubbies in a bottom portion thereof, and that serves as a lid 14 when the organizer lid assembly is secured to a box 12.

External Organization Features of Boxes 12

In accordance with example embodiments, the boxes 12 in a modular storage system can be provided with different external features and accessories relative to the outsides of the boxes 12 to expand the ability of the system 10 to store and transport items and increase access to these items.

An exterior box mounting accessory can include, for example, 0.5 inch diameter by 20 thread (i.e., ½×20) or ¼×20 bolts or other fasteners for easy addition of exterior mounting systems (e.g., MOLLE boards, soft bags, hand tool pockets, do-it-yourself (DIY) solutions, and so on) to a case or combination of cases to allow a user of a portable modular system to quickly move around a jobsite with convenient access to externally mounted items without having to pack and unpack case(s) to gain access to those items. For example, as stated above, an exterior organization accessory such as a MOLLE-board 482 (FIG. 99) can be affixed to the exterior of a box 12 to enable connection of tools and other items. Long handled tools (e.g., shovel, rake) can be detachably connected to a side 13c-13f of a box (e.g., lengthwise along a rolling base box 12a) for transport.

Figure 71:
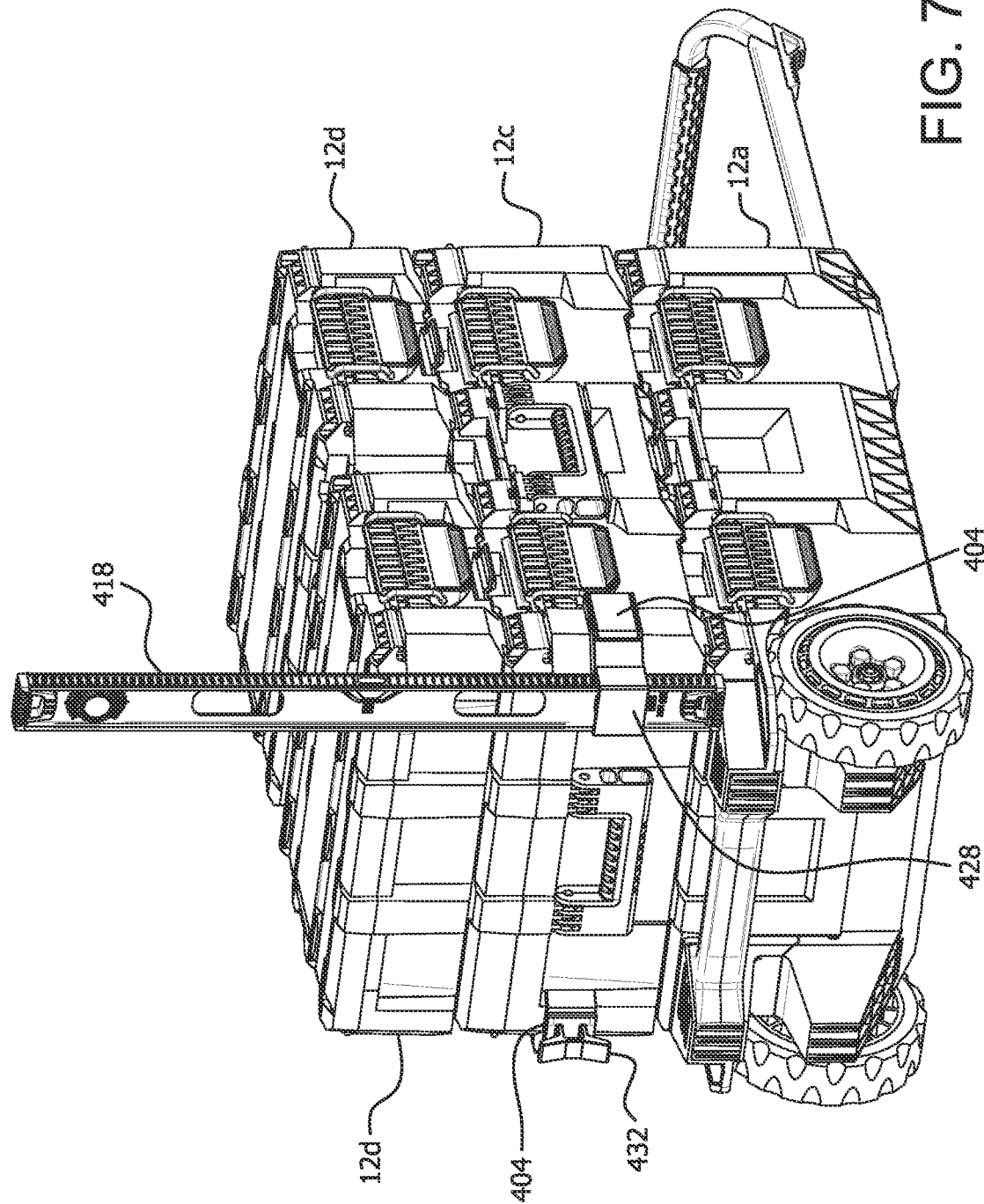
FIG. 71 is a perspective view of the box with corner clamps in FIG. 70 having a tool mounted in the corner clamp and secured to the modular storage system in FIG. 70 in accordance with an example embodiment.
Figure 72B:
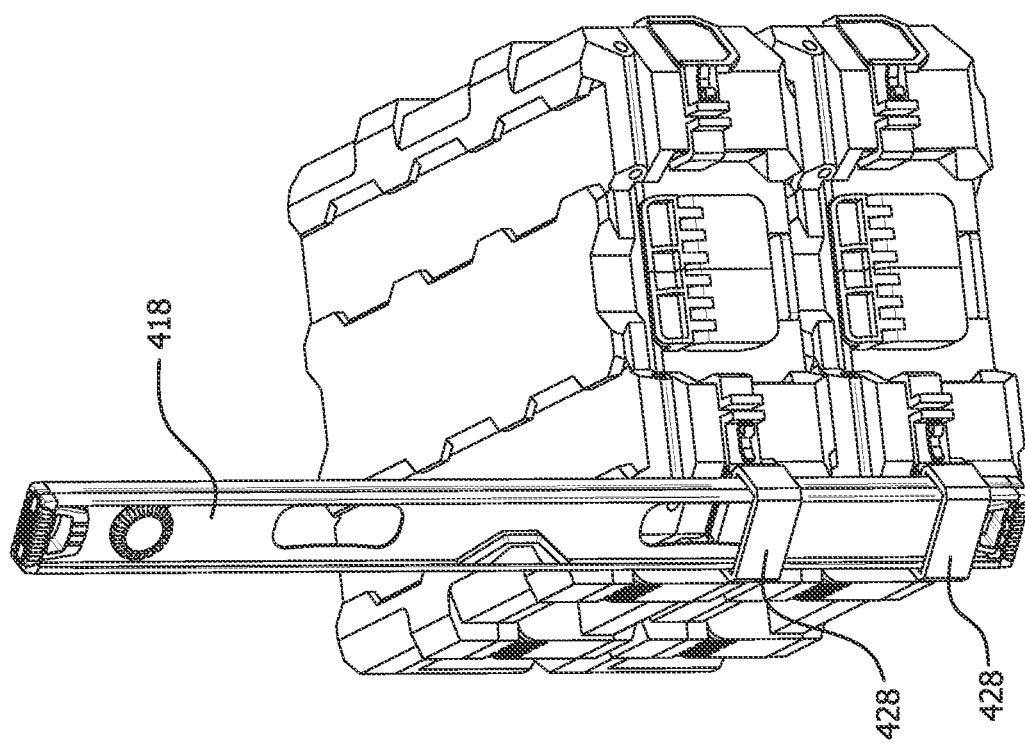
FIG. 72B is a perspective view of stacked boxes in FIG. 72A with a tool mounted using corner mount accessories in both corner clamps in accordance with an example embodiment.
Figure 72A:
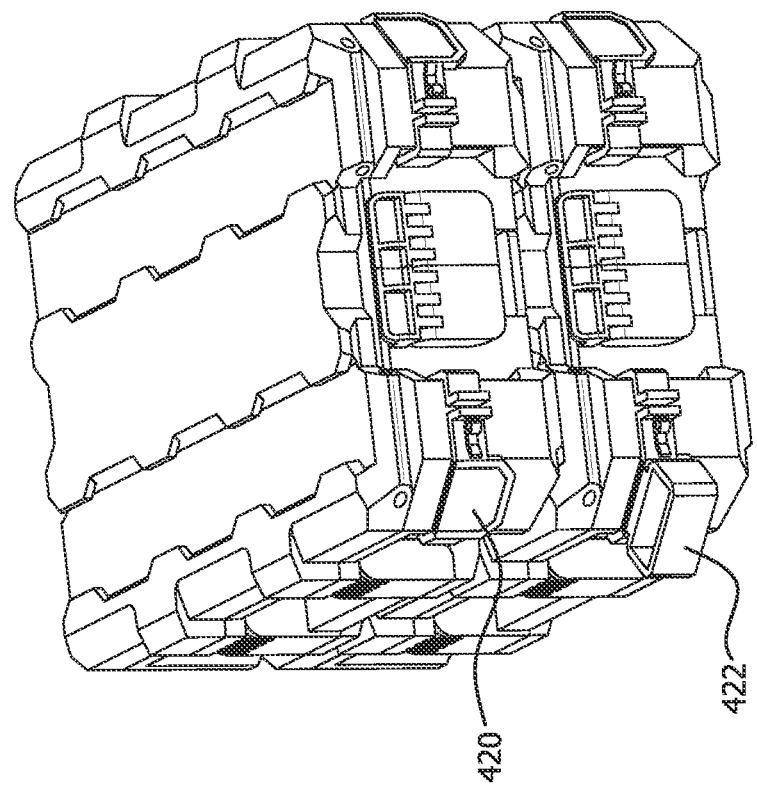
FIG. 72A is a perspective view of stacked boxes having a corner clamp accessory mount and a corner mount accessory, respectively, in accordance with an example embodiment.
Figure 73:
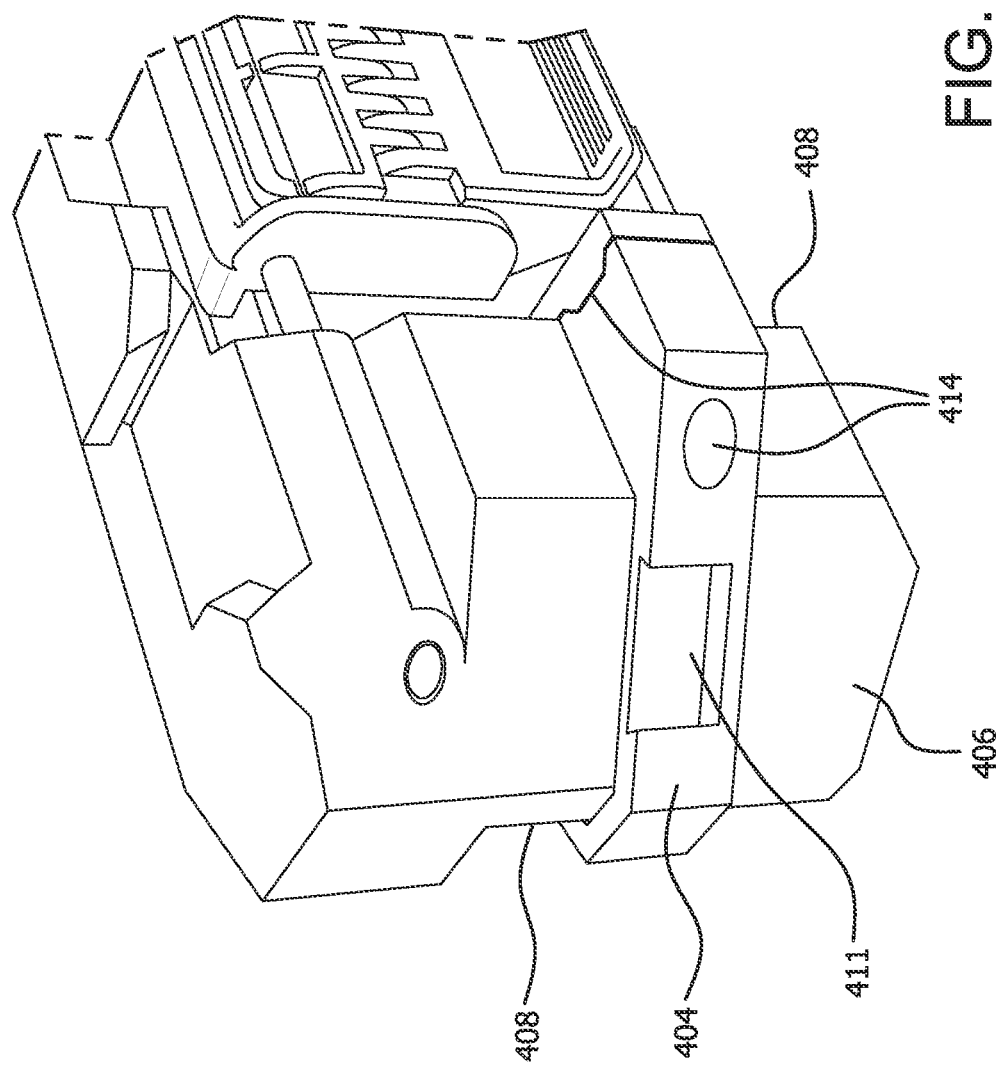
FIG. 73 is an perspective view of a corner clamp affixed to a box and having an accessory mount in accordance with another example embodiment.
Figure 74B:
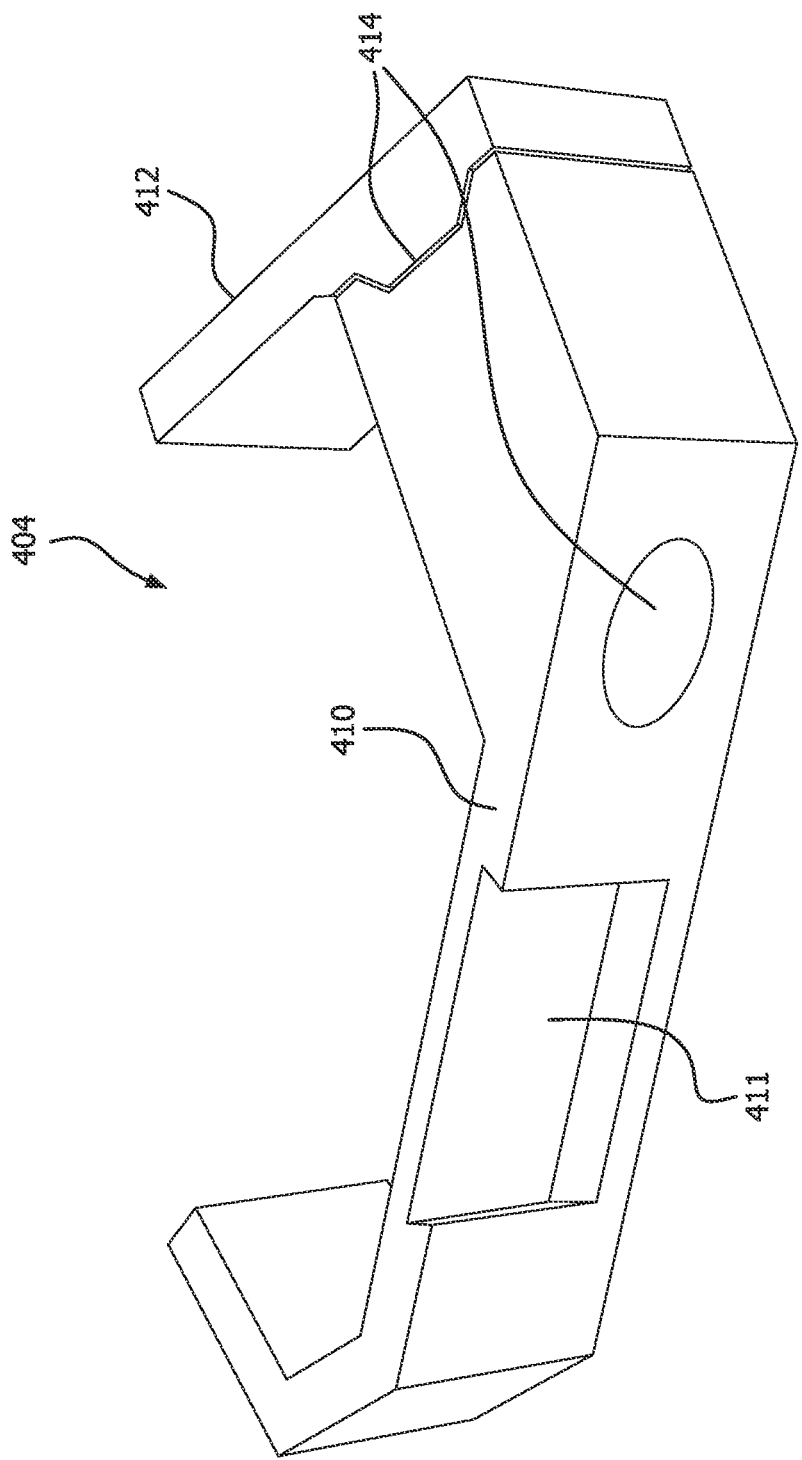
Figure 74C:
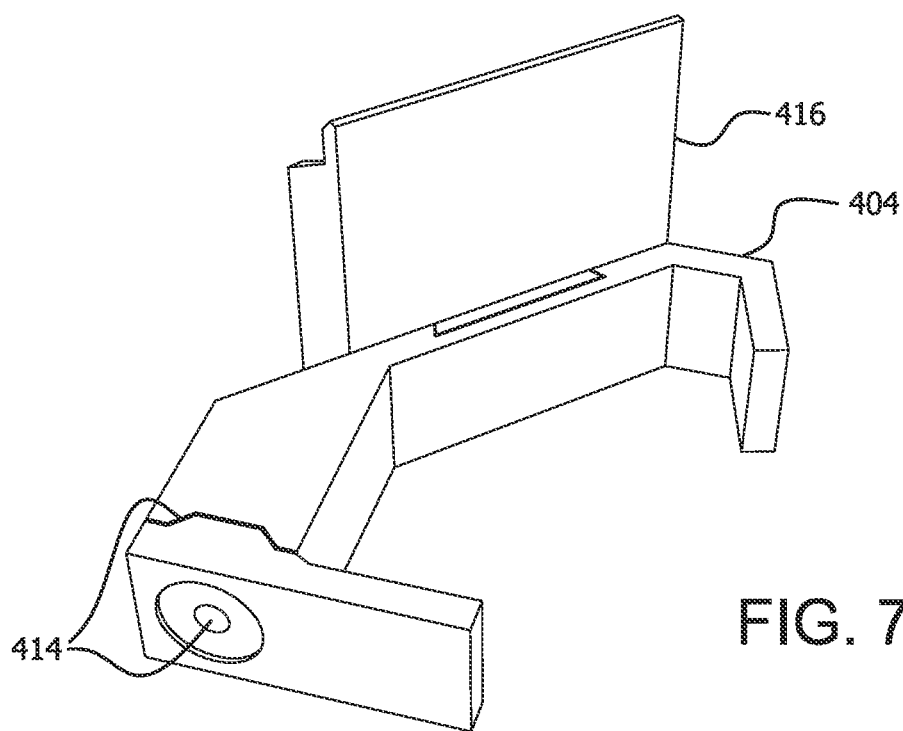
FIGS. 74C and 74D are respective views of the corner clamp in FIG. 73 having a mounting member for an accessory inserted and removed from the accessory mount.
Figure 74D:
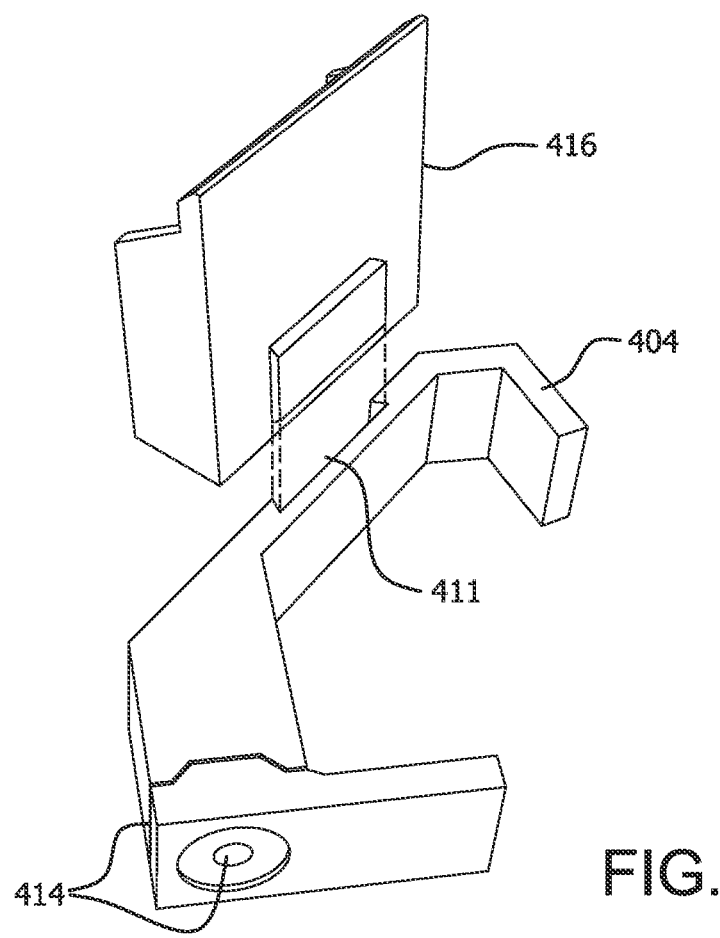
Figure 75A:
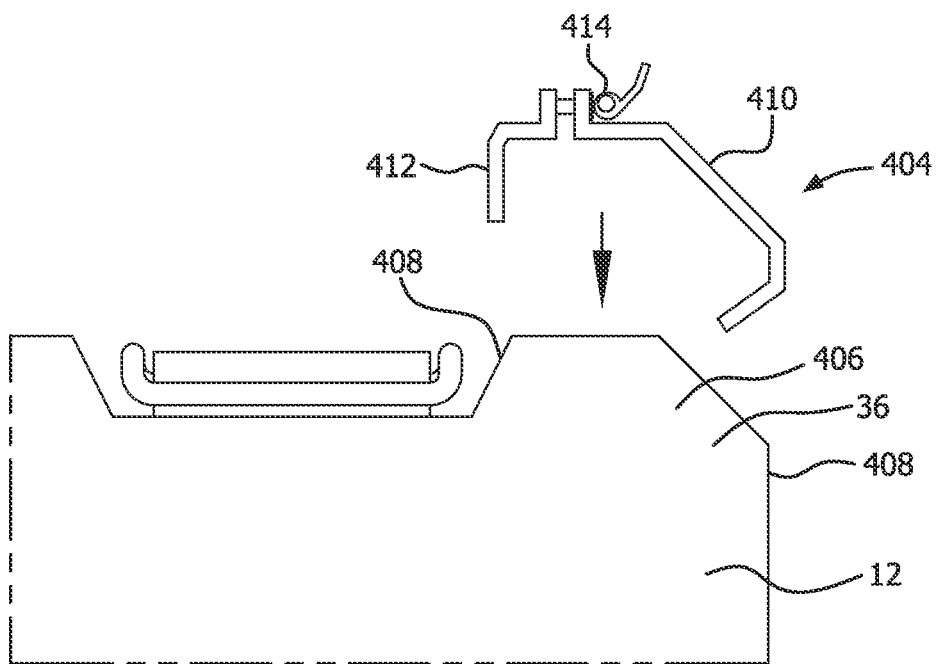
FIGS. 75A and 75B are top views of a box pinch corner having a corner clamp removed from and affixed thereto in accordance with another example embodiment.
Figure 75B:
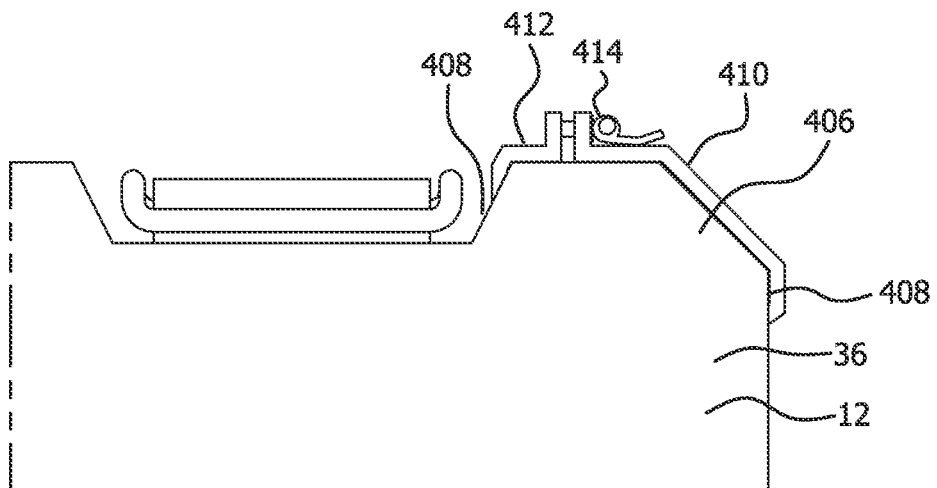

As stated above, the thicker areas 32 of a box 12 can form a pinch grip corner 36 on which a corner clamp 404 can be mounted in accordance with an example embodiment. With reference to reference to FIGS. 69 through 75B, the corner clamp 404 can be affixed to a corner 406 of a box 12 having an inset edge (e.g., implemented via a pinch grip corner 36 with an adjacent recess side wall 34). The corner clamp 404 can comprise a first clamp member 410 that can be provided with an accessory mount 424. The first clamp member 410 can be releasably secured to a second clamp member 412 by a clamp fastener 414 (e.g., an inset screw as shown in FIGS. 74A-74D, or a thumb screw as shown in FIGS. 75A-75B). Different accessories 416 with different accessory mounts to the corner clamp 404 and to a tool or other item 418 to be attached to the exterior of a box 12 can be used in accordance with example embodiments. For example, a fixed mounting member 420 (FIG. 72A) of the accessory 416 can be detachably connected to or integrated with a corner clamp and have an engagement feature (e.g., a lip, slot or recess 411, or insert member 424) to receive or otherwise detachably cooperate with a complementary mounting member 422 provided to a tool or other item 418. The mounting member 422 connected to the tool or other item 418 can comprises a further tool connection feature such as a band or pocket 428 to hold a long tool (e.g., a level as shown in FIGS. 71 and 72B), or a prong 432. Corner clamps 404 with prongs 432 can be provided on opposite corners of a box to facilitate winding an electrical power cord for external storage and convenient access.

The rolling base box 12a described herein is a two-wheel solution for a modular storage system 10. In accordance with another example embodiment, the modular storage system 10 can be configured with an adaptable four wheel dolly system can include a dolly base 502 having wheels 504 on one side and a flat bed or support surface 506 on the other side that accommodates one or more boxes 12 thereon, and a pivotable handle 508 attached to the base 502 (e.g., to a front wheel axle 510 that allows the front wheels to pivot laterally in the direction of handle operation) to allow a user to move heavy loads with minimal strain on the user's body. The adaptable four wheel dolly system fits easily through doors, and provides increased maneuverability compared to two wheel handcart configurations. The flat bed or support surface 506 can be provided with box-to-box connection system parts (e.g., channels 160 as described with reference to the box-to-box connection system 150 or other connecting means) to connect a bottom layer of box(es) 12 to the support surface 506 of the dolly 502.

Figure 102:
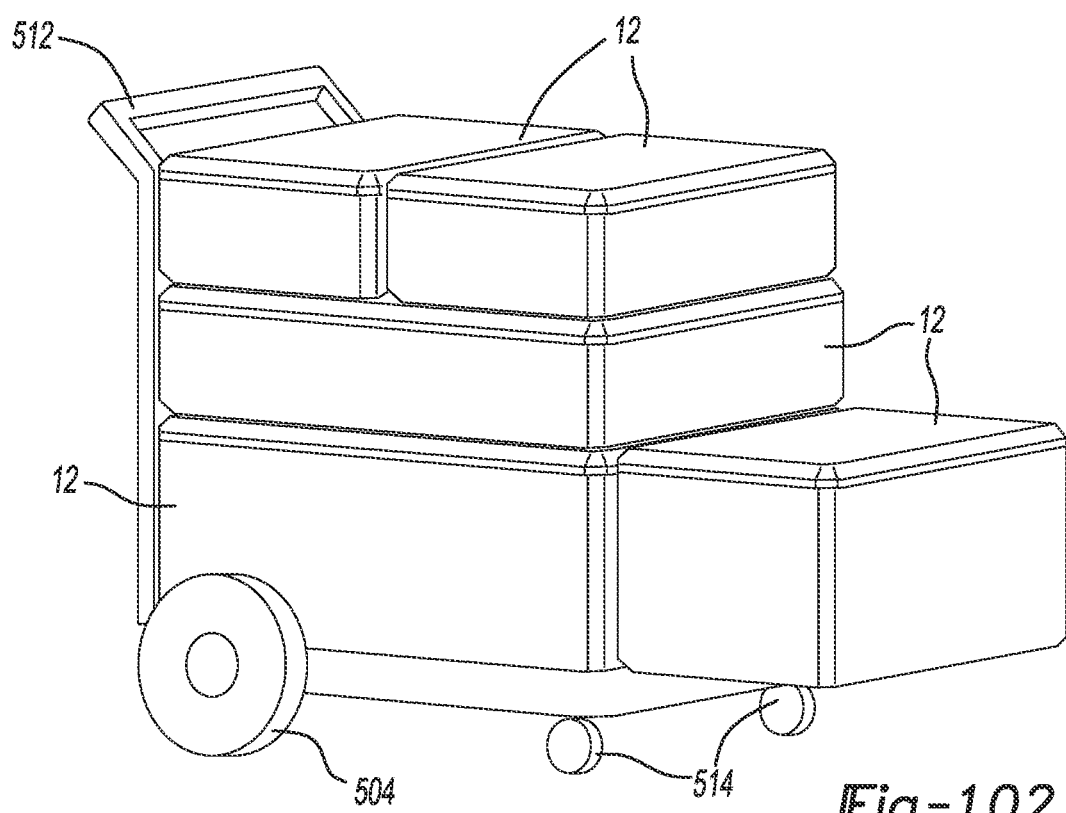
Figure 103A:
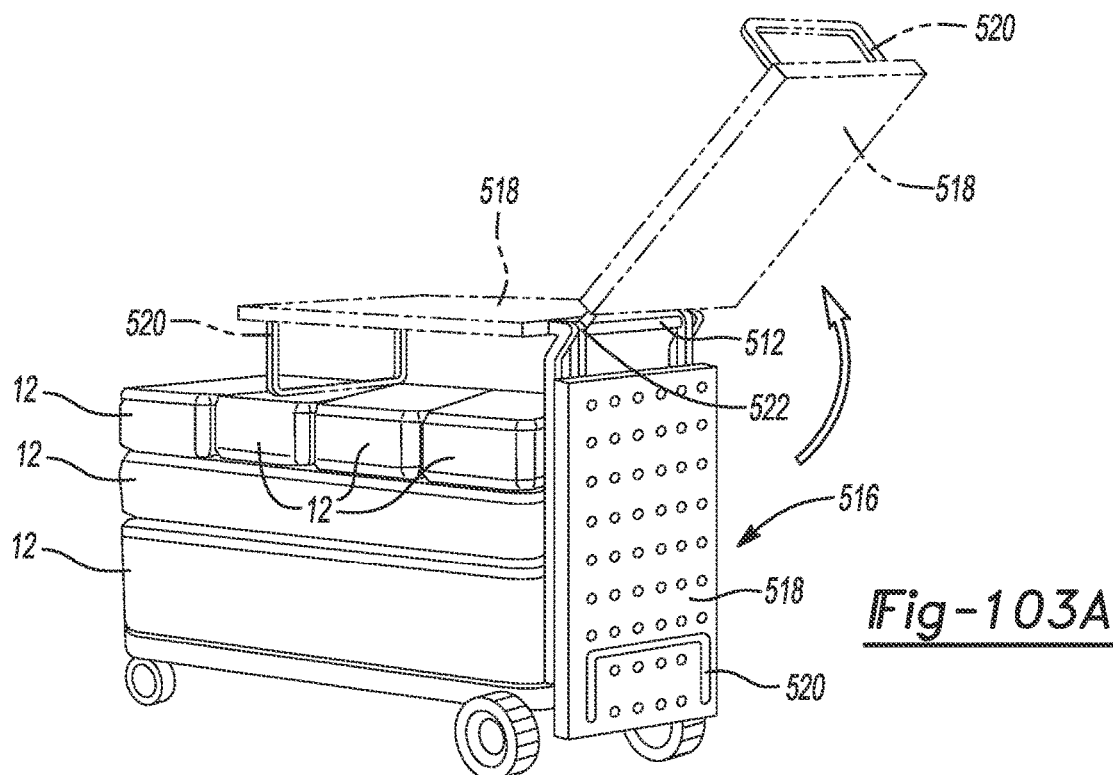
Figure 103B:
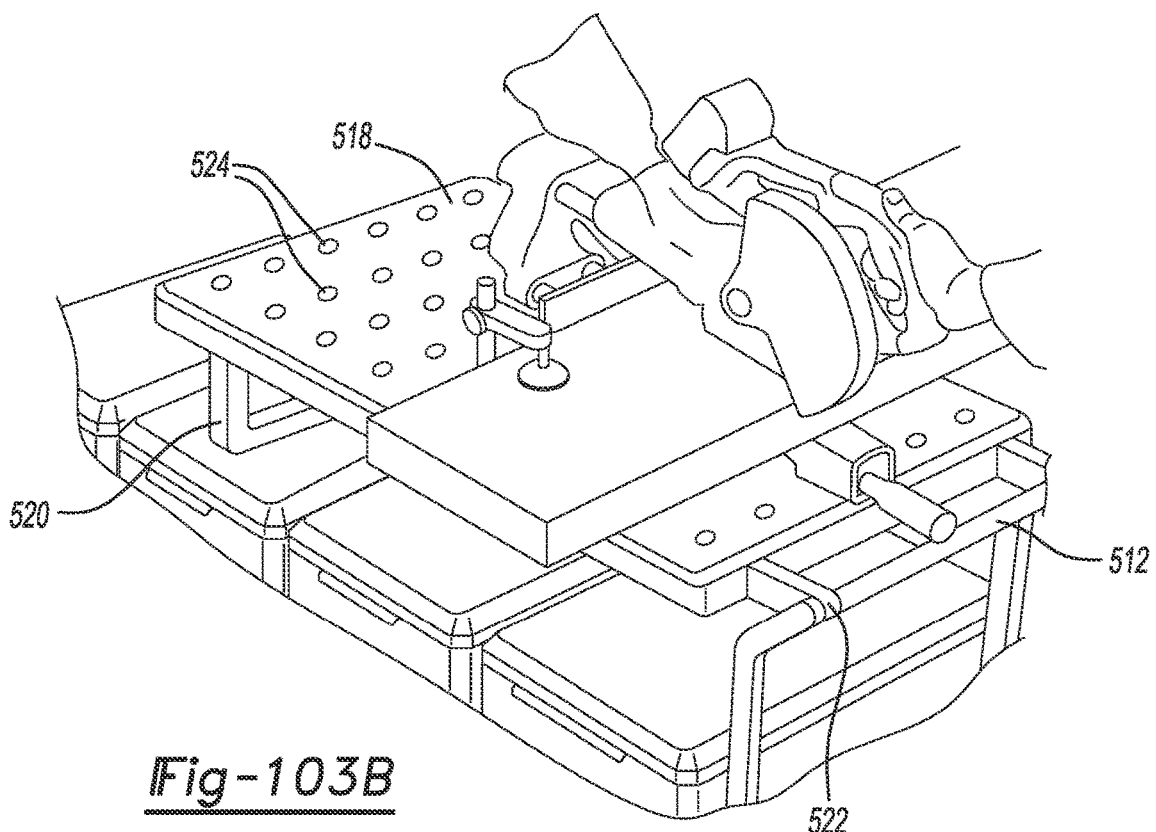

FIG. 102 depicts another example embodiment of an adaptable four wheel dolly system 520 having a cart handle 512 with rails connected to the dolly base 506. Two of the wheels 514 can be configured to pivot laterally. With reference to FIGS. 103A and 103B, the handle 512 can support a fixed or detachable pivotable work surface 516. The pivotable work surface 516 has a pivotable connecting mechanism 518 that is configured to allow a work surface 518 to rotate about a grip portion of the handle 512 from an undeployed position adjacent the rails of the cart handle 512 to a deployed position across stacked boxes 12 on the dolly 502. The work surface 518 has foldable legs 520 and can be provided with work surface mounting features 524 for various tools and applications.

As shown in FIG. 102, an extension connection system 220 can be used on two of the boxes 12 on the four wheel dolly 502, allowing a box to extend beyond the dimensions of the dolly base 502. Alternatively, the rails of the cart handle 512 or the handle 120 can have a quick mounted rail system to allow affixing a box to the legs thereof (e.g., to add another row to the current combination of boxes 12 placed on the dolly cart handle 512).

Alternate Box-to-Box Connection Systems

An example box-to-box connection system 150 is described herein with reference to FIGS. 24A through 29C.

Other example embodiments of box-to-box connection systems will now be described with reference to FIGS. 78A through 98B.

Figure 78A:
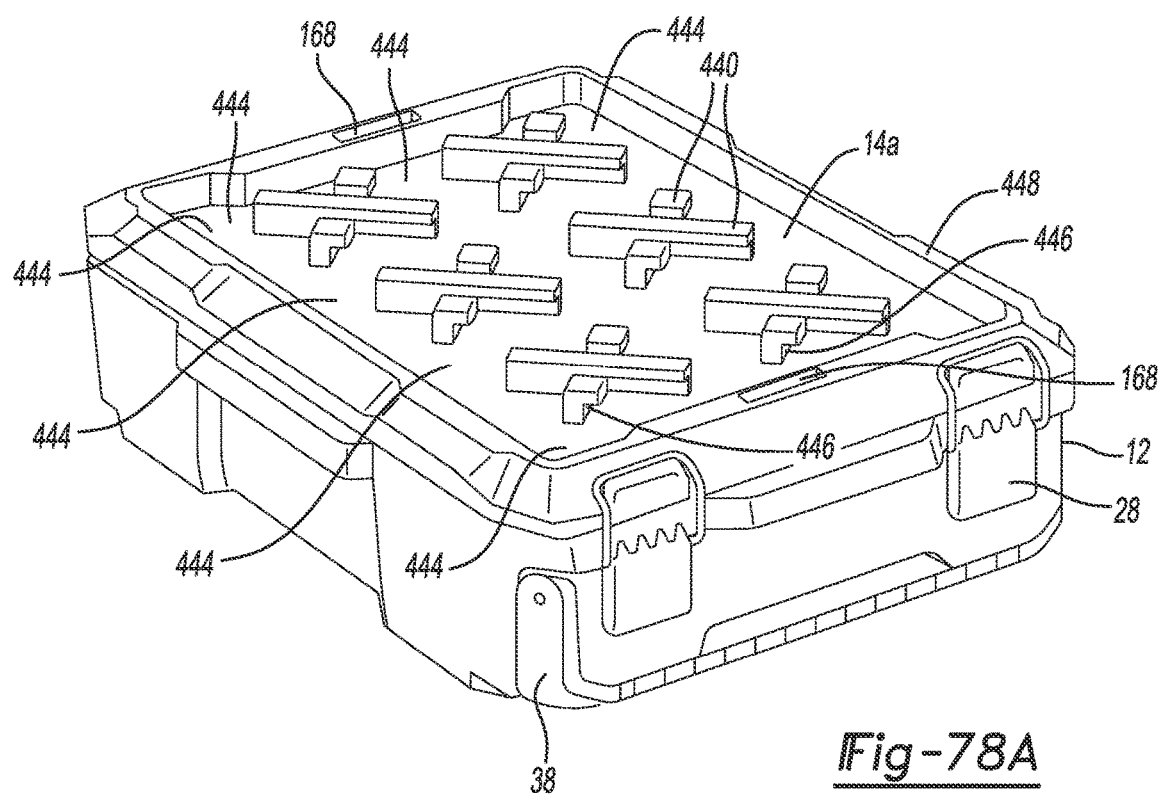
FIGS. 78A and 78B are, respectively, perspective top and bottom views of a storage box having a box-to-box connection system in accordance with an example embodiment.
Figure 78B:
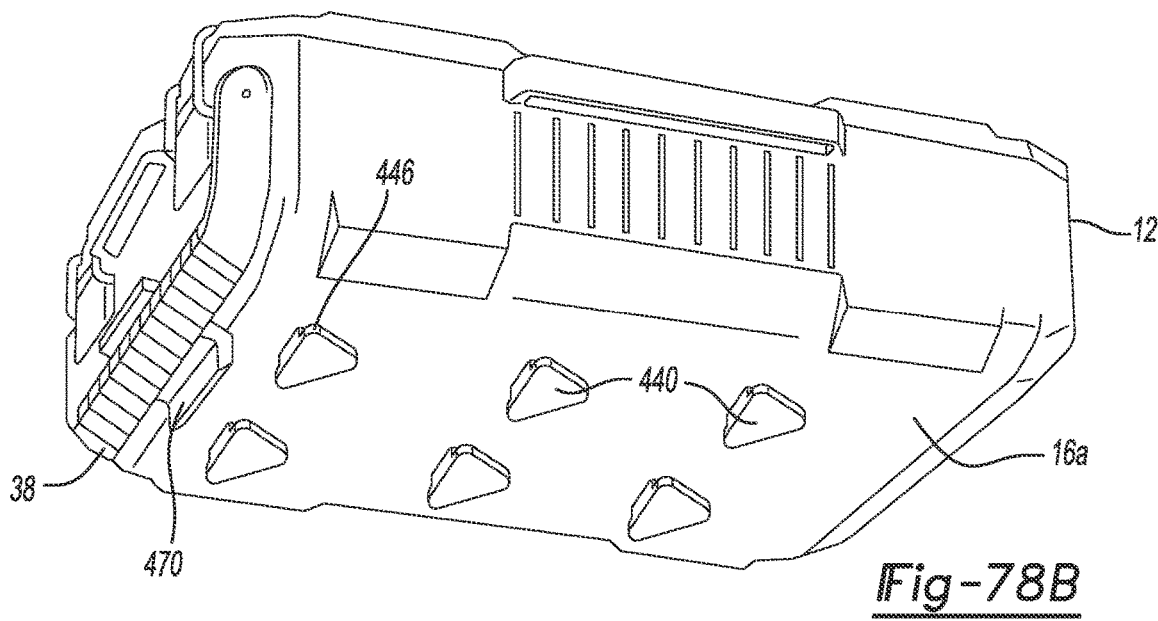
Figure 79:
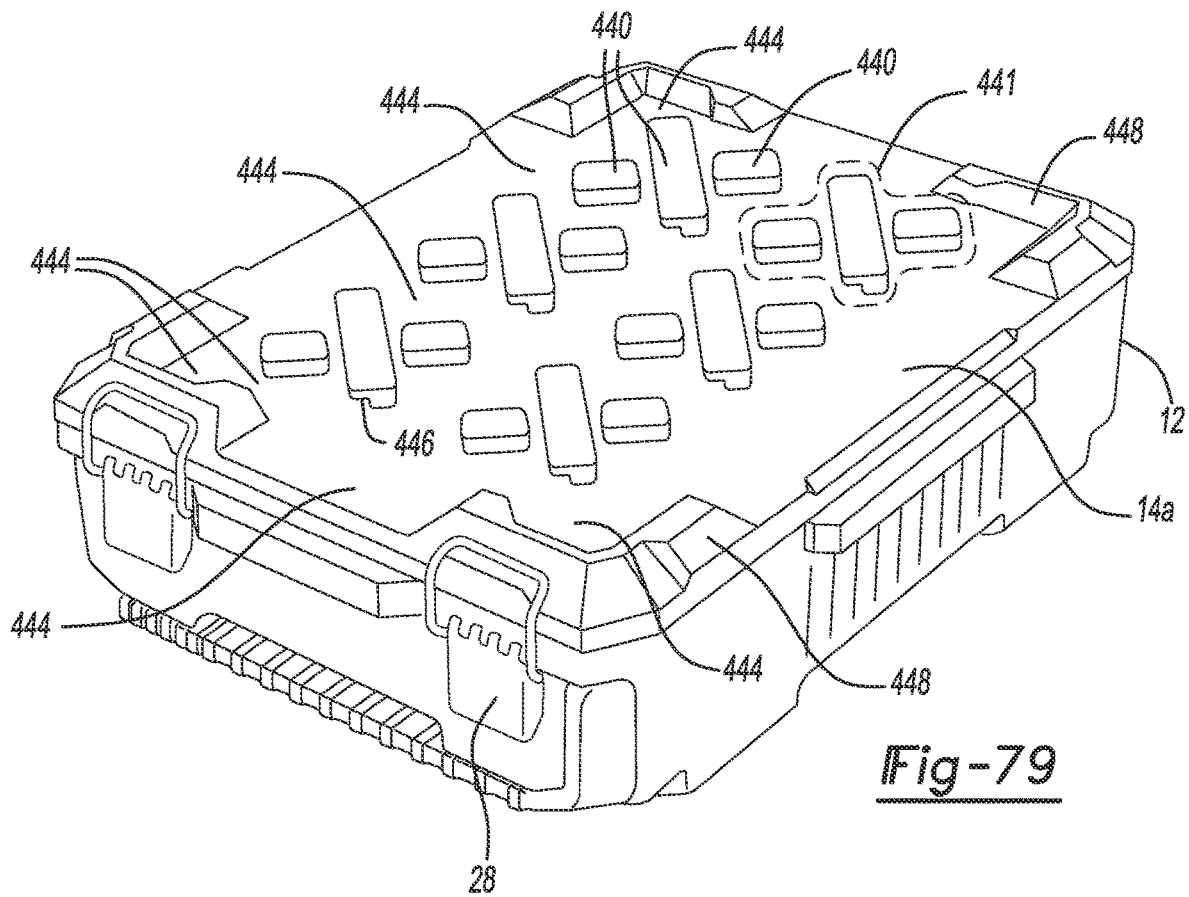
FIG. 79 is a perspective view of the storage box in FIGS. 78A and 78B.

FIGS. 78A and 78B are, respectively, top and bottom perspective views of a storage box 12 constructed in accordance with an example embodiment. The top surface 14a of the box 12 comprises a plurality of protuberances 440 extending from the top surface. The protuberances 440 can be arranged in clusters 441 (FIG. 79). As shown in FIGS. 78A through 84C, protuberances 440 or clusters 441 are arranged along a top surface 14a of a box in a manner that delineate open, continuous channels 444 of space in which protuberances 440 arranged on a bottom surface 16a of another box can be received to stack the two boxes together and prevent translation in at least one of lateral and longitudinal directions relative to the stacked boxes 12. The protuberances 440 on the top and/or bottom surfaces 14a, 16a of the boxes 12 can be configured with one or more edges 496 that engage cooperating protuberances 440 to prevent the boxes 12 from being unstacked.

Figure 80:
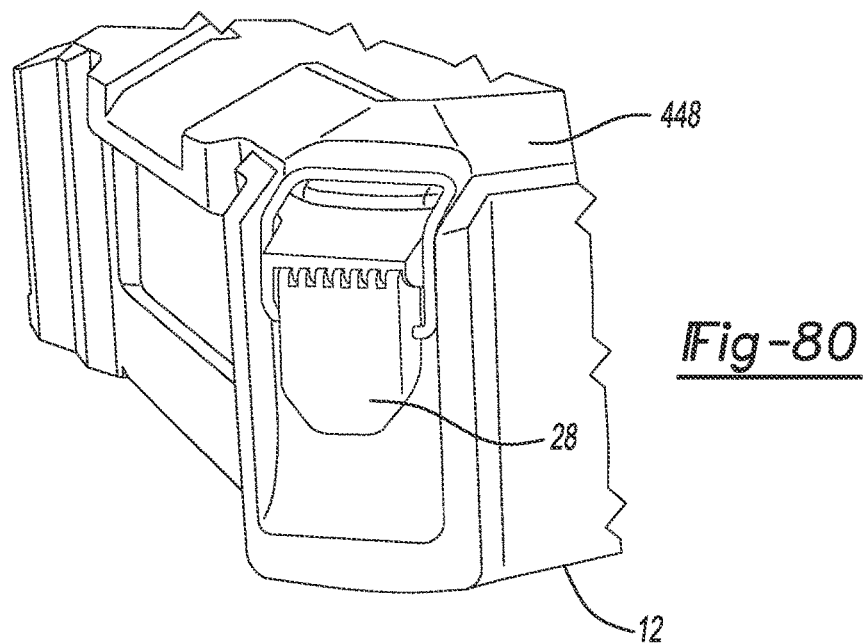
FIG. 80 is a partial view of a storage box in accordance with an example embodiment.
Figure 81A:
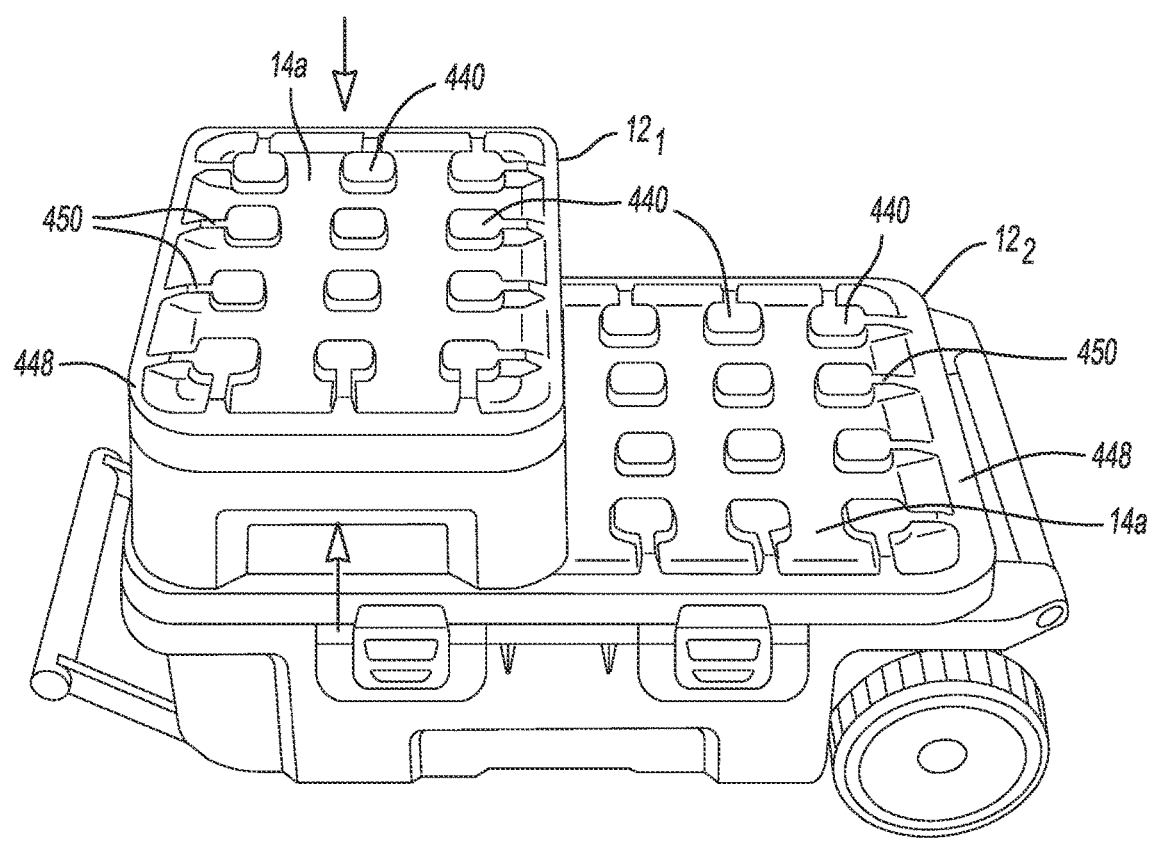
FIGS. 81A and 81B are views of two storage boxes that are stacked and interconnected using a box-to-box connection system, and unstacked, respectively, in accordance with an example embodiment.
Figure 81B:
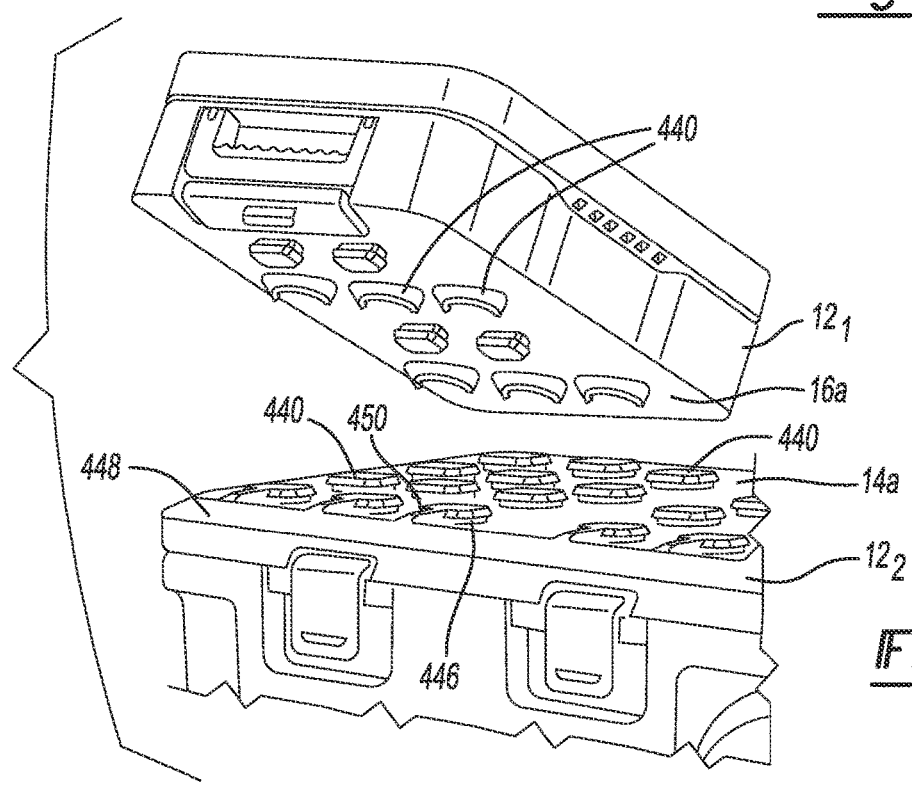

As shown in FIGS. 78A through 81B and 83A and 83B, a box 21 can have a rim 448 surrounding the edge of its top surface 14a or only partially surrounding it (e.g., rims only at box corners in FIG. 79) to reinforce and protect the top surface of the box. The rims, however, do not interfere with arrangements of protuberances 400 to provide several continuous channels 444 of space in between. FIG. 80 illustrates a latch 28 as described in FIGS. 22A through 22G and 20A implemented with respect to a section of reinforced rim 448. Instead of or in addition to a rim 448, edges of the top portion 14 of a box can be reinforced with buttress members 450 as shown in FIGS. 82A through 83B.

Figure 82A:
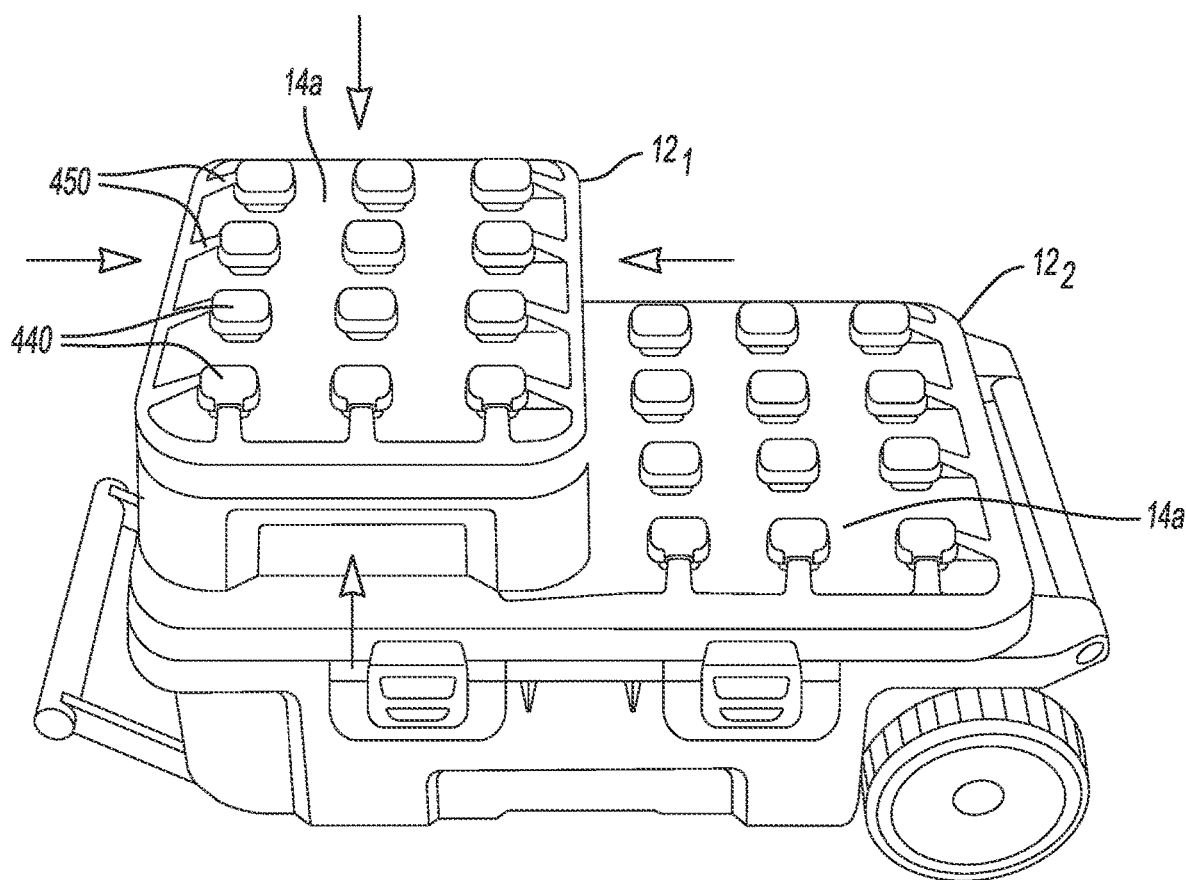
FIGS. 82A and 82B are views of two storage boxes that are stacked and interconnected using a box-to-box connection system, and unstacked, respectively, in accordance with an example embodiment.
Figure 82B:
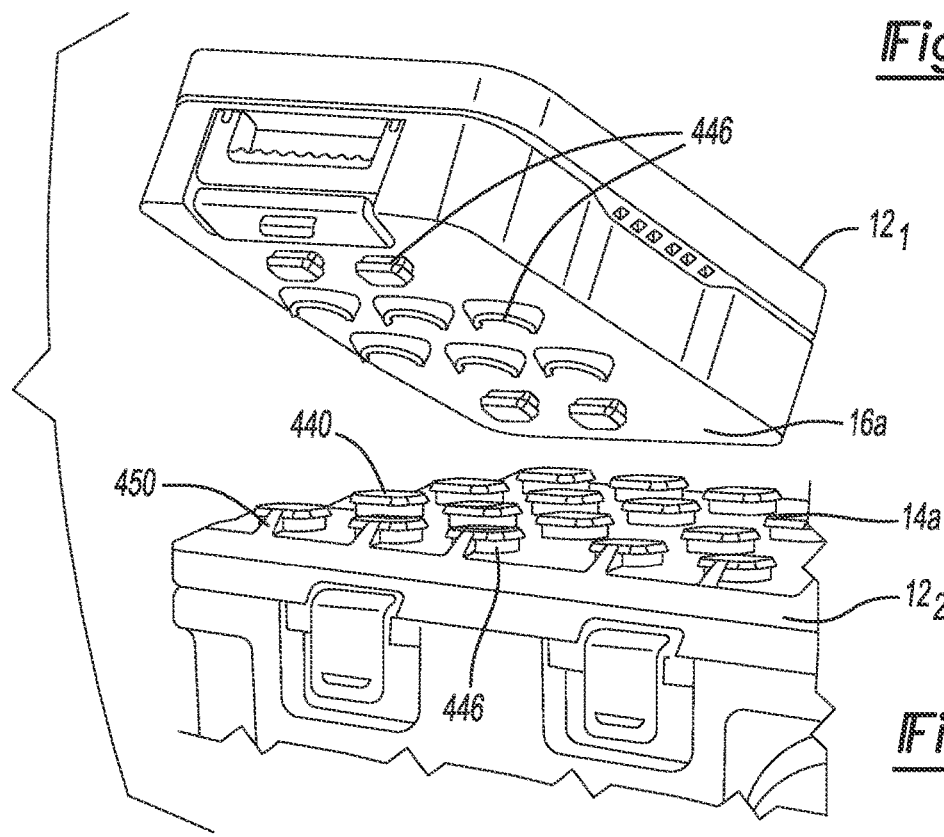
Figure 84A:
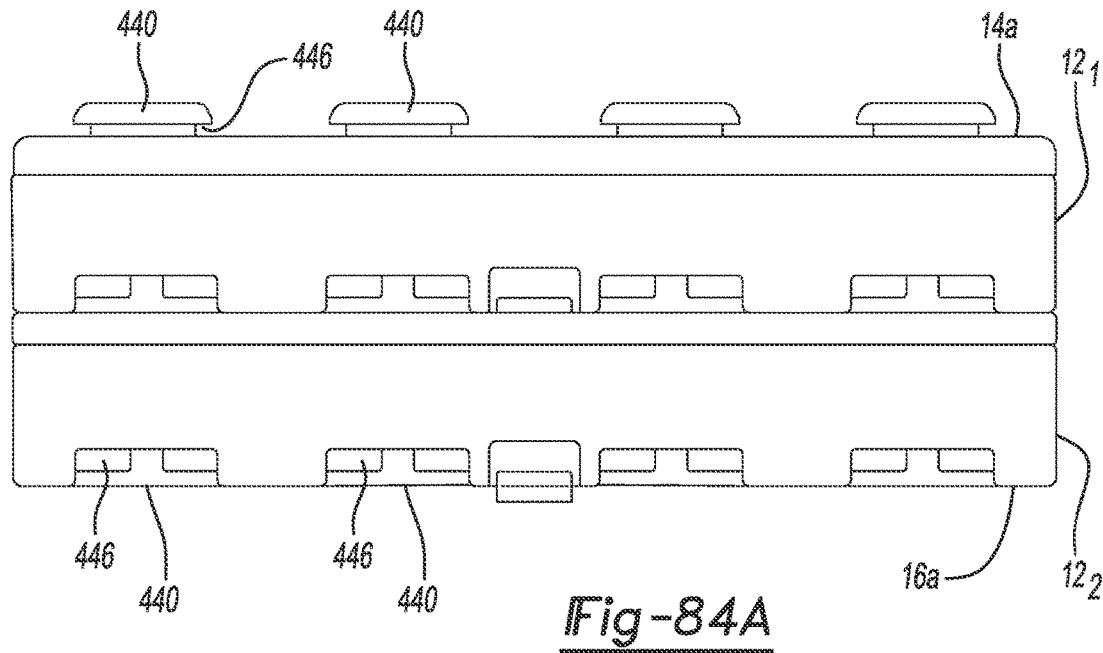
FIGS. 84A and 84B are side and perspective views, respectively, of two storage boxes that are stacked and interconnected using a box-to-box connection system in accordance with an example embodiment.
Figure 84B:
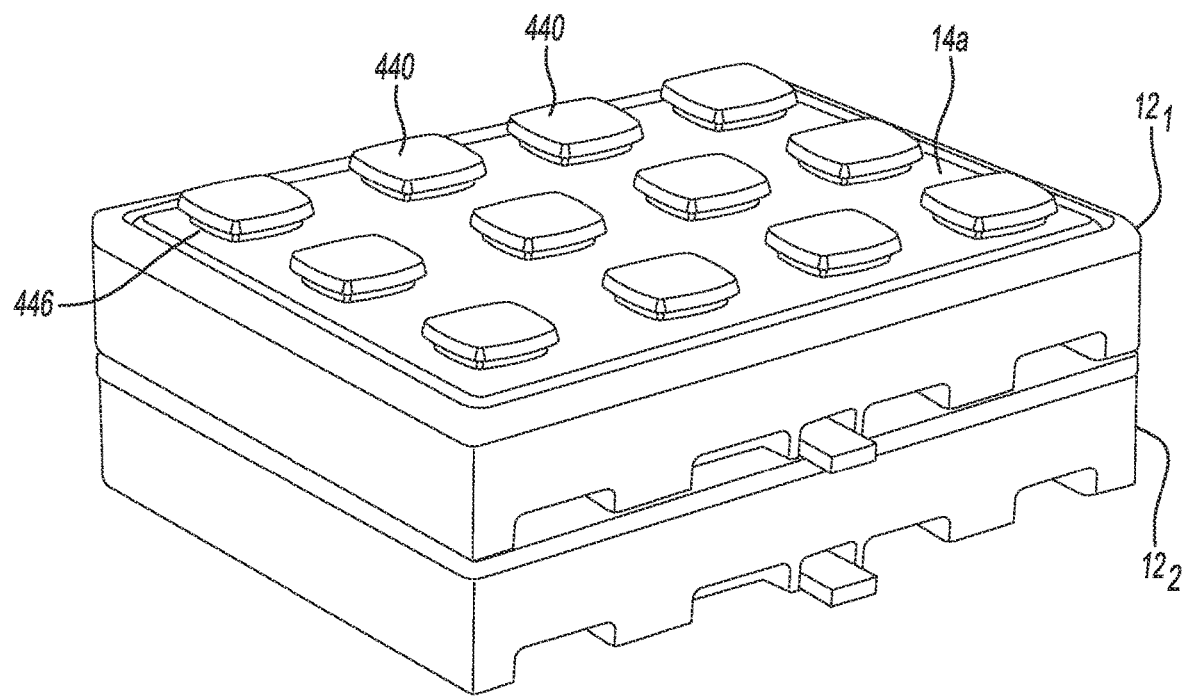
Figure 84C:
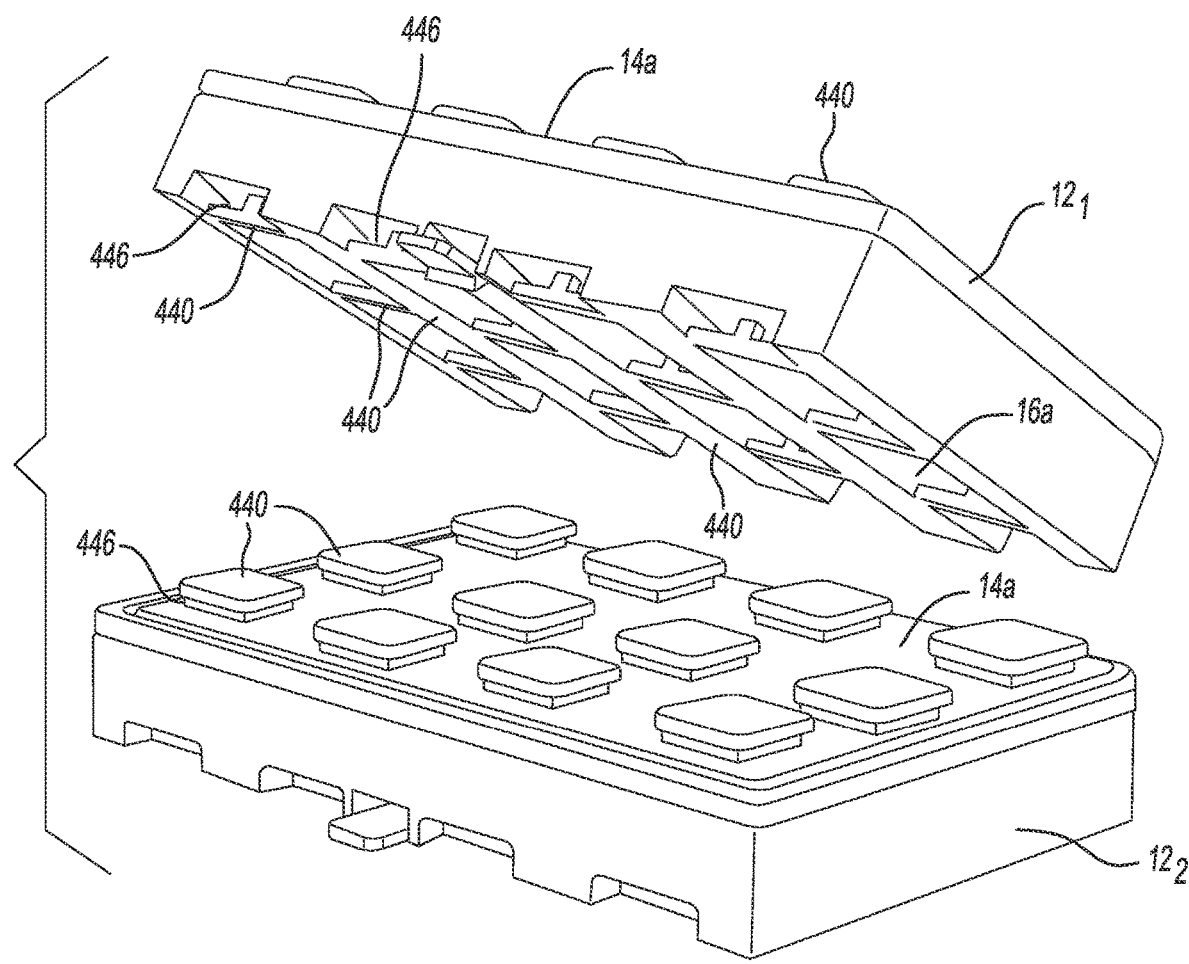
FIG. 84C is a perspective view of the two storage boxes of FIGS. 84A and 84B unstacked and in accordance with an example embodiment.
Figure 89A:
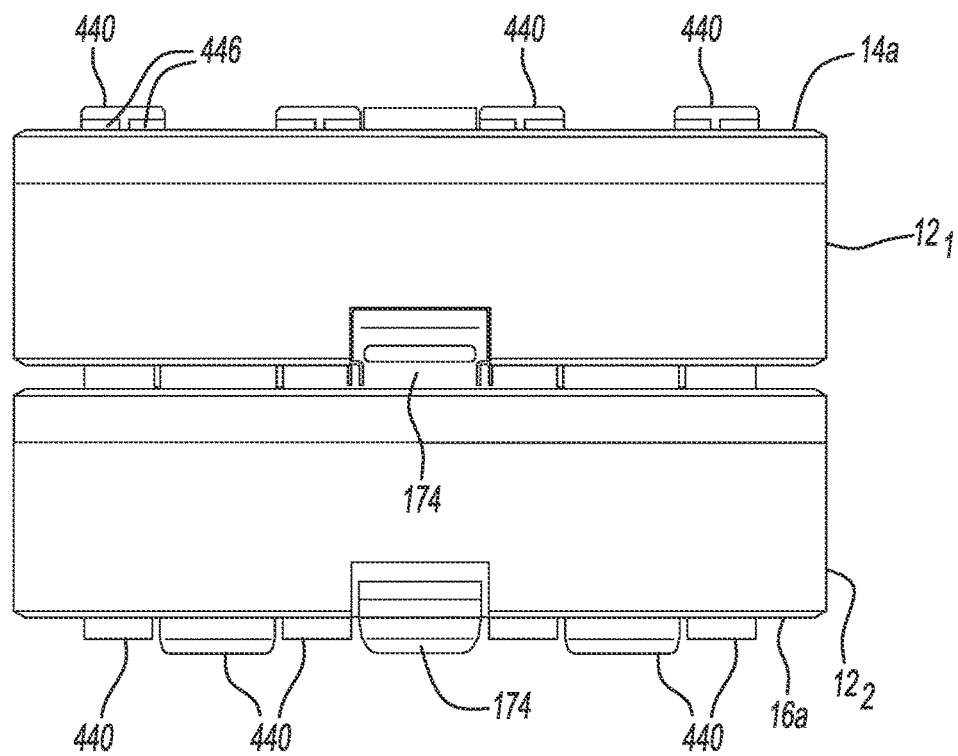
FIGS. 89A and 89B are side and perspective views, respectively, of two storage boxes that are stacked and interconnected using a box-to-box connection system in accordance with an example embodiment.
Figure 89B:
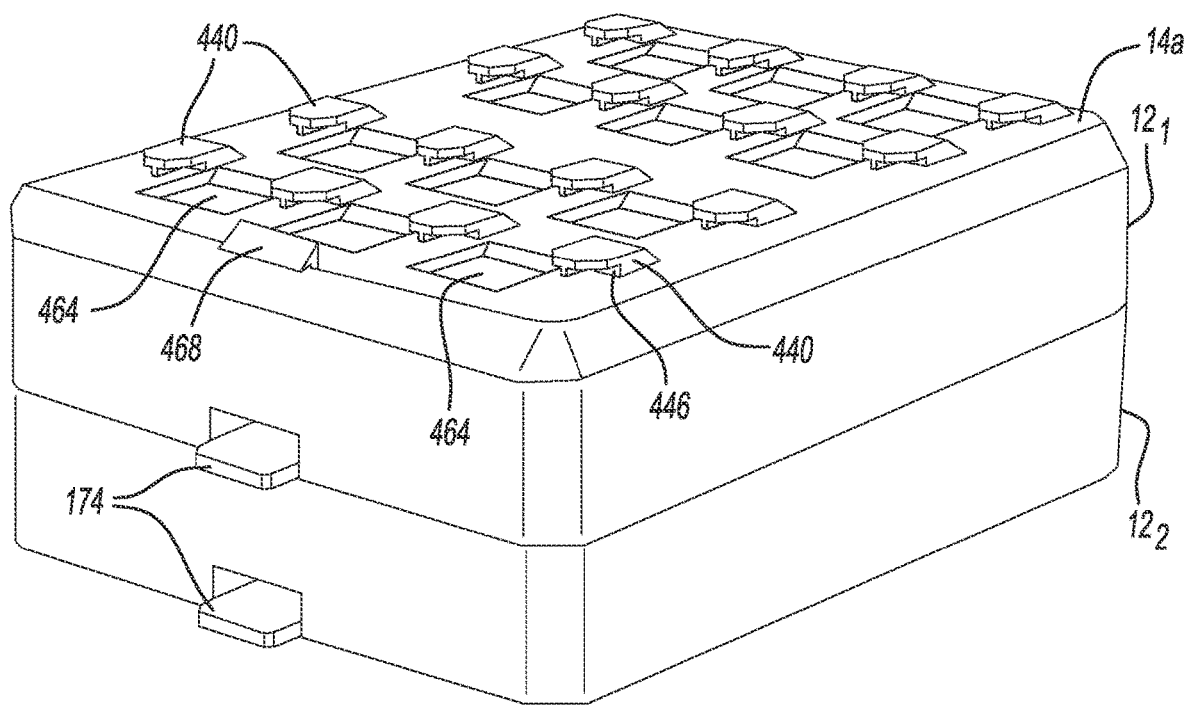
Figure 89C:
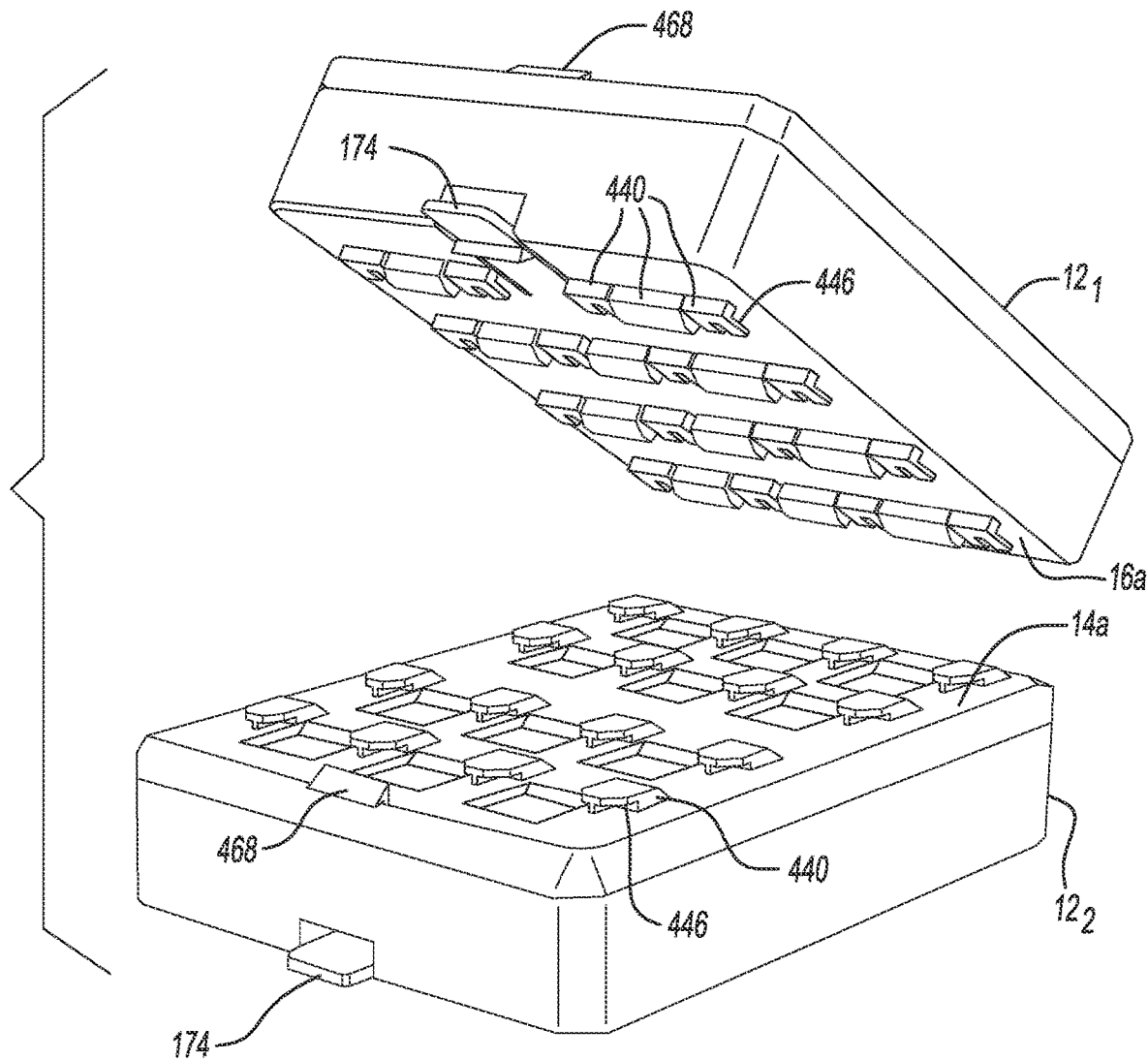
FIG. 89C is a perspective view of the two storage boxes of FIGS. 89A and 89B unstacked and in accordance with an example embodiment.
Figure 90A:
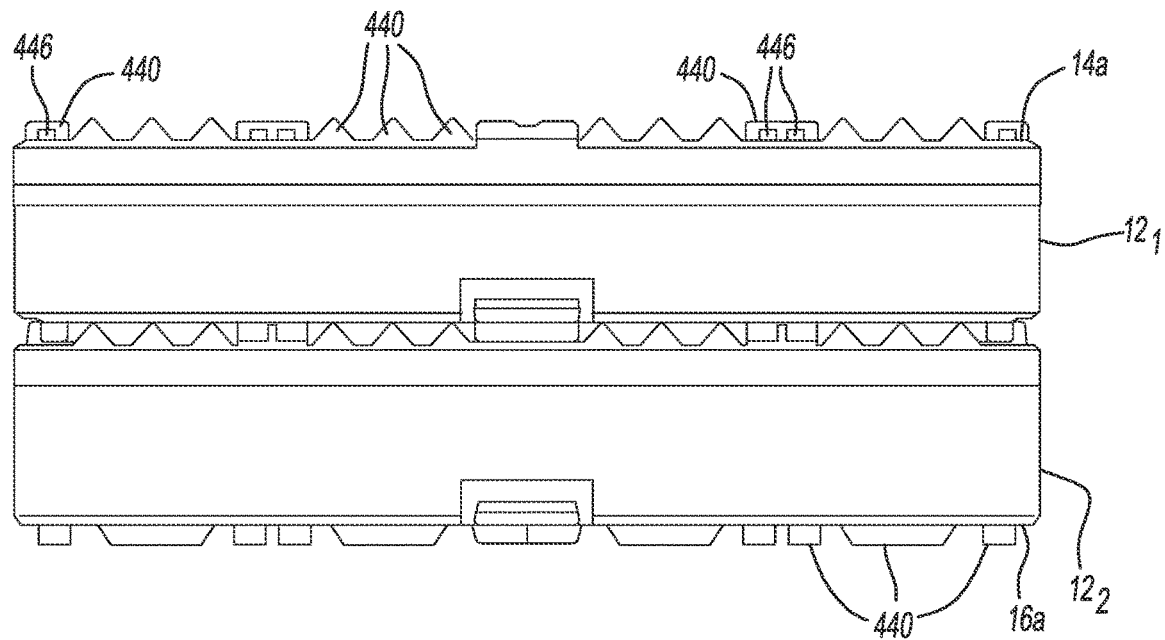
FIGS. 90A and 90B are side and perspective views, respectively, of two storage boxes that are stacked and interconnected using a box-to-box connection system in accordance with an example embodiment.
Figure 90B:
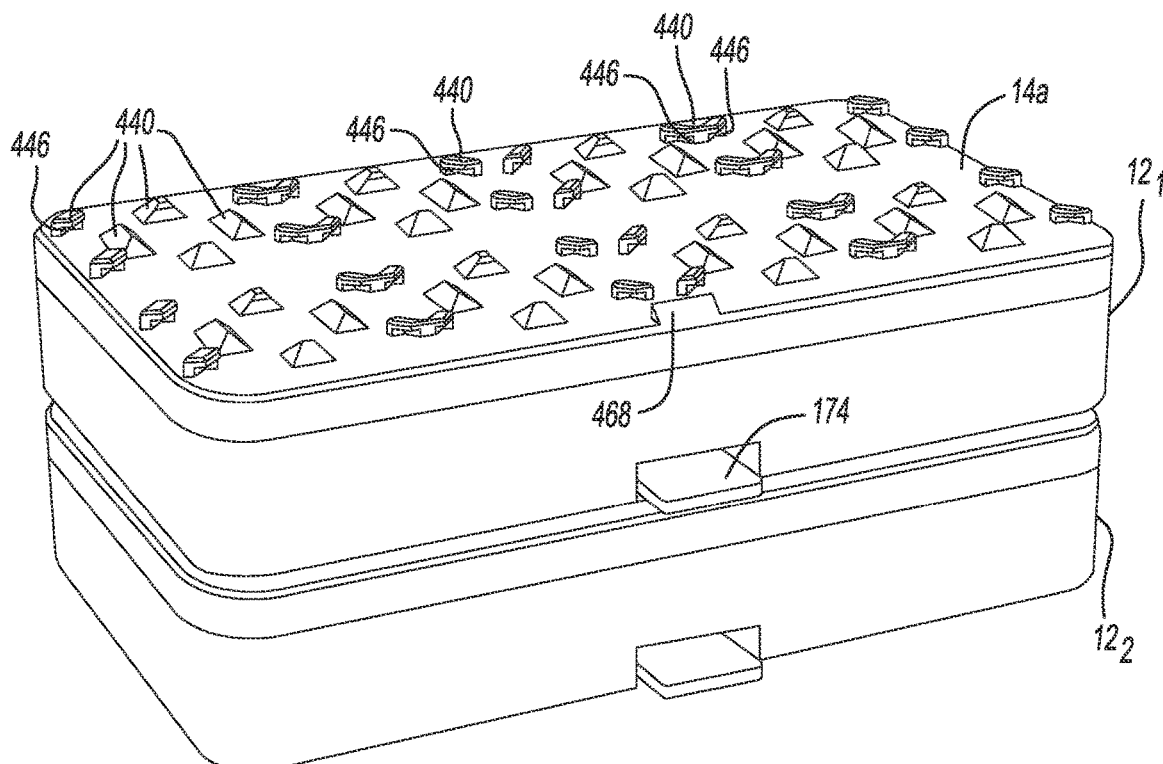
Figure 90C:
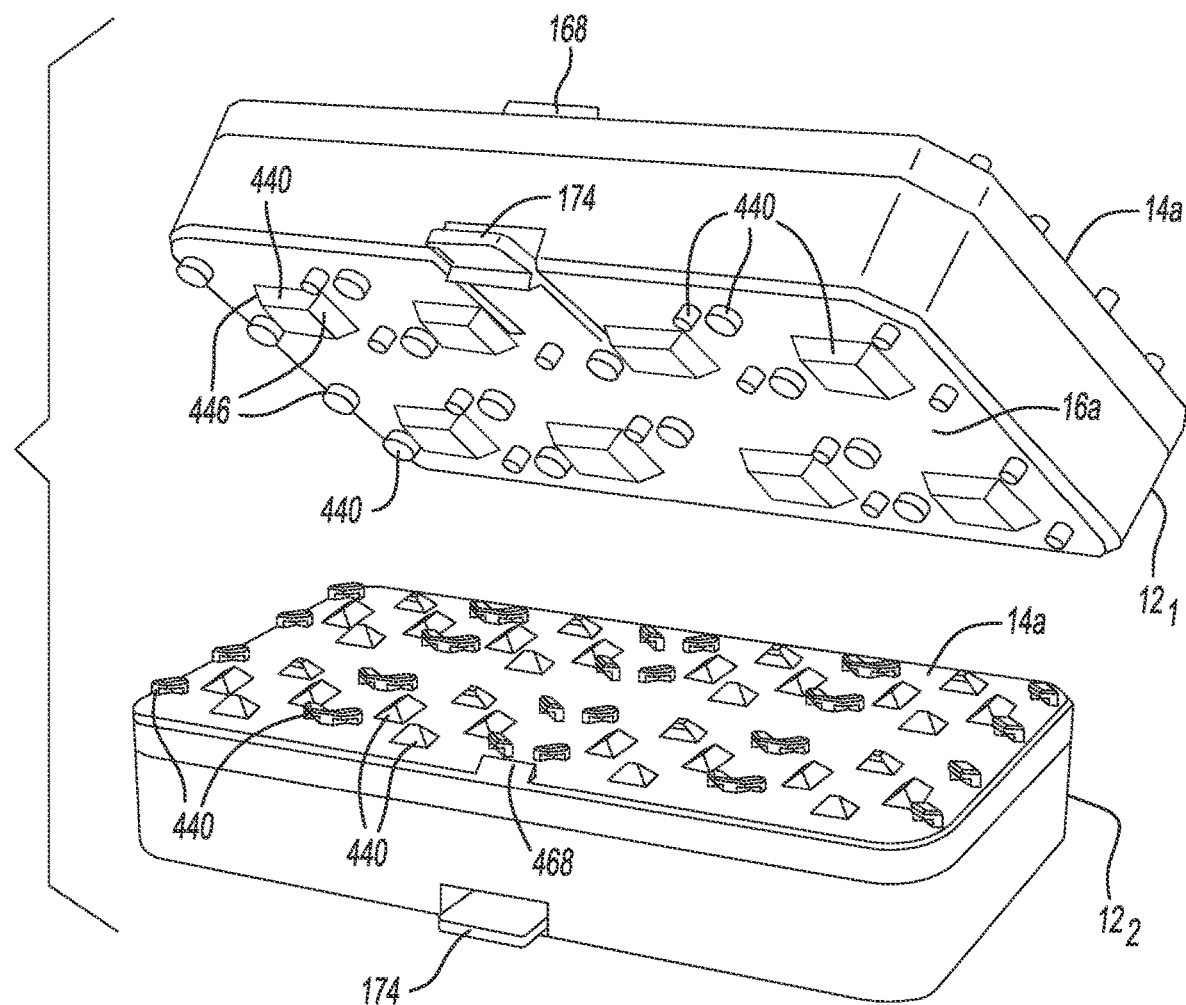
FIG. 90C is a perspective view of the two storage boxes of FIGS. 90A and 90B unstacked and in accordance with an example embodiment.
Figure 91A:
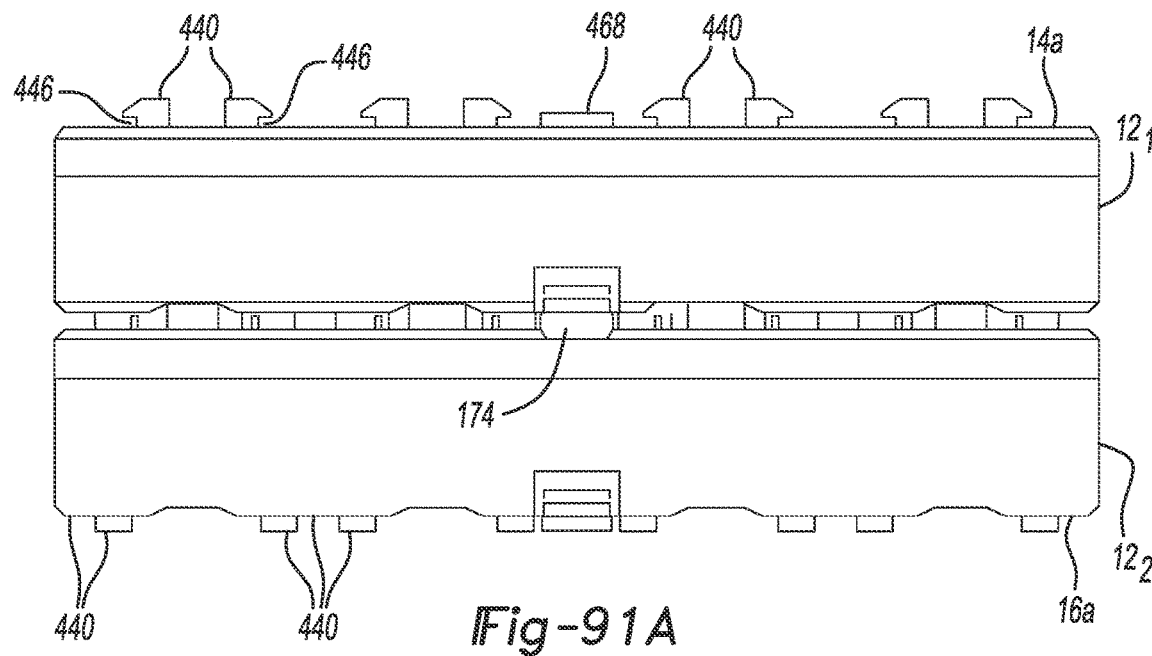
FIGS. 91A and 91B are side and perspective views, respectively, of two storage boxes that are stacked and interconnected using a box-to-box connection system in accordance with an example embodiment.
Figure 91B:
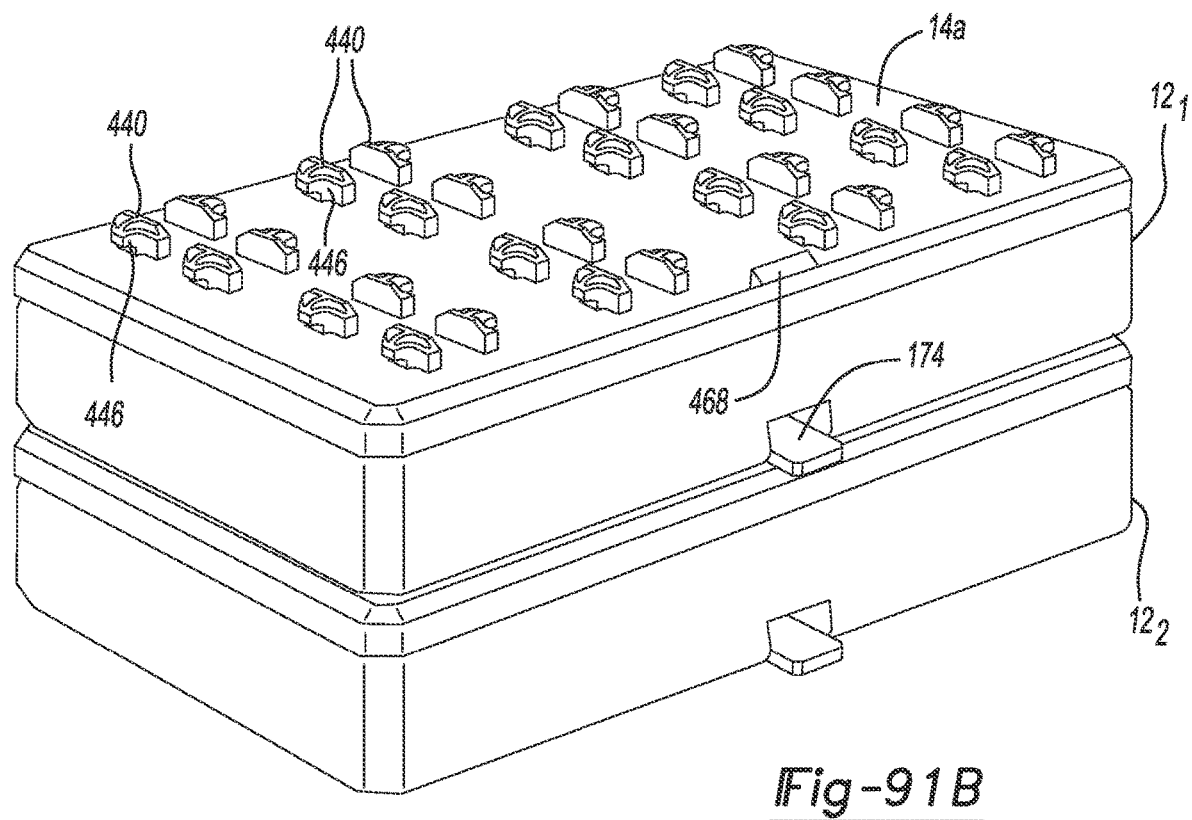
Figure 91C:
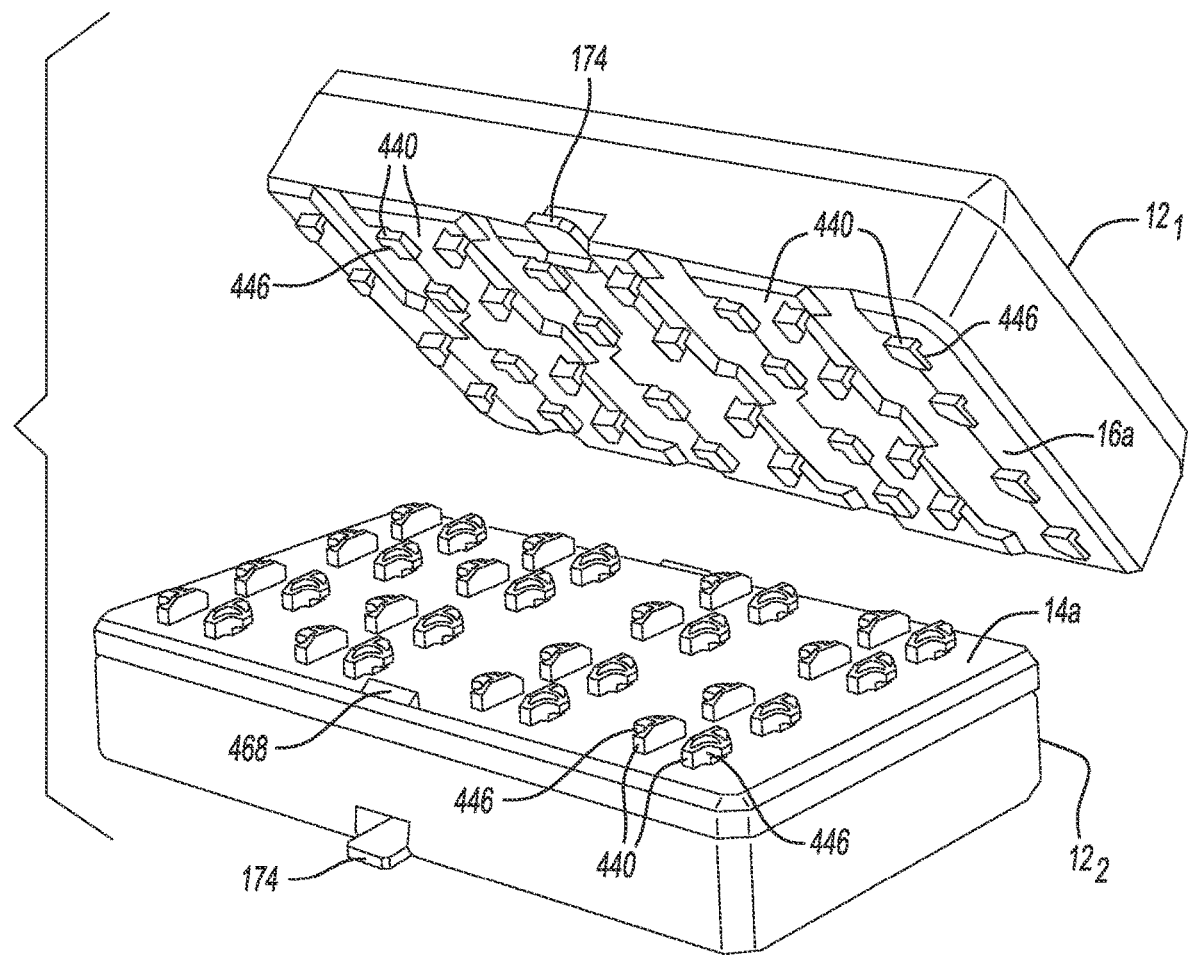
FIG. 91C is a perspective view of the two storage boxes of FIGS. 91A and 91B unstacked and in accordance with an example embodiment.
Figure 92A:
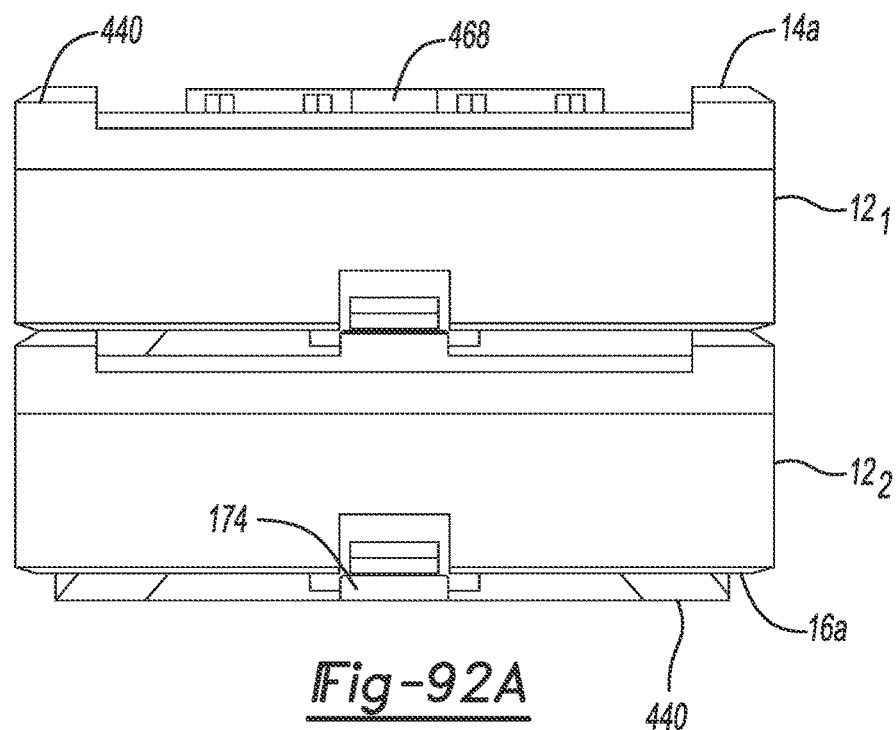
FIGS. 92A and 92B are side and perspective views, respectively, of two storage boxes that are stacked and interconnected using a box-to-box connection system in accordance with an example embodiment.
Figure 92B:
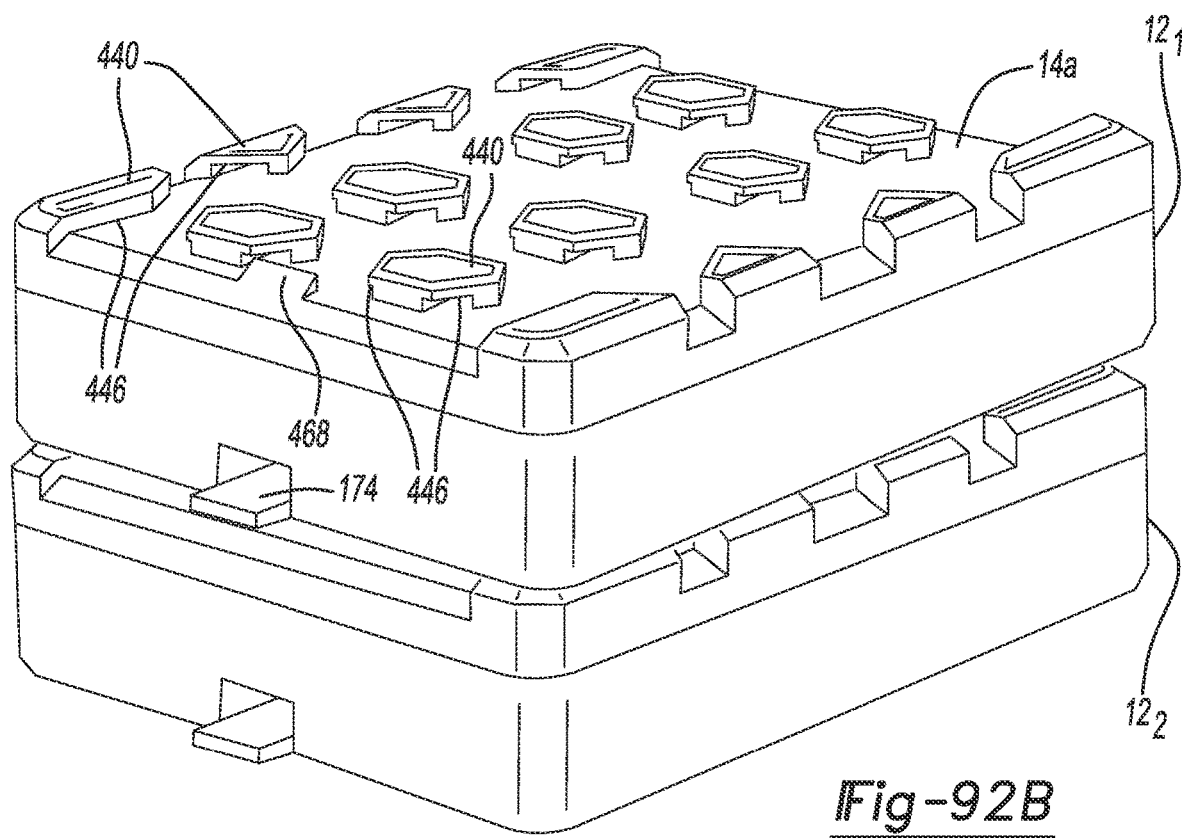
Figure 92C:
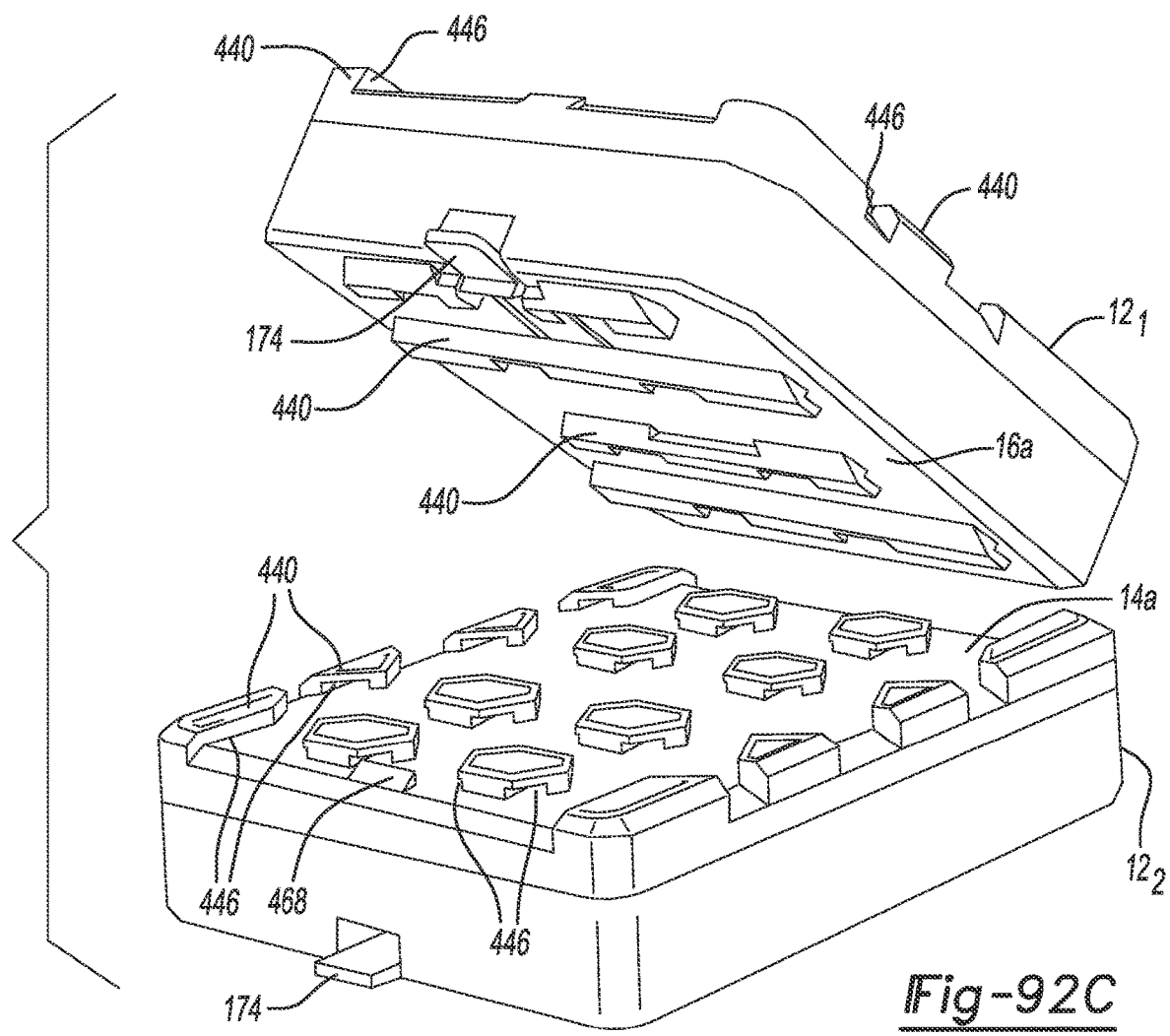
FIG. 92C is a perspective view of the two storage boxes of FIGS. 92A and 92B unstacked and in accordance with an example embodiment.
Figure 93A:
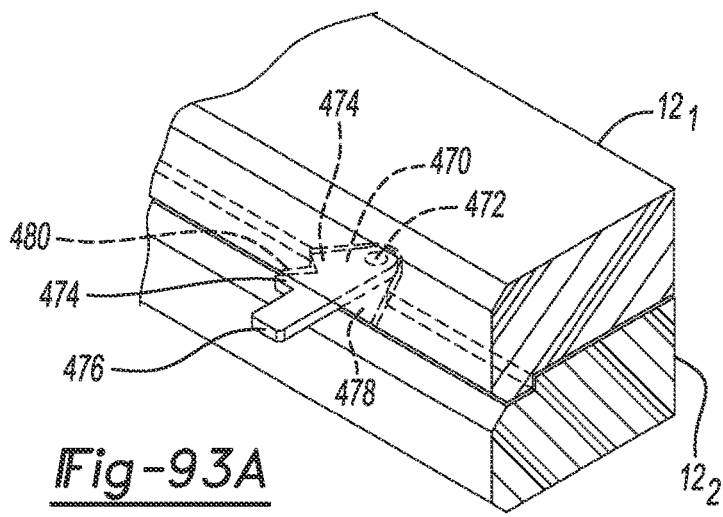
FIGS. 93A and 93B are partial perspective and top views, respectively, of a locking system for use between two stacked storage boxes in accordance with an example embodiment.
Figure 93B:
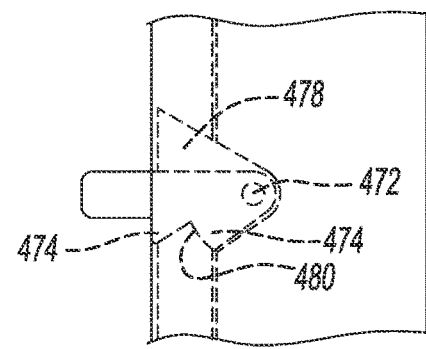
Figure 94A:
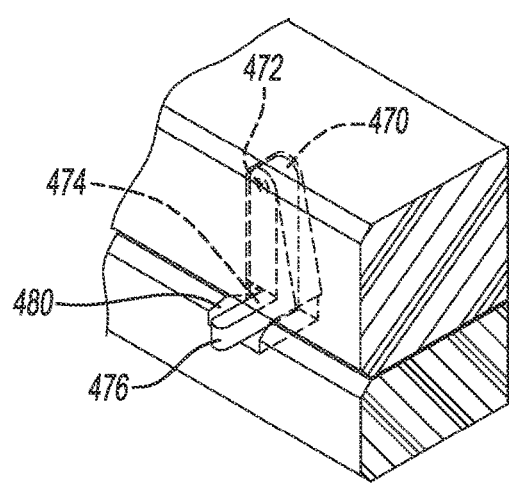
FIGS. 94A and 94B are partial perspective and cross-section side views, respectively, of a locking system for use between two stacked boxes in accordance with an example embodiment.
Figure 94B:
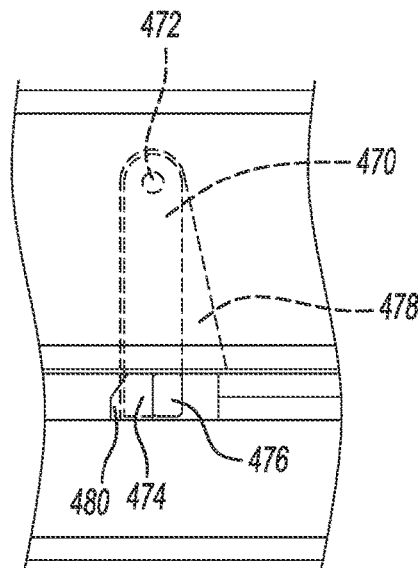
Figure 95A:
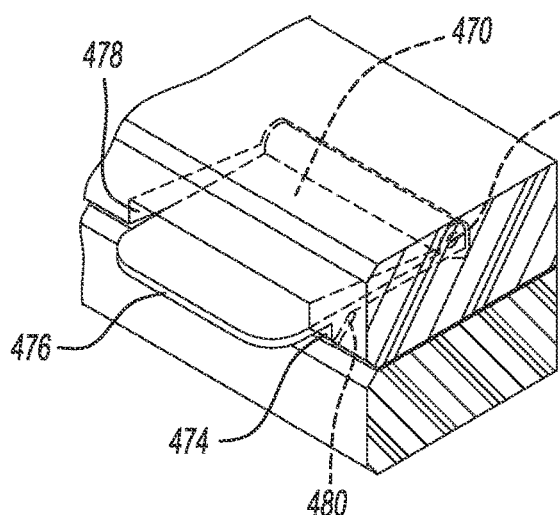
FIGS. 95A and 95B are partial perspective and cross-section side views, respectively, of a locking system for use between two stacked boxes in accordance with an example embodiment.
Figure 95B:
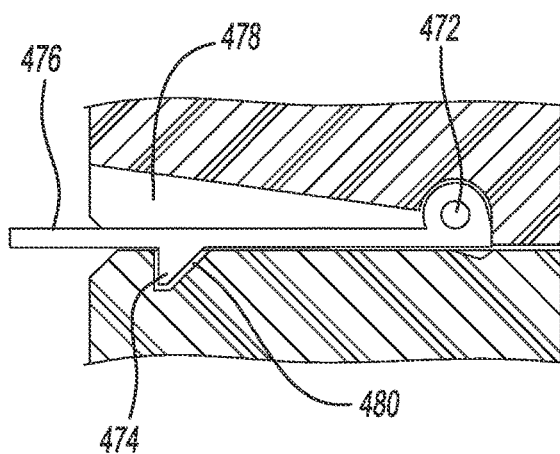
Figure 96A:
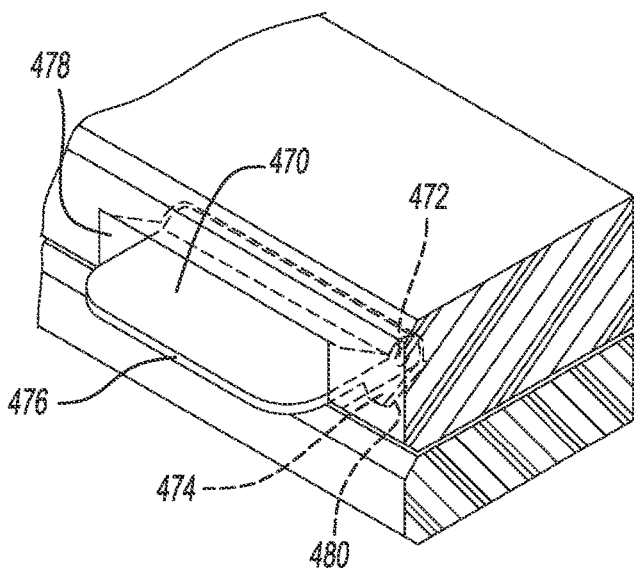
FIGS. 96A and 96B are partial perspective and cross-section side views, respectively, of a locking system for use between two stacked boxes in accordance with an example embodiment.
Figure 96B:
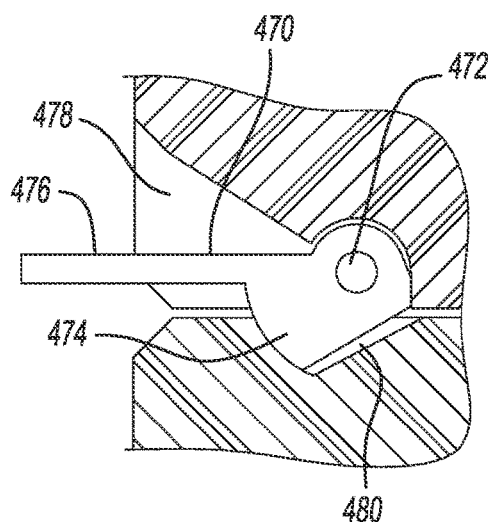
Figure 97A:
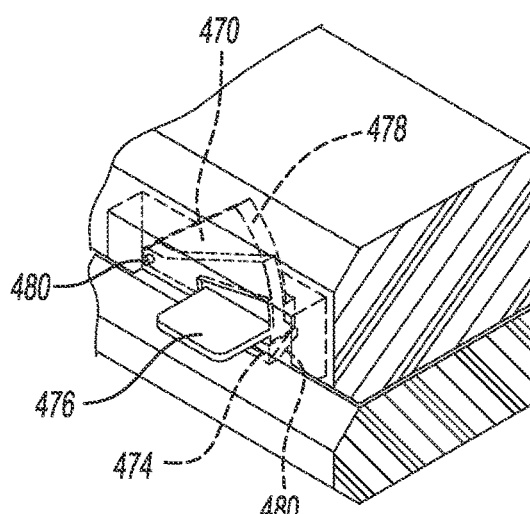
FIGS. 97A and 97B are partial perspective and cross-section side views, respectively, of a locking system for use between two stacked boxes in accordance with an example embodiment.
Figure 97B:
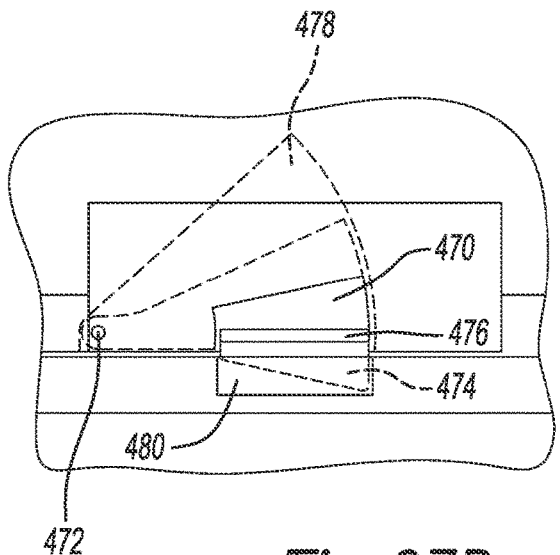
Figure 98A:
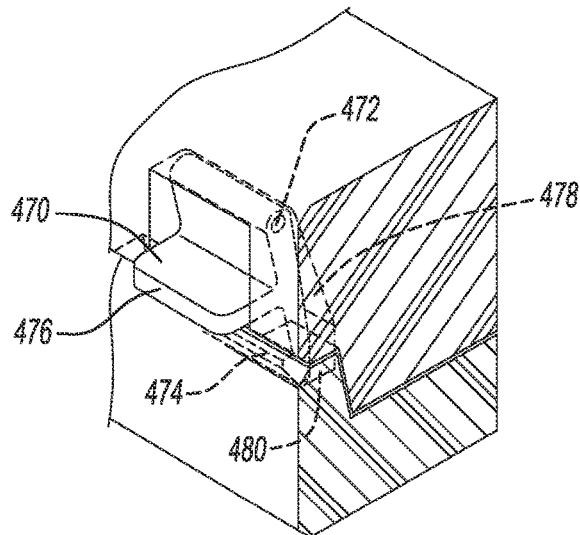
FIGS. 98A and 98B are partial perspective and cross-section side views, respectively, of a locking system for use between two stacked boxes in accordance with an example embodiment.
Figure 98B:
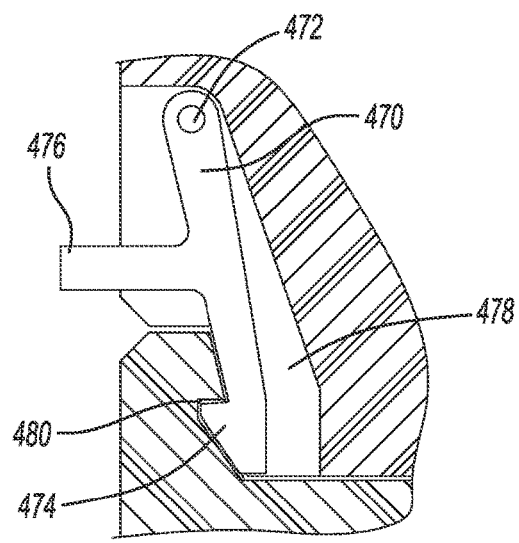

FIGS. 78A through 84C and 88A through 92B illustrate different sizes and shapes of protuberances 440 on the top and bottom surfaces 14a, 16a of boxes for cooperating with complementary protuberances 440 on another box stacked relative thereto. FIGS. 78A through 84C and 88A through 92B also illustrate different arrangements of protuberances 440 and density or number of protuberances 440 in these arrangements, as well as different types of edges 446 and placement of edges 446 on protuberances 440. FIGS. 89A-89C show recesses 464 arranged among the protuberances 440 on a top surface 14a of a box that are each dimensioned to receive a complementary protuberance 440 on the bottom surface 16a of another box 12. The recesses 464 reduce translational movement of stacked boxes relative to each other but do not have a retaining edge like other types of protuberances 440 provided on the box 12 surfaces 14a and 16a. The different example box-to-box connection systems illustrated in FIGS. 78A through 92C provide two-way box connection using dual slide attachment configurations that allow boxes 12 to be connected front-to-back or back-to-front. The box-to-box connection system illustrated in FIGS. 82A and 89B is an example of a four-way box connection that allow boxes 12 to be connected front-to-back or back-to-front, as well as side-to-front, or side-to-back.

Figure 85A:
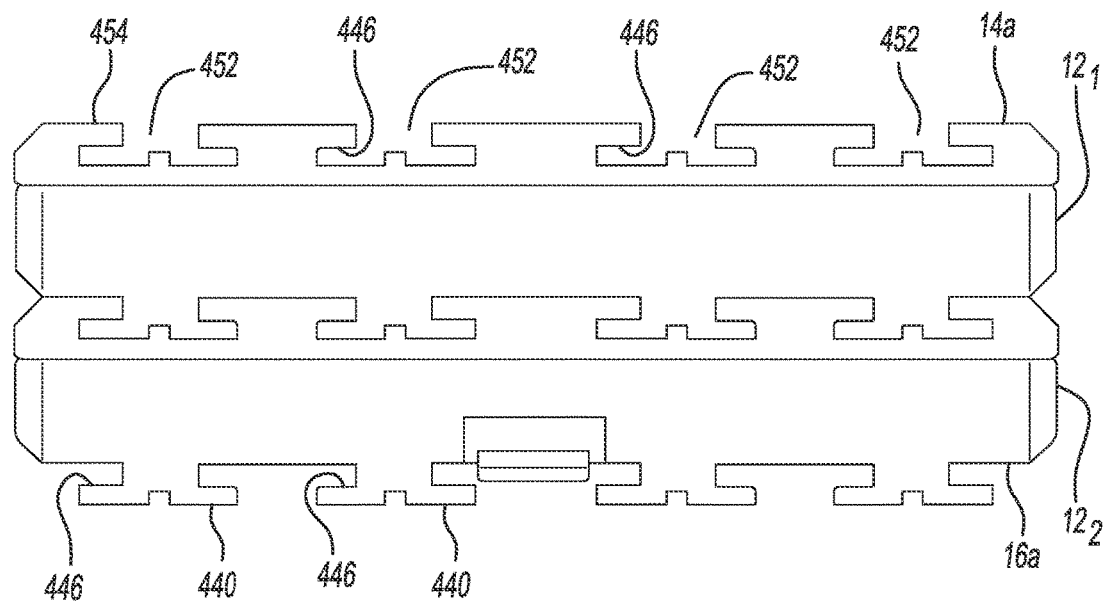
FIGS. 85A and 85B are side and perspective views, respectively, of two storage boxes that are stacked and interconnected using a box-to-box connection system in accordance with an example embodiment.
Figure 85B:
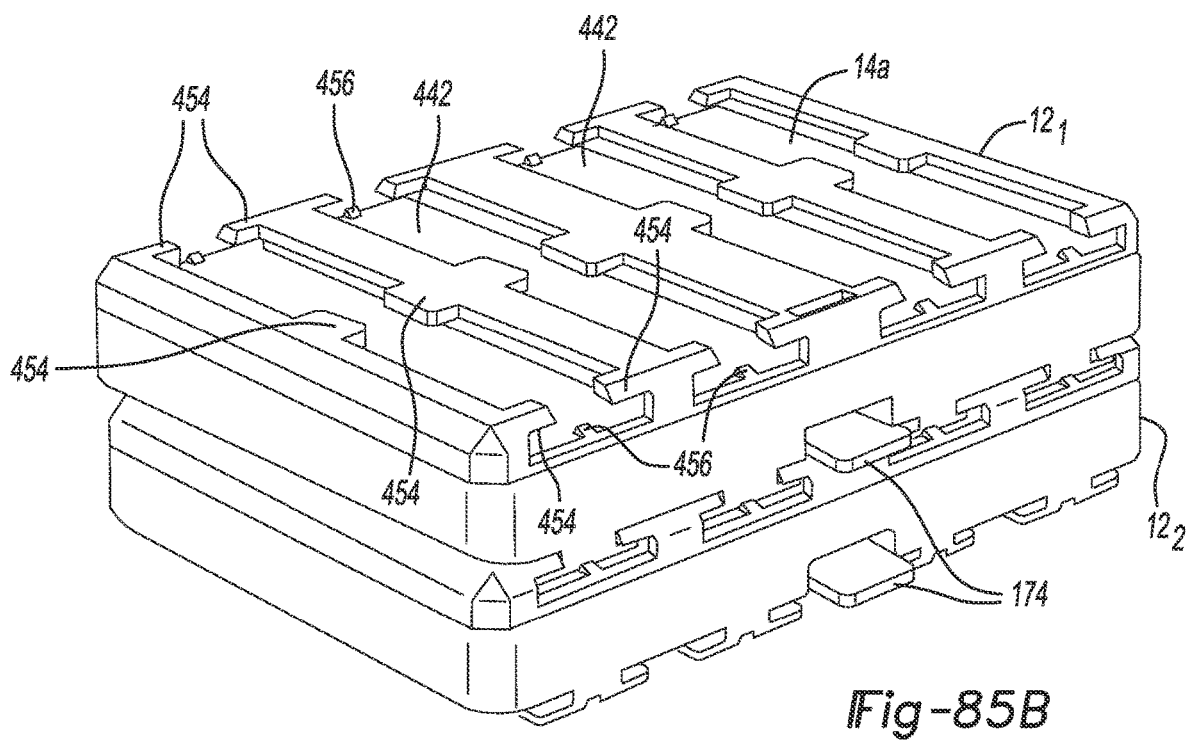
Figure 85C:
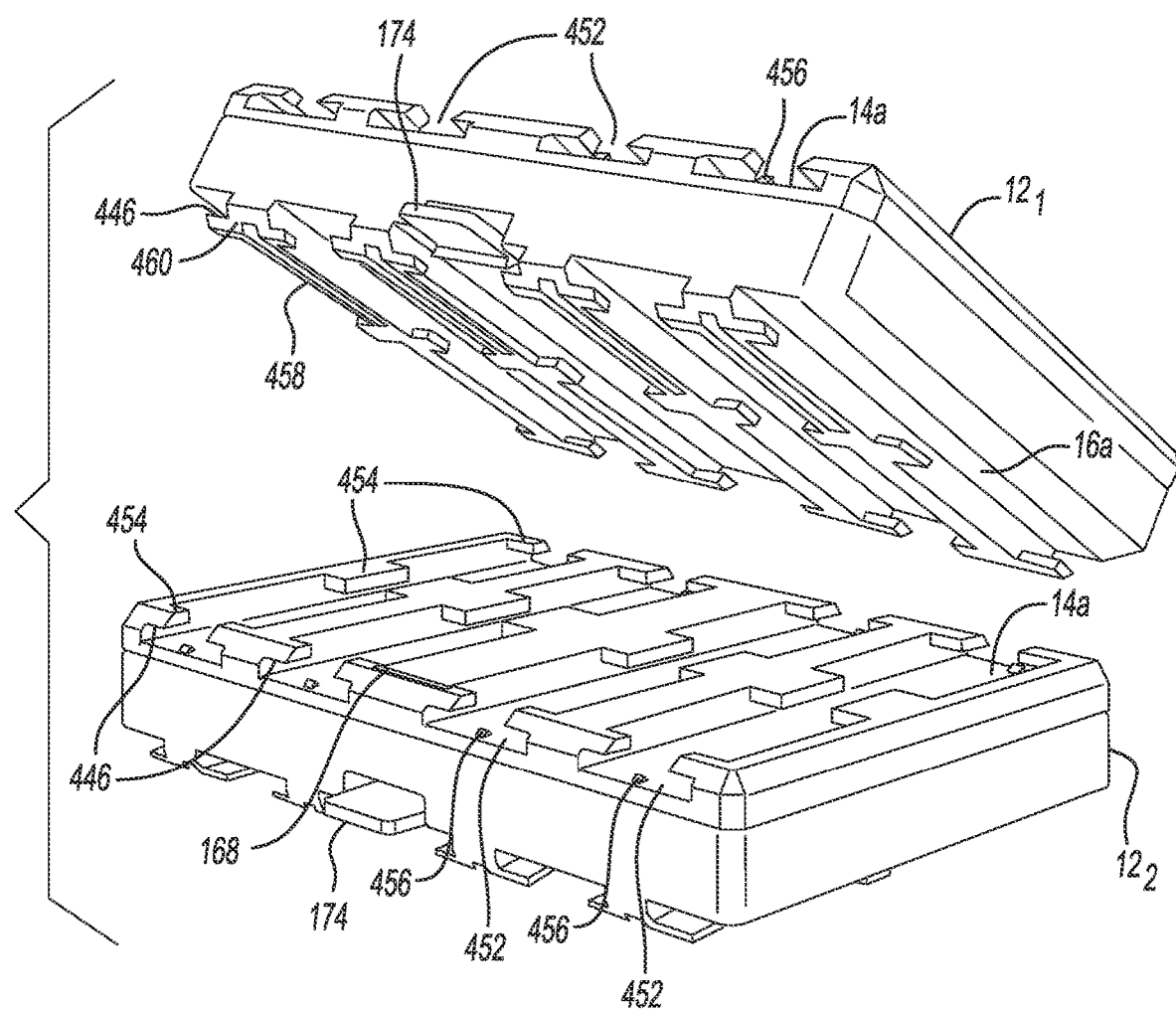
FIG. 85C is a perspective view of the two storage boxes of FIGS. 85A and 85B unstacked and in accordance with an example embodiment.

FIGS. 85A through 87B illustrate unitary and continuous protuberances 440 across a dimension of a top surface 14a of a box 12 to essentially form open and continuous channel cavities 452 with continuous side wall similar in function to the channels 156 in the box-to-box connection system 150. Unitary and continuous protuberances 440 across a dimension of a bottom surface 16a of a box 12 are arranged to form continuous guides 458 arranged and dimensioned to be received in channel cavities 452 of another box 12. The guides 458 are similar in function to the guides 160 in the box-to-box connection system 150. As shown in FIGS. 85A and 85B, the channel cavities 452 can be provided with tabs 454 for a retaining edge 446. The channel cavities 452 can also be provided with stoppers at the ends thereof that are dimensioned to keep the channel cavities 452 open at their ends. As shown in FIG. 85C, the guides 458 can be provided with spaced T-shaped tabs 460 to provide a retaining edge 446.

Similar to the example box-to-box connection system 150, the example embodiments of box-to-box connection systems in FIGS. 78A through 92B have spaces extending entire length and/or width dimensions of top and bottom surfaces 14a and 16a (e.g., or nearly entire length and/or width dimensions of top and bottom surfaces 14a and 16a of a box 12 that has a surrounding or partially surrounding rim) and therefore do not collect debris, in contrast with designs that use tongues or other male coupling members within respective recesses or depressions for coupling two boxes for stacking purposes. The arrangements of protuberances are advantageous over box connection components such as recesses or depressions with or without ribs that connect to tongues or other male coupling members since the box connection components that employ such recesses or depressions cannot engage the tongues or other male coupling members effectively when they contain debris and/or are obscured by debris. By contrast, the protuberances 440 are arranged in rows with columns of self-cleaning space therebetween.

Figure 86A:
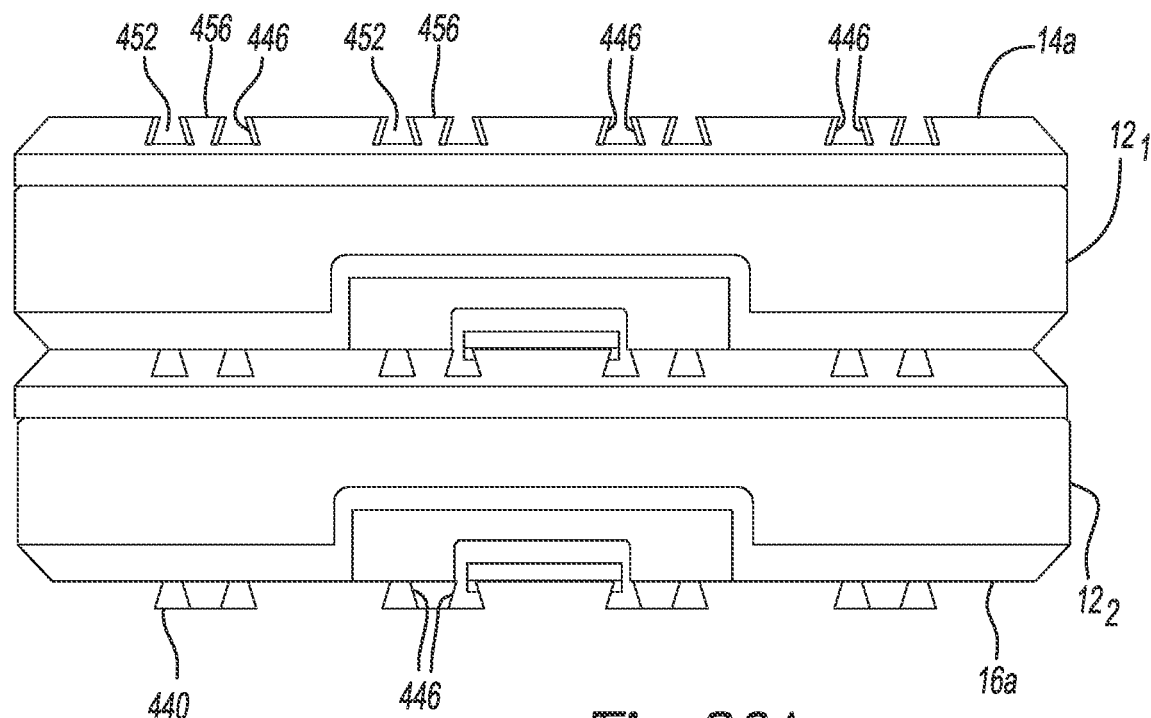
FIGS. 86A and 86B are side and perspective views, respectively, of two storage boxes that are stacked and interconnected using a box-to-box connection system in accordance with an example embodiment.
Figure 86B:
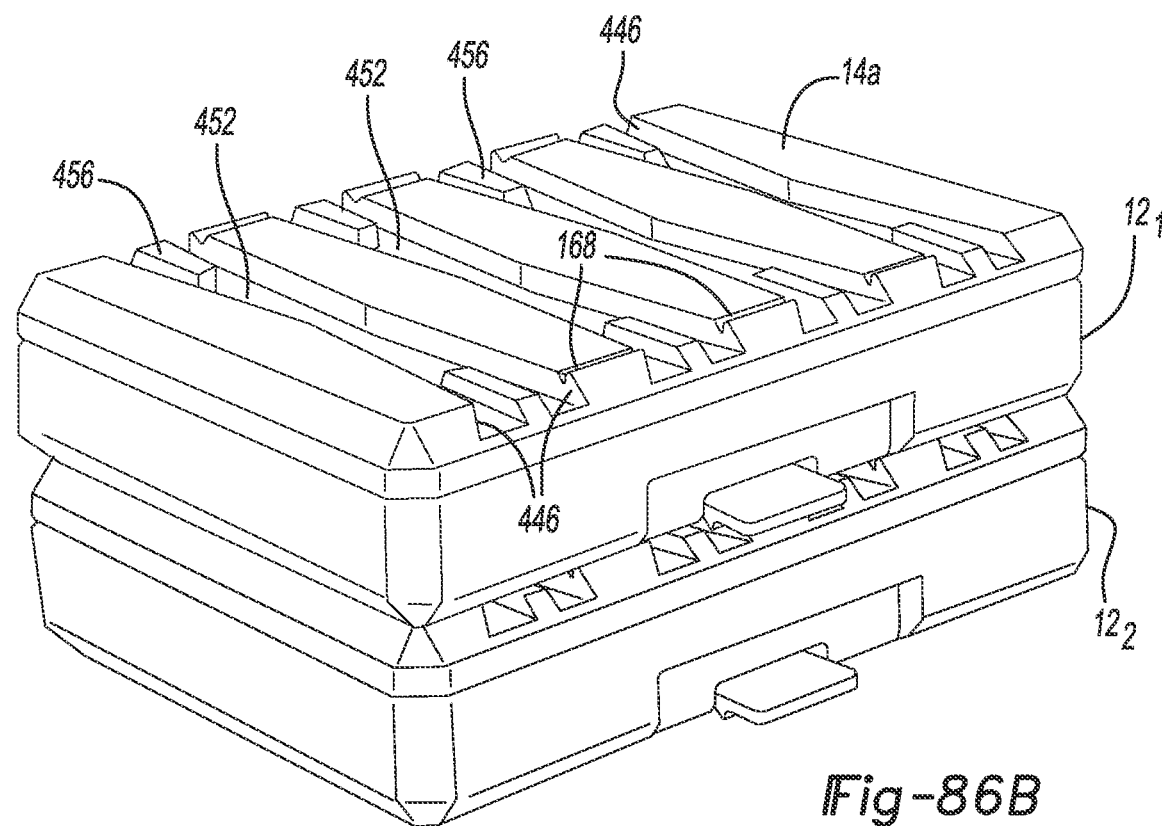
Figure 86C:
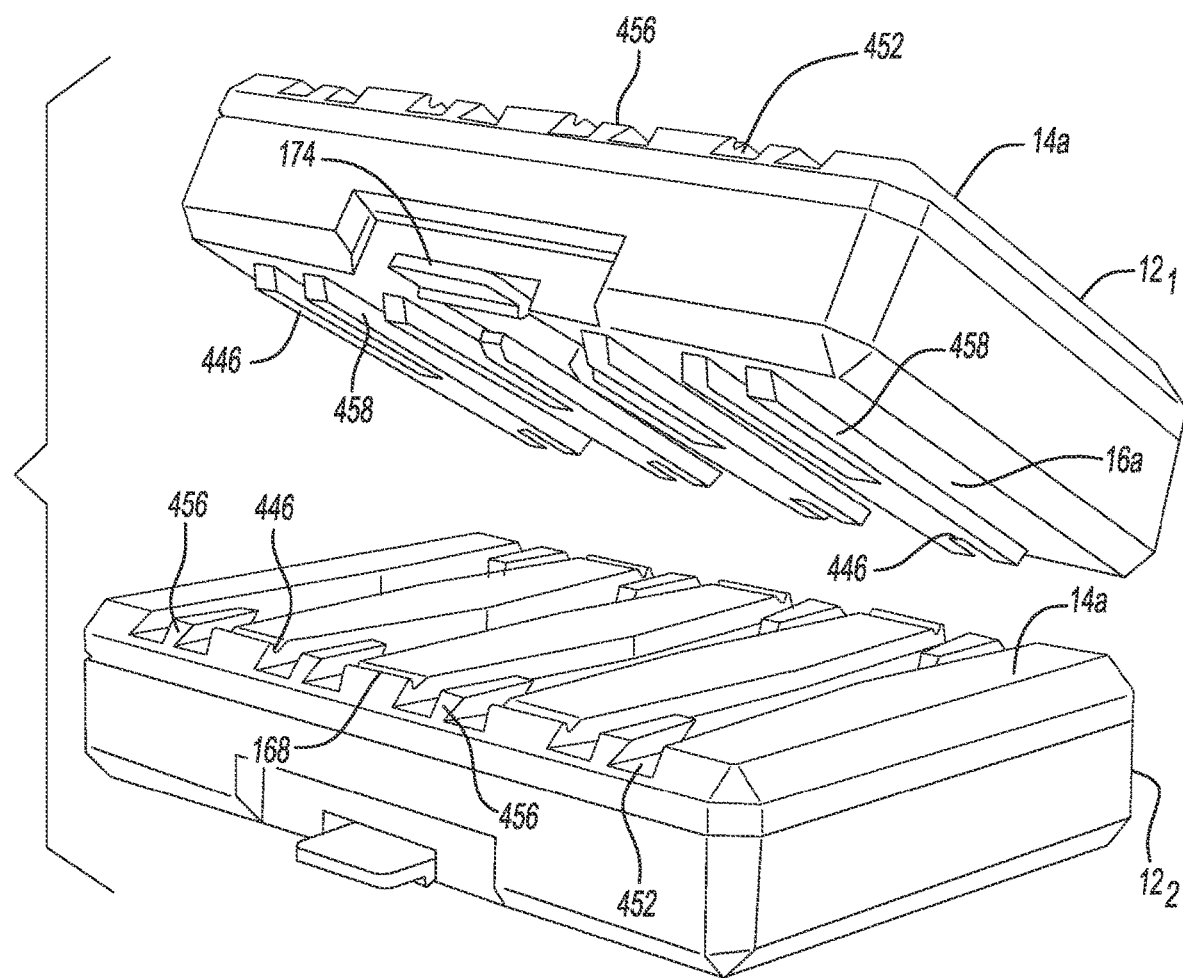
FIG. 86C is a perspective view of the two storage boxes of FIGS. 86A and 86B unstacked and in accordance with an example embodiment.
Figure 87A:
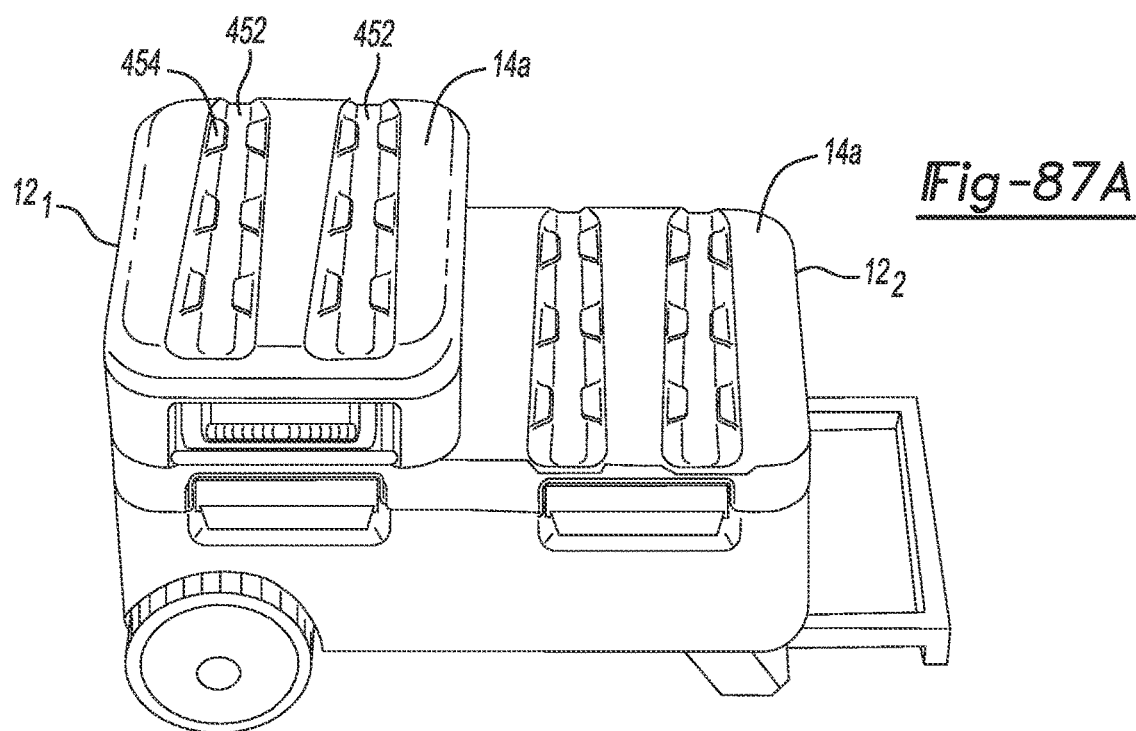
FIGS. 87A and 87B are views of two storage boxes that are stacked and interconnected using a box-to-box connection system, and unstacked, respectively, in accordance with an example embodiment.
Figure 87B:
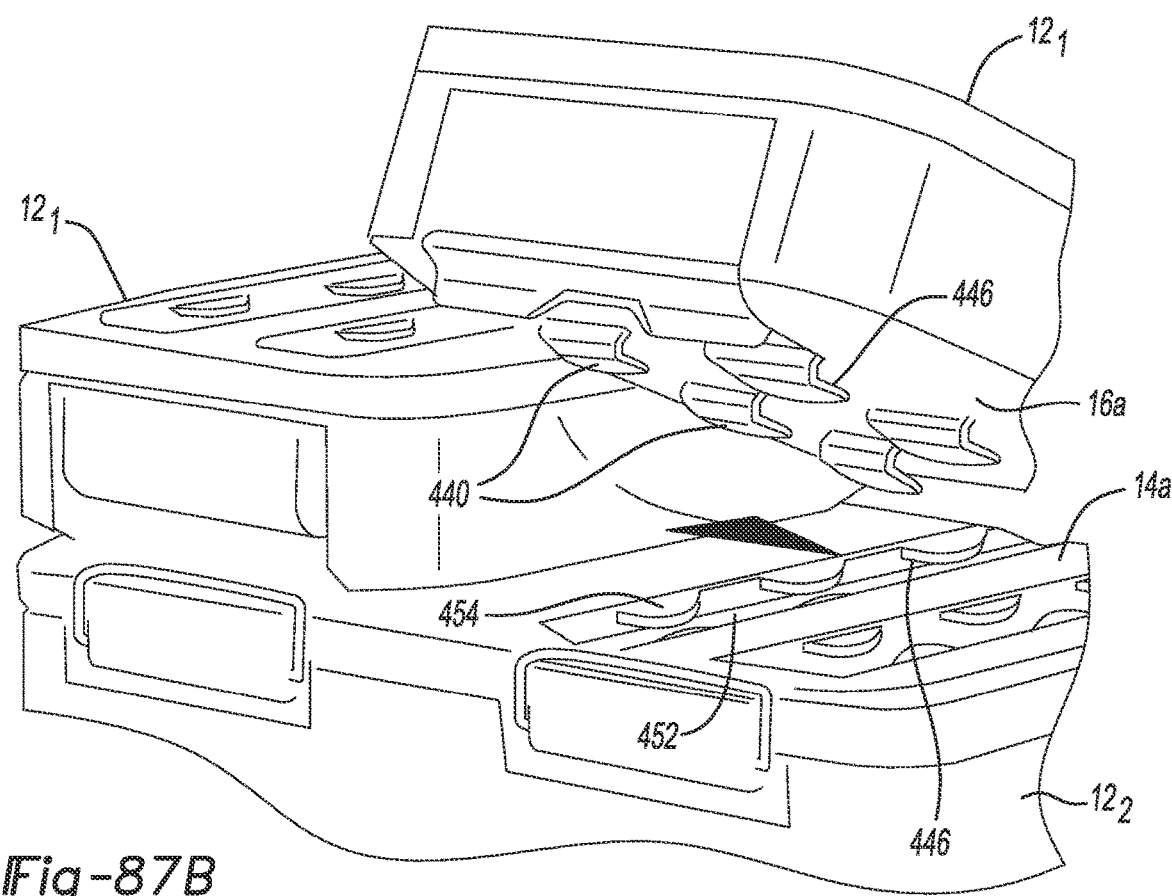
Figure 88A:
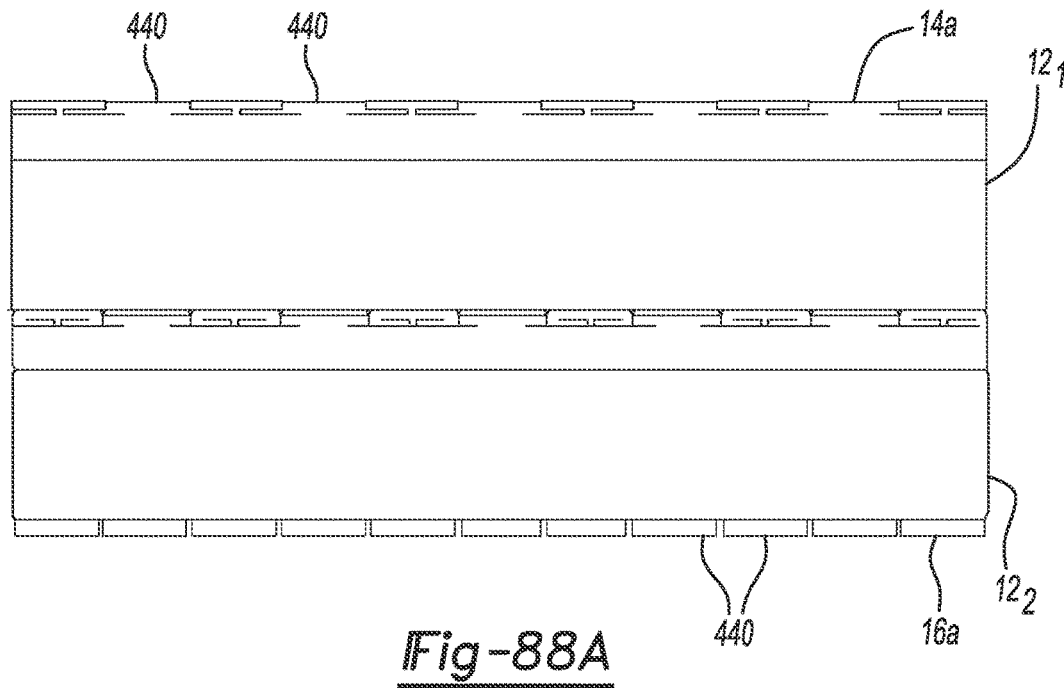
FIGS. 88A and 88B are side and perspective views, respectively, of two storage boxes that are stacked and interconnected using a box-to-box connection system in accordance with an example embodiment.
Figure 88B:
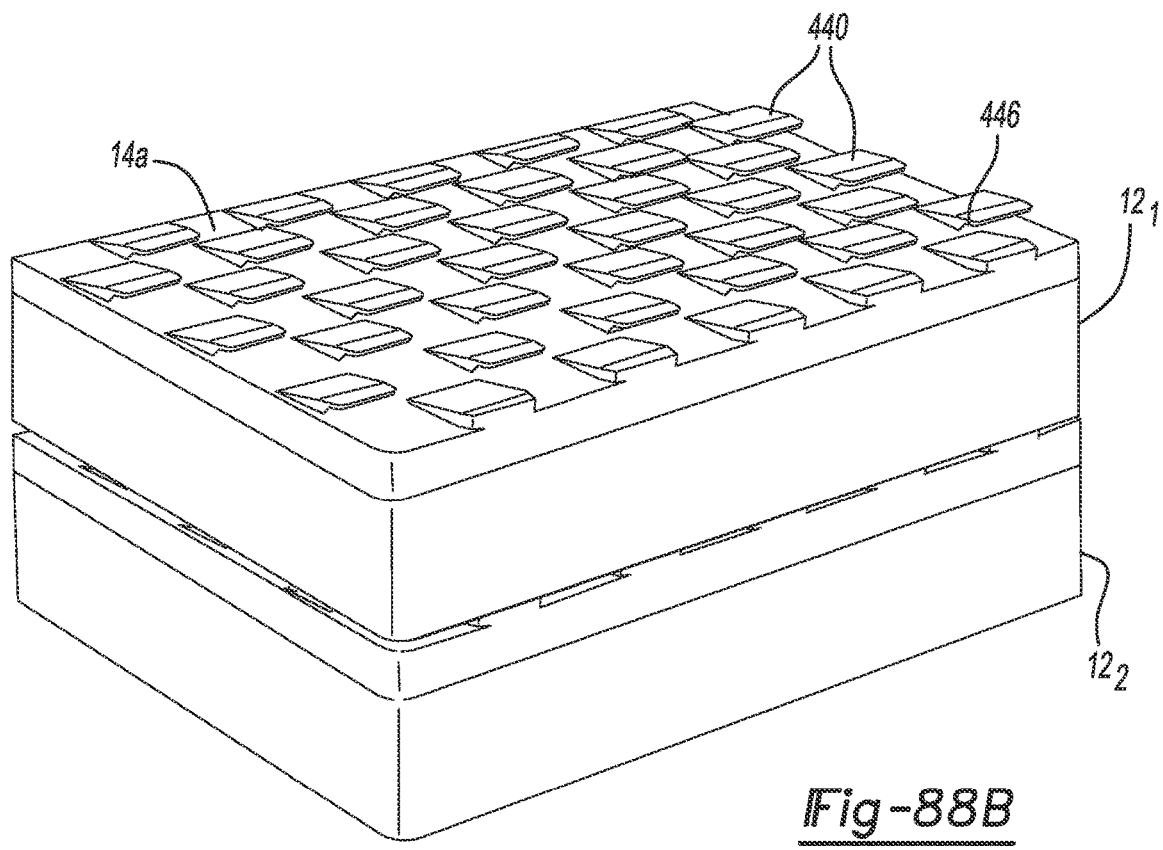
Figure 88C:
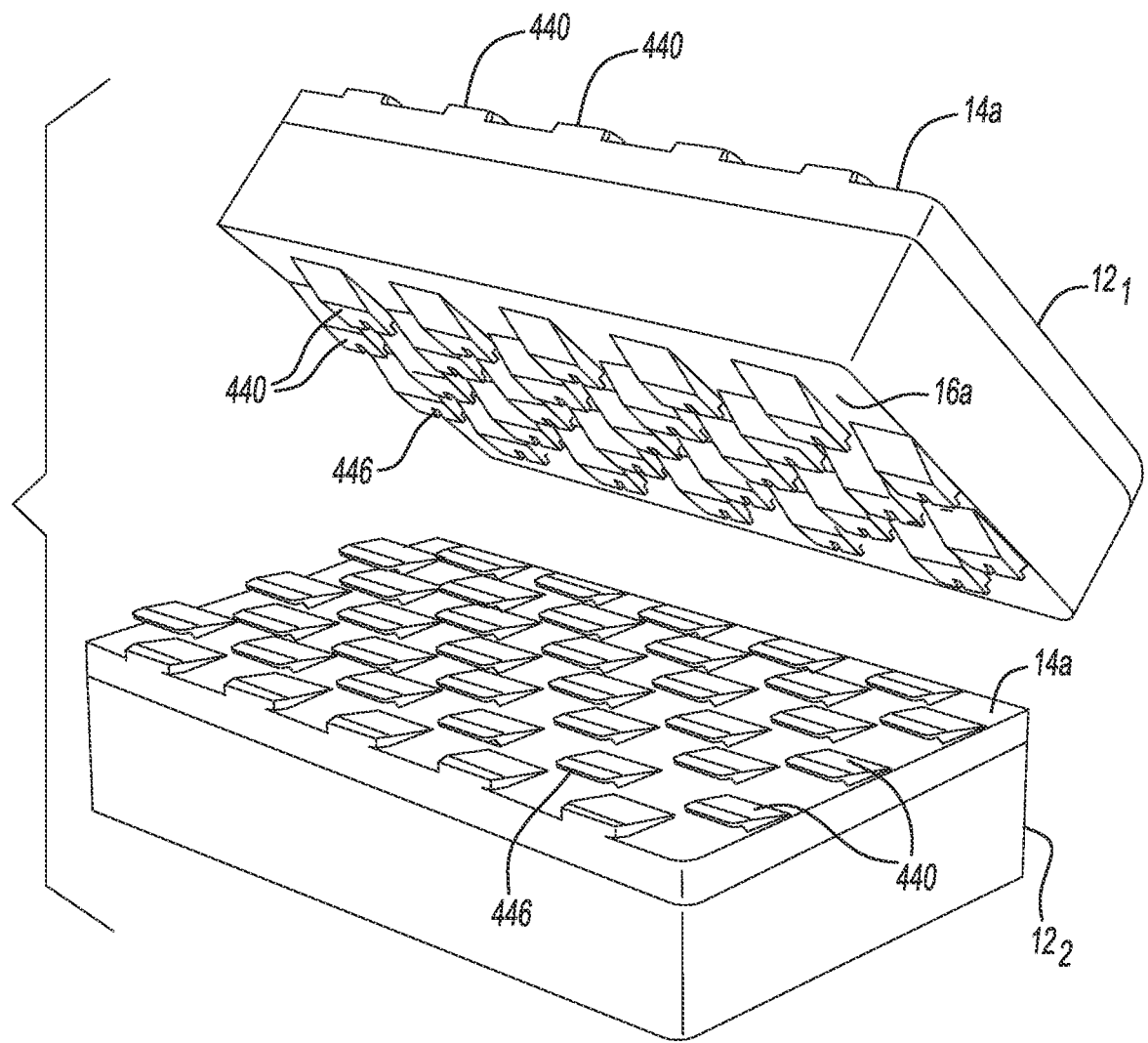
FIG. 88C is a perspective view of the two storage boxes of FIGS. 88A and 88B unstacked and in accordance with an example embodiment.

The box-to-box connection systems shown in FIGS. 78A through 92C can be configured with different types of integrative locking systems such as the integrative locking system 166 described with reference to FIGS. 28A through 29C and well as with different components. For example, some of the stacked boxes in FIGS. 78A through 92C employ a locking cleat member 174, while a different locking cleat member 470 (FIG. 78B) can be used. Some of the stacked boxes in FIGS. 78A through 92C employ a receptacle 168 to receive a cleat, and others employ an edge 468 to abut against a cleat. The receptacle can be implemented in a reinforced rim 448 (FIG. 78A) or in the top surface 14a. A cleat 474 of a locking cleat member 470 can engage more than one of spaced receptacles 168 (FIG. 86B). FIGS. 93A through 98B show different implementations of a locking cleat member 470 having a pivot connection 472 in a recess 478 of a top stacked box to pivot the locking cleat member 470 to disengage a cleat 474 from a recess 480 in a bottom stacked box. The locking cleat member 470 is provided with a finger member 476 for a user's finger(s) to pivot the locking cleat member 470 to disengage the cleat 474.

The modular storage system 10 realizes a number of advantages over existing storage cases and storage systems such as, but not limited to: easier unloading and unloading of boxes 12 from a vehicle; increased accessibility to stored items in a bottom stacked box 12; longer boxes 12a and 12c to store longer tools and materials not accommodated in existing boxes, box dimensions that increase efficiency of use of storage compartment (e.g., less wasted box space); box 12 features and storage accessories that optimize work from a truck at a remote site; rugged, minimized and easier to manipulate connection points (e.g., handles, latches, locking cleat members) to open or unstack/stack or carry boxes; improved and expanded options for interior organization of boxes; among other improvements. For example, the modular storage system 10 provides a comprehensive range of modular, professional grade, ruggedized mobile storage solutions for tools, materials, supplies and other items that are durable and designed for improved ability to transportation, accessibility, storage, and organization of stored items to address multiple and customizable uses or applications for different kinds of users.

Boxes 12 in a system 10 (e.g., FIGS. 1A-1C) with vertically aligned latching mechanisms (e.g., latches 28) among stacked boxes along at least one side of the stack allows a user to conveniently open boxes from the same side for easy access to box contents. Also, the user is not required to unstack boxes 12 to open a box disposed in a stack under one or more other boxes. The modular storage system 10 provides different scalable sizes of boxes 12, each box 12 having the same box-to-box connection components for interchangeability, and scalable hinges and latches, for a professional and aesthetically appealing appearance, and a functionally organized appearance that facilitates ergonomically efficient and convenient use of all system 10 boxes 12, box components and accessories.

The design of the larger boxes 12a and 12c to emphasize horizontal content distribution realizes a number of advantages such as, but not limited to: accommodating longer tools and materials than possible with existing cases; improved storage efficiency and therefore less wasted storage space; fewer tools covered by other items for easier location, retrieval and use; and easier loading.

The rolling base box 12a, for example, is easy to load and unload from a truck bed 434, particularly with its handle 120 stoppers 134a, 134b configured to operate as a tailgate grip. The handle legs 122a,122b provide a pivot point(s) that, when rested on a truck bed tailgate, allow a user to leverage a heavy box 12 or combination 10 of boxes 12 into a truck bed 434 without first having to disassemble the box(es) 12 from the rolling base box 12a or dolly 502 (FIG. 102).

The horizontal form factor of the rolling base box 12a permits its storage within the depth of most conventional pickup truck beds 434 so as not to interfere with a truck bed cover for improved security of the box 12a and its stored items.

One aspect of the example embodiments of the present disclosure that improves accessibility is a user's ability to quickly store an object and remove the object from storage in a box. For example, the box-to-box connection system (e.g., 150) with integrative locking system (e.g., 160) being independent of the lid latch 28 design allows for opening a box 12 to access items stored therein even when it has other boxes stacked upon it.

The dual hinge design of the latches 28 on several of the boxes 12 allows access from either side of the box 12, which makes access easier when the box or stacked boxes are located in different places such as on the bed 434 of a pick-up truck (see FIG. 76B). Also with the lids still secure on the boxes 12, they can rest back to back on each other and be held in place while the boxes are on the truck bed. The dual hinge design of the latches 28 also does not interfere with box contents.

Another aspect of accessibility is the storage system's ability to engage many differently sized boxes with a standardized connection mechanism (e.g., channels 156 and guides 160) between the boxes 12 and various modular storage system accessories (e.g., such wall mount systems as shown in FIGS. 30 through 31C). This facilitates engagement of an object or box(es) 12 at a plurality of locations.

The boxes 12 in the modular storage system 10 have multiple connection points for increased storage capacity and accessibility of stored and transported items such as, but not limited to: the extension connection system 220, the box-to-box connection system features (e.g., channels 156, guides 160), the pinch grip corners 36, among other features in accordance with example embodiments.

The boxes 12 in the modular storage system 10 have multiple customizable interior organization features such as, but not limited to: dividers 250, 290, bins 300, trays, and lid design and lid mounting solutions, among other features in accordance with example embodiments.

For example, tool attachment accessories for lids and outer and inner sides of boxes can include external attachment accessories to removably attach tools (e.g., shovel, broom, battery pack, charger, light, handheld tools, and so on) to the exteriors of a box 12 such as on its side or on its lid, and internal attachment systems to secure light(s) to a lid underside to provide interior case lighting or to attach other types of tools to a lid underside such as a bottle opener, and so on. The lid underside is provided with a grid of ribs and recesses to expand storage options. Mounting accessories also include a cleated mount bar that can be attached to sides of a panel van or a truck bed, and a corresponding back mounted cleated system secured to a surface of a case to mount the case to the mount bar, as well as wall panels that employ box-to-box connection features (e.g., channels) to engage complementary features in a box to be removably stowed on a wall via the wall panels.

The modular storage system 10 products (e.g., boxes 12) and features of the example embodiments are designed with attention to: durability, mobility, security and weather resistance. For example, regarding durability, strong materials and rugged design are used which allow the modular storage system and its components to withstand impacts, falls, long-term use, which includes using heavy-duty wheels that hold up against a variety of different worksite landscapes among other ruggedized components.

An advantageous mobile design of the modular storage system 10 comprises convenient and comfortable handles that do not extend beyond the outer dimensions of the box 12 and that allow for hand mobility of the box 12 and connectability of the box 12 to a variety of different wheeled transport devices. The modular storage system 10 products and features are secure, that is, the boxes 12 are designed to allow for a secured locking mechanism, both from entry into the storage box 12 and from nefarious removal of a box 12 from an open truck bed because the box 12 did not fit under a truck bed cover. The storage system boxes 12 and features are weather resistant, including covered cases and trays with seals tight enough to keep dirt, dust, and water out.

In accordance with example embodiments, a modular storage system 10 is provided for interconnecting boxes or container modules 12 to each other in a stacked configuration. For example, a box or container module 12 configured for connection with another box or container module 12 can have any number of and any combinations of the following features. Further, first and second interconnecting boxes or container modules 12 can have the same number of and combinations of the following features. Accessories for a box or container module 12 in the modular storage system 10 can have any number of and any combinations of the following features.

1) A storage system comprises means for removably connecting a first container module to a second container module.

2) The storage system can further comprise means for selectively locking the first container module to the second container module.

3) A storage system comprises an open container, a lid for covering a container, and a dual hinge system selectively attaching said lid at either side of said container to selectively close said container and/or provide access to said container.

4) A storage system comprising at least one of, or any combination of: means for removably connecting a first container module to a second container module; means for selectively locking the first container module to a second container module; and a lid for covering at least one of said first and second container module, and a dual hinge system selectively attaching said lid at either side of at least one of said first and second container module to selectively close said at least one of said first and second container module and/or provide access to said at least one of said first and second container module.

5) The storage system can further comprise means for removably connecting said first container module to said second container module.

6) The storage system can further comprise means for selectively locking the first container module to the second container module.

7) The means for removably connecting said first container module to said second container module can comprise connecting components disposed on opposite surfaces of at least one of said lid and said container module, respectively.

8) In a storage system, the means for interconnecting boxes can comprise at least one raised guide disposed along a surface of a first box, and at least one channel disposed along a surface of a second box and dimensioned to receive the guide.

9) The guide can extend along a dimension of the surface of the first box chosen from a box width and a box length.

10) The guide has a length that corresponds to the dimension of the surface of the first box chosen from the box width and the box length of the first box.

11) The channel can extend along a dimension of the surface of the second box chosen from a box width and a box length.

12) The channel has a length that corresponds to the dimension of the surface of the second box chosen from the box width and the box length of the second box.

13) The channel is open at opposite ends thereof.

14) In a stacked configuration where the first box is stacked on top of the second box, the surface of the first box comprising the at least one guide is a bottom exterior surface of the first box, and the surface of the second box comprising the at least one channel is a top exterior surface of the second box, the channel is a cavity formed in the top exterior surface of the second box, the cavity comprising a channel bottom and two channel side walls extending inwardly from the top exterior surface of the second box toward the channel bottom.

15) In a stacked configuration where the first box is stacked on top of the second box, the surface of the first box comprising the at least one guide is a bottom exterior surface of the first box, and the surface of the second box comprising the at least one channel is a top exterior surface of the second box, the guide is a raised member extending from the bottom exterior surface of the first box.

16) The at least one channel comprises opposite side walls with top edges that extend at least partially over the channel and notches in the top edges of the side walls, the at least one guide comprises tabs that can be aligned with the notches for insertion of the guide into the channel and be misaligned to abut at least one tab against an underside of one of the top edges to provide a surface to prevent the guide from being lifted out of the box channel.

17) The first box and the second box can slide relative to each other in both a forward direction and a backward direction along a box engagement path when the guide of the first box contacts the channel in the second box.

18) The tabs extend from a top edge of the guide in a direction transverse to the box engagement path.

19) Means for interconnecting boxes can comprise an integrative locking system having a cleat disposed on one of two interconnected boxes, and a receptacle configured to receive the cleat and disposed on the other one of the two interconnected boxes.

20) The integrative locking system further comprises a cleat member configured as a flat member with the cleat extending from a portion thereof between a first end and a second end, the flat member being securable at the first end thereof to one of the two interconnected boxes, the flat member being movable to remove the cleat from the receptacle when force is applied to the second end to move the second end toward the box and stationary to retain the cleat in the receptacle when no force is applied to the second end to move the second end toward the box.

21) The box to which the flat member is secured is molded with a depression in the bottom exterior surface thereof that is dimensioned to receive the flat member.

22) The at least one guide and the at least one channel are configured to prevent relative translational movement between the first box and the second box in a first direction corresponding to one of two-dimensional directions comprising an x-axis and a y-axis perpendicular to the x-axis, and the means for interconnecting boxes further comprises integrative locking means for preventing relative translational movement between the first box and the second box in a second direction corresponding to the other one of the two-dimensional directions.

23) Wherein the at least one guide and the at least one channel extend along the first box and second box, respectively, in the second direction between a first edge and a second edge on each of the first box and second box, and the integrative locking means can comprise, for example, a cleat disposed at one of the first edge and the second edge of the first box and cleat retaining member chosen from a receptacle and a wedge disposed at the corresponding one of the first edge and the second edge of the second box that is aligned to receive the cleat when the first box is translated over the second box in the second direction.

24) In a modular storage system comprising at least two boxes with means for interconnecting the at least two boxes to each other in a stacked configuration, each of the boxes can comprise a top portion and a bottom portion that define an inner volume for a storage compartment, and at least one latch on a side wall of the box to releasably secure the top portion to the bottom portion and enclose the storage compartment.

25) The latch secures the top portion to the bottom portion of the box independently of the means for interconnecting the at least two boxes, and can release the top portion from the bottom portion of the box to allow access to the storage compartment when the at least two boxes are interconnected for a stacked configuration.

26) One or more of the at least one latch can be mounted on each of opposite sides of a box to allow opening the top portion from either of the opposite sides of the box.

27) The box can comprise a hinge between the top portion and the bottom portion of the box on one side thereof, and at least one latch on the side of the box opposite the hinge.

28) The at least one latch is anchored to and pivots from a point on the bottom portion of the box, the at least one latch having a pivotable clamping piece that is pivotable relative to the box from an unlocked position whereby the pivotable clamping piece is detached from the box to a locked position whereby the pivotable clamping piece is releasably coupled to a clamping piece coupling feature in the top portion of the box.

29) The clamping piece coupling feature in the top portion of the box is chosen from a groove that receives a portion of the pivotable clamping piece therein, and a bar that is disposed to be clamped under a portion of the pivotable clamping piece when the pivotable clamping piece is in the locked position.

30) The box comprises a rod member along a side wall in the top portion thereof, and the latch comprises a cut-out portion that rotatably receives the rod member in the locked position to pivot about the top portion when the side wall opposite the rob member is moved away from the bottom portion of the box.

31) A box can have at least one box carrying handle pivotably secured to at least one side wall of the box.

32) A side wall of a box can be formed with at least one thinner area of less thickness than thicker areas at opposite ends of the side wall of the box at adjoining corners with other side walls of the box, the thicker areas at the adjoining corners providing reinforcing strength to the box against stacking pressure, the thinner area being configured as a depression in the side wall relative to the thicker areas at opposite ends of the side wall.

33) A side wall of the box can have an additional thicker area disposed between the thicker areas at the opposite ends of the side wall and separated therefrom by the at least one thinner area.

34) At least one of the latch and the box carrying handle can be disposed within the depression.

35) The box carrying handle is configured to have a fixed end mounted to the box and a free end that can move relative to the box between an undeployed position wherein the box carrying handle is disposed along the side wall of the box and a deployed position wherein the free end extends away from the side wall of the box, the depression in the side wall having a selected depth to receive the box carrying handle in the undeployed position so that the box carrying handle does not extend beyond the thicker areas of the side wall.

36) The latch is configured to have mounting piece mounted to the box and a pivotable clamping piece that is pivotable relative to the box from an unlocked position whereby the pivotable clamping piece is detached from the box to a locked position whereby the pivotable clamping piece is releasably coupled to a retention feature in the top portion of the box, the depression in the side wall having a selected depth to receive the latch in the unlocked position so that the latch does not extend beyond the thicker areas of the side wall.

37) The retention feature can be chosen from a groove or a rod disposed in the top portion of the box.

38) The latch is configured to have mounting piece mounted to the box at one of the adjoining corners and a pivotable clamping piece that is pivotable relative to the box from an unlocked position whereby the pivotable clamping piece is detached from the box to a locked position whereby the pivotable clamping piece is releasably coupled to a retention feature in the top portion of the box.

39) In the modular storage system, a plurality of boxes characterized by a plurality of sizes are stackable in a plurality of combinations of boxes that can comprise different numbers of the boxes and different ones of the plurality of sizes of boxes.

40) Each of the plurality of boxes can comprise a top portion and a bottom portion that define an inner volume for a storage compartment, and at least one of the plurality of boxes has a first length, a first width and a first depth, the first length being greater than the first width.

41) At least two of the plurality of boxes are large boxes characterized by the first length and the first width and that have means for interconnecting to various ones of the plurality of boxes, the large boxes being stackable one on top of the other along an exterior surface thereof having the first length.

42) The large boxes are characterized by a top exterior surface and a bottom exterior surface having the first length and side walls, two of the side walls each having the first length and two of the latches.

43) At least one of the plurality of boxes is a medium box characterized by two side walls having one-half of the first length and the other side walls having the first width, and having the means for interconnecting to various ones of the plurality of boxes, and one of the latches disposed on at least one of the side walls of one-half of the first length.

44) At least one of the plurality of boxes is a compact box characterized by two side walls having one-half of the first length and the other side walls having the one-half of the first width, and having the means for interconnecting to various ones of the plurality of boxes, and one of the latches disposed on at least one of the side walls of one-half of the first length.

45) At least one of the plurality of boxes is a low profile box characterized by two side walls having one-half of the first length and the other side walls having the first width, and having the means for interconnecting to various ones of the plurality of boxes, and a depth that is less than a depth of the large box.

46) At least one of the plurality of boxes is a high profile box characterized by two side walls having a length less than the first length and the other side walls having the first width, and having the means for interconnecting to various ones of the plurality of boxes, and a depth that is greater than a depth of the large box. In the modular storage system having at least two boxes, one of the at least two large boxes is a rolling base box comprising at least one wheel and a retractable handle connected relative to respective ends of the bottom portion.

47) The rolling base box can have exterior surfaces comprising a top exterior surface, a bottom exterior surface, and four exterior side walls, the exterior side walls comprising a front first side wall, a back second side wall opposite the front first side wall, and third and fourth side walls opposite each other that are, respectively, a bottom side wall when the rolling base box is set on its end that has the wheel connected relative thereto, and a top side wall from which the retractable handle extends.

48) An axis of the wheel is disposed a distance relative to the bottom side wall that allows a tread of the wheel to be proud of the bottom side wall.

49) The rolling base box comprises one or more foot members disposed adjacent the wheels and having a bottom edge thereof that is proud of the bottom side wall to operate with the wheel to balance the rolling base box when tilted to stand with its bottom side wall toward a ground surface.

50) The rolling base box comprises a fixed handle disposed on the bottom side wall, 51) The rolling base box comprises handle tracks in the bottom portion, the handle slides in and out of the handle tracks to selectively extend from track openings in the top side wall.

52) The handle tracks are formed integrally in the bottom portion and are at least partially open relative to the bottom exterior surface of the rolling base box.

53) The handle comprises two parallel handle legs having first ends that engage the handle tracks and slide therein, and second ends that join respective ends of a grip member, the second ends of the handle legs and the grip member each having a top surface and a bottom surface, and at least one stopper member provided on a bottom surface of at least one of the second ends of the handle legs and the grip member, the stopper member being configured with a protruding portion angled to catch an edge of a surface against which the rolling base box is inclined and retain the rolling base box against the surface.

54) The top side wall of the rolling base box comprises first means for removable connection to another storage box that rests on the handle when the handle is extended. The other storage box comprises second means for removable connection to the top side wall of the rolling base box.

55) The high profile box comprises the second means for removable connection to the top side wall of the rolling base box and the length of the high profile box is less than a length of the handle when fully extended.

56) The first means for removable connection comprises an insert member, and the second means for removable connection comprises a sleeve configured to receive the insert member when the other storage box is placed adjacent to the rolling base box and on the handle thereof.

57) At least one of the boxes comprises two side walls molded at an adjoining corner thereof to form a pinch grip corner, and means for attaching an accessory to the pinch grip corner.

58) Wherein a side wall of a box has an inset edge relative to the adjoining corners to form the pinch grip corner, the means for attaching an accessory to the pinch grip corner comprising a corner clamp device that extends along the side wall of the box from one side of the adjoining corner to the other side of the adjoining corner and at least partially around the inset edge, the corner clamp device comprising a first clamp member and a second clamp member that can be secured relative to each other in a clamped configuration to secure the corner clamp device to the adjoining corner, and separated relative to each other in a loosened configuration to remove the corner clamp device from the adjoining corner.

59) Wherein a side wall of a box can be formed with at least one thinner area of less thickness than thicker areas at opposite ends of the side wall of the box at adjoining corners with other side walls of the box, the thinner area being configured as a depression in the side wall relative to the thicker areas at opposite ends of the side wall to form the inset edge.

60) The corner clamp device comprises an accessory holder mounted on at least one of the first clamp member and the second clamp member, the accessory holder chosen from a pocket, a band configured to surround an item, and a post having a retention member on a free end thereof to prevent an item from falling off the post.

61) The means for attaching an accessory to the pinch grip corner further comprises a first accessory mounting member secured to the corner clamp device, and a second accessory mounting member secured to a removable accessory, the first accessory mounting member and the second accessory mounting member being removably engaged with each other.

62) In a modular storage system comprising means for interconnecting at least two boxes to each other in a stacked configuration, further comprising means for surface mounting the at least two boxes to a surface, wherein the means for interconnecting the at least two boxes and the means for surface mounting the at least two boxes have common features.

63) The means for surface mounting comprising a planar member that can be secured to a surface chosen from a wall of a building and a side of a vehicle, the planar member being configured to have the means for interconnecting to at least one box, the means for interconnecting on the planar member comprising at least one of a guide that cooperates with a channel on the at least one box, and a channel that receives a guide on the at least one box.

64) The planar surface is mounted on a bracket that can be folded flush against the surface and deployed at an angle relative to the surface.

65) Wherein the surface is a vertical wall, and the planar surface further comprises at least one stop member that can be removably placed at a selected location on the planar surface, the stop member being configured to prevent the at least one box from descending along the wall.

66) In a modular storage system comprising means for interconnecting at least two boxes to each other in a stacked configuration, the means for interconnecting boxes can comprise protuberances extending from each of a top surface and a bottom surface of a box, the protuberances extending from the top surface being arranged relative to each other to delineate channels of space in between rows of protuberances along at least one of a width dimension and a length dimension of the top surface.

67) The channels of space between rows of protuberances are open on respective ends thereof.

68) The protuberances extending from the bottom surface are arranged to engage with one or more of the protuberances extending from the top surface of a second box when the box is moved in a translational direction that is parallel to the rows of channels.

69) The protuberances extending from the top surface of the box are formed with an edge to engage the protuberances extending from the bottom surface of a second box, and/or the protuberances extending from the bottom surface of the box are formed with an edge to engage the protuberances extending from the top surface of a second box.

70) The protuberances are configured as unitary and continuous protuberances extending across a dimension of the top surface of the box to form open and continuous channel cavities with continuous side walls, and as unitary and continuous protuberances extending across a dimension of the bottom surface the box and arranged to form continuous raised guides disposed and dimensioned to be received in the channel cavities of a second box.

In accordance with example embodiments, a modular storage system comprises different sizes of interconnecting storage boxes that can be coupled to each other in various configurations. The storage boxes can each comprise a top portion and a bottom portion that define an inner volume for a storage compartment. The top portion or lid can have a number of features to enhance structural strength of the lid, and improve efficiency of storage of items on the interior surface of the lid and/or in the storage compartment. The lid and interior features of a storage box can have any number of and any combinations of the following features and any number of and any combination of the external features of the boxes or container modules enumerated above.

1) A storage box comprises a lid for covering a bottom portion and defining an inner volume, and means for organizing items stored within the inner volume.

2) The means for organizing comprises a plurality of ribs formed on an inner surface of the lid.

3) The means for organizing comprises a plurality of holes formed at one or more intersections of the ribs that are configured to receive a fastener such as a screw or pin.

4) The holes formed at one or more intersections of the ribs are configured as molded bosses.

5) A screw or pin is inserted into at least one of the plurality of holes to affix an item to the inner surface of the lid.

6) At least one of the ribs comprises a slot configured to receive a retention member chosen from a strap and a tab on an item to affix the item to the inner surface of the lid.

7) The ribs are formed using a grid pattern having greater density in a center portion of the box than at end portions of the box.

8) The grid pattern comprises two sets of ribs forming double trusses disposed on respective sides of the center portion of the top portion of the box, each set of the double trusses having ribs arranged in a lattice structure between the trusses.

9) The storage box can have means for organizing that further comprises a receptacle having a bottom surface and side walls for defining an interior storage space therein and an opening at the top of the receptacle, and wherein the ribs are formed using a grid pattern comprising intersecting ribs and some of the intersecting ribs abut the receptacle and close the opening when the lid is closed.

10) The means for organizing further comprises means for preventing movement of the receptacle within the box and chosen from protrusions arranged at respective locations on a bottom interior surface of the box to coincide with placement of the receptacle in the box and at least partially contact a wall of the receptacle, and a tray that can be provided in the bottom portion of the box and that at least one protrusion in a surface thereof that cooperates with a recess formed in the bottom surface of the receptacle.

11) The means for preventing movement of the receptacle within the box further comprises at least one rib on an interior side wall of the bottom portion of the box that contacts a receptacle.

12) The means for organizing further comprises a divider removably provided in the bottom portion to divide the inner volume into plural storage sections.

13) The divider is configured to be removed from the bottom portion and affixed against the inner surface of the lid.

14) The divider has a plurality of through holes, and the means for organizing comprises a plurality of holes formed at one or more intersections of the ribs that are configured to receive a fastener pin inserted through a selected one of the plurality of through holes aligned with a selected one of the plurality of holes to affix the divider against the inner surface of the lid.

15) The divider has a plurality of slots to which items are connected using a strap inserted into one or more of the slots.

16) The slots are arranged in the divider to configure the divider as a Modular Lightweight Load-carrying Equipment or MOLLE-board type interface.

17) The lid can be removably attached to the bottom portion by at least one latch connecting the lid to the bottom portion.

18) The lid can be attached to the bottom portion by a cable having a first end connected to the lid and a second end connected to the bottom portion.

19) A storage box comprises a lid for covering a bottom portion and defining an inner volume, and means for organizing items stored within the inner volume.

20) The means for organizing comprises a plurality of ribs formed on an inner surface of the lid.

21) The means for organizing comprises a plurality of holes formed at one or more intersections of the ribs that are configured to receive a fastener such as a screw or pin.

22) The holes formed at one or more intersections of the ribs are configured as molded bosses.

23) A screw or pin is inserted into at least one of the plurality of holes to affix an item to the inner surface of the lid.

24) At least one of the ribs comprises a slot configured to receive a retention member chosen from a strap and a tab on an item to affix the item to the inner surface of the lid.

25) The ribs are formed using a grid pattern having greater density in a center portion of the box than at end portions of the box.

26) The grid pattern comprises two sets of ribs forming double trusses disposed on respective sides of the center portion of the top portion of the box, each set of the double trusses having ribs arranged in a lattice structure between the trusses.

27) The storage box can have means for organizing that further comprises a receptacle having a bottom surface and side walls for defining an interior storage space therein and an opening at the top of the receptacle, and wherein the ribs are formed using a grid pattern comprising intersecting ribs and some of the intersecting ribs abut the receptacle and close the opening when the lid is closed.

28) The means for organizing further comprises means for preventing movement of the receptacle within the box and chosen from protrusions arranged at respective locations on a bottom interior surface of the box to coincide with placement of the receptacle in the box and at least partially contact a wall of the receptacle, and a tray that can be provided in the bottom portion of the box and that at least one protrusion in a surface thereof that cooperates with a recess formed in the bottom surface of the receptacle.

29) The means for preventing movement of the receptacle within the box further comprises at least one rib on an interior side wall of the bottom portion of the box that contacts a receptacle.

30) The means for preventing movement of the receptacle within the box further comprises a contoured surface on the bottom of the receptacle that cooperates with an complementary contoured surface on the interior wall of the bottom portion of the box that contacts a receptacle.

31) The means for organizing further comprises a divider removably provided in the bottom portion to divide the inner volume into plural storage sections.

32) The divider is configured to be removed from the bottom portion and affixed against the inner surface of the lid.

33) The divider has a plurality of through holes, and the means for organizing comprises a plurality of holes formed at one or more intersections of the ribs that are configured to receive a fastener pin inserted through a selected one of the plurality of through holes aligned with a selected one of the plurality of holes to affix the divider against the inner surface of the lid.

34) The divider has a plurality of slots to which items are connected using a strap inserted into one or more of the slots.

35) The slots are arranged in the divider to configure the divider as a Modular Lightweight Load-carrying Equipment or MOLLE-board type interface.

36) The lid can be removably attached to the bottom portion by at least one latch connecting the lid to the bottom portion.

37) The lid can be attached to the bottom portion by a cable having a first end connected to the lid and a second end connected to the bottom portion.

It will be understood by one skilled in the art that this disclosure is not limited in its application to the details of construction and the arrangement of components set forth in the example embodiments of a modular storage system and aspects thereof provided herein as described herein and with reference to the drawing figures. The embodiments herein are capable of other embodiments, and capable of being practiced or carried out in various ways. Also, it will be understood that the phraseology and terminology used herein is for the purpose of description and should not be regarded as limiting.

The invention claimed is:

1. A storage box comprises:
    a lid for covering a bottom portion and defining an inner volume;
    wherein the lid comprises a plurality of ribs are formed on an inner surface of the lid that faces the inner volume of the storage box when the lid is closed against the bottom portion of the storage box, and a plurality of holes formed at one or more intersections of the ribs that are configured to receive a fastener;
    the storage box further comprising an internal organizing system configured to organize stored items within the inner volume;
    wherein the internal organizing system comprises a receptacle having a bottom surface and side walls for defining an interior storage space therein and an opening at the top of the receptacle, and
    wherein the ribs are formed using a grid pattern comprising intersecting ribs and some of the intersecting ribs are configured to abut the receptacle and close the opening when the lid is closed to prevent contents in the receptacle from migrating out of the receptacle; and
    the internal organizing system comprises features for preventing movement of the receptacle within the box and chosen from protrusions arranged at respective locations on a bottom interior surface of the box to coincide with placement of the receptacle in the box and at least partially contact a wall of the receptacle, a tray that can be provided in the bottom portion of the box and that at least one protrusion in a surface thereof that cooperates with a recess formed in the bottom surface of the receptacle, at least one rib on an interior side wall of the bottom portion of the box that contacts a receptacle, and a contoured surface on the bottom of the receptacle that cooperates with a complementary contoured surface on the interior wall of the bottom portion of the box that contacts a receptacle.

2. The storage box of claim 1,
    wherein at least one of the ribs comprises a slot configured to receive a retention member chosen from a strap and a tab on an item to affix the item to the inner surface of the lid, the slot being formed in a portion of the rib that is disposed between the one or more intersections of the ribs.

3. The storage box of claim 1, wherein the plurality of holes formed at one or more intersections of the ribs are configured as molded bosses.

4. The storage box of claim 1, further comprising an item to be disposed in the storage box that is connected to the lid by at least one fastener inserted into at least one of the plurality of holes to affix the item to the inner surface of the lid.

5. The storage box of claim 1,
    wherein the ribs are formed using a grid pattern having greater density in a center portion of the box than at end portions of the box.

6. The storage box of claim 5, wherein the grid pattern comprises two sets of ribs forming double trusses disposed on respective sides of the center portion of the top portion of the box, each set of the double trusses having ribs arranged in a lattice structure between the trusses.

7. The storage box of claim 1, further comprising a plurality of lids wherein each of the plurality of lids has a length dimension and a width dimension that is the same as the bottom portion of a storage box and different respective height dimensions, the plurality of lids providing a different inner volume depending on which of the plurality of lids is connected to the bottom portion.

8. The storage box of claim 1, wherein the internal organizing system comprises a divider removably provided in the bottom portion to divide the inner volume into plural storage sections;
    wherein the divider is configured to be removed from the bottom portion and affixed against the inner surface of the lid;
    wherein the divider has a plurality of through holes, and the plurality of holes formed at one or more intersections of the ribs are configured to receive a fastener inserted through a selected one of the plurality of through holes aligned with a selected one of the plurality of holes to affix the divider against the inner surface of the lid.

9. The storage box of claim 8, wherein the divider has a plurality of slots configured as elongated through holes to which items are connected using a strap inserted into one or more of the slots.

10. The storage box of claim 9, wherein the slots are arranged in the divider to configure the divider as a Modular Lightweight Load-carrying Equipment or MOLLE-board type interface.

11. The storage box of claim 1, wherein the lid can be removably attached to the bottom portion by at least one latch connecting the lid to the bottom portion.

12. The storage box of claim 11, wherein the lid is removably attached to the bottom portion on opposing sides thereof by at least one latch which is configured as a hinge when closed to open the lid from only one of the opposing sides.

* * * * *